United States Patent
Strein et al.

(10) Patent No.: US 12,441,807 B2
(45) Date of Patent: Oct. 14, 2025

(54) BISPECIFIC ANTIBODIES AGAINST CEACAM5 AND CD3

(71) Applicant: LamKap Bio Alpha AG, Pfaeffikon (CH)

(72) Inventors: Klaus Strein, Weinheim (DE); Sara Majocchi, Grand Lancy (CH)

(73) Assignee: LAMKAP BIO ALPHA AG, Pfaeffikon (CH)

( * ) Notice: Subject to any disclaimer, the term of this patent is extended or adjusted under 35 U.S.C. 154(b) by 881 days.

(21) Appl. No.: 17/761,531

(22) PCT Filed: Sep. 17, 2020

(86) PCT No.: PCT/IB2020/058690
§ 371 (c)(1),
(2) Date: Mar. 17, 2022

(87) PCT Pub. No.: WO2021/053587
PCT Pub. Date: Mar. 25, 2021

(65) Prior Publication Data
US 2023/0136228 A1    May 4, 2023

Related U.S. Application Data

(60) Provisional application No. 62/902,150, filed on Sep. 18, 2019.

(30) Foreign Application Priority Data

Sep. 18, 2019  (EP) ..................... 19198124

(51) Int. Cl.
*C07K 16/30* (2006.01)
*A61K 39/00* (2006.01)
*A61P 35/00* (2006.01)
*C07K 16/28* (2006.01)

(52) U.S. Cl.
CPC .. *C07K 16/3007* (2013.01); *A61K 39/001129* (2018.08); *A61K 39/001182* (2018.08); *A61P 35/00* (2018.01); *C07K 16/2803* (2013.01); *C07K 16/2809* (2013.01); *A61K 2039/507* (2013.01); *A61K 2039/545* (2013.01); *C07K 2317/31* (2013.01); *C07K 2317/33* (2013.01); *C07K 2317/35* (2013.01); *C07K 2317/565* (2013.01); *C07K 2317/622* (2013.01); *C07K 2317/73* (2013.01); *C07K 2317/92* (2013.01)

(58) Field of Classification Search
CPC ............ C07K 16/3007; C07K 16/2803; C07K 16/2809; C07K 2317/31; C07K 2317/33; C07K 2317/35; C07K 2317/565; C07K 2317/622; C07K 2317/73; C07K 2317/92; C07K 2317/34; A61K 39/001129; A61K 39/001182; A61K 2039/507; A61K 2039/545; A61K 2039/505; A61P 35/00
See application file for complete search history.

(56) References Cited

U.S. PATENT DOCUMENTS

| | | | |
|---|---|---|---|
| 6,737,056 B1 | 5/2004 | Presta |
| 7,521,051 B2 | 4/2009 | Collins et al. |
| 8,008,449 B2 | 8/2011 | Korman et al. |
| 8,236,308 B2 | 8/2012 | Kischel et al. |
| 8,354,509 B2 | 1/2013 | Carven et al. |
| 8,383,796 B2 | 2/2013 | Korman et al. |
| 2002/0165360 A1 | 11/2002 | Junghans |
| 2005/0147614 A1 | 7/2005 | Begent et al. |
| 2011/0064653 A1 | 3/2011 | Hansen et al. |
| 2012/0184716 A1 | 7/2012 | Fischer et al. |
| 2012/0251529 A1 | 10/2012 | Hofer et al. |
| 2012/0321626 A1 | 12/2012 | Zhou |
| 2014/0140989 A1 | 5/2014 | Eckelman et al. |
| 2014/0242079 A1 | 8/2014 | Bacac et al. |
| 2014/0242080 A1 | 8/2014 | Jaeger et al. |
| 2016/0194399 A1 | 7/2016 | Irving et al. |
| 2019/0284297 A1 | 9/2019 | Fischer et al. |
| 2020/0123252 A1 | 4/2020 | Buatois et al. |

FOREIGN PATENT DOCUMENTS

| | | |
|---|---|---|
| CA | 3079039 A1 | 6/2019 |
| EP | 0307434 B2 | 7/1998 |
| EP | 3199552 B1 | 12/2019 |
| RU | 2605390 C2 | 12/2016 |
| WO | WO-0041474 A2 | 7/2000 |
| WO | WO-03099196 A2 | 12/2003 |

(Continued)

OTHER PUBLICATIONS

Anasetti, C., et al., "Treatment of Acute Graft-Versus-Host Disease with a Nonmitogenic Anti-CD3 Monoclonal Antibody," Transplantation, 54(5):844-851, Williams & Wilkins, United States (Nov. 1992).
Bacac, M., et al., "A Novel Carcinoembryonic Antigen T-Cell Bispecific Antibody (CEA TCB) for the Treatment of Solid Tumors," Clinical Cancer Research 22(13):3286-3297, The Association, United States (Jul. 2016).
Berinstein, N.L., "Carcinoembryonic Antigen as a Target for Therapeutic Anticancer Vaccines: a Review," Journal of Clinical Oncology 20(8):2197-2207, American Society of Clinical Oncology, United States (Apr. 2002).
Bruce, M. P., et al., "Dialysis-based bioreactor systems for the production of monoclonal antibodies—alternatives to ascites production in mice," J Immunol Methods 264(1-2):59-68, Elsevier, Netherlands (Jun. 2002).
Chothia, C. and Lesk, A. M., "Canonical Structures for the Hypervariable Regions of Immunoglobulins," Journal of Molecular Biology 196(4):901-917, Elsevier, United Kingdom (Aug. 1987).

(Continued)

*Primary Examiner* — Misook Yu
*Assistant Examiner* — Grace H Lunde
(74) *Attorney, Agent, or Firm* — Sterne, Kessler, Goldstein and Fox P.L.L.C.

(57) ABSTRACT

The present invention relates to bispecific antibodies which bind to human carcinoembryonic antigen CEACAM5 (CEA) and human CD3ε. In addition, the present invention relates to polynucleotides encoding such bispecific antibodies and vectors and host cells comprising such polynucleotides. The invention further relates to methods for selecting and producing such antibodies and to methods of using such antibodies in the treatment of diseases.

11 Claims, 24 Drawing Sheets

Specification includes a Sequence Listing.

(56) References Cited

FOREIGN PATENT DOCUMENTS

| | | |
|---|---|---|
| WO | WO-2007005874 A2 | 1/2007 |
| WO | WO-2007042261 A2 | 4/2007 |
| WO | WO-2007071426 A1 | 6/2007 |
| WO | WO-2008119565 A2 | 10/2008 |
| WO | WO-2008119566 A2 | 10/2008 |
| WO | WO-2008119567 A2 | 10/2008 |
| WO | WO-2008156712 A1 | 12/2008 |
| WO | WO-2009091547 A1 | 7/2009 |
| WO | WO-2009091601 A1 | 7/2009 |
| WO | WO-2009101611 A1 | 8/2009 |
| WO | WO-2009114335 A2 | 9/2009 |
| WO | WO-2009131453 A1 | 10/2009 |
| WO | WO-2010027423 A2 | 3/2010 |
| WO | WO-2010027827 A2 | 3/2010 |
| WO | WO-2010027828 A2 | 3/2010 |
| WO | WO-2010037836 A2 | 4/2010 |
| WO | WO-2010037837 A2 | 4/2010 |
| WO | WO-2010037838 A2 | 4/2010 |
| WO | WO-2010077634 A1 | 7/2010 |
| WO | WO-2011143624 A2 | 11/2011 |
| WO | WO-2012023053 A2 | 2/2012 |
| WO | WO-2012117002 A1 | 9/2012 |
| WO | WO-2013012414 A1 | 1/2013 |
| WO | WO-2013019906 A1 | 2/2013 |
| WO | WO-2013032948 A1 | 3/2013 |
| WO | WO-2013055958 A1 | 4/2013 |
| WO | WO-2013088259 A2 | 6/2013 |
| WO | WO-2013119714 A1 | 8/2013 |
| WO | WO-2013173223 A1 | 11/2013 |
| WO | WO-2014087248 A2 | 6/2014 |
| WO | WO-2014131711 A1 | 9/2014 |
| WO | WO-2014131712 A1 | 9/2014 |
| WO | WO-2015026634 A1 | 2/2015 |
| WO | WO-2015105995 A2 | 7/2015 |
| WO | WO-2015112534 A2 | 7/2015 |
| WO | WO-2016007235 A1 | 1/2016 |
| WO | WO-2016036678 A1 | 3/2016 |
| WO | WO-2016116907 A1 | 7/2016 |
| WO | WO-2016156537 A1 | 10/2016 |
| WO | WO-2017055389 A1 | 4/2017 |
| WO | WO-2017118675 A1 | 7/2017 |
| WO | WO-2017181033 A1 | 10/2017 |
| WO | WO-2017196793 A1 | 11/2017 |
| WO | WO-2018026600 A1 | 2/2018 |
| WO | WO-2018053328 A1 | 3/2018 |
| WO | WO-2018199593 A1 | 11/2018 |
| WO | WO-2019157432 A1 | 8/2019 |
| WO | WO-2019175658 A1 | 9/2019 |
| WO | WO-2019234576 A1 | 12/2019 |
| WO | WO-2021053587 A1 | 3/2021 |

OTHER PUBLICATIONS

Cole, S.P.C., et al., "The EBV-Hybridoma Technique and Its Application to Human Lung Cancer," in Monoclonal Antibodies and Cancer Therapy, Reisfeld, R.A. and Sell, S., eds., pp. 77-96, Alan R. Liss, Inc., United States (1985).

Conaghan, P.J., "Targeted Killing of Colorectal Cancer Cell Lines by a Humanised IgG1 Monoclonal Antibody that Binds to Membrane-Bound Carcinoembryonic Antigen," British Journal of Cancer, 98(7):1217-1225, Nature Publishing Group on behalf of Cancer Research UK, United Kingdom (Apr. 2008).

Cote, R.J., et al., "Generation of Human Monoclonal Antibodies Reactive with Cellular Antigens," Proceedings of the National Academy of Sciences of the United States of America, 80(7):2026-2030, National Academy of Sciences, United States (1983).

Durbin, H., et al., "An Epitope on Carcinoembryonic Antigen Defined by the Clinically Relevant Antibody PR1A3," Proceedings of the National Academy of Sciences of the United States of America, 91(10):4313-4317, National Academy of Sciences, United States (May 1994).

Fischer, N., et al., "Exploiting Light Chains for the Scalable Generation and Platform Purification of Native Human Bispecific IgG," Nature communications, 6:6113, pp. 1-12, Nature Publishing Group, United Kingdom (Feb. 2015).

Gold, P. and Freedman, S.O., "Demonstration of Tumor-specific Antigens in Human Colonic Carcinomata by Immunological Tolerance and Absorption Techniques," The Journal of Experimental Medicine 121(3):439-462, Rockefeller University Press, United States (Mar. 1965).

Hammarstrom, S., "The Carcinoembryonic Antigen (CEA) Family: Structures, Suggested Functions and Expression in Normal and Malignant Tissues," Seminars in Cancer Biology 9(2):67-81, Academic Press, United Kingdom (Apr. 1999).

International Search Report and Written Opinion for International Application No. PCT/IB2020/058690, European Patent Office, Netherlands, mailed on Dec. 18, 2020, 12 pages.

Johnson, G., et al., "Kabat Database and Its Applications: 30 Years After the First Variability Plot," Nucleic Acids Research 28(1):214-218, Oxford University Press, United Kingdom (Jan. 2000).

Kabat, E. A., et al., "Evolutionary and Structural Influences on Light Chain Constant ($C_L$) Region of Human and Mouse Immunoglobulins," Proceedings of the National Academy of Sciences of the United States of America 72(7):2785-2788, National Academy of Sciences, United States (Jul. 1975).

Kabat, E. A., et al., "Sequence of Proteins of Immunological Interest," U.S. Department of Health and Human Services, United States, 347 pages (1983).

Klein, C., et al., "Cergutuzumab Amunaleukin (CEA-IL2v), A CEA-Targeted IL-2 Variant-Based Immunocytokine for Combination Cancer Immunotherapy: Overcoming Limitations of Aldesleukin and Conventional IL-2-based Immunocytokines," Oncoimmunology, 6(3):e1277306, pp. 1-15, Taylor & Francis, United States (Jan. 2017).

Kozbor, D. and Roder, J.C., "The Production of Monoclonal Antibodies From Human Lymphocytes," Immunology Today 4(3):72-79, Elsevier Science Publishers, United Kingdom (Mar. 1983).

Lund, J., et al., "Oligosaccharide-Protein Interactions in IgG can Modulate Recognition by Fc Gamma Receptors," FASEB Journal 9(1):115-119, Federation of American Societies for Experimental Biology, United States (1995).

Magistrelli, G., et al., "Optimizing Assembly and Production of Native Bispecific Antibodies by Codon De-Optimization," MABS, 9(2):231-239, Taylor & Francis, United States (Feb. 2017).

Mcdonald, K. A., et al., "Production of human alpha-1-antitrypsin from transgenic rice cell culture in a membrane bioreactor," Biotechnol Prog 21(3):728-734, American Institute of Chemical Engineers and the Society for Biological Engineering, United States (May-Jun. 2005).

Melero, I., et al., "Pharmacokinetics (PK) and Pharmacodynamics (PD) of a Novel Carcinoembryonic Antigen (CEA) T-cell Bispecific Antibody (CEA CD3 TCB) for the Treatment of CEA-Expressing Solid Tumors," Journal of Clinical Oncology 35(15):2549-2549, American Society of Clinical Oncology, United States (May 2017).

Morgan, A., et al., "The N-terminal End of the CH2 Domain of Chimeric Human IgG1 Anti-HLA-DR is Necessary for C1q, Fc Gamma RI and Fc Gamma RIII Binding," Immunology 86(2):319-324, Blackwell Scientific Publications, United Kingdom (1995).

NCT01284231, "A Study to Evaluate the Safety and Tolerability of MEDI-565 in Adults With Gastrointestinal Adenocarcinomas," ClinicalTrials.gov, sponsored by MedImmune LLC, first posted Jan. 26, 2011, study start Dec. 2010, study completion Jan. 2015, accessed at (https://www.clinicaltrials.gov/ct2/show/study/NCT01284231) on Sep. 1, 2022, 7 pages.

NCT02309892, "A Dose Escalation Study of L-DOS47 in Recurrent or Metastatic Non-Squamous NSCLC," ClinicalTrials.gov, sponsored by Helix BioPharma Corporation, first posted Dec. 5, 2014, study start Apr. 2014, study completion Sep. 2019, accessed at (https://clinicaltrials.gov/ct2/show/NCT02309892) on Sep. 1, 2022, 7 pages.

NCT03866239, "A Phase Ib Study to Evaluate the Safety, Efficacy, and Pharmacokinetics of Cibisatamab in Combination With Atezolizumab After Pretreatment With Obinutuzumab in Participants With Previously Treated Metastatic Colorectal Adenocarcinoma,"

(56) References Cited

OTHER PUBLICATIONS

ClinicalTrials.gov, sponsored by Hoffmann-La Roche, first posted Mar. 7, 2019, study start May 7, 2019, as updated on Aug. 22, 2022, accessed at (https://clinicaltrials.gov/ct2/show/NCT03866239) on Sep. 6, 2022, 9 pages.

Pishvaian, M., et al., "Phase 1 Dose Escalation Study of MEDI-565, a Bispecific T-Cell Engager that Targets Human Carcinoembryonic Antigen, in Patients With Advanced Gastrointestinal Adenocarcinomas," Clinical Colorectal Cancer 15(4):345-351, Elsevier, United States (Dec. 2016).

Richman, P.I and Bodmer, W.F., "Monoclonal Antibodies to Human Colorectal Epithelium: Markers for Differentiation and Tumour Characterization," International Journal of Cancer, 39(3):317-328, Wiley-Liss, United States (Mar. 1987).

Salmeron, A., et al., "A Conformational Epitope Expressed upon Association of CD3-epsilon with either CD3-delta or CD3-gamma is the Main Target for Recognition by Anti-CD3 Monoclonal Antibodies," Journal of Immunology 147(9):3047-3052, American Association of Immunologists, United States (1991).

Sandler, B., et al., "The Role of Blood Levels of Soluble 53 kDa Protein and CEA in Monitoring Colon Cancer Patients," Anticancer Research, 19(5B):Abstract, 1 page, International Institute of Anticancer Research, Greece (Sep. 1999).

Schutte, M., et al., "Molecular Dissection of Colorectal Cancer in Pre-clinical models identifies biomarkers predicting sensitivity to EGFR inhibitors," Nature Communications, 8(14262):1-19, Nature Publishing Group, United Kingdom (Feb. 2017).

Shields, R.L., et al., "High Resolution Mapping of the Binding Site on Human IgG1 for Fc gamma RI, Fc gamma RII, Fc gamma RIII, and FcRn and Design of IgG1 Variants with Improved Binding to the Fc gamma R," The Journal of Biological Chemistry 276(9):6591-6604, American Society for Biochemistry and Molecular Biology, United States (Mar. 2001).

Sonnichsen, R., et al., "Individual Susceptibility Analysis Using Patient-derived Slice Cultures of Colorectal Carcinoma," Clinical Colorectal Cancer 17(2):e189-e199, Elsevier, United States (Jun. 2018).

Stewart, L.M., et al., "Humanisation and Characterisation of PR1A3, A Monoclonal Antibody Specific for Cell-Bound Carcinoembryonic Antigen," Cancer Immunology and Immunotherapy, 47(6):299-306, Springer Verlag, Germany (1999).

Tabernero, J., et al., "Phase Ia and Ib Studies of the Novel Carcinoembryonic Antigen (CEA) T-cell Bispecific (CEA CD3 TCB) Antibody as a Single Agent and in Combination with Atezolizumab: Preliminary Efficacy and Safety in Patients with Metastatic Colorectal Cancer (mCRC)," Journal of Clinical Oncology 35(15): Abstract 3002, 4 pages, American Society of Clinical Oncology, United States (2017).

Vaughan, T.J., et al., "Human Antibodies with Sub-nanomolar Affinities Isolated from a Large non-Immunized Phage Display Library," Nature Biotechnology 14(3):309-314, Nature Publishing Co., United States (Mar. 1996).

Yang, S.Y., et al., "A common pathway for T lymphocyte activation involving both the CD3-Ti complex and CD2 sheep erythrocyte receptor determinants," Journal of Immunology 137(4): 1097-1100, American Association of Immunologists, United States (1986).

Mizutani, K., et al., "Response to nivolumab in metastatic collecting duct carcinoma expressing PD-L1: A case report," Molecular and Clinical Oncology 7(6):988-990, Spandidos Publications, Greece (Dec. 2017).

Baylot, V., et al., "TCTP Has a Crucial Role in the Different Stages of Prostate Cancer Malignant Progression," Results Probl Cell Differ 64:255-261, Springer, Germany (Nov. 2017).

Muller, S., et al., "Spliceosomal peptide P140 for immunotherapy of systemic lupus erythematosus: results of an early phase II clinical trial," Arthritis Rheum 58(12):3873-3883, Wiley, United States (Dec. 2008).

C

D

BISPECIFIC ANTIBODIES AGAINST CEACAM5 AND CD3

FIELD OF THE INVENTION

The present invention relates to bispecific antibodies which bind to human carcinoembryonic antigen CEACAM5 (CEA) and human CD3ε (CEA×CD3 bispecific antibody). In addition, the present invention relates to polynucleotides encoding such bispecific antibodies and vectors and host cells comprising such polynucleotides. The invention further relates to methods for selecting and producing such antibodies and to methods of using such antibodies in the treatment of diseases.

BACKGROUND OF THE INVENTION

Successful treatment of advanced/metastatic solid cancer like e.g. pancreatic cancer, colorectal cancer stomach cancer, lung cancer etc. is still a challenge. Modern cancer immunotherapy has introduced methods/techniques to help the body's immune cells to better attack and kill cancer cells. For example, several techniques/methods have been developed to increase the attack of tumor cells by T-cells. Examples are immune checkpoint inhibitors like e.g. PD-1/PD-L1 inhibiting monoclonal antibodies, T-cell bispecific antibodies binding to a tumor associated antigen (TAA) and CD3 on T-cells or CAR-T-cells. CAR-T-cells and bispecific antibodies are effective in hematological malignancies and approved for e.g. the treatment of B-cell malignancies or acute lymphocytic leukemia ALL, but so far there has been no real breakthrough of these methods in the therapy of advanced/metastatic solid cancer. Monoclonal antibodies and also bispecific antibodies used in therapy can cause a variety of adverse effects. An important toxicity issue is the cytokine-release syndrome (CRS), which was for example found in therapy with alemtuzumab, muromonab-CD3, rituximab, tosituzumab and CD19×CD3 bispecific antibody Blinatumomab.

Tabernero et. al. (J Clin Oncol 35, 2017 (suppl. abstr. 3002)) presented at ASCO 2017 phase 1 clinical data in patients with advanced/metastatic colorectal cancer with an CEA×CD3 bispecific antibody (RO 6958688, cibisatamab, see below) in monotherapy and in combination with the anti-PD-L1 antibody atezolizumab. Cibisatamab has a so called 2+1 format, with one Fab fragment binding to CD3 and with two Fab fragments binding to CEA. Such antibodies are e.g. described in US20140242079 (WO2014131712) and US20140242080 (WO2014131711).

As used herein "TCB2014" refers to a bispecific antibody binding to CEA and CD3 in the 2+1 format as described in US20140242080 (incorporated by reference in its entirety), comprising as CDRs the CDRs as shown in SEQ ID NOs: 270-276 and 290-296 of US20140242080 (see also CDRs of SEQ ID NOs: 4-10 and 24-30 of US20140242079, incorporated by reference in its entirety). As used herein "TCB2017" refers to molecule B in the "2+1 IgG CrossFab, inverted" format with charge modifications (VH/VL exchange in CD3 binder, charge modification in CEA binder, humanized CEA binder) as described in WO2017055389 (incorporated by reference in its entirety) comprising as CDRs the CDRs as shown in SEQ ID NOs: 4-6, 8-10 and 14-19 of WO2017055389.

The 2+1 structure is rather different from native IgG antibodies. The structure also contains artificial amino acid (aa) bridges and two different heavy chains brought together by knob into hole technology/aa sequences in the Fc part (see e.g. U.S. Pat. No. 6,737,056, WO2013055958). Such bispecific antibodies (e.g., RO6958688, cibisatamab) are immunogenic and cause therefore formation of anti-drug-antibodies (ADA) and loss of drug exposure due to the neutralization of the drug by ADA. Melero et al reported at 60-200 mg doses 50 or more % of patients with ADA and in 45% of patients loss of exposure (Melero et al., ASCO 2017, Abstract 2549 and Poster No. 41, Abstract see Journal of Clinical Oncology 35, no. 15_suppl (May 20, 2017) 2549-2549). Loss of exposure makes practical therapy difficult to control and significantly decreases the probability for success. To minimize ADA formation, cibisatamab respectively the combination of cibisatamab and atezolizumab is tested clinically in combination after pre-treatment with the anti-CD20 antibody obinutuzumab (see ClinicalTrials.gov Trial NCT03866239). The pre-treatment is given to deplete the B-cells of the patients with metastatic colorectal carcinomas. Depletion of B-cells leads to a drop of immunoglobulins of the patient and therefore of potential ADAs, but at the same time it leads to a weakening of the immune system.

MEDI-565 (AMG211), a further bispecific CEA×CD3 antibody, a single-chain antibody, has been in clinical development, results have been published (see e.g. M. Pishvaian et al. Clin Colorectal Cancer. 2016 December; 15(4) 345-351). The study NCT01284231 (ClinicalTrials.gov) is reported as completed, no new trial has been started in the last years. This single chain bispecific antibody (two scFv connected by an aa linker) has extremely low elimination half-life between 2.2 and 6.5 hours (Pishvaian et al.; Clin. Colorectal Cancer, 2016 December; 15(4) 345-351) (herein incorporated by reference).

The present invention provides a less immunogenic CEA×CD3 bispecific antibody with high efficacy. Such an antibody comprises a common heavy chain and in one embodiment a kappa light chain in the CEA binding part and a lambda light chain in the CD3 binding part.

The concept of using a common heavy chain for obtaining bispecific antibodies is mentioned in Fischer et al., Nature Communications 6 (2015): 6113. and Magistrelli G. et al., MABS 9 (2017) 231-239. Kappa lambda bispecific antibodies are described in e.g. WO2014087248 (hereby incorporated by reference in its entirety). Their structure is almost indistinguishable from the structure of a native IgG with the consequence of no or minimal ADA formation and thus low or minimal loss of exposure. The sequence of the common heavy chain variable region VH and the sequence huCD3 VL 1A4 of the invention are described in WO2019175658 (US2019/0284297) (incorporated by reference herein in its entirety).

As mentioned above, WO2017055389 describes bispecific CEA×CD3 antibodies with the 2+1 format but binding to a different domain as cibisatamab. One of these antibodies (RO7172508 or RG 6123) has been tested in a clinical trial in patients with locally advanced and/or metastatic CEA-positive solid tumors (ClinicalTrials.gov; search for RO7172508), also with obinutuzumab pre-treatment and in combination with atezolizumab. According to the description of the clinical trial in ClinicalTrials.gov for some cohorts serum CEA (shed soluble CEACAM5, sCEA) levels below a certain threshold were required in patients to be treated to make them eligible to the treatment, suggesting that higher levels of shed soluble CEACAM5 can decrease the efficacy of this CEA×CD3 bispecific antibody. The antibodies of the current invention show minimal influence of shed soluble CEA on their tumor cell killing efficacy.

Shed soluble CEACAM5 is an established tumor marker. Levels of sCEA in plasma of cancer patients can go over 1000 ng/ml whereas plasma concentrations in healthy individuals are below 10 ng/ml (e.g. Sandler B. et al Anticancer Res 1999, 19(5B), 4229-33). Shed soluble CEACAM5 can therefore compete with membrane-bound CEA present on tumor cells for the binding of therapeutic anti-CEA antibodies and anti-CEA bispecific antibodies, potentially causing decreased efficacy of an anti-CEA antibody or a CEA×CD3 antibody. TCB2017 and TCB2014 (see above) have been tested by the inventors in vitro in a test for T-cell mediated lysis of CEA positive tumor cells in the presence of soluble CEA. It was found that addition of sCEA to the test shifts the lysis curve and therefore the EC50 value of TCB2014 and TCB2017 to higher concentrations, suggesting that both TCB2014 and TCB2017 bind significantly to sCEA.

The human CEA family contains 29 genes, of which 18 are expressed: 7 belong to the CEA subgroup and 11 to the pregnancy-specific glycoprotein subgroup. Several CEA subgroup members are thought to possess cell adhesion properties. CEACAM5 is not only expressed by colorectal cancer cells but also by pancreatic cancer, stomach cancer, lung cancer and other cancer types. CEACAM5 is thought to have a role in innate immunity (Hammarström S., Semin. Cancer Biol. 9(2):67-81 (1999)). Carcinoembryonic antigen 5 (CEA, CEACAM5 or CD66e; UniProtKB—P06731) is a member of the carcinoembryonic antigen-related cell adhesion molecule (CEACAM family) and a tumor-associated antigen (Gold and Freedman, J Exp. Med., 121:439-462, 1965; Berinstein N. L., J Clin Oncol., 20:2197-2207, 2002). Multiple monoclonal antibodies have been raised against CEACAM5 for research purposes, as diagnostic tools, and for therapeutic purposes (see e.g. WO2012117002). Members of the carcinoembryonic antigen family (CEACAMs) are widely expressed, and, depending on the tissue, capable of regulating diverse functions including tumor promotion, tumor suppression, angiogenesis, and neutrophil activation. Four members of this family, CEACAM1, CEACAM3, CEACAM6, and CEACAM8 are expressed and enriched on human neutrophils. Given the mechanism of action of CEA× CD3 bispecific antibodies, cross-reactivity with other CEACAM could lead to depletion of important circulating healthy cell populations. E.g. cross-reactivity with CEACAM8, which is expressed by neutrophils or hematopoietic stem cells, could lead to the depletion of such cell populations. The invention provides a CEA×CD3 bispecific antibody with low cross reactivity to one or more of the members of the CEACAM family, CEACAM1, CEACAM3, CEACAM4, CEACAM6, CEACAM7, CEACAM8, CEACAM16, CEACAM18, CEACAM19, CEACAM20, and CEACAM21.

The mouse monoclonal anti-CEACAM5 antibody PR1A3 was raised by fusion of NS1 (P3/NS 1/I-Ag-4-1) myeloma cells with spleen cells from mice immunized with normal colorectal epithelium. Richman P. I. and Bodmer W. F., Int. J. Cancer, 39:317-328, 1987 describe mouse monoclonal antibody PR1A3. Epitope mapping of PR1 A3 shows that the antibody targets the B3 domain and the GPI anchor of the CEA molecule (Durbin H. et al., Proc. Natl. Acad. Sci. USA, 91:4313-4317, 1994). The epitope bound by PR1 A3 is a conformational epitope, not a linear epitope (Stewart et al., Cancer Immunol. Immunother., 47 (1999) 299-06). Humanized PR1A3 (hPR1A3) antibodies are described e.g. by Conaghhan P. J., et al., Br. J. Cancer, 98 (2008)1217-1225 and WO2012117002. The CEA binder used in TCB2014 (named CH1A1A) is a humanized, affinity matured, and stability-engineered version derived from the PR1A3 antibody. M. Bacac et. al., Clin. Cancer Research 22(13); 3286-97 (2016), Conaghan P, et al., Br J Cancer 2008; 98:1217-25, and Durbin H, et al. Proc Natl Acad Sci USA 1994; 91:4313-7).

A method for treating cancer by a combination of a human PD-1 axis antagonist and a bispecific anti-CEA×CD3 antibody is mentioned in WO2017118657 and clinical results have been published at ASCO conference 2017 (Tabernero et al, J Clin Oncol 35, 2017 (suppl. abstr. 3002)). A method of treating tumors by administering immune checkpoint antagonists binding two or more different targets of an immune checkpoint pathway, and a T cell-redirecting agent binding to CEA and a T cell surface antigen is mentioned in WO2015112534. A conjugate consisting of a single domain anti-CEACAM6 antibody and urease is at present in clinical trials (NCT02309892; WO2016116907). A class I antibody binding to CEACAM5, CEACAM6 and granulocytes is mentioned in US20110064653. Bispecific antibodies comprising a first polypeptide chain and a second polypeptide chain, covalently bonded to one another are mentioned in WO2018053328.

An anti-CD3ε antibody described in the state of the art is SP34 (Yang S J, The Journal of Immunology (1986) 137; 1097-1100). SP34 reacts with both primate and human CD3. SP34 is available from BD Biosciences. A further anti CD3 antibody described in the state of the art is UCHT-1 (see WO2000041474). A further anti CD3 antibody described in the state of the art is BC-3 (Fred Hutchinson Cancer Research Institute; used in Phase I/II trials of GvHD, Anasetti et al., Transplantation 54: 844 (1992)). SP34 differs from UCHT-1 and BC-3 in that SP-34 recognizes an epitope present on solely the ε chain of CD3 (see Salmeron et al., (1991) J. Immunol. 147: 3047) whereas UCHT-1 and BC-3 recognize an epitope contributed by both the ε and γ chains. Anti CD3 antibodies are also described in WO2007042261, WO2008119565, WO2008119566, WO2008119567, WO2010037836, WO2010037837, WO2010037838, and U.S. Pat. No. 8,236,308. Bispecific antibodies comprising a binding part specific for CEA and a binding part specific for CD3ε are e.g. described in US20140242079, WO2007071426, WO2013012414, WO2015112534, WO2017118675, and WO2017055389. An anti CD3 antibody comprising sequences of the second binding part of an antibody according to the invention are mentioned in U.S. 62/643,095 and PCT/US2019/000232, incorporated herein by reference in its entirety.

US2012321626 mentions a multi-specific Fab fusion protein comprising a Fab fragment that binds to the N-terminus of CD3 epsilon. WO2018199593 mentions bispecific antibodies that bind to HER3 and CD3.

As mentioned already above, results of first clinical trials with T-cell bispecific antibodies TAA×CD3 (TAA=Tumor Associated Antigen) in patients with advanced solid tumors were disappointing, but recently preliminary phase 1 results have been published for the CEA×CD3 bispecific antibody cibisatamab (RO6958688, see for example Bacac et al Clin. Cancer Res., 22(13), 3286-97 (2016); and US20140242079) showing in advanced colorectal cancer patients in monotherapy and in combination with PD-L1 inhibition partial responses and stable disease (J. Tabernero et. al., J. Clin. Oncol. 35, 2017 (suppl. Abstr. 3002)). Another approach to get better results could be to add to T-cell bispecific antibodies not only an inhibitor of PD-1 checkpoint axis, but to add further checkpoint inhibitors or agonists. But so far, it is believed there are no promising clinical data for such a combination approach available.

Limited availability of T-cells within advanced solid tumors is certainly an important mechanism limiting the efficacy achievable with T-cell bispecific antibodies plus PD-1 axis inhibitors.

Instead of adding to the combination of a T-cell bispecific antibody and a PD-1 axis inhibitor another therapeutic agent aiming to re-direct T-cells against tumor cells of advanced solid tumors, it may be more successful to add a therapeutic agent re-directing to the tumor cells other immune cells, especially macrophages or macrophages and natural killer (NK)-cells.

The present invention provides new CEAxCD3 bispecific antibodies which are designed in a way that they can be administered in parallel with CEAxCD47 bispecific antibodies re-directing macrophages and also NK-cells against CEA expressing solid tumors. The combined attack of T-cells and macrophages and NK-cells targeted to CEA expressing tumors offers a considerable opportunity for superior efficacy/killing and phagocytosis of CEA expressing tumor cells.

The so far disappointing results with CAR T-cells in solid tumors may have a simple explanation—the number of CAR T-cells penetrating the solid tumor and distributed in it are just not sufficient. This is certainly different in the majority of haematological malignancies; CAR T-cells can well access the tumor cells, explaining the difference of high efficacy in these malignancies compared to disappointing efficacy in solid tumors. In addition, CAR T-cells may be heavily suppressed by the tumor microenvironment (TME) of the solid tumors which is mostly strongly immune suppressive.

The present invention provides novel bispecific anti-CEAxCD3 antibodies with high efficacy, low influence of sCEA on efficacy, low or no crossreactivity to other CEACAM than CEACAM5 (=CEA) and therefore decreased toxicity, low immunogenicity, the opportunity of parallel combination therapy with CEAxCD47 antibodies and with valuable pharmacokinetic properties.

SUMMARY OF THE INVENTION

In one embodiment, the invention relates to a bispecific antibody (further named also as "bsAb CEAxCD3" or "CEAxCD3 bispecific antibody") comprising a first binding part, specifically binding to human CEACAM5 (further named also as "CEA") and a second binding part, specifically binding to human CD3ε (further named also as "CD3").

In one embodiment the bispecific antibody is characterized in that said antibody is monovalent for the first binding part and monovalent for the second binding part.

In one embodiment the bispecific antibody is characterized in that the constant and variable framework region sequences are human.

In one embodiment the bispecific antibody is characterized in that each of the first and second binding parts comprises an immunoglobulin heavy chain and an immunoglobulin light chain.

In one embodiment the bispecific antibody has a first binding part comprising a heavy chain and a second binding part comprising a heavy chain wherein the heavy chain in each binding part is the same (i.e. a common heavy chain). In one embodiment the common heavy chain variable region comprises as CDRs CDRH1 of SEQ ID NO: 2, CDRH2 of SEQ ID NO: 3, and CDRH3 of SEQ ID NO: 4. In one embodiment the common heavy chain variable region is of SEQ ID NO: 1. In one embodiment the common constant heavy chain is of SEQ ID NO: 30. In one embodiment the common heavy chain is of SEQ ID NO: 43. In one embodiment the common heavy chain is of SEQ ID NO: 44. In one embodiment the common heavy chain is of SEQ ID NO: 45.

In one embodiment the bispecific antibody is characterized in comprising in the first binding part and the second binding part as heavy chain a common heavy chain, comprising in the first binding part as light chain a kappa light chain, and in the second binding part as light chain a lambda light chain. In one embodiment the light chain of the second binding part is of SEQ ID NO: 28 and the heavy chain of the second binding part is of SEQ ID NO: 45 (e.g. AB1 and AB-1L3-1/N derived bispecific antibodies like AB13L3-1/N, AB14L3-1/N, AB15L3-1/N, AB17L3-1/N, AB20L3-1/N, AB54L3-1/N, AB60L3-1/N, AB66L3-1N, AB71L3-1/N, AB72L3-1/N, and AB73L3-1/N; for CDR and VL sequences see sequence list).

AB13,14,15 etc. denote for a first binding part (anti-CEACAM5 antibody arms) and L3-1 denotes for a second binding part (anti-CD3 antibody arm, also called 1A4) of bispecific antibodies of this invention. Any ABXX anti CEA arm can be combined with the L3-1 anti CD3 arm to form a bispecific antibody: e.g. ABXXL3-1 denotes a CEAxCD3 bispecific antibody according to the invention, comprising a WT hIgG1 Fc part; ABXXL3-1/D denotes a CEAxCD3 bispecific antibody according to the invention, comprising a hIgG1 Fc part carrying the L234A+L235A mutations; ABXXL3-1/N denotes a CEAxCD3 bispecific antibody according to the invention, comprising a hIgG1 Fc part carrying the L234A+L235A+P329A mutations.

In one embodiment the bispecific antibody is characterized in comprising in the first binding part and the second binding part as heavy chain a common heavy chain, comprising in the first binding part as light chain variable region a lambda type region and as light chain constant region a kappa type region ("hybrid format light chain"), and in the second binding part as light chain a lambda light chain (e.g. L3-1AB8 H-CK5/D see FIG. 2 and description of FIG. 2).

In one embodiment the bispecific antibody is characterized in comprising in the first binding part and the second binding part as heavy chain a common heavy chain, comprising in the first binding part as light chain variable region a lambda type region and as light chain constant region a lambda type region, and in the second binding part as light chain variable region a lambda type region and as light chain constant region a kappa type region ("hybrid format light chain"); e.g. AB8L3-1 H-CK5/D.

The bispecific antibodies of the invention show low binding/cross-reactivity to CEACAM family members other than CEACAM5. In one embodiment the bispecific antibody is characterized in that the MFI value for binding to PEAKrapid cells (ATCC® CRL-2828™) expressing a CEACAM selected from the group consisting of CEACAM1, CEACAM3, CEACAM4, CEACAM6, CEACAM7, CEACAM8, CEACAM16, CEACAM18, CEACAM19, CEACAM20, and CEACAM21 is no more than 2 times compared to the MFI value for binding to WT PEAK cells (that is, untransfected PEAK cells) under the same experimental conditions. In one embodiment the bispecific antibody is characterized in that the MFI value for binding to PEAKrapid cells expressing a CEACAM selected form the group consisting of CEACAM1, CEACAM3, CEACAM4, CEACAM6, and CEACAM8 is no more than 2 times compared to the MFI value for binding to WT PEAK cells under the same experimental conditions. In one embodiment the bispecific antibody is characterized in that the MFI value for binding to PEAKrapid cells expressing CEACAM8 is no more than 2 times compared to the MFI value for binding to WT PEAK cells under the same experimental conditions. The experimental procedure for transfection of the PEAK cells and measuring of the binding of antibodies to these PEAK cells is described in Examples 1 and 5.

In one embodiment the bispecific antibody binds to MKN-45 cells (DSMZ No: ACC 409) with an EC50 value of 0.5 nM to 50 nM. In one embodiment the bispecific antibody binds to MKN-45 cells with an EC50 value of 0.5 nM to 30 nM. In one embodiment the bispecific antibody according to the invention is characterized in that the MFI value for binding to MKN-45 cells at 200 nM, 1000 nM and 5000 nM is at least double of the MFI value obtained with TCB2014. The binding assay is described in Example 7a. In one embodiment the EC50 for the killing of tumor cell line MKN-45 measured in the assay containing human PBMC is for the bispecific antibodies of this invention 40% or more lower than the EC50 measured for TCB2014. In one embodiment the EC50 for the killing of tumor cell line LS-174T measured in the assay containing human PBMC is for the bispecific antibodies of this invention 40% or more lower than the EC50 measured for TCB2014.

In one embodiment the bispecific antibody is killing LS174T cells in an assay containing human PBMC in a concentration dependent manner with an EC50 value of 0.01 to 10 nM. In one embodiment the bispecific antibody is killing LS174T cells in an assay containing human PBMC in a concentration dependent manner with an EC50 value of 0.01 to 1 nM.

An assay for measuring T-cell retargeted lysis/killing of CEA-positive cells is described in Example 8.

In one embodiment the bispecific antibody is characterized in that the EC50 value in the same assay (killing of CEA positive LS174T tumor cells) is not increased by more than a factor of 20, in one embodiment not more than 15, and in one embodiment not more than 10, in presence of 5 µg/ml soluble CEACAM5, compared to the EC50 value for lysis without soluble CEACAM5 under the same experimental conditions.

In another embodiment the bispecific antibody is characterized in that the EC50 value in the same assay is not increased by more than a factor of 10, in one embodiment not more than 5, in presence of 1 µg/ml soluble CEACAM5, compared to the EC50 value for lysis without soluble CEACAM5 under the same experimental conditions.

In one embodiment the bispecific antibody is characterized in that said bispecific antibody inhibits tumor volume growth in a HPAF-II model until day 18 by 25% or more, compared to tumor volume growth in the vehicle group under the same experimental conditions. In one embodiment the bispecific antibody is characterized in that said bispecific antibody inhibits tumor volume growth in a HPAF-II model until day 18 similar, and not different in a statistically significant manner, compared to TCB2014 under the same experimental conditions. The mouse tumor model is described in Example 9a.

In one embodiment the bispecific antibody comprises in each subunit of the Fc domain amino acid substitutions that reduce binding to an activating Fc receptor and/or reduce effector function wherein said amino acid substitutions are L234A and L235A and/or a substitution of P329, selected from the group consisting of P329A, P329G and P329R (Kabat EU index numbering). In one embodiment the bispecific antibody comprises in each subunit of the Fc domain amino acid substitutions L234A and L235A and P329A (Kabat EU index numbering). L234A and L235A (LALA) means that amino acid leucine at position 234/235 is replaced by alanine. P329A (PA) means that amino acid proline at position 329 is replaced by alanine.

In one embodiment the bispecific antibody comprises a common heavy chain. In one embodiment the bispecific antibody comprises a common heavy chain comprising as CDRs CDRH1 of SEQ ID NO: 2, as CDRH2 of SEQ ID NO: 3 and as CDRH3 of SEQ ID NO: 4. In one embodiment the bispecific antibody comprises in the second binding part a light chain region comprising as CDRs CDRL1 of SEQ ID NO: 18, CDRL2 of SEQ ID NO: 19, and CDRL3 of SEQ ID NO: 20.

In one embodiment the bispecific antibody comprises in the first binding part as light chain constant region a region of SEQ ID NO: 39. In one embodiment the bispecific antibody comprises in the first binding part as light chain constant region a region of SEQ ID NO: 41. In one embodiment the bispecific antibody comprises in the first binding part as light chain constant region a region of SEQ ID NO: 58. In one embodiment the bispecific antibody comprises a common heavy chain of SEQ ID NO: 43 or a common heavy chain of SEQ ID NO: 44 or a common heavy chain of SEQ ID NO: 45. In one embodiment the bispecific antibody comprises in the first binding part as light chain constant region a region of SEQ ID NO: 39 and a common heavy chain of SEQ ID of SEQ ID NO: 45.

In one embodiment the bispecific antibody comprises in the second binding part as light chain a light chain selected from the group consisting of SEQ ID NOs: 25, 26, 27, 28, and 29 or from the hybrid format light chain (LC) group of SEQ ID NOs: 67, 68, 69, 70, and 71.

In one embodiment the bispecific antibody comprises in the first binding part as light chain constant region a region of SEQ ID NO: 39, a common heavy chain of SEQ ID NO: 45, and in the second binding part a light chain of SEQ ID NO: 28.

In one embodiment the bispecific antibody competes with an anti-CEA antibody, selected from the group consisting of an anti-CEA antibody, comprising as VL and VH domains VL and VH of sequences SEQ ID NOs: 48 and 49 (anti-CEA antibody MEDI), comprising as VL and VH domains VL and VH of sequences SEQ ID NOs: 46 and 47 (antibody SM3E), comprising as VL and VH domains VL and VH of sequences SEQ ID NOs: 56 and 57 (Labetuzumab (Lab)), comprising as VL and VH domains VL and VH of sequences SEQ ID NOs: 50 and 51 (SAR), comprising as VL and VH domains VL and VH of sequences SEQ ID NOs: 54 and 55 (T86.66), and comprising as VL and VH domains VL and VH of sequences SEQ ID NOs: 52 and 53 (CH1A1A). See also FIG. 1 and Example 5c).

Examples for antibodies useful as CEA VL or CL regions in bispecific antibodies according to the invention and competing with MEDI for the binding to recombinant CEA are anti-CEA antibody AB1 and antibodies obtained by lead optimizing of AB1 (see Example 11 for the experimental method). Anti-CEA antibodies AB13, 14, 15, 17, 20, 54, 60, 66, 71, 72, 73 and the respective bispecific anti CEA×CD3 antibodies AB13L3-1, AB14L3-1, AB15L3-1, AB17L3-1, AB20L3-1, AB54L3-1, AB 60L3-1, AB 66L3-1, AB 71L3-1, AB 72L3-1, and AB 73L3-1 are competing in the same manner as antibody AB1 rsp. AB1L3-1. Examples for antibodies useful as CEA VL or CL regions in bispecific antibodies according to the invention and competing with SM3E for the binding to recombinant CEA are anti-CEA antibody AB8 and antibodies obtained by oligonucleotide-directed mutagenesis of AB8, using degenerated oligonucleotides. Examples for antibodies useful as CEA VL or CL regions in bispecific antibodies according to the invention and competing with T84.66 for the binding to recombinant CEA are anti-CEA antibody 1B4 and antibodies obtained by oligonucleotide-directed mutagenesis of 1B4, using degenerated oligonucleotides.

Examples for antibodies useful as CEA VL or CL regions in bispecific antibodies according to the invention but not competing with any of the reference antibodies for the binding to recombinant CEA are anti-CEA antibody C11 and antibodies obtained by oligonucleotide-directed mutagenesis of C11, using degenerated oligonucleotides.

AB1 is an anti-CEA antibody with the HC SEQ ID NO: 43 and the kappa LC SEQ ID NO: 40, encoded by the nucleic acid sequences shown in SEQ ID NOs: 80 and 78, respectively.

AB8 is an anti-CEA antibody with the HC SEQ ID NO: 43 and the lambda LC SEQ ID NO: 42, encoded by the nucleic acid sequences shown in SEQ ID NOs: 80 and 79, respectively.

1B4 is an anti-CEA antibody with the HC SEQ ID NO: 43 and the lambda LC SEQ ID NO: 74, encoded by the nucleic acid sequences shown in SEQ ID NO: 80 and 77, respectively.

C11 is an anti-CEA antibody with the HC SEQ ID NO: 43 and the kappa LC SEQ ID NO: 73, encoded by the nucleic acid sequences shown in SEQ ID NO: 80 and 76, respectively.

A CEA light chain useful as kappa light chain is of SEQ ID NO: 40. A CEA light chain useful as kappa light chain is of SEQ ID NO: 73. A CEA light chain useful as lambda light chain is of SEQ ID NO: 74. A CEA light chain useful as hybrid kappa light chain is of SEQ ID NO: 75.

In one embodiment the bispecific antibody comprises in each subunit of the Fc domain up to three amino acid substitutions that reduce binding to an activating Fc receptor and/or effector function wherein said amino acid substitutions are L234A, L235A and a substitution of P329, selected from the group consisting of P329A, P329G and P329R (Kabat EU index numbering). In one embodiment the common heavy chain of the antibody according to the invention is of SEQ ID NOs: 43, 44, or 45. In one embodiment the common heavy chain of the antibody according to the invention is of SEQ ID NO: 45 (L234A, L235A, and P329A).

In one embodiment the bispecific antibody shows one or more properties selected from the group of a) binding to MKN-45 cells with an EC50 value of 0.5 nM to 50 nM, b1) competing with an anti-CEA antibody, comprising as VL and VH domains VL and VH of sequences SEQ ID NOs: 48 and 49 (MEDI), or b2) competing with an anti-CEA antibody, comprising as VL and VH domains VL and VH of sequences SEQ ID NOs: 46 and 47 (SM3E), or b3) competing with an anti-CEA antibody, comprising as VL and VH domains VL and CH of sequences SEQ ID NOs: 54 and 55 (T84.66), or b4) not competing with any of the tool antibodies (see Example 5c for the tool antibodies) c) comprising in each subunit of the Fc domain amino acid substitutions that reduce binding to an activating Fc receptor and/or effector function wherein said amino acid substitutions are L234A and L235A and a substitution of P329, selected from the group consisting of P329A, P329G and P329R (Kabat EU index numbering), d) killing MKN-45, HPAF-II, and/or LS174T cells in an assay containing human PBMC in a concentration dependent manner with an EC50 value of 0.01 to 10 nM.

In one embodiment the bispecific antibody shows one or more properties selected from the group of a) binding to MKN-45 cells with an EC50 value of 0.5 nM to 50 nM,
b) killing MKN-45, HPAF-II, or LS174T cells in an assay containing human PBMC in a concentration dependent manner with an EC50 value of 0.01 to 10 nM,
c) binding to CEACAM5 expressing PEAK cells, but not cross reacting with CEACAM8 expressing PEAK cells,
d) the killing EC50 in the TDCC assay (Example 8) when LS174T tumor cells are used as target cells is not increased by more than a factor 5 in presence of 1 μg/mL of sCEA,
e) inhibiting tumor growth in a HPAF-II model by 25% or more compared to the control group (vehicle only),
f) competing with an anti-CEA antibody, comprising as VL and VH domains VL and VH of sequences SEQ ID NOs: 48 and 49 (MEDI), and
g) comprising in each subunit of the Fc domain amino acid substitutions L234A, L235A and P329A (Kabat EU index numbering).

In one embodiment the bispecific antibody shows the properties of a) to d). In one embodiment the bispecific antibody shows all properties of a) to f). In one embodiment the bispecific antibody shows the properties of a) to d) and g). In one embodiment the bispecific antibody shows the properties of a) to d) and f) and g). In one embodiment the bispecific antibody shows all properties of a) to g).

In one embodiment the bispecific antibody is characterized in comprising a first binding part, specifically binding to human CEACAM5 and a second binding part, specifically binding to human CD3ε, characterized in that
 a) the first binding part and the second binding part comprise each as heavy chain a common heavy chain (cHC) and comprises as variable region a variable region which comprises as CDRH1, CDRH2, and CDRH3, a CDRH1 of SEQ ID NO: 2, a CDRH2 of SEQ ID NO: 3 and a CDRH3 of SEQ ID NO: 4,
 b) the first binding part comprises
 i) a kappa light chain constant region (CL), and a light chain variable region (VL), comprising as CDRL1, CDRL2 and CDRL3, a CDRL1 of SEQ ID NO: 32, a CDRL2 of SEQ ID NO: 33 and a CDRL3 of SEQ ID NO: 34 or a light chain variable region derived from SEQ ID NO: 31 by oligonucleotide-directed mutagenesis using degenerated oligonucleotides,
 c) the second binding part comprises a light chain variable region, comprising as CDRL1, CDRL2 and CDRL3 a group of CDRs selected from the group consisting of
 I) CDRL1 of SEQ ID NO: 6, a CDRL2 of SEQ ID NO: 7 and a CDRL3 of SEQ ID NO: 8,
 II) CDRL1 of SEQ ID NO: 10, a CDRL2 of SEQ ID NO: 11 and a CDRL3 of SEQ ID NO: 12,
 III) CDRL1 of SEQ ID NO: 14, a CDRL2 of SEQ ID NO: 15 and a CDRL3 of SEQ ID NO: 16,
 IV) CDRL1 of SEQ ID NO: 18, a CDRL2 of SEQ ID NO: 19 and a CDRL3 of SEQ ID NO: 20, and
 V) CDRL1 of SEQ ID NO: 22, a CDRL2 of SEQ ID NO: 23 and a CDRL3 of SEQ ID NO: 24.
 d) the second binding part comprises a lambda light chain constant region.

In one embodiment the second binding part in c) comprises a light chain selected from the group consisting of SEQ ID NOs: 25, 26, 27, 28, and 29.

In one embodiment the bispecific antibody is characterized in comprising a first binding part, specifically binding to human CEACAM5 and a second binding part, specifically binding to human CD3ε, characterized in that a) the first binding part and the second binding part comprise each as heavy chain a heavy chain which comprises as CDRH1, CDRH2, and CDRH3, a CDRH1 of SEQ ID NO: 2, a CDRH2 of SEQ ID NO: 3 and a CDRH3 of SEQ ID NO: 4, b) the first binding part comprises a light chain variable region (VL), comprising as CDRs a CDRL1 derived from SEQ ID NO: 32 by oligonucleotide-directed mutagenesis using degenerated oligonucleotides and comprising up to four amino acid substitutions, a CDRL2 derived from SEQ ID NO: 33 by oligonucleotide-directed mutagenesis using degenerated oligonucleotides and comprising up to four amino acid substitutions, a CDRL3 derived from SEQ ID NO: 34 by oligonucleotide-directed mutagenesis using degenerated oligonucleotides and comprising up to four amino acid substitutions, c) the second binding part comprises a light chain variable region, comprising as CDRL1, CDRL2 and CDRL3 a CDRL1 of SEQ ID NO: 18, a CDRL2 of SEQ ID NO: 19 and a CDRL3 of SEQ ID NO: 20.

Such bispecific antibodies are, but not limited, bispecific anti CEA×CD3 antibodies AB13L3-1, AB14L3-1, AB15L3-1, AB17L3-1, AB20L3-1, AB54L3-1, AB60L3-1, AB66L3-1, AB71L3-1, AB72L3-1, and AB73L3-1.

In one embodiment the bispecific antibody is characterized in comprising a first binding part, specifically binding to human CEACAM5 and a second binding part, specifically binding to human CD3ε, characterized in that:

a) the first binding part comprises a heavy chain variable region VH, which comprises as CDRH1, CDRH2, and CDRH3 a CDRH1 of SEQ ID NO: 2, a CDRH2 of SEQ ID NO: 3 and a CDRH3 of SEQ ID NO: 4, b) the first binding part comprises as light chain variable region a light chain variable region comprising a CDRL set selected from the group consisting of b1) a CDRL1 of SEQ ID NO: 32, CDRL2 of SEQ ID NO: 33, and CDRL3 of SEQ ID NO: 34,
b2) a CDRL1 of SEQ ID NO: 81, CDRL2 of SEQ ID NO: 82, and CDRL3 of SEQ ID NO: 83,
b3) a CDRL1 of SEQ ID NO: 84, CDRL2 of SEQ ID NO: 85, and CDRL3 of SEQ ID NO: 86,
b4) a CDRL1 of SEQ ID NO: 87, CDRL2 of SEQ ID NO: 88, and CDRL3 of SEQ ID NO: 89,
b5) a CDRL1 of SEQ ID NO: 90, CDRL2 of SEQ ID NO: 91, and CDRL3 of SEQ ID NO: 92,
b6) a CDRL1 of SEQ ID NO: 93, CDRL2 of SEQ ID NO: 94, and CDRL3 of SEQ ID NO: 95,
b7) a CDRL1 of SEQ ID NO: 96, CDRL2 of SEQ ID NO: 97, and CDRL3 of SEQ ID NO: 98,
b8) a CDRL1 of SEQ ID NO: 99, CDRL2 of SEQ ID NO: 100, and CDRL3 of SEQ ID NO: 101,
b9) a CDRL1 of SEQ ID NO: 102, CDRL2 of SEQ ID NO: 103, and CDRL3 of SEQ ID NO: 104,
b10) a CDRL1 of SEQ ID NO: 105, CDRL2 of SEQ ID NO: 106, and CDRL3 of SEQ ID NO: 107,
b11) a CDRL1 of SEQ ID NO: 108, CDRL2 of SEQ ID NO: 109, and CDRL3 of SEQ ID NO: 110, and
b12) a CDRL1 of SEQ ID NO: 111, CDRL2 of SEQ ID NO: 112, and CDRL3 of SEQ ID NO: 113, and c) the second binding part comprises a heavy chain variable region VH comprising a CDRH1 of SEQ ID NO: 2, CDRH2 of SEQ ID NO: 3 and CDRH3 of SEQ ID NO: 4 and a light chain variable region VL comprising a CDRL1 of SEQ ID NO: 18, CDRL2 of SEQ ID NO: 19, and CDRL3 of SEQ ID NO: 20.

In one embodiment the bispecific antibody is characterized in comprising a first binding part, specifically binding to human CEACAM5 and a second binding part, specifically binding to human CD3ε, characterized in that:

a) the first binding part comprises a heavy chain variable region VH, which comprises as CDRH1, CDRH2, and CDRH3 a CDRH1 of SEQ ID NO: 2, a CDRH2 of SEQ ID NO: 3 and a CDRH3 of SEQ ID NO: 4, b) the first binding part comprises as light chain variable region a light chain variable region comprising a CDRL set selected from the group consisting of b1) a CDRL1 of SEQ ID NO: 90, CDRL2 of SEQ ID NO: 91, and CDRL3 of SEQ ID NO: 92,
b2) a CDRL1 of SEQ ID NO: 96, CDRL2 of SEQ ID NO: 97, and CDRL3 of SEQ ID NO: 98,
b3) a CDRL1 of SEQ ID NO: 99, CDRL2 of SEQ ID NO: 100, and CDRL3 of SEQ ID NO: 101,
b4) a CDRL1 of SEQ ID NO: 102, CDRL2 of SEQ ID NO: 103, and CDRL3 of SEQ ID NO: 104,
b5) a CDRL1 of SEQ ID NO: 105, CDRL2 of SEQ ID NO: 106, and CDRL3 of SEQ ID NO: 107, and
b6) a CDRL1 of SEQ ID NO: 111, CDRL2 of SEQ ID NO: 112, and CDRL3 of SEQ ID NO: 113, and c) the second binding part comprises a heavy chain variable region VH comprising a CDRH1 of SEQ ID NO: 2, CDRH2 of SEQ ID NO: 3 and CDRH3 of SEQ ID NO: 4 and a light chain variable region VL comprising a CDRL1 of SEQ ID NO: 18, CDRL2 of SEQ ID NO: 19, and CDRL3 of SEQ ID NO: 20.

In one embodiment the bispecific antibody is characterized in comprising a first binding part, specifically binding to human CEACAM5 and a second binding part, specifically binding to human CD3ε, characterized in that:

a) the first binding part comprises a heavy chain variable region VH, which comprises as CDRH1, CDRH2, and CDRH3 a CDRH1 of SEQ ID NO: 2, a CDRH2 of SEQ ID NO: 3 and a CDRH3 of SEQ ID NO: 4, b) the first binding part comprises as light chain variable region a light chain variable region comprising a CDRL set selected from the group consisting of b1) a CDRL1 of SEQ ID NO: 90, CDRL2 of SEQ ID NO: 91, and CDRL3 of SEQ ID NO: 92,
b2) a CDRL1 of SEQ ID NO: 105, CDRL2 of SEQ ID NO: 106, and CDRL3 of SEQ ID NO: 107, and
b3) a CDRL1 of SEQ ID NO: 111, CDRL2 of SEQ ID NO: 112, and CDRL3 of SEQ ID NO: 113, and c) the second binding part comprises a heavy chain variable region VH comprising a CDRH1 of SEQ ID NO: 2, CDRH2 of SEQ ID NO: 3 and CDRH3 of SEQ ID NO: 4 and a light chain variable region VL comprising a CDRL1 of SEQ ID NO: 18, CDRL2 of SEQ ID NO: 19, and CDRL3 of SEQ ID NO: 20.

In one embodiment, the invention relates to a bispecific antibody according to the invention, characterized in comprising a) in the first binding part a heavy chain variable region VH having 97%, 98%, 99%, or 100% amino acid identity to SEQ ID NO: 1, comprising a CDR1 of SEQ ID NO: 2, a CDR2 of SEQ ID NO: 3, and a CDR3 of SEQ ID NO: 4, and b) a light chain variable region VL selected from the group consisting of b1) a light chain variable region VL having 97%, 98%, 99%, or 100% amino acid identity to SEQ ID NO: 31 and comprising a CDRL1 of SEQ ID NO: 32, CDRL2 of SEQ ID NO: 33, and CDRL3 of SEQ ID NO: 34, b2) a light chain variable region VL having 97%, 98%, 99%, or 100% amino acid identity to SEQ ID NO: 114 and comprising a CDRL1 of SEQ ID NO: 81, CDRL2 of SEQ ID NO: 82, and CDRL3 of SEQ ID NO: 83,
b3) a light chain variable region VL having 97%, 98%, 99%, or 100% amino acid identity to SEQ ID NO: 115 and a CDRL1 of SEQ ID NO: 84, CDRL2 of SEQ ID NO: 85, and CDRL3 of SEQ ID NO: 86,
b4) a light chain variable region VL having 97%, 98%, 99%, or 100% amino acid identity to SEQ ID NO: 116 and a CDRL1 of SEQ ID NO: 87, CDRL2 of SEQ ID NO: 88, and CDRL3 of SEQ ID NO: 89,
b5) a light chain variable region VL having 97%, 98%, 99%, or 100% amino acid identity to SEQ ID NO: 117 and a CDRL1 of SEQ ID NO: 90, CDRL2 of SEQ ID NO: 91, and CDRL3 of SEQ ID NO: 92,
b6) a light chain variable region VL having 97%, 98%, 99%, or 100% amino acid identity to SEQ ID NO: 118 and a CDRL1 of SEQ ID NO: 93, CDRL2 of SEQ ID NO: 94, and CDRL3 of SEQ ID NO: 95,
b7) a light chain variable region VL having 97%, 98%, 99%, or 100% amino acid identity to SEQ ID NO: 119 and a CDRL1 of SEQ ID NO: 96, CDRL2 of SEQ ID NO: 97, and CDRL3 of SEQ ID NO: 98,
b8) a light chain variable region VL having 97%, 98%, 99%, or 100% amino acid identity to SEQ ID NO: 120 and a CDRL1 of SEQ ID NO: 99, CDRL2 of SEQ ID NO: 100, and CDRL3 of SEQ ID NO: 101,
b9) a light chain variable region VL having 97%, 98%, 99%, or 100% amino acid identity to SEQ ID NO: 121 and a CDRL1 of SEQ ID NO: 102, CDRL2 of SEQ ID NO: 103, and CDRL3 of SEQ ID NO: 104,
b10) a light chain variable region VL having 97%, 98%, 99%, or 100% amino acid identity to SEQ ID NO: 122 and a CDRL1 of SEQ ID NO: 105, CDRL2 of SEQ ID NO: 106, and CDRL3 of SEQ ID NO: 107, and
b11) a light chain variable region VL having 97%, 98%, 99%, or 100% amino acid identity to SEQ ID NO: 123 and a CDRL1 of SEQ ID NO: 108, CDRL2 of SEQ ID NO: 109, and CDRL3 of SEQ ID NO: 110, and
b12) a light chain variable region VL having 97%, 98%, 99%, or 100% amino acid identity to SEQ ID NO: 124 and a CDRL1 of SEQ ID NO: 111, CDRL2 of SEQ ID NO: 112, and CDRL3 of SEQ ID NO: 113,
c) the second binding part a heavy chain variable region VH having 97%, 98%, 99%, or 100% amino acid identity to SEQ ID NO: 1, comprising a CDR1 of SEQ ID NO: 2, a CDR2 of SEQ ID NO: 3, and a CDR3 of SEQ ID NO: 4, and a light chain variable region VL having 97%, 98%, 99%, or 100% amino acid identity to SEQ ID NO: 17, comprising a CDRL1 of SEQ ID NO: 18, CDRL2 of SEQ ID NO: 19, and CDRL3 of SEQ ID NO: 20.

In one embodiment, the invention relates to a bispecific antibody according to the invention, characterized in comprising
a) in the first binding part a heavy chain variable region VH SEQ ID NO: 1, and
b) a light chain variable region VL selected from the group consisting of
b1) a light chain variable region VL of SEQ ID NO: 31,
b2) a light chain variable region VL of SEQ ID NO: 114,
b3) a light chain variable region VL of SEQ ID NO: 115,
b4) a light chain variable region VL of SEQ ID NO: 116,
b5) a light chain variable region VL of SEQ ID NO: 117,
b6) a light chain variable region VL of SEQ ID NO: 118,
b7) a light chain variable region VL of SEQ ID NO: 119,
b8) a light chain variable region VL of SEQ ID NO: 120,
b9) a light chain variable region VL of SEQ ID NO: 121,
b10) a light chain variable region VL of SEQ ID NO: 122,
b11) a light chain variable region VL of SEQ ID NO: 123, and
b12) a light chain variable region VL of SEQ ID NO: 124, and
c) in the second binding part a heavy chain variable region VH of SEQ ID NO: 1 and a light chain variable region VL of SEQ ID NO: 17.

In one embodiment, the invention relates to a bispecific antibody according to the invention, characterized in comprising
a) in the first binding part a heavy chain variable region VH SEQ ID NO: 1, and
b) a light chain variable region VL selected from the group consisting of
b1) a light chain variable region VL of SEQ ID NO: 117,
b2) a light chain variable region VL of SEQ ID NO: 119,
b3) a light chain variable region VL of SEQ ID NO: 120,
b4) a light chain variable region VL of SEQ ID NO: 121,
b5) a light chain variable region VL of SEQ ID NO: 122, and
b6) a light chain variable region VL of SEQ ID NO: 124, and
c) in the second binding part a heavy chain variable region VH of SEQ ID NO: 1 and a light chain variable region VL of SEQ ID NO: 17.

In one embodiment, the invention relates to a bispecific antibody according to the invention, characterized in comprising
a) in the first binding part a heavy chain variable region VH SEQ ID NO: 1, and
b) a light chain variable region VL selected from the group consisting of
b1) a light chain variable region VL of SEQ ID NO: 117,
b2) a light chain variable region VL of SEQ ID NO: 122, and
b3) a light chain variable region VL of SEQ ID NO: 124, and
c) in the second binding part a heavy chain variable region VH of SEQ ID NO: 1 and a light chain variable region VL of SEQ ID NO: 17.

In one embodiment, the invention relates to a bispecific antibody according to the invention, characterized in comprising in the first binding part
a) a heavy chain variable region VH SEQ ID NO: 1, and
b) a light chain selected from the group consisting of
b1) the light chain of SEQ ID NO: 40
b2) the light chain of SEQ ID NO: 125,
b3) the light chain of SEQ ID NO: 126,
b4) the light chain of SEQ ID NO: 127,
b5) the light chain of SEQ ID NO: 128,
b6) the light chain of SEQ ID NO: 129,
b7) the light chain of SEQ ID NO: 130,
b8) the light chain of SEQ ID NO: 131
b9) the light chain of SEQ ID NO: 132,
b10) the light chain of SEQ ID NO: 133, and
b11) the light chain of SEQ ID NO: 134, and
b12) the light chain of SEQ ID NO: 135, and
c) in the second binding part a heavy chain variable region VH of SEQ ID NO: 1 and a light chain of SEQ ID NO: 28.

In one embodiment, the invention relates to a bispecific antibody according to the invention, characterized in comprising in the first binding part a) a common heavy chain selected from the group consisting of
  a1) the heavy chain of SEQ ID NO: 43,
  a2) the heavy chain of SEQ ID NO: 44, or
  a3) the heavy chain of SEQ ID NO: 45, and
b) a light chain selected from the group consisting of
  b1) the light chain of SEQ ID NO: 40
  b2) the light chain of SEQ ID NO: 125,
  b3) the light chain of SEQ ID NO: 126,
  b4) the light chain of SEQ ID NO: 127,
  b5) the light chain of SEQ ID NO: 128,
  b6) the light chain of SEQ ID NO: 129,
  b7) the light chain of SEQ ID NO: 130,
  b8) the light chain of SEQ ID NO: 131
  b9) the light chain of SEQ ID NO: 132,
  b10) the light chain of SEQ ID NO: 133
  b11) the light chain of SEQ ID NO: 134, or
  b12) the light chain of SEQ ID NO: 135, and
c) in the second binding part a light chain of SEQ ID NO: 28.

In one embodiment a bispecific antibody according to the invention (AB17L3-1/N) comprises a common heavy chain of SEQ ID NO: 45 (/N) and in the second binding part as light chain a light chain of SEQ ID NO: 28 (1A4 LC respectively L3-1) and in the first binding part as light chain a light chain of SEQ ID NO: 128 (AB17). In one embodiment a bispecific antibody according to the invention (AB71L3-1/N) comprises a common heavy chain of SEQ ID NO: 45 (/N) and in the second binding part as light chain a light chain of SEQ ID NO: 28 (L3-1) and in the first binding part as light chain a light chain of SEQ ID NO: 133 (AB71). In one embodiment a bispecific antibody according to the invention (AB73L3-1/N) comprises a common heavy chain of SEQ ID NO: 45 (/N) and in the second binding part as light chain a light chain of SEQ ID NO: 28 (L3-1) and in the first binding part as light chain a light chain of SEQ ID NO: 135 (AB73).

In one embodiment the bispecific antibody is characterized in comprising a first binding part, specifically binding to human CEACAM5 and a second binding part, specifically binding to human CD3 ε, characterized in that
  a) the first binding part and the second binding part comprise each as heavy chain a common heavy chain and comprises as variable region a variable region which comprises as CDRH1, CDRH2, and CDRH3, a CDRH1 of SEQ ID NO: 2, a CDRH2 of SEQ ID NO: 3 and a CDRH3 of SEQ ID NO: 4,
  b) the first binding part comprises
  i) a lambda light chain constant region (CL) and
  ii) a light chain variable region (VL), comprising as CDRL1, CDRL2 and CDRL3, a CDRL1 of SEQ ID NO: 36, a CDRL2 of SEQ ID NO: 37 and a CDRL3 of SEQ ID NO: 38 or a light chain variable region derived from SEQ ID NO: 35 by oligonucleotide-directed mutagenesis using degenerated oligonucleotides,
  c) the second binding part comprises a light chain variable region, comprising as CDRL1, CDRL2 and CDRL3 a group of CDRs selected from the group consisting of
  I) CDRL1 of SEQ ID NO: 6, a CDRL2 of SEQ ID NO: 7 and a CDRL3 of SEQ ID NO: 8,
  II) CDRL1 of SEQ ID NO: 10, a CDRL2 of SEQ ID NO: 11 and a CDRL3 of SEQ ID NO: 12,
  III) CDRL1 of SEQ ID NO: 14, a CDRL2 of SEQ ID NO: 15 and a CDRL3 of SEQ ID NO: 16,
  IV) CDRL1 of SEQ ID NO: 18, a CDRL2 of SEQ ID NO: 19 and a CDRL3 of SEQ ID NO: 20, and
  V) CDRL1 of SEQ ID NO: 22, a CDRL2 of SEQ ID NO: 23 and a CDRL3 of SEQ ID NO: 24.
  d) the second binding part comprises a hybrid-kappa chain constant region.

In one embodiment the second binding part in c) comprises a light chain selected from the group consisting of SEQ ID NOs: 67, 68, 69, 70, and 71

In one embodiment the second binding part can comprise as light chain constant region a lambda light chain constant region of SEQ ID NO: 41; in that case the first binding part comprises in one embodiment as light chain constant region a hybrid-kappa light chain region of SEQ ID NO: 58. In one embodiment the arm carrying the hybrid light chain constant region is based on the overall properties of the bsAb, including but not limited to stability and productivity.

In one embodiment the light chain variable region of the first binding part is derived from SEQ ID NO: 35 by oligonucleotide-directed mutagenesis using degenerated oligonucleotides, the common heavy chain is of SEQ ID NO: 45, and the variable region of the common heavy chain is of SEQ ID NO: 1.

In one embodiment the bispecific antibody is characterized in comprising a first binding part, specifically binding to human CEACAM5 and a second binding part, specifically binding to human CD3ε, characterized in that
  a) the first binding part and the second binding part comprise each as heavy chain a common heavy chain and comprises as variable region a variable region which comprises as CDRH1, CDRH2, and CDRH3, a CDRH1 of SEQ ID NO: 2, a CDRH2 of SEQ ID NO: 3 and a CDRH3 of SEQ ID NO: 4,
  b) the first binding part comprises
  i) a kappa light chain constant region (CL), and
  ii) a light chain variable region (VL), comprising as CDRL1, CDRL2 and CDRL3, a CDRL1 of SEQ ID NO: 64, a CDRL2 of SEQ ID NO: 65 and a CDRL3 of SEQ ID NO: 66 or a light chain variable region derived from SEQ ID NO: 63 by oligonucleotide-directed mutagenesis,
  c) the second binding part comprises a light chain variable region, comprising as CDRL1, CDRL2 and CDRL3 a group of CDRs selected from the group consisting of
  I) CDRL1 of SEQ ID NO: 6, a CDRL2 of SEQ ID NO: 7 and a CDRL3 of SEQ ID NO: 8,
  II) CDRL1 of SEQ ID NO: 10, a CDRL2 of SEQ ID NO: 11 and a CDRL3 of SEQ ID NO: 12,
  III) CDRL1 of SEQ ID NO: 14, a CDRL2 of SEQ ID NO: 15 and a CDRL3 of SEQ ID NO: 16,
  IV) CDRL1 of SEQ ID NO: 18, a CDRL2 of SEQ ID NO: 19 and a CDRL3 of SEQ ID NO: 20, and
  V) CDRL1 of SEQ ID NO: 22, a CDRL2 of SEQ ID NO: 23 and a CDRL3 of SEQ ID NO: 24.
  d) the second binding part comprises a lambda light chain constant region.

In one embodiment the second binding part in c) comprises a light chain selected from the group consisting of SEQ ID NOs: 25, 26, 27, 28, and 29.

In one embodiment of the invention the light chain variable region of the first binding part is derived from SEQ ID NO: 63 by oligonucleotide-directed mutagenesis using degenerated oligonucleotides, the common heavy chain is of SEQ ID NO: 45.

In one embodiment the bispecific antibody is characterized in comprising a first binding part, specifically binding to human CEACAM5 and a second binding part, specifically binding to human CD3ε, characterized in that a) the first binding part and the second binding part comprise each as heavy chain a common heavy chain and comprises as variable region a variable region which comprises as CDRH1, CDRH2, and CDRH3, a CDRH1 of SEQ ID NO: 2, a CDRH2 of SEQ ID NO: 3 and a CDRH3 of SEQ ID NO: 4, b) the first binding part a lambda light chain constant region (CL), and a light chain variable region (VL), comprising as CDRL1, CDRL2 and CDRL3, a CDRL1 of SEQ ID NO: 60, a CDRL2 of SEQ ID NO: 61 and a CDRL3 of SEQ ID NO: 62 or a light chain variable region derived from SEQ ID NO: 59 by oligonucleotide-directed mutagenesis using degenerated oligonucleotides, c) the second binding part comprises a light chain variable region, comprising as CDRL1, CDRL2 and CDRL3 a group of CDRs selected from the group consisting of
  I) CDRL1 of SEQ ID NO: 6, a CDRL2 of SEQ ID NO: 7 and a CDRL3 of SEQ ID NO: 8,
  II) CDRL1 of SEQ ID NO: 10, a CDRL2 of SEQ ID NO: 11 and a CDRL3 of SEQ ID NO: 12,
  III) CDRL1 of SEQ ID NO: 14, a CDRL2 of SEQ ID NO: 15 and a CDRL3 of SEQ ID NO: 16,
  IV) CDRL1 of SEQ ID NO: 18, a CDRL2 of SEQ ID NO: 19 and a CDRL3 of SEQ ID NO: 20, and
  V) CDRL1 of SEQ ID NO: 22, a CDRL2 of SEQ ID NO: 23 and a CDRL3 of SEQ ID NO: 24.

d) the second binding part comprises a hybrid-kappa chain constant region.

In a further embodiment of the invention, the second binding part comprise as light chain constant region a lambda light constant chain region of SEQ ID NO: 41; in that case the first binding part comprises in one embodiment as light chain constant region a hybrid-kappa light chain constant region of SEQ ID NO: 58. The choice of the arm carrying the hybrid light chain constant region is based on the overall properties of the final bsAb, including but not limited to stability and productivity.

In one embodiment the light chain variable region of the first binding part is derived from SEQ ID NO: 59 by oligonucleotide-directed mutagenesis using degenerated oligonucleotides.

In one embodiment the bispecific antibody is characterized in comprising a first binding part, specifically binding to human CEACAM5 and a second binding part, specifically binding to human CD3ε, characterized in that a) the first binding part and the second binding part comprise each as heavy chain a common heavy chain) and comprises as variable region a variable region which comprises as CDRH1, CDRH2, and CDRH3, a CDRH1 of SEQ ID NO: 2, a CDRH2 of SEQ ID NO: 3 and a CDRH3 of SEQ ID NO: 4, b) the first binding part comprises a light chain constant region of human kappa type and a light chain variable region of human kappa type, comprising as CDRL1, CDRL2 and CDRL3 a CDRL1 of SEQ ID NO: 32 with substitution of 0, 1, 2, 3, or 4 amino acids, a CDRL2 of SEQ ID NO: 33 with substitution of 0, 1, 2, 3 or 4 amino acids, and a CDRL3 of SEQ ID NO: 34 with substitution of 0, 1, 2, 3, 4, or 5 amino acids, c) the second binding part comprises a light chain constant region of human lambda type and a light chain variable region of human lambda type, comprising as CDRL1, CDRL2 and CDRL3 a group of CDRs selected from the group consisting of
  I) CDRL1 of SEQ ID NO: 6, a CDRL2 of SEQ ID NO: 7 and a CDRL3 of SEQ ID NO: 8,
  II) CDRL1 of SEQ ID NO: 10, a CDRL2 of SEQ ID NO: 11 and a CDRL3 of SEQ ID NO: 12,
  III) CDRL1 of SEQ ID NO: 14, a CDRL2 of SEQ ID NO: 15 and a CDRL3 of SEQ ID NO: 16,
  IV) CDRL1 of SEQ ID NO: 18, a CDRL2 of SEQ ID NO: 19 and a CDRL3 of SEQ ID NO: 20, and
  V) CDRL1 of SEQ ID NO: 22, a CDRL2 of SEQ ID NO: 23 and a CDRL3 of SEQ ID NO: 24.

In one embodiment the second binding part in c) comprises a light chain selected from the group consisting of SEQ ID NOs: 25, 26, 27, 28, and 29.

In one embodiment the bispecific antibody is characterized in comprising a first binding part, specifically binding to human CEACAM5 and a second binding part, specifically binding to human CD3ε, characterized in that a) the first binding part and the second binding part comprise each as heavy chain a common heavy chain and comprises as variable region a variable region which comprises as CDRH1, CDRH2, and CDRH3, a CDRH1 of SEQ ID NO: 2, a CDRH2 of SEQ ID NO: 3 and a CDRH3 of SEQ ID NO: 4, b) the first binding part comprises light chain constant region of human lambda type and a light chain variable region of human lambda type, comprising as CDRL1, CDRL2 and CDRL3, a CDRL set selected from the group consisting of a CDRL1 of SEQ ID NO: 36 with substitution of 0, 1, 2, 3, 4, or 5 amino acids, a CDRL2 of SEQ ID NO: 37 with substitution of 0, 1, 2, 3, 4, or 5 amino acids, and a CDRL3 of SEQ ID NO: 38, with substitution of 0, 1, 2, 3, 4, or 5 amino acids, c) the second binding part comprises a hybrid kappa light chain constant region and a light chain variable region of human lambda type, comprising as CDRL1, CDRL2 and CDRL3 a group of CDRs selected from the group consisting of
  I) CDRL1 of SEQ ID NO: 6, a CDRL2 of SEQ ID NO: 7 and a CDRL3 of SEQ ID NO: 8,
  II) CDRL1 of SEQ ID NO: 10, a CDRL2 of SEQ ID NO: 11 and a CDRL3 of SEQ ID NO: 12,
  III) CDRL1 of SEQ ID NO: 14, a CDRL2 of SEQ ID NO: 15 and a CDRL3 of SEQ ID NO: 16,
  IV) CDRL1 of SEQ ID NO: 18, a CDRL2 of SEQ ID NO: 19 and a CDRL3 of SEQ ID NO: 20, and
  V) CDRL1 of SEQ ID NO: 22, a CDRL2 of SEQ ID NO: 23 and a CDRL3 of SEQ ID NO: 24.

In one embodiment the second binding part in c) comprises a light chain selected from the group consisting of SEQ ID NOs: 67, 68, 69, 70, and 71.

In one embodiment the bispecific antibody is characterized in comprising a first binding part, specifically binding to human CEACAM5 and a second binding part, specifically binding to human CD3ε, characterized in that a) the first binding part and the second binding part comprise each as heavy chain a common heavy chain and comprises as variable region a variable region which comprises as CDRH1, CDRH2, and CDRH3, a CDRH1 of SEQ ID NO: 2, a CDRH2 of SEQ ID NO: 3 and a CDRH3 of SEQ ID NO: 4, b) the first binding part comprises a light chain constant region of human lambda type and a light chain variable region of human lambda type, comprising as CDRL1, CDRL2 and CDRL3, a CDRL set selected from the group consisting of a CDRL1 of SEQ ID NO: 60 with substitution of 0, 1, 2, 3, or 4 amino acids, a CDRL2 of SEQ ID NO: 61 with substitution of 0, 1, 2, 3 or 4 amino acids, and a CDRL3 of SEQ ID NO: 62 with substitution of 0, 1, 2, 3, 4, or 5 amino acids, and c) the second binding part comprises a light chain constant region of human kappa type, and a light chain variable region of human lambda type, comprising as CDRL1, CDRL2 and CDRL3 a group of CDRs selected from the group consisting of
I) CDRL1 of SEQ ID NO: 6, a CDRL2 of SEQ ID NO: 7 and a CDRL3 of SEQ ID NO: 8,
II) CDRL1 of SEQ ID NO: 10, a CDRL2 of SEQ ID NO: 11 and a CDRL3 of SEQ ID NO: 12,
III) CDRL1 of SEQ ID NO: 14, a CDRL2 of SEQ ID NO: 15 and a CDRL3 of SEQ ID NO: 16,
IV) CDRL1 of SEQ ID NO: 18, a CDRL2 of SEQ ID NO: 19 and a CDRL3 of SEQ ID NO: 20, and
V) CDRL1 of SEQ ID NO: 22, a CDRL2 of SEQ ID NO: 23 and a CDRL3 of SEQ ID NO: 24.

In one embodiment the second binding part in c) comprises a light chain selected from the group consisting of SEQ ID NOs: 67, 68, 69, 70, and 71.

In one embodiment the bispecific antibody is characterized in comprising a first binding part, specifically binding to human CEACAM5 and a second binding part, specifically binding to human CD3ε, characterized in that
a) the first binding part and the second binding part comprise each as heavy chain a (common heavy chain and comprises as variable region a variable region which comprises as CDRH1, CDRH2, and CDRH3, a CDRH1 of SEQ ID NO: 2, a CDRH2 of SEQ ID NO: 3 and a CDRH3 of SEQ ID NO: 4,
b) the first binding part comprises a light chain constant region of human kappa type, and a light chain variable region of human kappa type, comprising as CDRL1, CDRL2 and CDRL3, a CDRL set selected from the group consisting of a CDRL1 of SEQ ID NO: 64 with substitution of 0, 1, 2, 3, 4, or 5 amino acids, a CDRL2 of SEQ ID NO: 65 with substitution of 0, 1, 2, 3, 4, or 5 amino acids, and a CDRL3 of SEQ ID NO: 66, and with substitution of 0, 1, 2, 3, 4, or 5 amino acids
c) the second binding part comprises a light chain constant region of human lambda type, and a light chain variable region of human lambda type, comprising as CDRL1, CDRL2 and CDRL3 a group of CDRs selected from the group consisting of I) CDRL1 of SEQ ID NO: 6, a CDRL2 of SEQ ID NO: 7 and a CDRL3 of SEQ ID NO: 8,
II) CDRL1 of SEQ ID NO: 10, a CDRL2 of SEQ ID NO: 11 and a CDRL3 of SEQ ID NO: 12,
III) CDRL1 of SEQ ID NO: 14, a CDRL2 of SEQ ID NO: 15 and a CDRL3 of SEQ ID NO: 16,
IV) CDRL1 of SEQ ID NO: 18, a CDRL2 of SEQ ID NO: 19 and a CDRL3 of SEQ ID NO: 20, and
V) CDRL1 of SEQ ID NO: 22, a CDRL2 of SEQ ID NO: 23 and a CDRL3 of SEQ ID NO: 24.

In one embodiment the second binding part in c) comprises a light chain selected from the group consisting of SEQ ID NOs: 25, 26, 27, 28, and 29.

In one embodiment, the bispecific antibody comprises a first binding part, specifically binding to human CEACAM5, and a second binding part, specifically binding to human CD3ε, wherein:
a) the first binding part comprises a heavy chain variable region (VH), which comprises a CDRH1 of SEQ ID NO: 2, a CDRH2 of SEQ ID NO: 3 and a CDRH3 of SEQ ID NO: 4,
b) the first binding part comprises a light chain variable region (VL) comprising a CDRL set in which the CDRL1 has the consensus sequence of SEQ ID NO: 136, the CDRL2 has the consensus sequence of SEQ ID NO: 137, and the CDRL3 has the consensus sequence of SEQ ID NO: 138, and
c) the second binding part comprises a VH comprising a CDRH1 of SEQ ID NO: 2, CDRH2 of SEQ ID NO: 3 and CDRH3 of SEQ ID NO: 4.

In one embodiment the first binding part comprises as variable light chain framework sequence the framework sequence of SEQ ID NO: 31. In one embodiment the first binding part comprises as variable light chain framework sequence the framework sequence of SEQ ID NO: 35. In one embodiment the first binding part comprises as variable light chain framework sequence the framework sequence of SEQ ID NO: 59. In one embodiment the first binding part comprises as variable light chain framework sequence the framework sequence of SEQ ID NO: 63.

In one embodiment, the first binding part specifically binding to CEA, comprises as heavy chain variable region a heavy chain variable region of an amino acid sequence SEQ ID NO: 1 and as light chain variable region a light chain variable region of an amino acid sequence that is 98%, 99% or 100% identical to an amino acid sequence selected from the group of SEQ ID NO: 31 or SEQ ID NO: 35, SEQ ID NO: 59 or SEQ ID NO: 63, and the second binding part specifically binding to CD3, comprises as heavy chain variable region a heavy chain variable region of amino acid sequence SEQ ID NO: 1 and as light chain variable region a light chain variable region of amino acid sequence selected from the group consisting of SEQ ID NO: 5, SEQ ID NO: 9, SEQ ID NO: 13 SEQ ID NO: 17 and SEQ ID NO: 21.

In one embodiment the bispecific antibody according to the invention is characterized in comprising a first binding part specific for CEA, comprising a kappa light chain variable domain and a kappa light chain constant domain and a second binding part specific for CD3ε, comprising a lambda light chain variable domain and a lambda light chain constant domain.

In one embodiment the bispecific antibody according to the invention is characterized in comprising a first binding part specific for CEA, comprising a lambda light chain variable domain and a kappa light chain constant domain and a second binding part specific for CD3ε, comprising a lambda light chain variable domain and a lambda light chain constant domain.

In one embodiment the bispecific antibody according to the invention is characterized in comprising a first binding part specific for CEA, comprising a lambda light chain variable domain and a lambda light chain constant domain and a second binding part specific for CD3ε, comprising a lambda light chain variable domain and a kappa light chain constant domain.

In a particular embodiment the Fc domain exhibits reduced binding affinity to an Fc receptor and/or reduced effector function, as compared to a native/wild type IgG1 Fc domain. In certain embodiments the Fc domain is engineered to have reduced binding affinity to an Fc receptor and/or reduced effector function, as compared to a non-engineered Fc domain. In one embodiment, the Fc domain comprises one or more amino acid substitution that reduces binding to one or more Fc receptors and/or reduces effector functions. In one embodiment such one or more substitutions are selected from the group consisting of Pro238, Asp265, Asp270, Asn297 (loss of Fc carbohydrate), Pro329, Leu234, Leu235, Gly236, Gly237, Ile253, Ser254, Lys288, Thr307, Gln311, Asn434, and His435 (Shields, R. L., et al., J. Biol. Chem. 276 (2001) 6591-6604; Lund, J., et al., FASEB J. 9 (1995) 115-119; Morgan, A., et al., Immunology 86 (1995) 319-324; EP 0 307 434). In one embodiment the antibody is in regard to FcR binding of IgG4 subclass or of IgG1 or IgG2 subclass with a mutation in S228, L234, L235 and/or D265, and/or contains the PVA236 mutation. In one embodiment the mutations in the Fc domain are S228P, L234A, L235A, L235E and/or PVA236. In another embodiment the mutations in Fc domain are in IgG4 S228P and in IgG1 L234A and L235A. In one embodiment, the one or more amino acid substitution in the Fc domain that reduces binding to one or more Fc receptors and/or reduces effector functions is at one or more position selected from the group of L234, L235, and P329 (Kabat EU index numbering). In particular embodiments, each subunit of the Fc domain comprises two amino acid substitutions that reduce binding to an Fc receptor and/or reduces effector function wherein said amino acid substitutions are L234A and L235A (Kabat EU index numbering). In particular embodiments, each subunit of the Fc domain comprises three amino acid substitutions that reduce binding to an Fc receptor and/or reduces effector function wherein said amino acid substitutions are L234A, L235A and P329A (Kabat EU index numbering). In one such embodiment, the Fc domain is an IgG1Fc domain, particularly a human IgG1Fc domain (Kabat EU index numbering). In one embodiment, the Fc domain is of IgG4 subclass and in one embodiment of IgG4 subclass with mutation S228P.

In one embodiment the Fc receptor is an Fcγ receptor. In one embodiment the Fc receptor is a human Fc receptor. In one embodiment, the Fc receptor is an activating Fc receptor. In a specific embodiment, the Fc receptor is human FcγRIIIA, FcγRI, and/or FcγRIIIA. In one embodiment, the effector function is antibody-dependent cell-mediated cytotoxicity (ADCC), but not limited to only ADCC.

An embodiment of the invention is a kappa CL region of SEQ ID NO: 58 for use in the second binding part as CL region in the construction of a bispecific antibody comprising a common heavy chain of SEQ ID NOs: 43, 44, or 45, and a lambda CL region of SEQ ID NO: 41 as CL region in the first binding part.

An embodiment of the invention is a kappa CL region of SEQ ID NO: 58 for use in the second binding part, specifically binding to CD3 as CL region in the construction of a bispecific antibody according to the invention, comprising a common heavy chain of SEQ ID NOs: 43, 44, or 45, and a lambda CL region of SEQ ID NO: 41 as CL region in the first binding part, specifically binding to CEACAM5.

An embodiment of the invention is a kappa CL region of SEQ ID NO: 58 for use in the second binding part, specifically binding to CD3 as CL region in the construction of a bispecific antibody according to the invention, comprising a common heavy chain of SEQ ID NOs: 43, 44, or 45, a variable light chain of SEQ ID NOs: 5, 9, 13, 17, or 21, and a lambda CL region of SEQ ID NO: 41 as CL region in the first binding part, specifically binding to CEACAM5.

A further embodiment of the invention is an oligonucleotide, selected from the group consisting of SEQ ID NOs: 76, 77, 78, and 79 for use in the antibody affinity maturation by oligonucleotide-directed mutagenesis using degenerated oligonucleotides of the respective light chain variable region of SEQ ID NOs: 31, 35, 59, and 63.

In another aspect is provided a method of producing the bispecific of the invention, comprising the steps of a) culturing the host cell of the invention under conditions suitable for the expression of the bispecific antibody and b) recovering the bispecific antibody. The invention also encompasses a bispecific antibody produced by the method of the invention.

The invention further provides a pharmaceutical composition comprising the bispecific antibody of the invention and a pharmaceutically acceptable carrier. Also encompassed by the invention are methods of using the bispecific antibody and pharmaceutical composition of the invention. In one aspect the invention provides a bispecific antibody or a pharmaceutical composition of the invention for use as a medicament. In one aspect is provided a bispecific antibody or a pharmaceutical composition according to the invention for use in the treatment of a disease in an individual in need thereof. In a specific embodiment the disease is cancer.

Also provided is a bispecific antibody of the invention for use in the manufacture of a medicament for the treatment of a disease in an individual in need thereof; as well as a method of treating a disease in an individual, comprising administering to said individual a therapeutically effective amount of a composition comprising the Bispecific antibody according to the invention in a pharmaceutically acceptable form. In a specific embodiment the disease is cancer. In any of the above embodiments the individual preferably is a mammal, particularly a human.

The invention also provides a method for inducing lysis of a target cell, particularly a tumor cell, comprising contacting a target cell with a bispecific antibody of the invention in the presence of a T cell, particularly a cytotoxic T cell.

A further embodiment of the invention is the bispecific antibody according to the invention for use in the manufacture of a medicament for treating a subject having a cancer that expresses CEA.

A further embodiment of the invention is the bispecific antibody according to the invention for use in the manufacture of a medicament according to the invention, characterized in that the cancer is selected from the group consisting of colorectal cancer, non-small cell lung cancer (NSCLC), esophageal cancer, gastric/esophageal junction cancer, pancreatic cancer and breast cancer.

A further embodiment of the invention is a bispecific antibody according to the invention for use in simultaneous, separate, or sequential combination with an anti-CD47 antibody. In one embodiment the anti-CD47 antibody is Magrolimab, ALX148 or TTI-621 and/or TTI-622.

A further embodiment of the invention is a bispecific antibody according to the invention, for use in simultaneous, separate, or sequential combination with a second bispecific antibody comprising a third binding part specifically binding to human CEACAM5, and a fourth binding part specifically binding to human CD47 in the treatment of a subject having a cancer that expresses CEA.

Such second bispecific CEA×CD47 antibodies are described in PCT/IB2019/054559 and U.S. Ser. No. 16/428, 359.

A further embodiment of the invention is a bispecific antibody according to the invention for use according to the invention, characterized in that the bispecific antibody according to the invention and the second bispecific CEA× CD47 antibody are administered to said subject alternately in 6 to 15 day intervals, but not limited to such intervals.

A further embodiment of the invention is a first bispecific antibody according to the invention, comprising a first binding part, specifically binding to human CEACAM5 and a second binding part, specifically binding to human CD3 according to the invention, and a second bispecific antibody CEA×CD47 for use in the treatment of cancer according to the invention, characterized in that said cancer is colorectal cancer, non-small cell lung cancer (NSCLC), gastric cancer, esophageal cancer, pancreatic cancer and breast cancer.

A further embodiment of the invention is a composition comprising a bispecific antibody according to the invention, characterized in not competing with said second CEA×CD47 bispecific antibody as defined above for use in the treatment of a subject having a cancer that expresses CEA.

A further embodiment of the invention is a method for the treatment of a human patient diagnosed with a tumor (cancer), especially a solid tumor, especially a solid cancer that expresses CEA, especially colorectal cancer, non-small cell lung cancer (NSCLC), gastric cancer, esophageal cancer, pancreatic cancer and breast cancer, comprising administering an effective amount of an bispecific antibody according to the invention and a second bispecific antibody as described in PCT/IB2019/054559 and U.S. Ser. No. 16/428,359, against CEA and CD47, to the human patient, the method comprising subsequently:
- administering to the patient a dose of 0.1 to 30 mg/kg, in a further embodiment of 0.5 to 10 mg/kg, in a further embodiment of 1 to 10 mg/kg of said second anti CEA×CD47 antibody, e.g. weekly over 4 to 12 weeks,
- administering to the patient said second antibody q1, q2w, q3w or optionally q4w,
- administering after these 4 to 12 weeks and after additional 2 or 3 or 4 elimination half-lives of said anti CEA×CD47 antibody to the patient a dose of 0.1 to 10 mg/kg of an antibody according to the invention,
- administering to the patient said antibody according to the invention q1, q2w, q3w or optionally q4w,
- waiting 2 or 3 or 4 elimination half-lives of said antibody according to the invention and then optionally repeating said cycle of CEA×CD47 bispecific antibody administration followed by CEA×CD3 bispecific antibody administration and optionally repeat again that cycle.

This "alternating" method is applied if the antibody of the invention and the second bispecific antibody are competitive regarding binding to CEA.

In case said CEA×CD47 bispecific antibody and the CEA×CD3 bispecific antibody according to this invention are not competitive, the two bispecific antibodies can also be administered in a manner ("simultaneous manner") that the patient experiences therapeutically effective plasma and tissue concentrations of both bispecific antibodies in parallel, e.g. by administration to the patient at about the same time a dose of 0.1 to 30 mg/kg, in a further embodiment of 0.5 to 10 mg/kg, in a further embodiment of 1 to 10 mg/kg of the CEA×CD47 bispecific antibody and 0.1 to 10 mg/kg of the CEA×CD3 bispecific antibody of this invention, followed by one or more of these combined administrations at a frequency of q1w or q2w or q3w or optionally q4w.

The term "q1w" means administration once a week; q2w means administration every two weeks etc.

A further embodiment of the invention is a pharmaceutical composition comprising an antibody according to the invention and a pharmaceutically acceptable excipient or carrier.

A further preferred embodiment of the invention is a pharmaceutical composition comprising an antibody according to the invention for use as a medicament.

A further preferred embodiment of the invention is a pharmaceutical composition comprising an antibody according to the invention for use as a medicament in the treatment of solid tumor disorders expressing CEA.

A further preferred embodiment of the invention is a pharmaceutical composition comprising an antibody according to the invention for use as a medicament in the treatment of colorectal cancer, NSCLC (non-small cell lung cancer), gastric cancer, esophageal cancer, pancreatic cancer or breast cancer.

A further embodiment of the invention is a composition according to the invention, characterized in that the cancer is colorectal cancer, non-small cell lung cancer (NSCLC), gastric cancer, esophageal cancer, pancreatic cancer, or breast cancer.

A further embodiment of the invention is an antibody according to the invention for use in the manufacture of a pharmaceutical composition.

A further embodiment of the invention is an antibody according to the invention and a pharmaceutically acceptable excipient or carrier for use in the manufacture of a pharmaceutical composition.

A further embodiment of the invention is of an antibody according to the invention for use in the manufacture of a medicament in the treatment of solid tumor disorders.

A further embodiment of the invention is of an antibody according to the invention for use in the treatment of colorectal cancer, NSCLC (non-small cell lung cancer), gastric cancer, esophageal cancer, pancreatic cancer or breast cancer.

Another aspect of the invention provides a method of inducing cell lysis of a tumor cell comprising contacting the tumor cell with the bispecific antibody of any of above described embodiments. In some embodiments, the tumor cell is a colorectal cancer cell, NSCLC (non-small cell lung cancer), gastric cancer cell, esophageal cancer cell, pancreatic cancer cell or breast cancer cell.

In one embodiment, the cell lysis is induced by T-cell directed cellular cytotoxicity (TDCC).

Another aspect of the invention provides a method of treating a subject having a cancer that expresses CEA, the method comprising administering to the subject a therapeutically effective amount of the bispecific antibody of any of above described embodiments.

Another aspect of the invention provides a method of treating a subject having a cancer that expresses CEA, the method comprising administering to the subject a therapeutically effective amount of the bispecific antibody of any of above described embodiments in combination with a bispecific antibody binding to human CEA and human CD47. If the CEA×CD47 antibody and the CEA×CD3 antibody are competing they will compete for the CEA receptors on the surface of the tumor cell and the receptor occupancy and efficacy for each combination partner depends on their binding affinity and their plasma concentrations and is therefore difficult to predict and also variable over time if the concentrations of the two drugs have a different elimination half-life respectively clearance from the body. Therefore, competing CEA×CD3 and CEA×CD47 bispecific antibodies should be given sequentially (alternating). If the CEA×CD3 and CEA×CD47 bispecific antibodies are not or only minimally competing they can be not only given sequentially but also in parallel (simultaneously) which may well be an advantage because tumor cell killing via engagement of T-cells by the CEA×CD3 bispecific antibody and at the same time via engagement of macrophages by the CEA×CD47 bispecific antibody is expected to be additive or may be even synergistic, which means efficacy is increased if both drugs are given in parallel.

Another aspect of the invention provides a method of increasing progression free survival and/or overall survival time in a subject having a cancer that expresses CEA, said method comprising administering to said subject a therapeutically effective amount of the bispecific antibody of any of above described embodiments. In one embodiment, the cancer is colorectal cancer, non-small cell lung cancer (NSCLC), gastric cancer, esophageal cancer, pancreatic cancer, breast cancer, head and neck carcinoma, uterine cancer, bladder cancer, or another cancer expressing CEA.

In certain embodiments of these methods, the bispecific antibody is administered in combination with chemotherapy or radiation therapy. In one embodiment, the subject is a patient suffering from colorectal cancer or lung cancer or gastric cancer, esophageal cancer, or pancreatic cancer or breast cancer or another cancer expressing CEA.

In certain embodiments of these methods, the bispecific antibody of the invention is administered to a patient in doses ranging from 0.1 to 100 mg/kg of body weight per day or per week in single or divided doses, or by continuous infusion. In certain embodiments, the bispecific antibody of the invention is administered to a patient in doses ranging from 1 to 20 mg/kg.

Another aspect of the invention provides a method of treating a subject having a cancer that expresses CEA, the method comprising administering to the subject a therapeutically effective amount of the bispecific antibody of any of above described embodiments in combination with a bispecific antibody against human CEA and human CD47. In certain embodiments of these methods, the bispecific antibody is administered in combination with a bispecific anti-CEA×CD47 antibody in simultaneous, separate, or sequential combination. In certain embodiments of these methods, the bispecific anti-CEA×CD47 antibody is administered in an alternating pattern with an antibody of the invention, with intervals of 6 to 15 days between administrations of the antibody of the invention and a bispecific anti-CEA×CD47 antibody. In certain embodiments, the anti-CEA×CD47 antibody is administered to a patient in doses ranging from 0.1 to 100 mg/kg of body weight per day or per week in single or divided doses, or by continuous infusion.

In certain embodiments of these methods, the bispecific antibody is administered in combination with a PD-1 axis antagonist in simultaneous, separate, or sequential combination. In certain embodiments of these methods, the bispecific antibody is administered in combination with a bispecific anti-CEA×CD47 antibody and a PD-1 axis antagonist in simultaneous, separate, or sequential combination. In certain embodiments, the PD-1 axis antagonist is administered to a patient in doses ranging from 0.1 to 100 mg/kg of body weight per day or per week in single or divided doses, or by continuous infusion.

Another aspect of the invention provides a method of increasing progression free survival time and/or overall survival time in a subject having a cancer that abnormally expresses CEA, said method comprising administering to said subject a therapeutically effective amount of the bispecific antibody of any of above described embodiments. In one embodiment, the cancer is colorectal cancer, non-small cell lung cancer (NSCLC), gastric cancer, esophageal cancer, pancreatic cancer or breast cancer.

In certain embodiments of these methods, the bispecific antibody is administered in combination with chemotherapy or radiation therapy. In one embodiment, the subject is a cancer patient with colorectal cancer or lung cancer or gastric cancer esophageal cancer, or pancreatic cancer or breast cancer or another CEA expressing cancer.

Another embodiment of the invention provides a bispecific antibody according to the invention for use in any of the above described methods of treatment. In one embodiment, the cancer is selected from the group consisting of colorectal cancer, non-small cell lung cancer (NSCLC), gastric cancer, esophageal cancer, pancreatic cancer and breast cancer.

Another embodiment of the invention provides polynucleotides that encode the bispecific antibodies disclosed herein or a domain thereof (e.g., a variable light chain region and/or variable heavy chain region) that immunospecifically binds to CEACAM5 or CD3ε. In certain aspects, provided herein are polynucleotides comprising a nucleotide sequence encoding the light chain or heavy chain of an antibody described herein. The polynucleotides can comprise nucleotide sequences encoding a heavy chain comprising the VHs or heavy chain CDRs of antibodies described herein. The polynucleotides can comprise nucleotide sequences encoding a light chain comprising the VLs or light chain CDRs of antibodies described herein.

Certain embodiments are vectors comprising the isolated polynucleotides disclosed herein. Certain other embodiments are cells comprising the isolated polynucleotides or vectors encoding the bispecific antibodies disclosed herein. In some embodiments, the cell is selected from the group consisting of *Streptomyces*, yeast, CHO, YB/20, NS0, PER-C6, HEK-293T, NIH-3T3, HeLa, BHK, Hep G2, SP2/0, R1.1, B-W, L-M, COS 1, COS 7, BSC1, BSC40, BMT10 cell, plant cell, insect cell, and human cell in tissue culture.

Certain embodiments are methods of making the antibodies disclosed herein. In some embodiments, the method of making an antibody comprises expressing the antibody using cells comprising the isolated polynucleotides or vectors encoding the bispecific antibodies disclosed herein. In some embodiments, the method of making an antibody comprises culturing a cell containing an isolated polynucleotide or vector encoding the bispecific antibodies disclosed herein and isolating the antibody expressed therein.

For the characterization of the new CEA binding antibodies of this invention a competitive immunoassay is used. A competitive blocking profile is created against antibodies all binding to CEACAM5 (CEA) and for which the binding epitope has already been published. SM3E, MEDI (=MEDI-565), SAR, T84.66, Labetuzumab and CH1A1A are such antibodies, for details of these antibodies and the assay see Example 5c.

Figure 2:
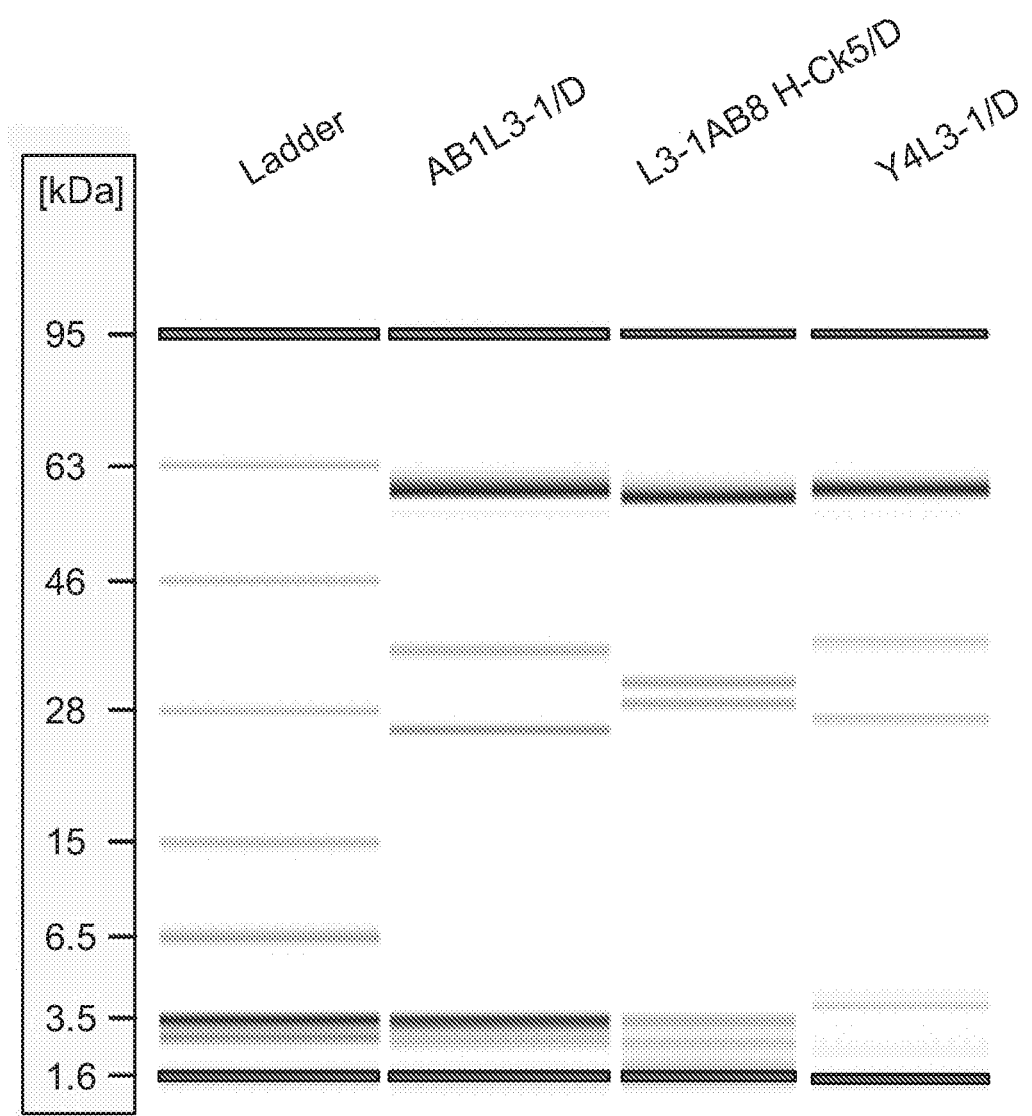

FIG. 2 Agilent Profile of Purified Bispecific Antibodies

In Example 6 expression, purification and analyses of the new kappa lambda bispecific CEA×CD3 antibodies is described. Purified bispecific antibodies are analyzed by electrophoresis in denaturing and reducing conditions. The Agilent 2100 Bioanalyzer is used, the figure shows a typical result obtained for the kappa lambda antibodies of this invention AB1 L3-1/D (KL CEA×CD3 bispecific antibody with a lambda CD3 LC SEQ ID NO: 28 and a kappa CEA LC SEQ ID NO: 40 and the common HC SEQ ID NO 44) and L3-1AB8 H-CK5/D (Hybrid KL CEA×CD3 bispecific antibody with a hybrid-kappa CD3 LC SEQ ID NO: 70 and a lambda CEA LC SEQ ID NO: 42 and a common HC SEQ ID NO: 44). Y4 L3-1/D is a bispecific antibody with same CD3 arm as AB1 L3-1/D and L3-1AB8 H-CK5/D but a second arm not binding to CEA, this antibody is frequently used in pharmacological assays as a control antibody.

Figure 3:
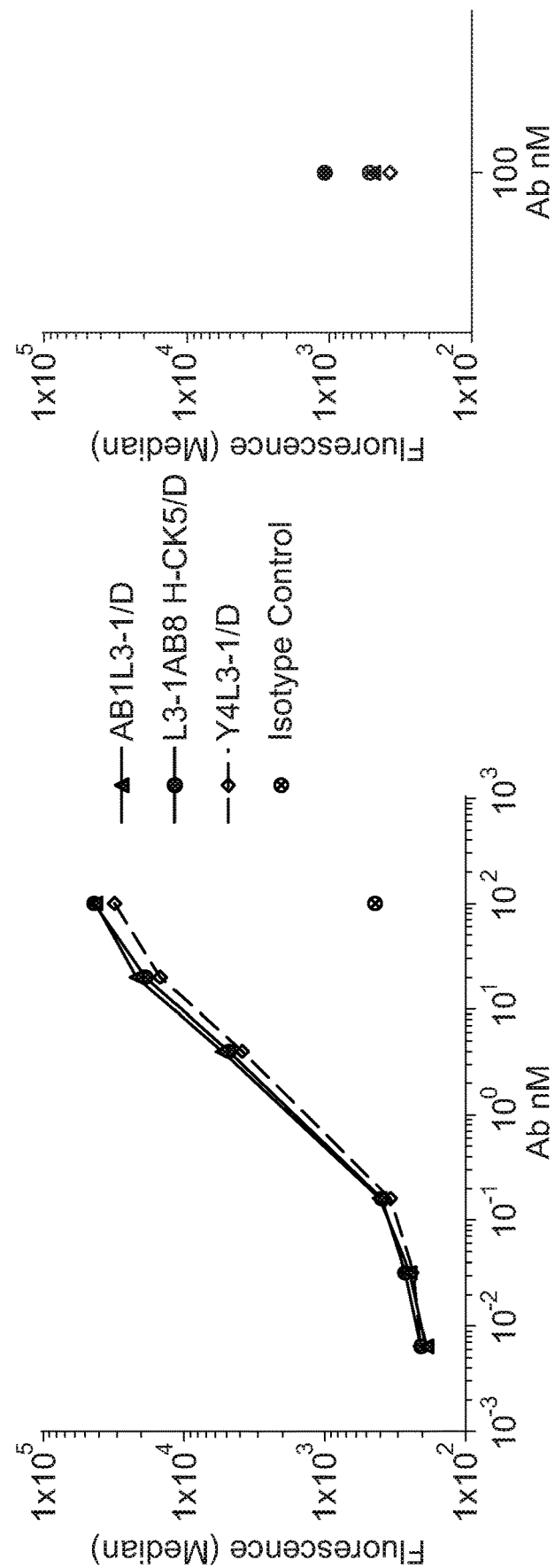

FIG. 3 Binding to $CD3^{POS}$ Jurkat Cells (and $CD3^{NEG}$ TIB-153 Cells)

Concentration dependent binding of the KL bispecific antibodies of the invention AB1 L3-1/D and L3-1AB8 H-CK5/D to CD3 expressing Jurkat cells. Both KL bispecific antibodies carry the same CD3 arm. Y4L3-1/D is a KL bispecific antibody with the same CD3 arm but with the second arm not binding to CEA. Right hand figure shows no binding to the CD3 negative cell line TIB-153 even at 100 nM concentration of the bispecific antibodies.

Figure 4:
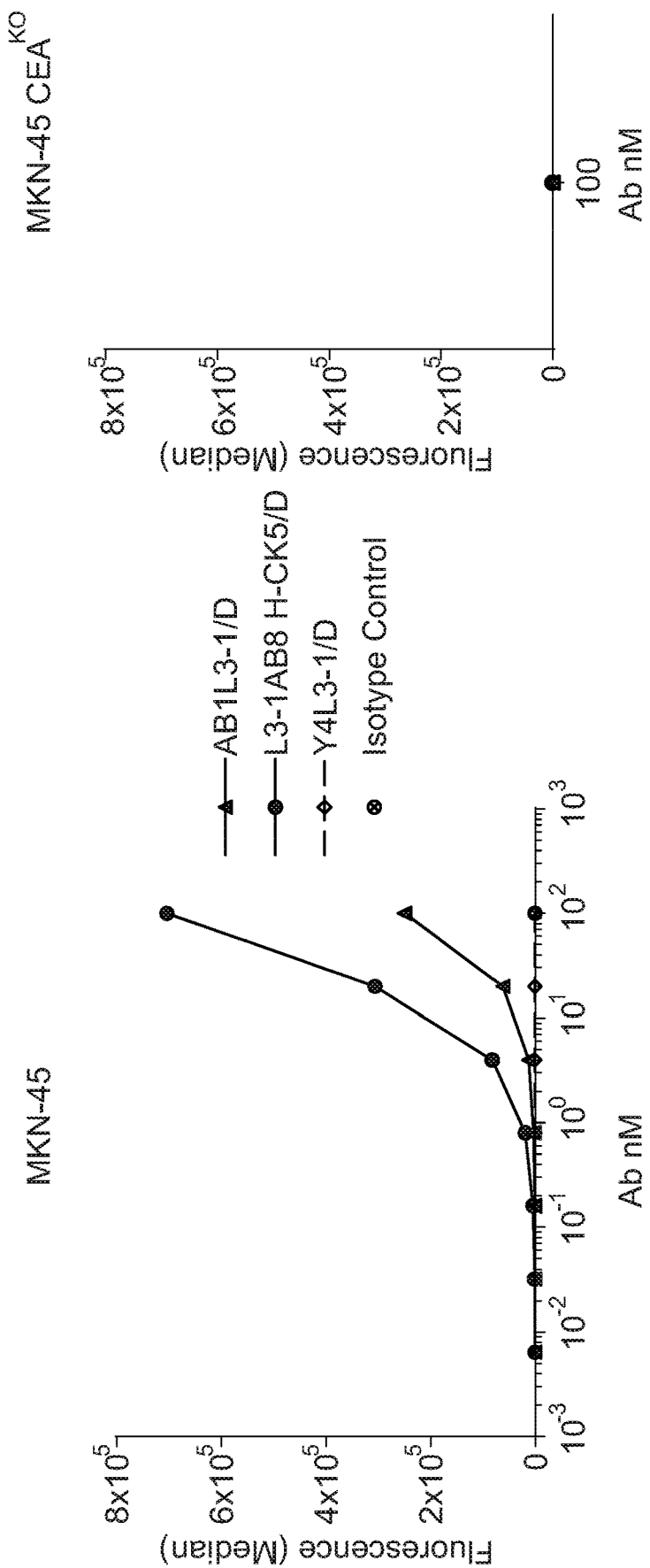

FIG. 4 Binding to $CEA^{POS}$ MKN-45 Cells (and $CEA^{NEG}$ MKN-45_$hCEA^{KO}$ Cells)

Concentration dependent binding of the KL bispecific antibodies of the invention AB1 L3-1/D and L3-1AB8 H-CK5/D to CEA expressing MKN-45 cells. Both KL bispecific antibodies carry the same CD3 arm. Y4L3-1/D, a KL bispecific antibody with the same CD3 arm but with the second arm not binding to CEA, does not bind to MKN-45 cells. Right hand figure shows no binding to the MKN-45 cell line after knock-out of CEACAM5 even at 100 nM concentration.

Figure 5:
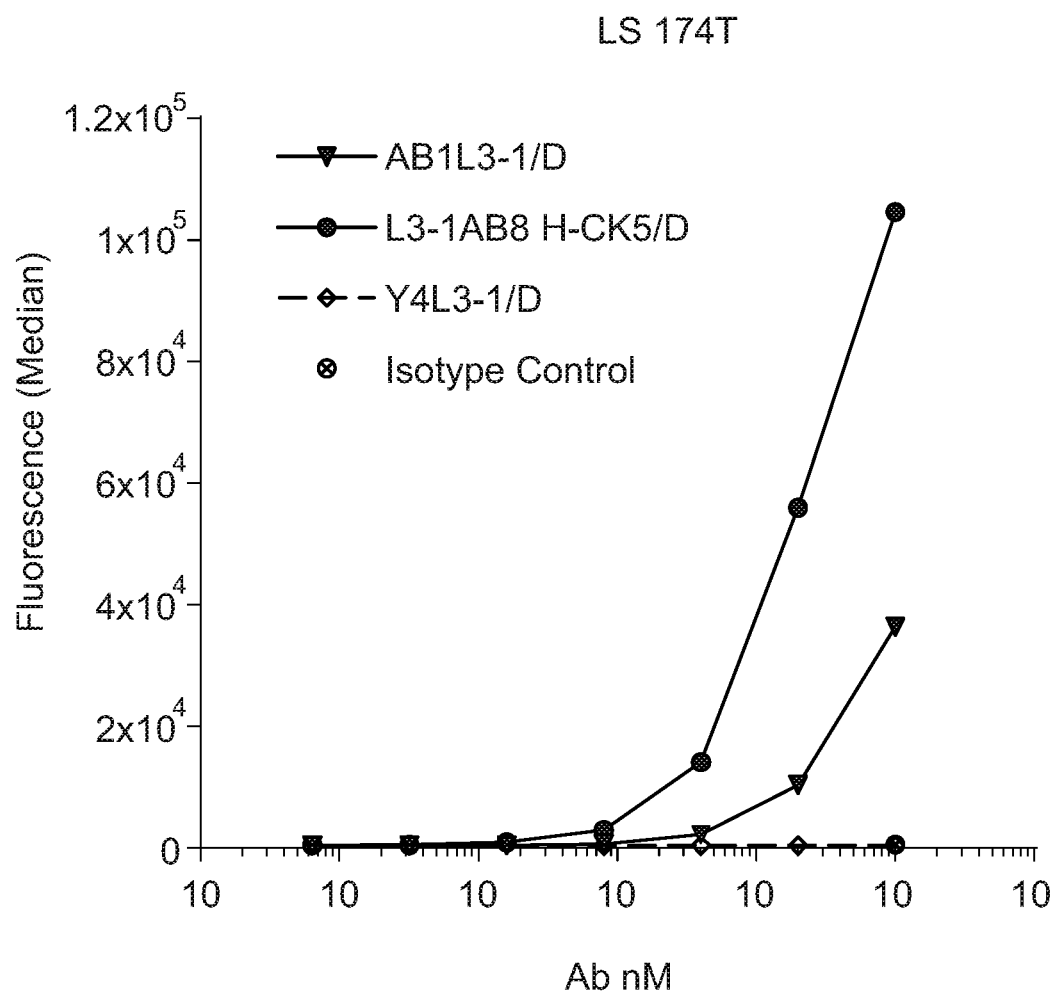

FIG. 5 Binding to $CEA^{POS}$ LS174T Cells

Concentration dependent binding of the KL bispecific antibodies of the invention AB1 L3-1/D and L3-1AB8 H-CK5/D to CEA expressing LS 174T cells. Both KL bispecific antibodies carry the same CD3 arm. Y4L3-1/D, a KL bispecific antibody with the same CD3 arm but with the second arm not binding to CEA, does not bind to the LS 174T cells.

Figure 6:
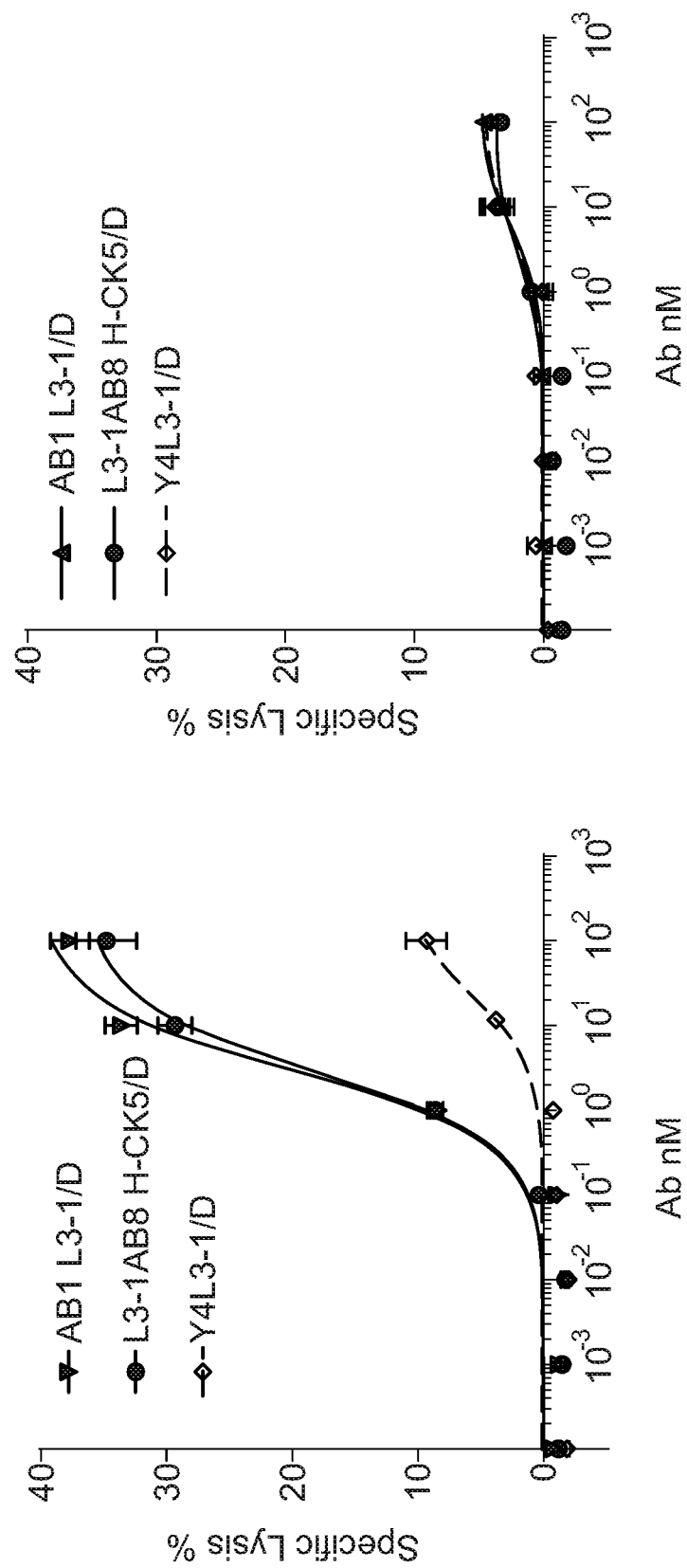

FIG. 6 Killing of $CEA^{POS}$ MKN-45 Cells (and $CEA^{NEG}$ MKN-45_$hCEA^{KO}$ Cells)

Concentration dependent T-cell retargeted killing/lysis of MKN-45 cells by the KL bispecific antibodies of the invention AB1 L3-1/D and L3-1AB8 H-CK5/D (assay described in Example 8a). Both KL bispecific antibodies carry the same CD3 arm. Both KL bispecific antibodies show the same killing potency. This is surprising/unexpected because AB1 L3-1/D binding to MKN-45 is much weaker than the binding of L3-1AB8 H-CK5/D (see FIG. 4).

Y4L3-1/D, a KL bispecific antibody with the same CD3 arm but with the second arm not binding to CEA, shows only very low killing/lysis potency at approximately 100 times higher concentrations.

Right hand figure: Only very low unspecific killing/lysis of CEA knocked out MKN-45 cells by all 3 bispecific antibodies.

Figure 7:
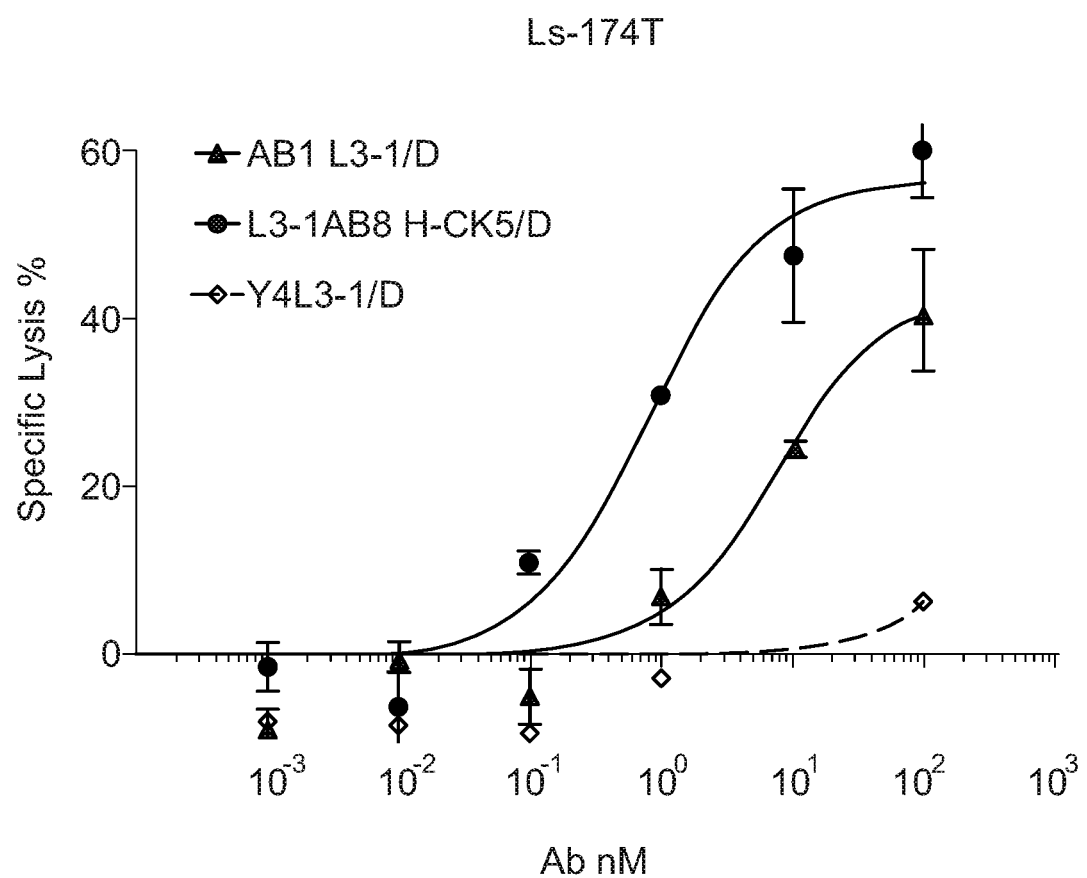

FIG. 7 Killing of $CEA^{POS}$ LS-174T

Concentration dependent T-cell retargeted killing/lysis of LS-174T cells by the KL bispecific antibodies of the invention AB1 L3-1/D and L3-1AB8 H-CK5/D (assay described in Example 8a). Both KL bispecific antibodies carry the same CD3 arm. L3-1AB8 H-CK5/D shows stronger killing potency than AB1 L3-1/D. L3-1AB8 H-CK5/D binding to LS-174T cells is more potent than the binding of AB1 L3-1/D (see FIG. 5).

Y4L3-1/D, a KL bispecific antibody with the same CD3 arm but with the second arm not binding to CEA, shows only very low killing/lysis potency at more than 100 times higher concentrations.

Figure 8:
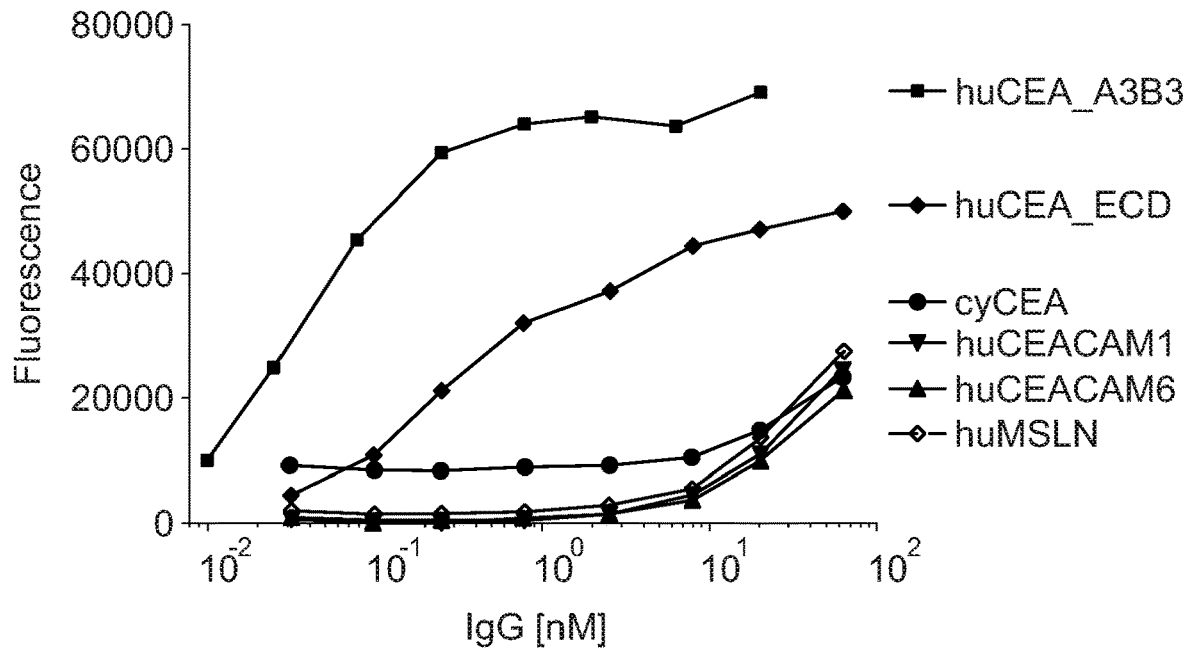

FIG. 8 Binding of the Monoclonal Anti CEA mAb 1B4 to Different Recombinant Proteins (ELISA).

CEA ECD=Extracellular domain of CEA; CEA A3B3 is the A3 B3 domain of CEA. Recombinant Mesothelin MSLN is used as a control to measure unspecific binding (binding not specific for ECD of CEA respectively A3B3 domain of CEA).

Figure 9:
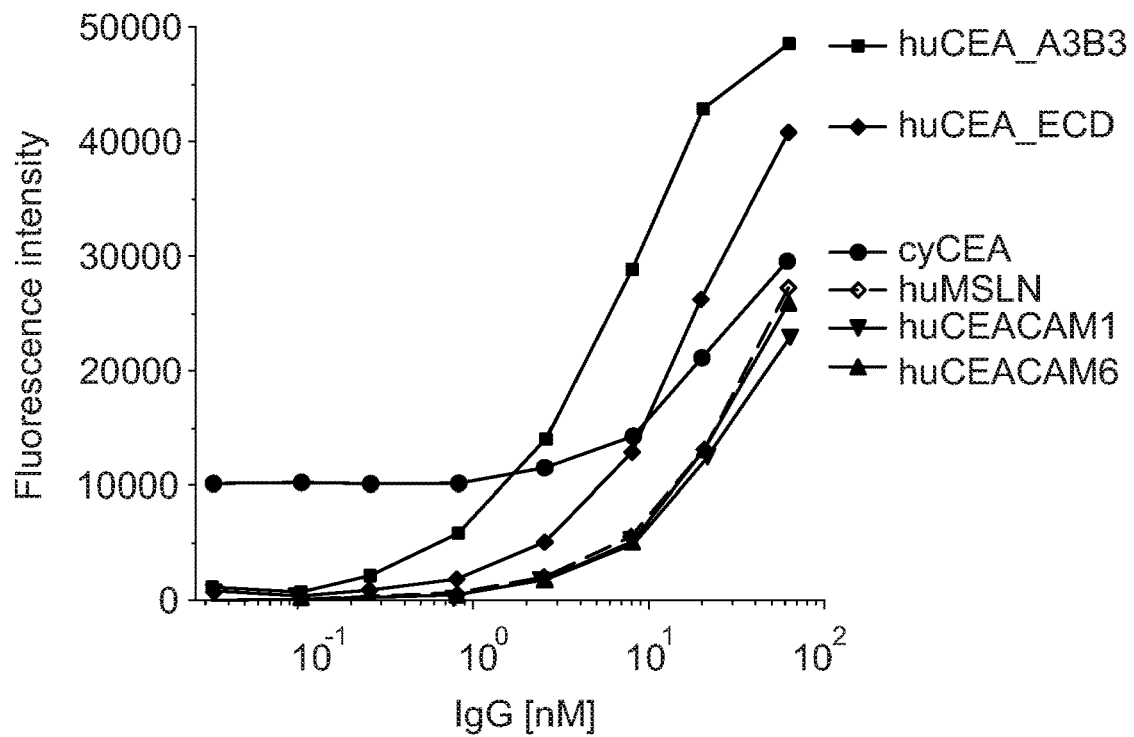

FIG. 9 Binding of the Monoclonal Anti CEA mAb C11 to Different Recombinant Proteins (ELISA).

CEA ECD=Extracellular domain of CEA; CEA A3B3 is the A3 B3 domain of CEA.

Recombinant Mesothelin MSLN is used as a control to measure unspecific binding (binding not specific for ECD of CEA respectively A3B3 domain of CEA).

Figure 10:
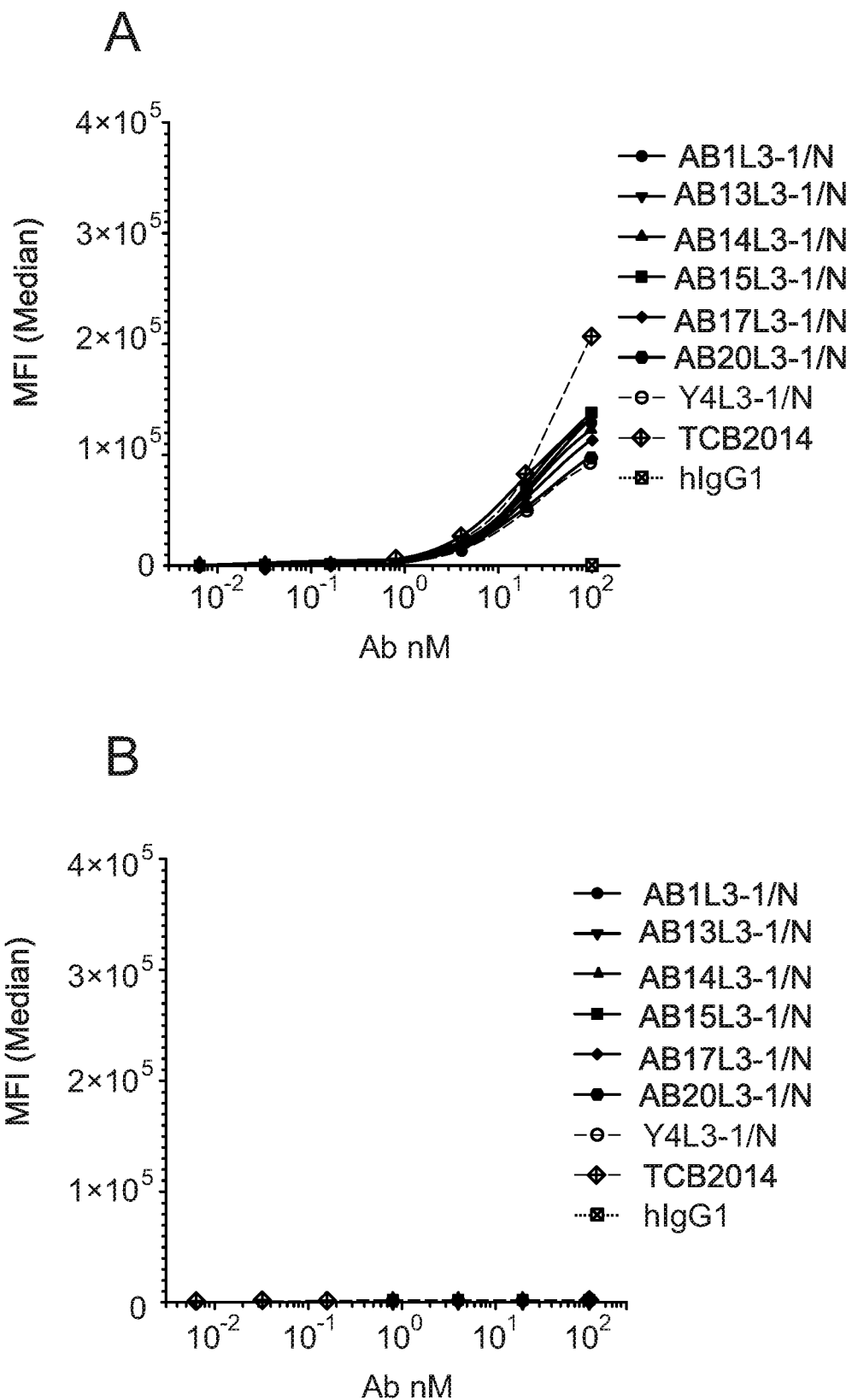

FIG. 10 Binding of Lead Optimization Wave 1 Antibodies to $CD3^{POS}$ Jurkat Cells (and $CD3^{NEG}$ TIB-153 Cells)

Concentration dependent binding of the KL bispecific antibodies of the invention AB13L3-1/N, AB14L3-1/N, AB15L3-1/N, AB17L3-1/N and AB20L3-1/N to CD3 expressing HUT-78 cells. All KL bispecific antibodies carry the same CD3 arm. AB1L3-1/N is the parental KL bispecific antibody from which the above mentioned bsAbs were derived by lead optimization. Y4L3-1/N is a KL bispecific antibody with the same CD3 arm but with the second arm not binding to CEA. TCB 2014 corresponds to another CEA×CD3 T-cell bispecific antibody described in US20140242079 which was included as reference antibody. hIgG1 corresponds to a non-binding human IgG1 antibody used as isotype control. Right hand figure shows no binding to the CD3 negative cell line JKTP-del even at 100 nM concentration of the bispecific antibodies. Method is described in Example 7b.

Figure 11:
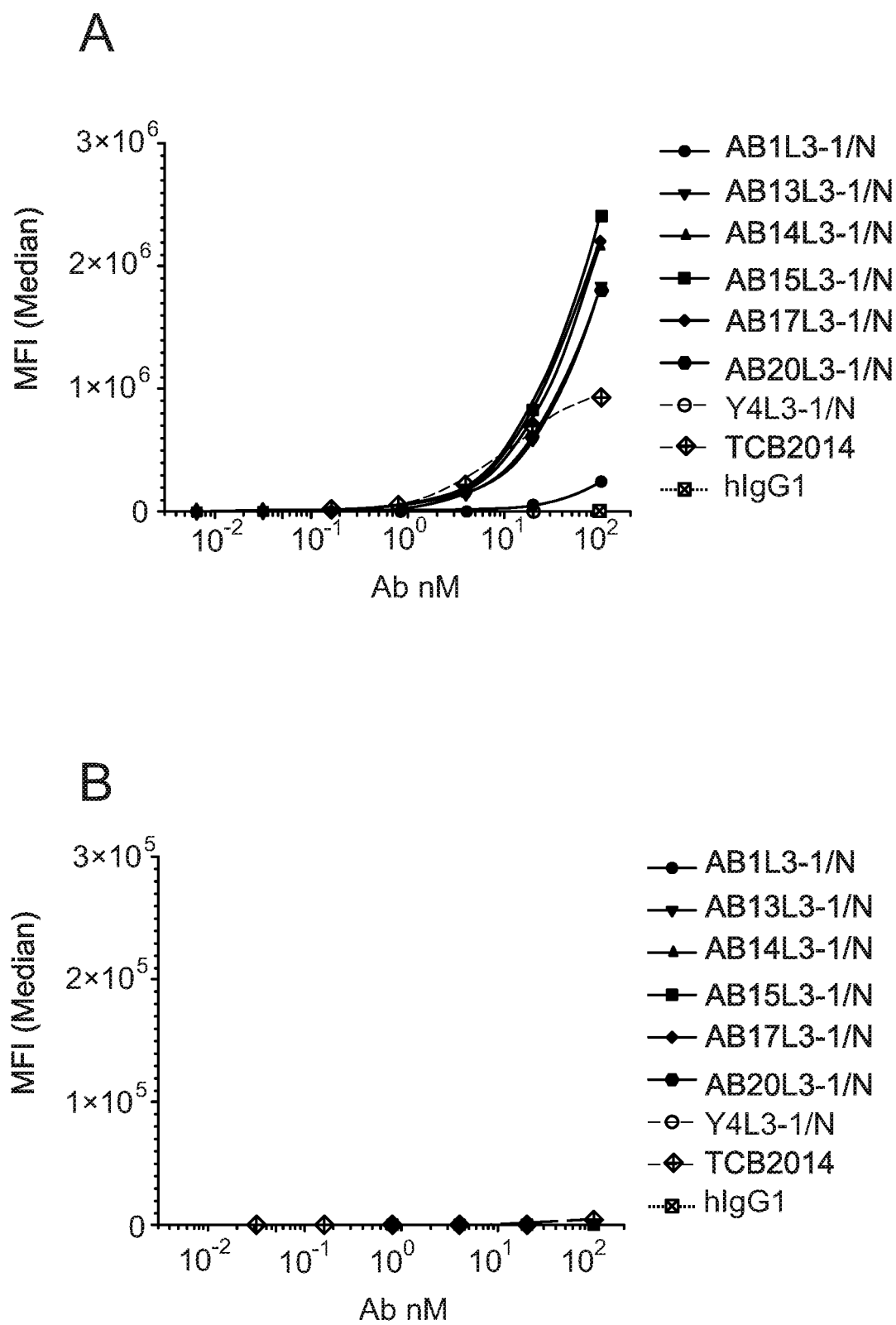
Figure 11:
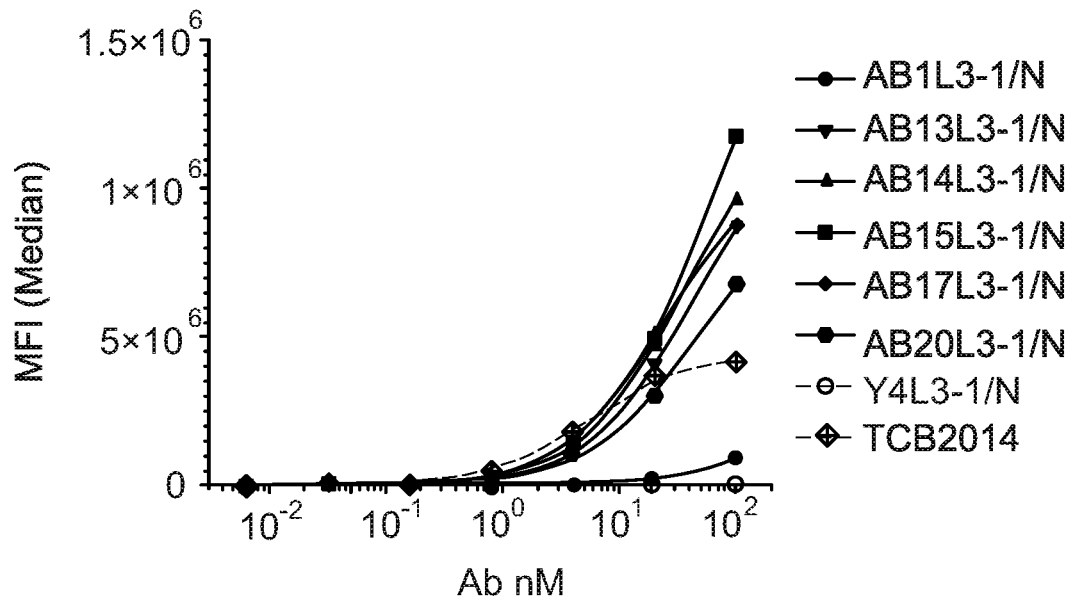
Figure 11:
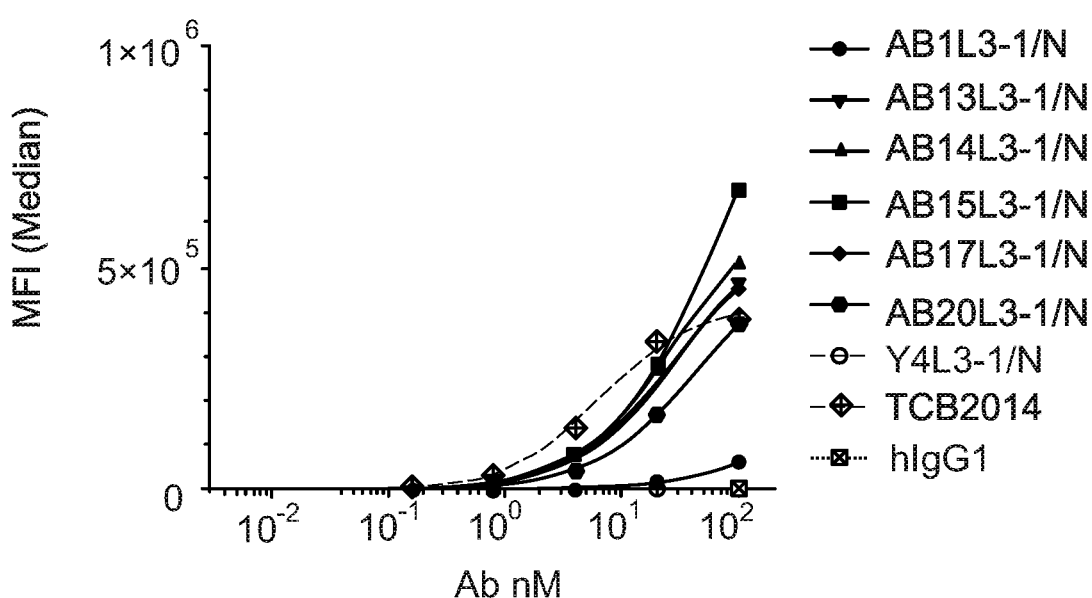

FIG. 11 Binding of Lead Optimization Wave 1 Antibodies to $CEA^{POS}$ MKN-45 Cells, HPAF-II Cells and LS174T (ATCC® CL-188™) Cells (and $CEA^{NEG}$ MKN-45_$hCEA^{KO}$ Cells)

Concentration dependent binding of the KL bispecific antibodies of the invention AB13L3-1/N, AB14L3-1/N, AB15L3-1/N, AB17L3-1/N and AB20L3-1/N to CEA positive MKN-45 (A); HPAF-II (C) and LS174T (D) or CEA negative MKN-45_$hCEA^{KO}$ (B) cells. All KL bispecific antibodies carry the same CD3 arm. AB1L3-1/N is the parental KL bispecific antibody from which the above mentioned bsAbs were derived by affinity maturation. Y4L3-1/N is a KL bispecific antibody with the same CD3 arm but with the second arm not binding to CEA. TCB 2014 corresponds to another CEA×CD3 T-cell bispecific antibody described in US20140242079 which was included as reference antibody. hIgG1 corresponds to a non-binding human IgG1 antibody used as isotype control. FIG. 10B show no binding to the CEA negative cell line MKN-45-$hCEA^{KO}$ cells even at 100 nM concentration of the bispecific antibodies. Binding of the antibodies of this invention to MKN-45 and/or HPAF-II cells at 100 nM concentration is 40% or more higher than binding of the TCB2014. Method described in Example 7a.

Figure 12:
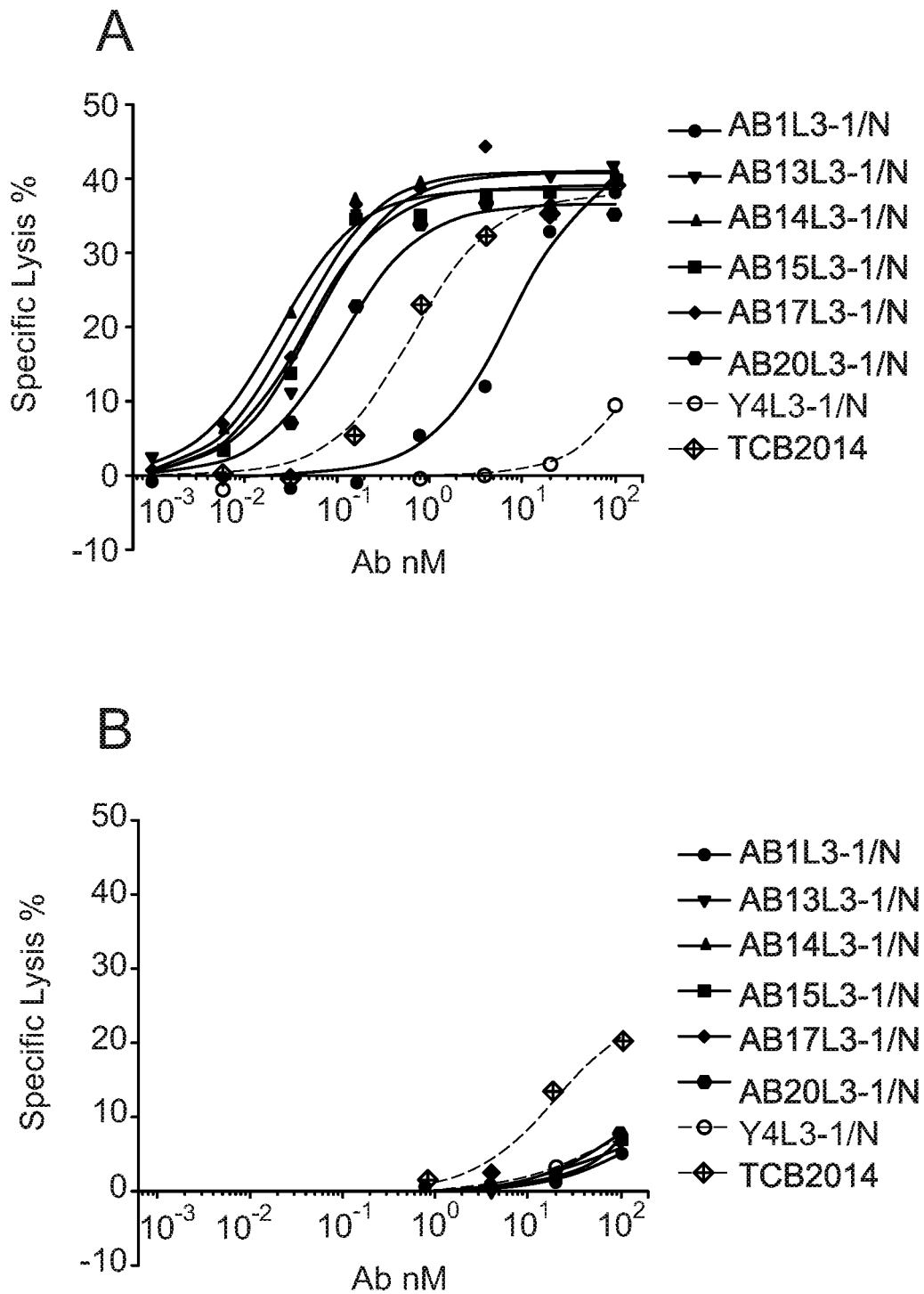
Figure 12:
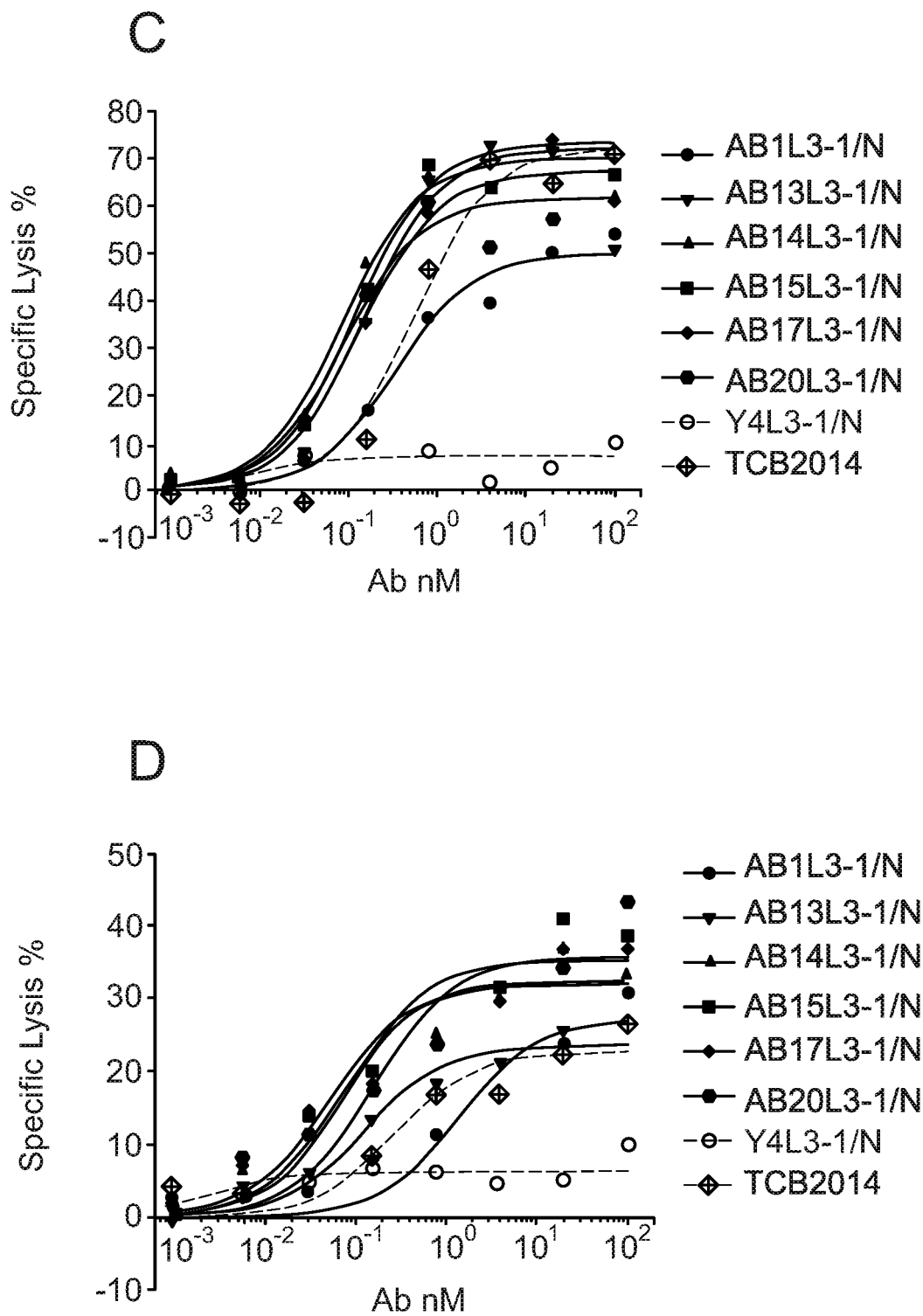

FIG. 12 Killing of $CEA^{POS}$ MKN-45, HPAF-II, and LS174T Cells (and $CEA^{NEG}$ MKN-45_$hCEA^{KO}$ Cells) by Lead Optimization Wave 1 Antibodies Concentration dependent T-cell retargeted killing/lysis of CEA positive MKN-45 (A); HPAF-II (C) and LS174T (D) or CEA negative MKN-45_$hCEA^{KO}$ (B) cells by the KL bispecific antibodies of the invention AB13L3-1/N, AB14L3-1/N, AB15L3-1/N, AB17L3-1/N and AB20L3-1/N (assay described in Example 8a). All KL bispecific antibodies carry the same CD3 arm. All KL bispecific antibodies show an improved killing as compared to the parental AB1L3-1/N antibody, from which they were derived by lead optimization, when CEA-positive cells were used (A, C, D), but only very low unspecific killing/lysis of CEA knocked out MKN-45 cells (B). Y4L3-1/N, a KL bispecific antibody with the same CD3 arm but with the second arm not binding to CEA, shows only very low killing/lysis potency at the highest concentrations tested. TCB 2014 corresponds to another CEA×CD3 T-cell bispecific antibody described in US20140242079 which was included as reference antibody.

EC50 of the bispecific antibodies of this invention are lower than EC50 of TCB2014, demonstrating improved potency for tumor cell killing. Method described in Example 8a.

Figure 13:
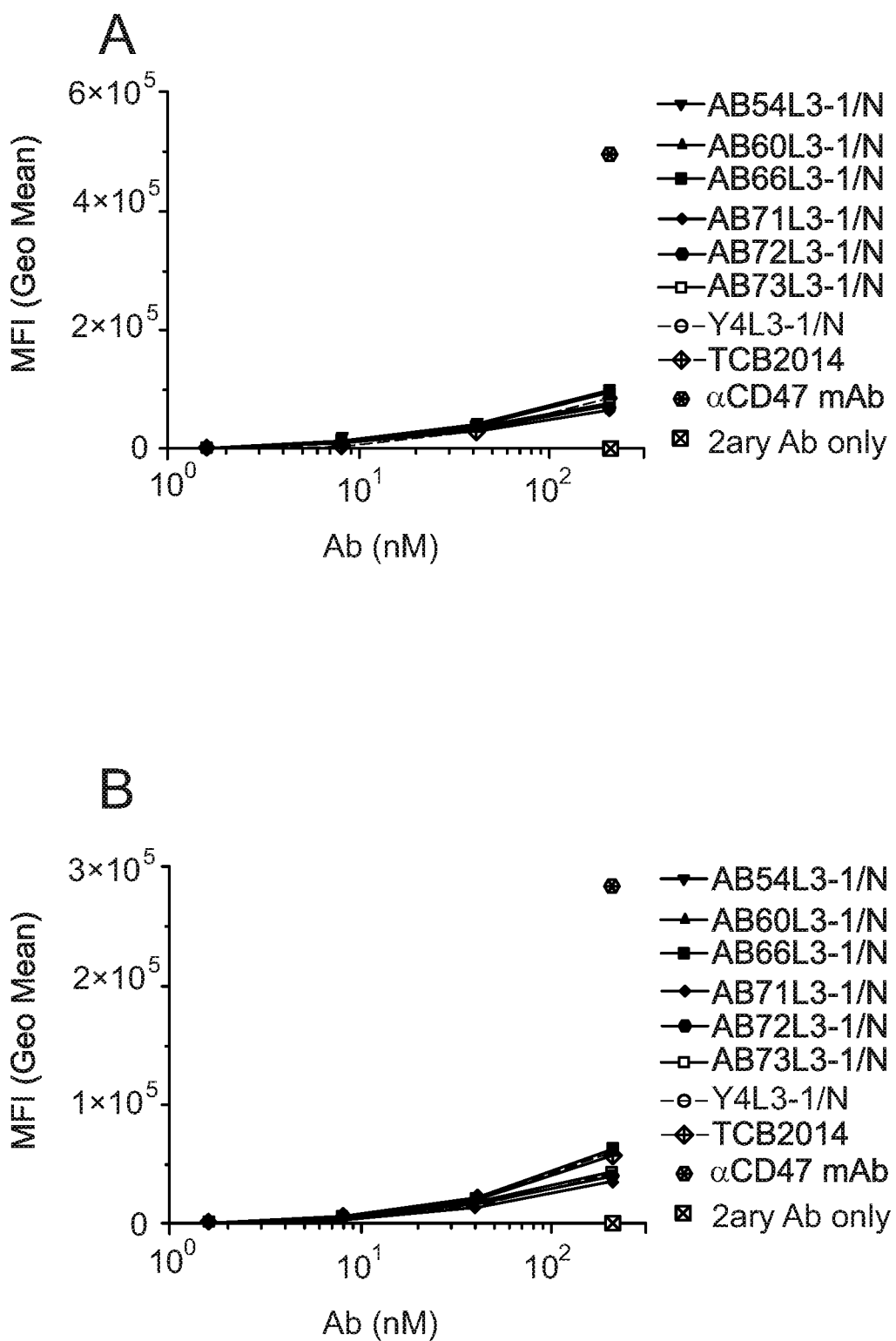
Figure 13:
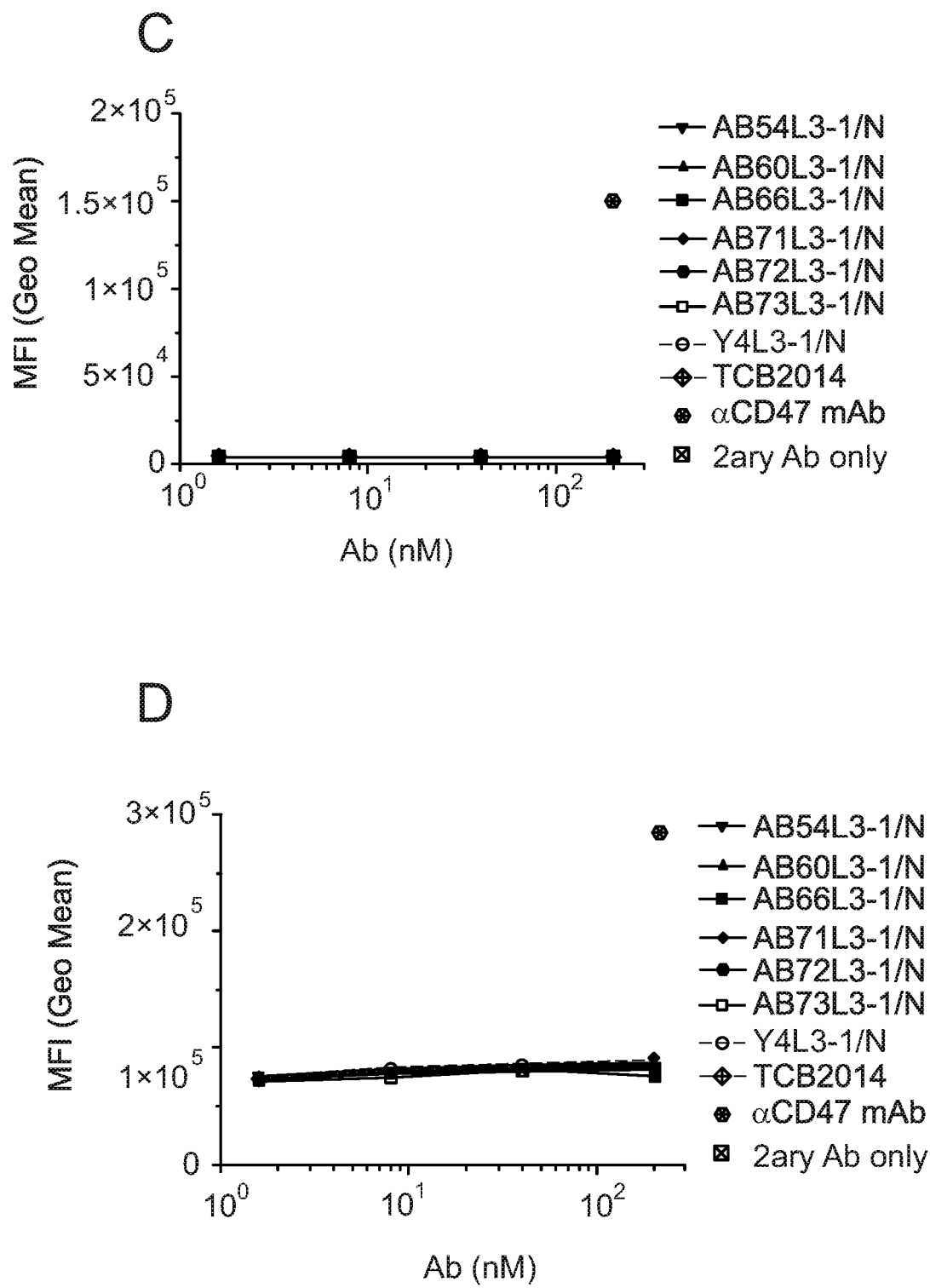

FIG. 13 Binding of Lead Optimization Wave 2 Antibodies to $CD3^{POS}$ Primary T-Cells (CD4+ and CD8+) and $CD3^{NEG}$ B-Cells and Monocytes Concentration dependent binding of the KL bispecific antibodies of the invention AB54L3-1/N, AB60L3-1/N, AB66L3-1/N, AB71L3-1/N, AB72L3-1/N and AB73L3-1/N to CD3 positive primary CD4+ T-cells (A) and primary CD8+ T-cells (B) or to CD3 negative B-cells (C) and Monocytes (D). All KL bispecific antibodies carry the same CD3 arm and bind similarly to the CD3-positive T-cell populations. Y4L3-1/N, a KL bispecific antibody with the same CD3 arm but with the second arm not binding to CEA, binds equally well to CD3 positive T-cells. TCB 2014 corresponds to another CEA×CD3 T-cell bispecific antibody described in US20140242079 which was included as reference antibody. The anti-human CD47 antibody B6H12 (aCD47 mAb) was used as positive control (T-cells, B-cells, and monocytes express CD47). Secondary Ab only corresponds to a condition where only the detection antibody was added to the cells and serves to determine the background signal (negative control). All tested antibodies show no binding to the CD3 negative cell populations even at 200 nM concentration.

Figure 14:
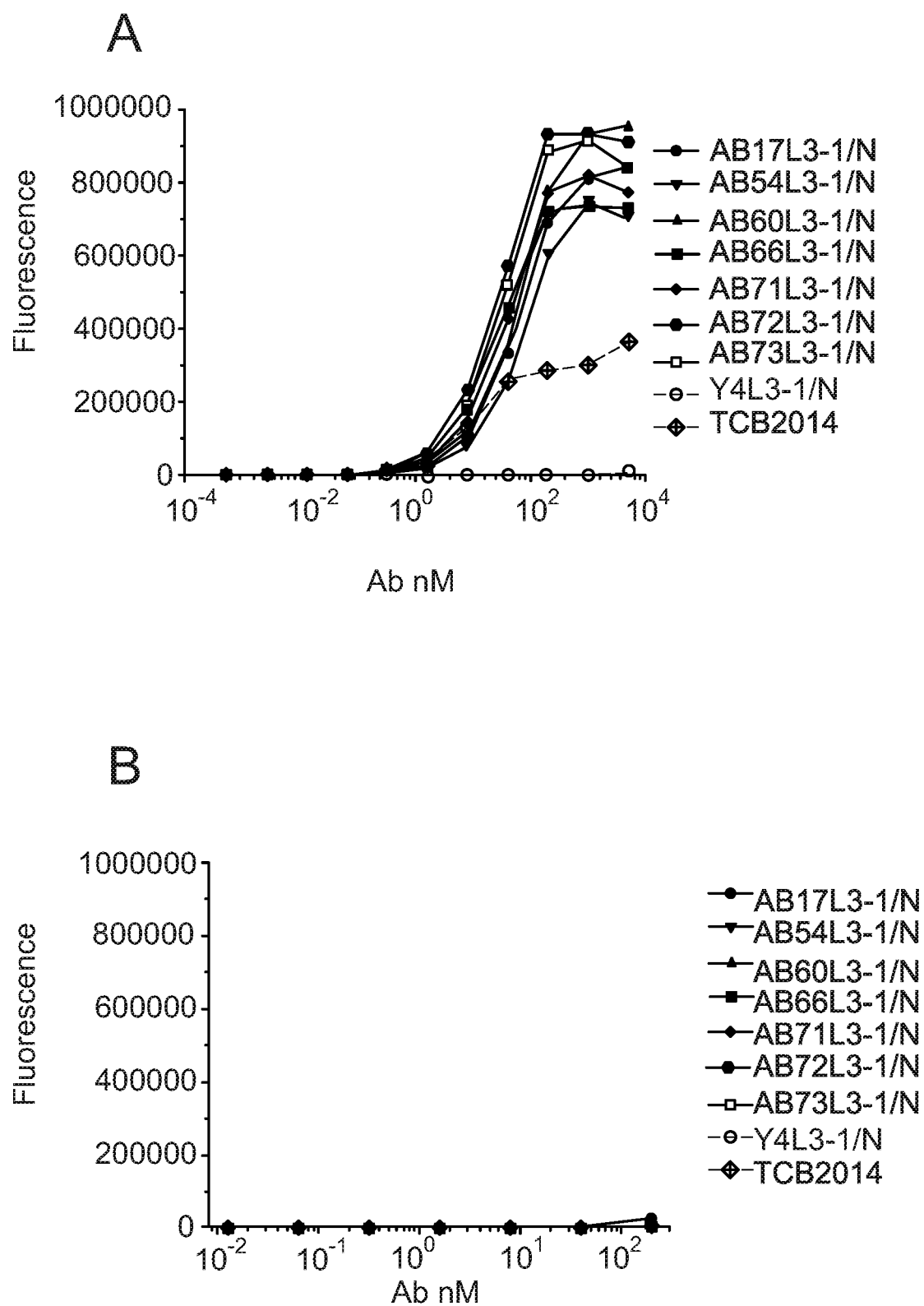
Figure 14:
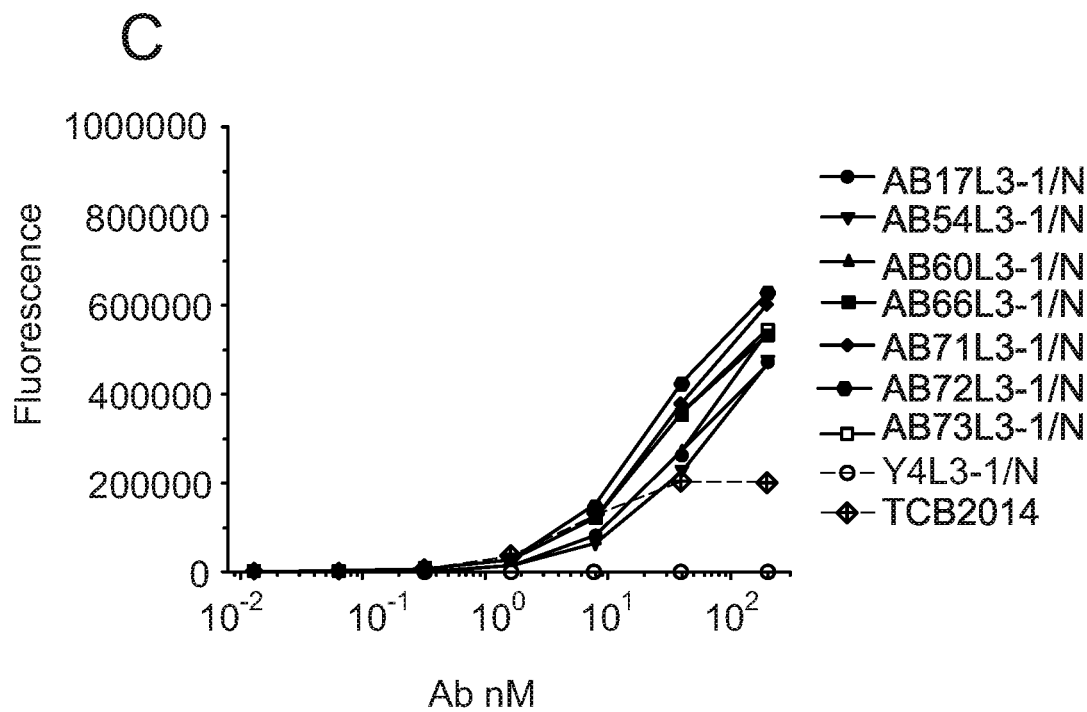
Figure 14:
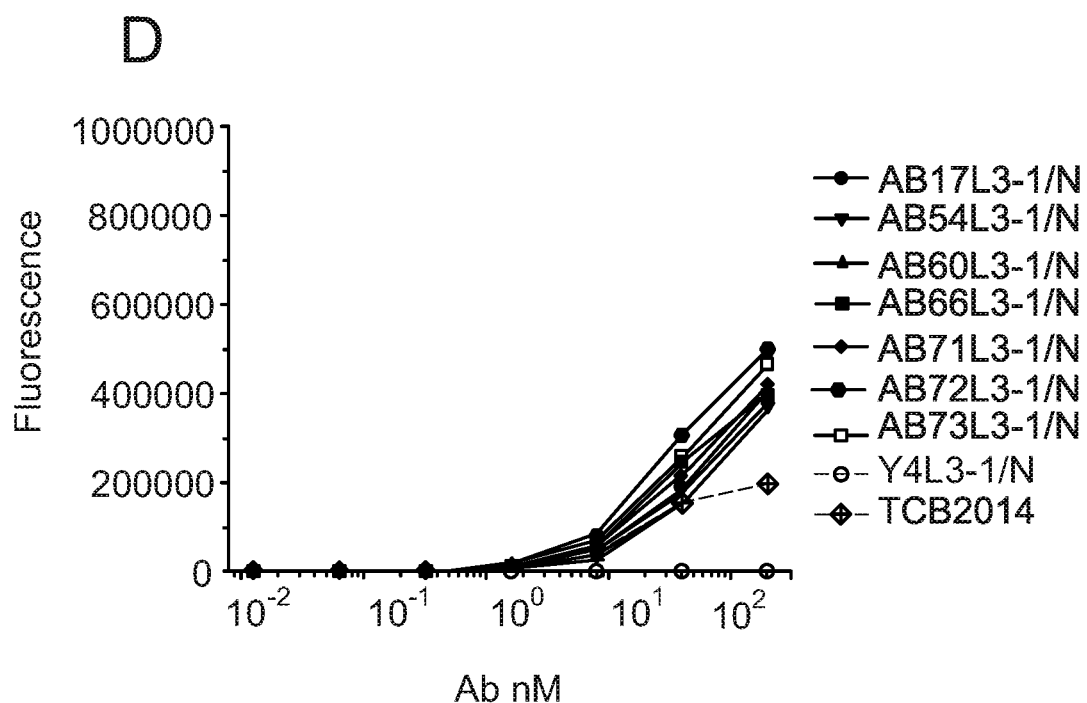

FIG. 14 Binding of Lead Optimization Wave 2 Antibodies to $CEA^{POS}$ MKN-45 Cells, HPAF-II Cells and LS174T Cells (and $CEA^{NEG}$ MKN-45_$hCEA^{KO}$ Cells)

Concentration dependent binding of the KL bispecific antibodies of the invention AB54L3-1/N, AB60L3-1/N, AB66L3-1/N, AB71L3-1/N, AB72L3-1/N and AB73L3-1/N to CEA positive MKN-45 (A); HPAF-II (C) and LS174T (D) or CEA negative MKN-45_$hCEA^{KO}$ (B) cells. All KL bispecific antibodies carry the same CD3 arm. Y4L3-1/N is a KL bispecific antibody with the same CD3 arm but with the second arm not binding to CEA. TCB 2014 corresponds to another CEA×CD3 T-cell bispecific antibody described in US20140242079 which was included as reference antibody. FIG. 14B show no binding to the CEA negative cell line MKN-45_$hCEA^{KO}$ cells even at 200 nM concentration of the bispecific antibodies. For FIG. 14A, EC50 values are reported in table 4. Binding of bispecific antibodies of the invention at 200 nM concentration are 40% or more higher than binding of TCB2014.

Figure 15:
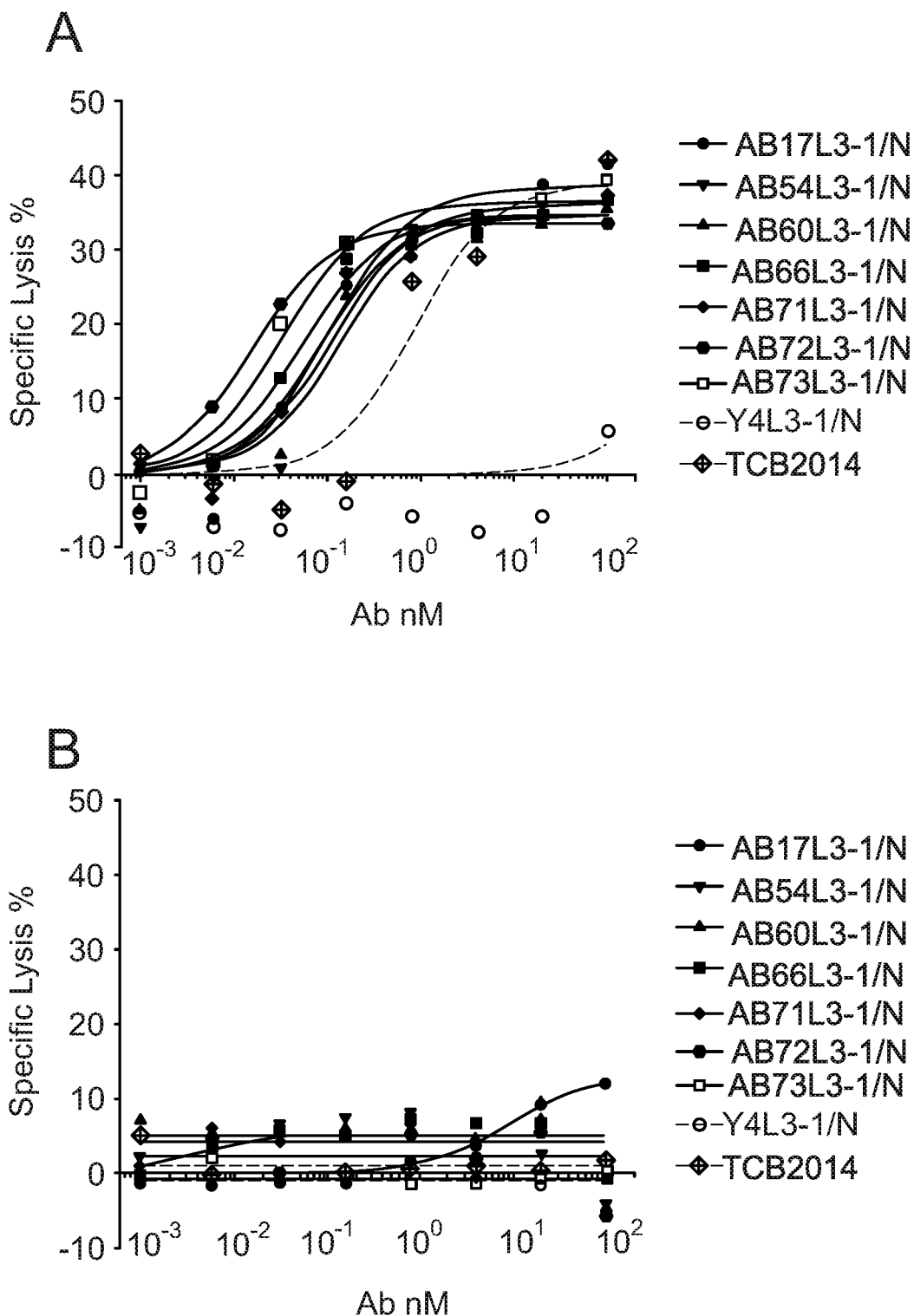
Figure 15:
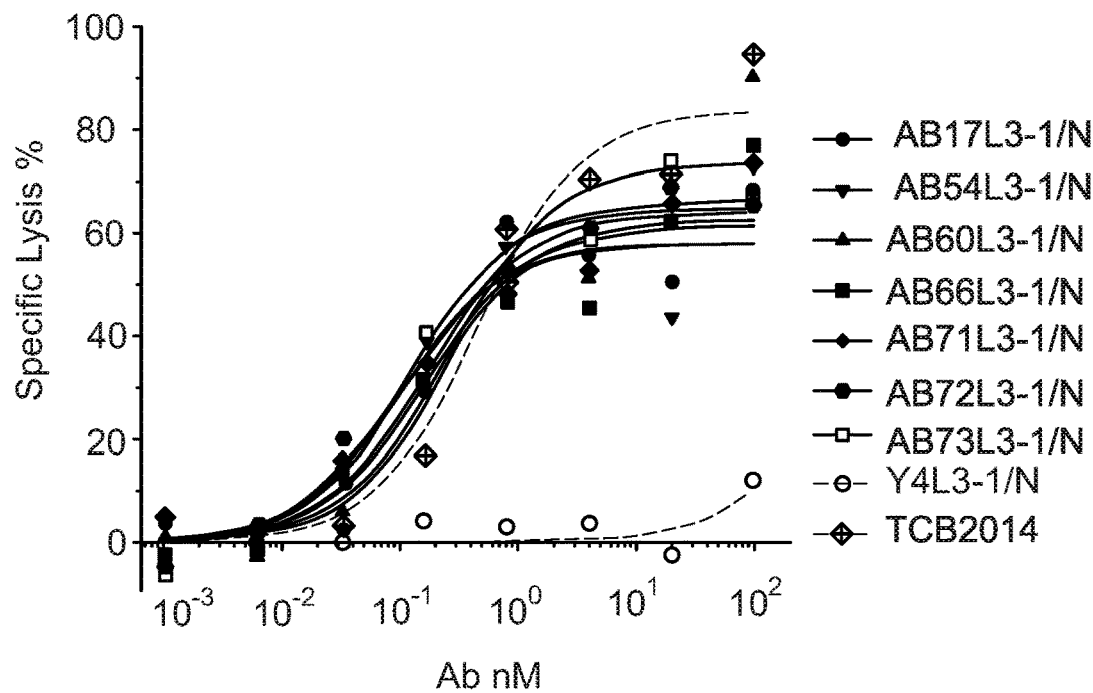
Figure 15:
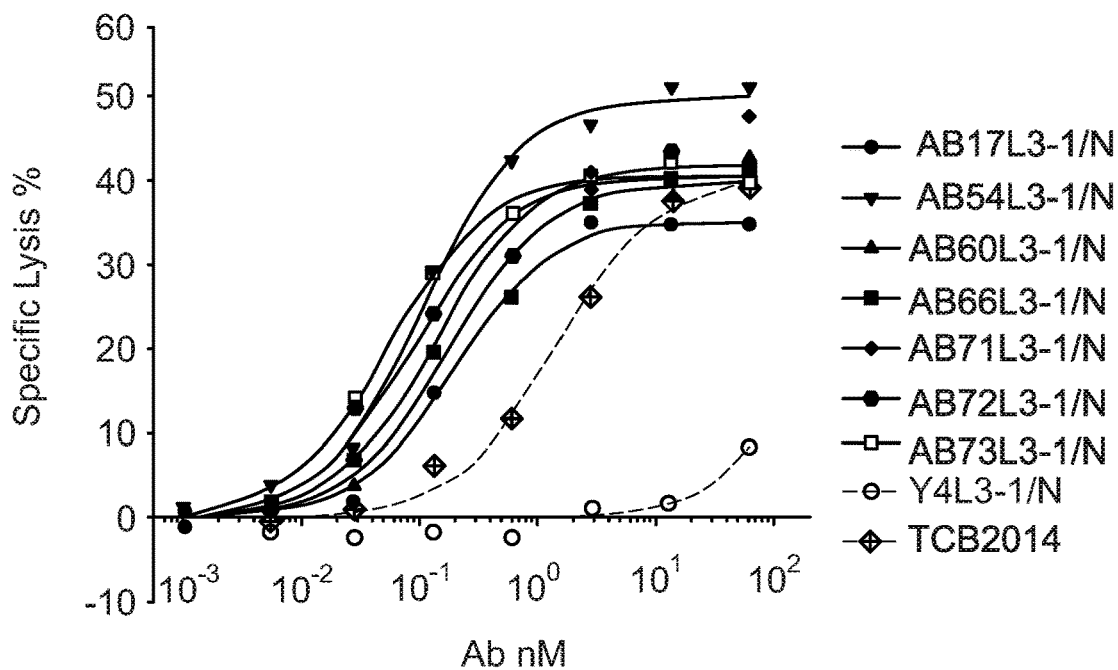

FIG. 15 Killing of $CEA^{POS}$ MKN-45, HPAF-II and LS174T Cells (and $CEA^{NEG}$ MKN-45_$hCEA^{KO}$ Cells) by Lead Optimization Wave 2 Antibodies Concentration dependent T-cell retargeted killing/lysis of CEA positive MKN-45 (A); HPAF-II (C) and LS174T (D) or CEA negative MKN-45_$hCEA^{KO}$ (B) cells by the KL bispecific antibodies of the invention AB54L3-1/N, AB60L3-1/N, AB66L3-1/N, AB71L3-1/N, AB72L3-1/N and AB73L3-1/N (assay described in Example 8a). All KL bispecific antibodies carry the same CD3 arm. Y4L3-1/N, a KL bispecific antibody with the same CD3 arm but with the second arm not binding to CEA, shows only very low killing/lysis potency at the highest tested concentrations. TCB 2014 corresponds to another CEA×CD3 T-cell bispecific antibody described in US20140242079 which was included as reference antibody. Compared to this reference antibody TCB2014, the KL bispecific antibodies of the invention AB54L3-1/N, AB60L3-1/N, AB66L3-1/N, AB71L3-1/N, AB72L3-1/N and AB73L3-1/N all show lower EC50 values, respective more potent killing of CEA positive target cells (A, C, D), but equivalently low unspecific killing/lysis of CEA knocked out MKN-45 cells (B). For FIGS. 15A, C and D, EC50 values are reported in table 5.

Figure 16:
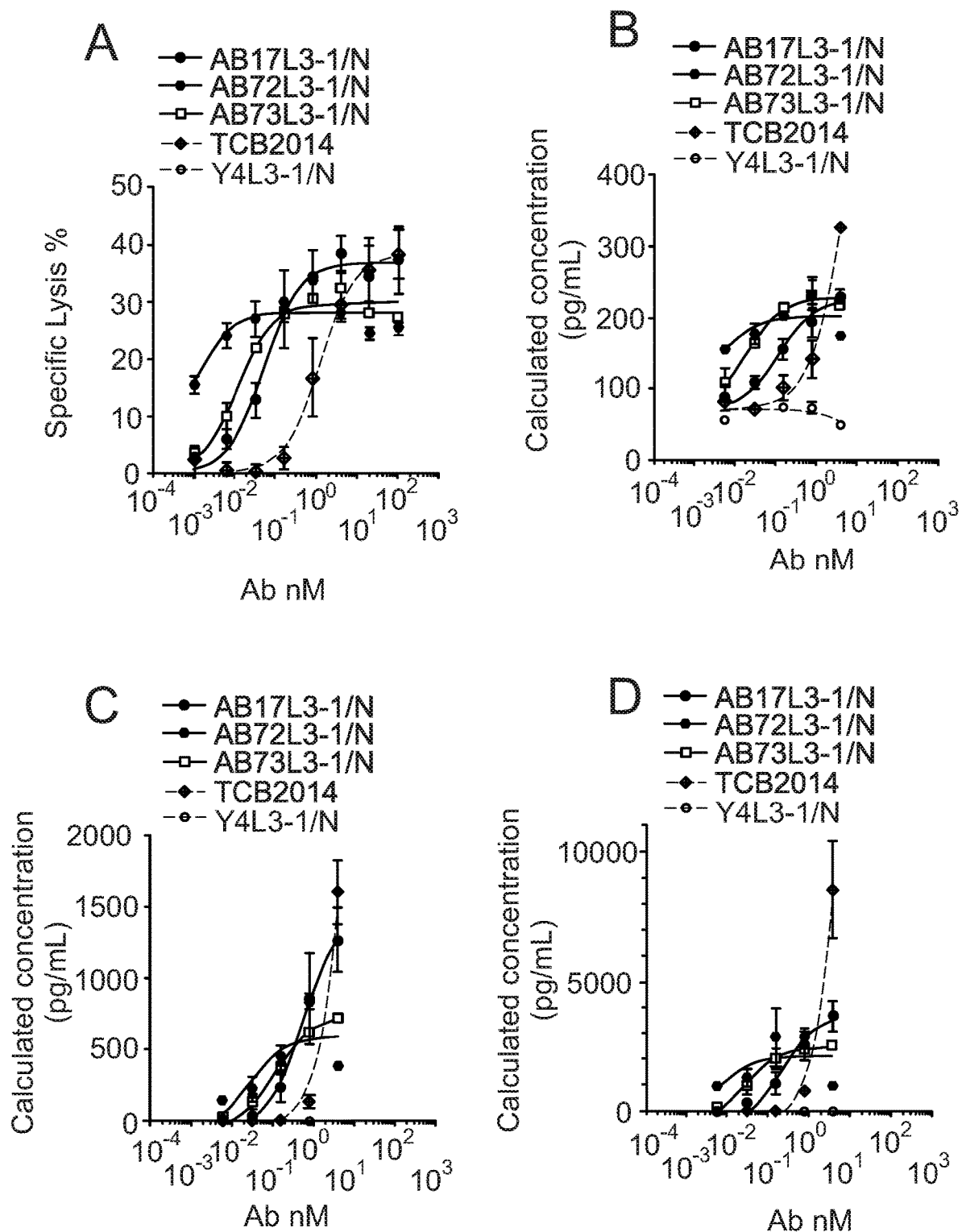
Figure 16:
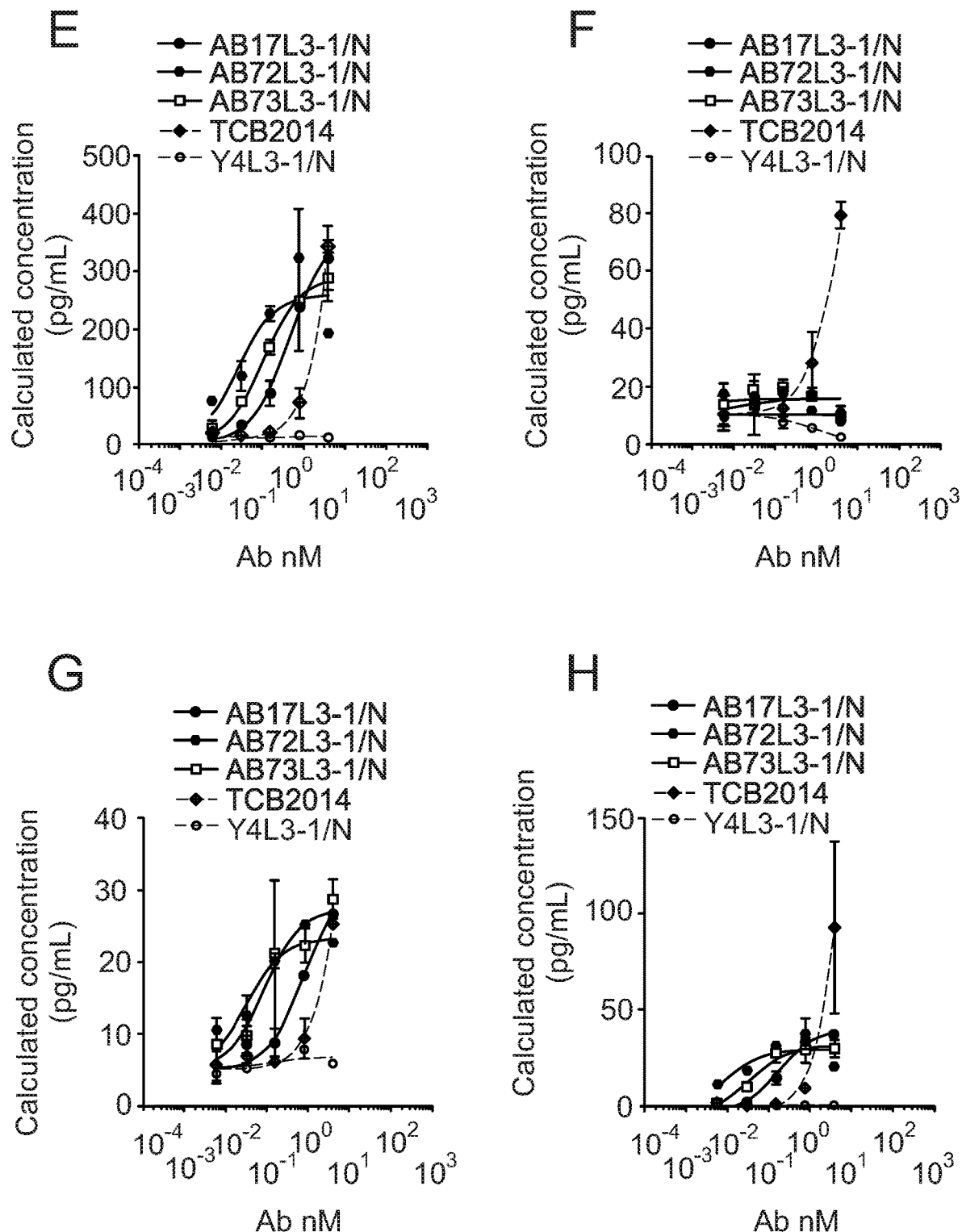

FIG. 16 Secretion of Cytokine After T Cell Mediated Killing of MKN45 Tumor Cells Secretion of Perforin (B); Granzyme B (C); IFN-γ (D); TNF-α (E); IL-2 (F); IL-6 (G); IL-10 (H) mediated by the KL bispecific antibodies of the invention AB17L3-1/N, AB72L3-1/N and AB73L3-1/N after T cell mediated killing of MKN45 tumor cells (E:T (human PBMC:tumor cells)=10:1, 48 h incubation, specific lysis is shown in (A). Method described in Example 8e.

Figure 17:
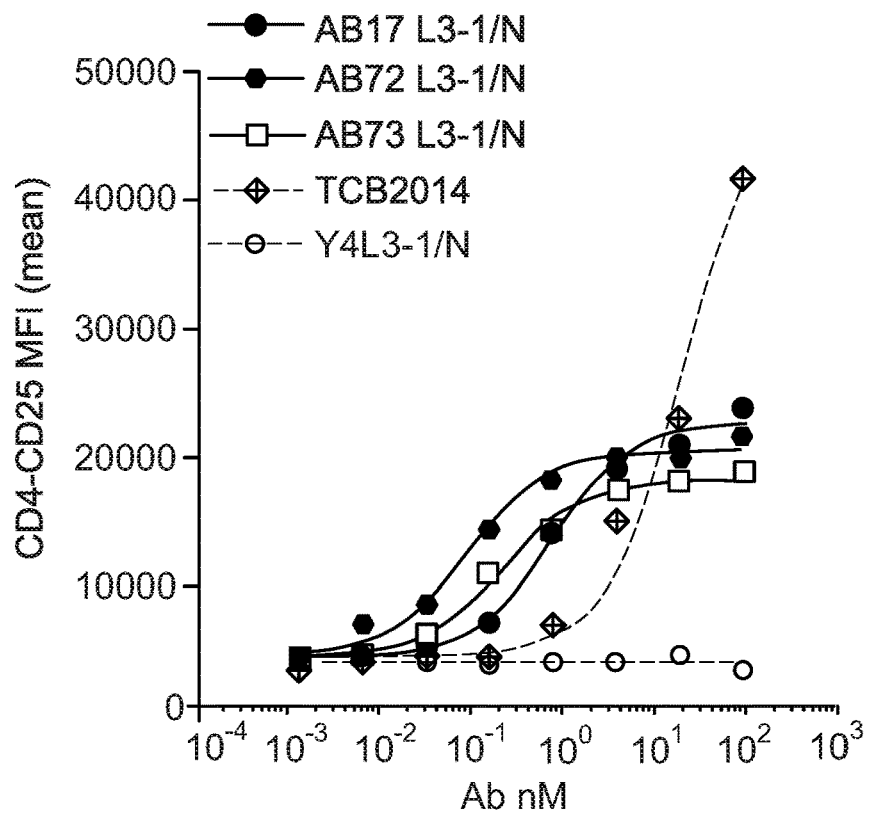
Figure 17:
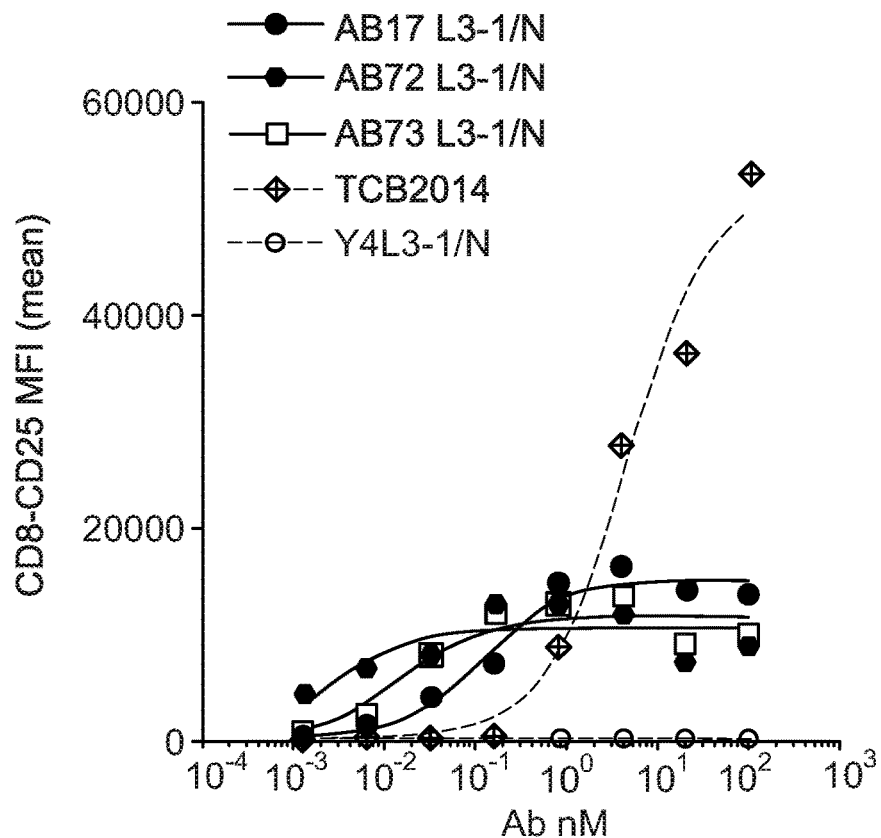
Figure 17:
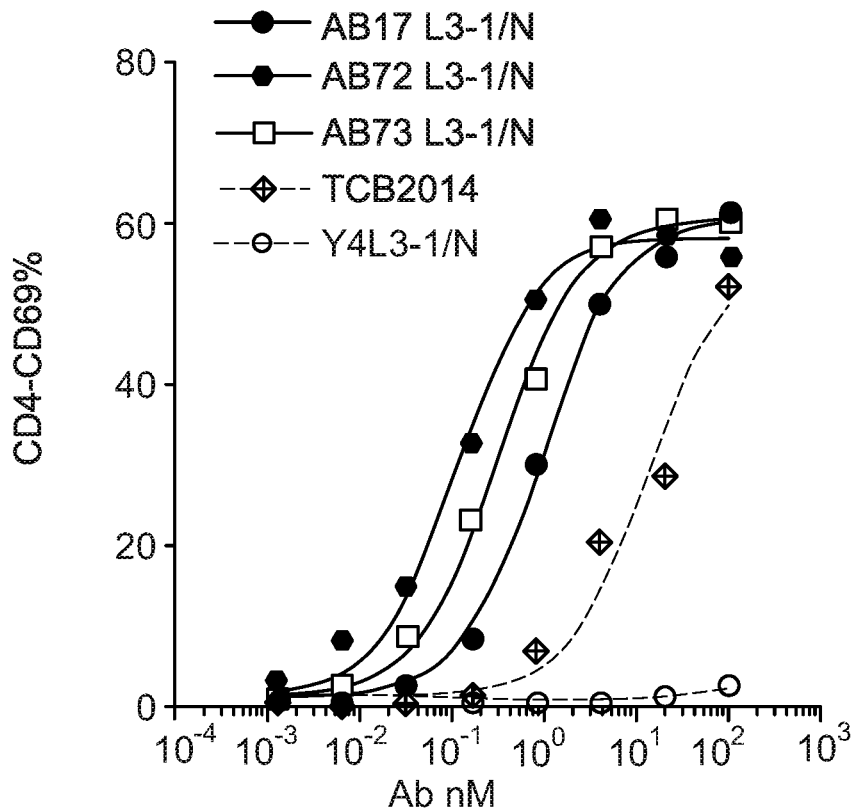
Figure 17:
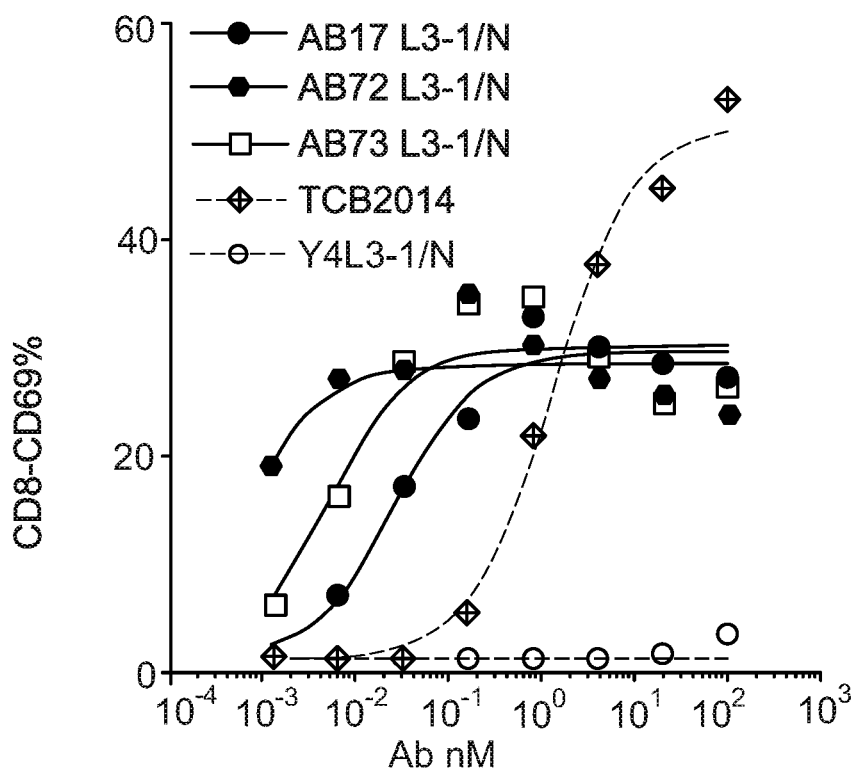

FIG. 17 T-Cell Activation After T Cell-Mediated Killing of MKN-45 Tumor Cells

Human CD4+ and CD8+ T-cell upregulation of CD25 (A and B) and CD69 (C and D) mediated by the KL bispecific antibodies of the invention AB17L3-1/N, AB72L3-1/N and AB73L3-1/N 2 days after T cell-mediated killing of CEA-positive MKN-45 tumor cells (killing/lysis of tumor cells shown in FIG. 16A).

Despite statistically not different tumor cell lysis at 100 nM, less T-cell activation of the antibodies of the invention compared to TCB2014 suggesting lower side effects at same tumor lysis, Method described in Example 8c.

Figure 18:
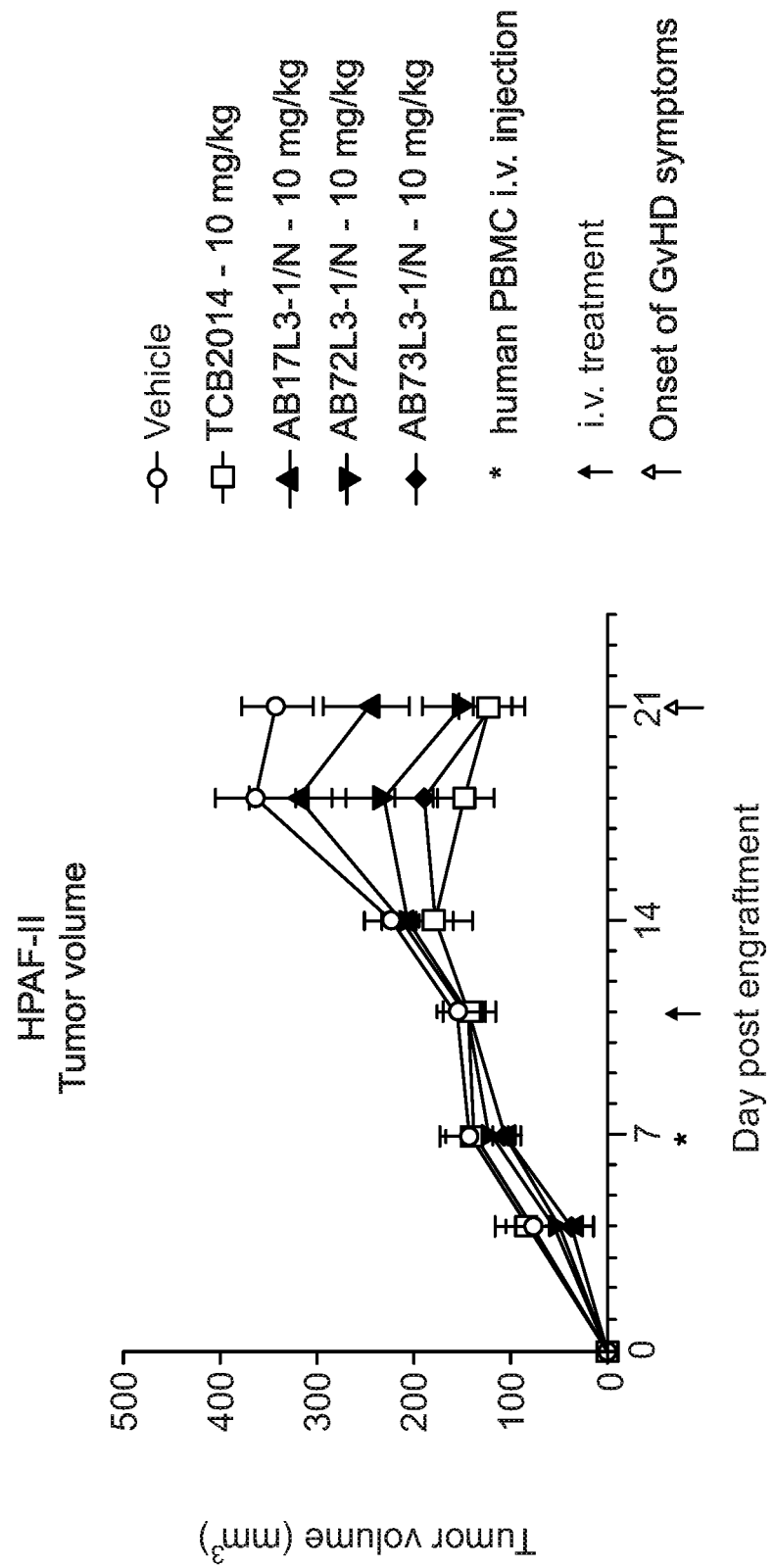

FIG. 18 In Vivo Anti-Tumor Efficacy in the HPAF-II Model in NOG Mice with huPBMC Transfer In vivo anti-tumor efficacy of the KL bispecific antibodies of the invention AB17L3-1/N, AB72L3-1/N and AB73L3-1/N and of TCB2014 (all single 10 mg/kg injection) in the HPAF-II tumor cell line model in NOG mice with huPBMC transfer. Mice were randomized at day 11, when the average tumor volume was close to 150 mm³. Results show average and SEM from 8 mice of tumor volume measured by caliper in the different study groups. No statistical difference between AB73L3-1/N and TCB2014 was found. Method described in Example 9a.

DEFINITIONS

Terms are used herein as generally used in the art, unless otherwise defined as follows.

As used herein, the term "antigen binding part, binding part" refers in its broadest sense to a part of an antibody that specifically binds an antigenic determinant such as CEA, CD47 and CD3.

More specifically, as used herein, a binding part that binds membrane-bound human carcinoembryonic antigen (CEA, same as CEACAM5) or to CD3 specifically binds to CEA or CD3, more particularly to cell surface or membrane-bound CEA or CD3. By "specifically binding, specific for, binding to" is meant that the binding is selective for the antigen and can be discriminated from unwanted or nonspecific interactions. In some embodiments, the extent of binding of an anti-target antibody to an unrelated, non-target protein is about 10-fold preferably >100-fold less than the binding of the antibody to said target as measured, e.g., by surface plasmon resonance (SPR) e.g. Biacore®, enzyme-linked immunosorbent (ELISA) or flow cytometry (FACS). Targets are the proteins discussed herein—e.g. CEA, CD47, and CD3ε.

"Specifically binding to CEA, CD3, binding to CEA, CD3" refers in one embodiment to an antibody that is capable of binding to the targets CEA resp. CD3 with sufficient affinity such that the antibody is useful as a therapeutic agent in retargeting T-cells to tumor cells via the binding of CD3, resp. CEA.

Preferably the bispecific antibody according to the invention binds to an epitope of CD3 that is conserved from different species, preferably among human and cynomolgus.

As used herein, the term "antibody" refers to an antibody comprising two heavy chains and two light chains. In one embodiment the antibody is a full length antibody. As used herein, the term "antibody heavy chain" refers to an antibody heavy chain, consisting of a variable region (variable domain) and a constant region (constant domain) as defined for a full length antibody. As used herein, the term "antibody light chain" refers to an antibody light chain, consisting of a variable region and a constant region as defined for a full length antibody. Constant light chains, useful for the present invention, are comprised in light chains as disclosed in the present invention.

The term "full length antibody" denotes an antibody consisting of two "full length antibody heavy chains" and two "full length antibody light chains". A "full length antibody heavy chain" is a polypeptide consisting in N-terminal to C-terminal direction of an antibody heavy chain variable domain (VH), an antibody constant heavy chain domain 1 (CH1), an antibody hinge region (HR), an antibody heavy chain constant domain 2 (CH2), and an antibody heavy chain constant domain 3 (CH3), abbreviated as VH-CH1-HR-CH2-CH3. A "full length antibody light chain" is a polypeptide consisting in N-terminal to C-terminal direction of an antibody light chain variable domain (VL), and an antibody light chain constant domain (CL), abbreviated as VL-CL. The antibody light chain constant domain (CL) can be κ (kappa) or λ (lambda). The two full length antibody domains are linked together via inter-polypeptide disulfide bonds between the CL domain and the CH1 domain and between the hinge regions of the full length antibody heavy chains. Examples of typical full length antibodies are natural antibodies like IgG (e.g. IgG 1 and IgG2), IgM, IgA, IgD, and IgE. The full length antibody according to the invention is in one embodiment of human IgG1 type, in one further embodiment comprising one or more amino acid substitutions in the Fc part as defined below. The full length antibody according to the invention comprise two binding parts each formed by a pair of VH and VL, one binding to CEA and the other binding to CD3.

As used herein, the term "Fc region; Fc domain" refers to a C-terminal region of an IgG heavy chain; in case of an IgG1 antibody, the C-terminal region comprises —CH2-CH3 (see above). Although the boundaries of the Fc region of an IgG heavy chain might vary slightly, the human IgG heavy chain Fc region is usually defined to stretch from the amino acid residue at position Cys226 to the carboxyl-terminus.

Constant regions are well known in the state of the art and e.g. described by Kabat, E. A., (see e.g. Johnson, G., and Wu, T. T., Nucleic Acids Res. 28 (2000) 214-218; Kabat, E. A., et al, Proc. Natl. Acad. Sci. USA 72 (1975) 2785-2788).

The term "epitope" includes any polypeptide determinant capable of specific binding to an antibody. In certain embodiments, epitope determinants include chemically active surface groupings of molecules such as amino acids, sugar side chains, phosphoryl, or sulfonyl, and, in certain embodiments, may have specific three dimensional structural characteristics, and or specific charge characteristics. An epitope is a region of a target that is bound by an antibody.

As used herein, the term "a common heavy chain (cHC)" refers to a polypeptide consisting in N-terminal to C-terminal direction of an antibody heavy chain variable domain (VH), an antibody heavy chain constant domain 1 (CH1), an antibody hinge region (HR), an antibody heavy chain constant domain 2 (CH2), and an antibody heavy chain constant domain 3 (CH3), abbreviated as VH-CH1-HR-CH2-CH3. Common heavy chains suitable for the bispecific antibodies according to the invention are heavy chains as described in WO2012023053, WO2013088259, WO2014087248, WO2019175658, and WO2016156537 (the entire contents of each of which are herein incorporated by reference). In one embodiment the cHC of the bispecific antibody according to the invention comprises as heavy chain CDRs a CDRL1 of SEQ ID NO: 2, a CDRL2 of SEQ ID NO: 3, and a CDRL3 of SEQ ID NO: 4. In one embodiment the cHC of the bispecific antibody according to the invention comprises as heavy chain variable region a VH region of SEQ ID NO: 1. In one embodiment the cHC of the bispecific antibody according to the invention is of SEQ ID NOs: 43, 44, or 45.

The format of the bispecific antibodies according to the invention and comprising a common heavy chain, allows the affinity purification of bispecific antibodies which are undistinguishable from a standard IgG molecule and with characteristics that are undistinguishable from a standard monoclonal antibody (see e.g. WO2013088259, WO2012023053), promising no or low immunogenicity potential in patients.

As used herein "AB1L3-1, AB17L3-1, AB54L3-1, AB60L3-1, AB66L3-1, AB71L3-1, AB72L3-1, AB73L3-1 and the like" refer to bispecific CEAxCD3 antibodies according to the invention, comprising a common heavy chain comprising as heavy chain CDRs the CDRs of SEQ ID NOs: 2, 3, and 4 and in the second binding part a light chain comprising as light chain CDRs the CDRs of SEQ ID NOs: 18, 19, and 20. AB1 etc. denotes therefore for a first binding part (anti-CEACAM5 binding part) and L3-1 denotes for a second binding part (anti-CD3 binding part).

In one embodiment AB1L3-1, AB17L3-1, AB54L3-1, AB 60L3-1, AB66L3-1, AB71L3-1, AB72L3-1, AB73L3-1 and the like comprise a common heavy chain of SEQ ID NO: 43 (WT hIgG1) and in the second binding part as light chain a light chain of SEQ ID NO: 28. Such bispecific antibodies of the invention are designated in the examples also as AB1L3-1, AB17L3-1, AB71L3-1, AB72L3-1, AB73L3-1.

In one embodiment AB1L3-1, AB17L3-1, AB54L3-1, AB60L3-1, AB66L3-1, AB71L3-1, AB72L3-1, AB73L3-1 and the like comprise a common heavy chain of SEQ ID NO: 44 (hIgG1 with L234A+L235A mutations) and in the second binding part as light chain a light chain of SEQ ID NO: 28 Such bispecific antibodies of the invention are designated in the examples as AB1L3-1/D, AB17L3-1/D, AB71L3-1/D, AB72L3-1/D, AB73L3-1/D and the like.

In one embodiment AB1L3-1, AB17L3-1, AB54L3-1, AB60L3-1, AB66L3-1, AB71L3-1, AB72L3-1, AB73L3-1 and the like comprise a common heavy chain of SEQ ID NO: 45 (IgG1 with L234A+L235A+P329A mutations) and in the second binding part as light chain a light chain of SEQ ID NO: 28 Such bispecific antibodies of the invention are designated in the examples as AB1L3-1/N, AB17L3-1/N, AB54L3-1/N, AB60L3-1/N, AB66L3-1/N, AB71L3-1/N, AB72L3-1/N, AB73L3-1/N and the like.

Bispecific antibodies of the invention, comprising a common heavy chain, can be made for example according to WO2012023053. The methods described in WO2012023053 generate bispecific antibodies that are identical in structure to a human immunoglobulin. This type of molecule is composed of two copies of a unique heavy chain polypeptide, a first light chain variable region fused to a Kappa constant domain and second light chain variable region fused to a Lambda constant domain.

In the bispecific antibodies of the invention one binding site displays specificity to CEA and the other site displays specificity to CD3, wherein to each the heavy and the respective light chain contribute. The light chain variable regions can be of the Lambda or Kappa family and are preferably fused to a Lambda and Kappa constant domains, respectively. This is preferred in order to avoid the generation of non-natural polypeptide junctions. However, it is also possible to obtain an antibody arm usable for the generation of bispecific antibodies of the invention by fusing a Kappa light chain variable domain to a Lambda constant domain for any of the two specificities or by fusing a Lambda light chain variable domain to a Kappa constant domain, also for any of the two specificities. The bispecific antibodies described in WO 2012023053 are "κλ Bodies". This κλ-Body format allows the affinity purification of a bispecific antibody that is undistinguishable from a standard IgG molecule with characteristics that are undistinguishable from a standard monoclonal antibody and, therefore, favorable as compared to previous formats including e.g. amino acid bridges or other unnatural elements.

An essential step of the method is the identification of two antibody Fv regions (each composed by a variable light domain and variable heavy domain) having different antigen specificities that share the same heavy chain variable domain. Numerous methods have been described for the generation of monoclonal antibodies and fragments thereof (see, e.g., Antibodies: A Laboratory Manual, Harlow E, and Lane D, 1988, Cold Spring Harbor Laboratory Press, Cold Spring Harbor, N.Y.). Fully human antibodies are antibody molecules in which the sequence of both the light chain and the heavy chain, including the CDRs 1 and 2, arise from human genes. The CDR3 region can be of human origin or designed by synthetic means. Such antibodies are termed "human antibodies", or "fully human antibodies". Human monoclonal antibodies can be prepared by using the trioma technique; the human B-cell hybridoma technique (see Kozbor, et al., 1983 Immunol Today 4: 72); and the EBV hybridoma technique to produce human monoclonal antibodies (see Cole, et al., 1985 In: Monoclonal Antibodies and Cancer Therapy, Alan R. Liss, Inc., pp. 77-96). Human monoclonal antibodies may be utilized and may be produced by using human hybridomas (see Cote, et al., 1983. Proc Natl Acad Sci USA 80: 2026-2030) or by transforming human B-cells with Epstein Barr Virus in vitro (see Cole, et al., supra).

The term "CD3ε or CD3" as used herein relates to human CD3ε described under UniProt P07766 (CD3E_HUMAN). The term "antibody against CD3, anti CD3 antibody" relates to an antibody binding to CD3ε.

As used herein, the term "CEA, CEACAM5" refers to human carcinoembryonic antigen (CEA, CEACAM-5 or CD66e; UniProtKB—P06731) which is a cell surface glycoprotein and a tumor-associated antigen (Gold and Freedman, J Exp. Med., 121:439-462, 1965; Berinstein N L, J Clin Oncol., 20:2197-2207, 2002). As used herein, the term "CEACAM6" refers to human CEACAM6 (CD66c; UniProtKB—P40199), which is also a member of the carcinoembryonic antigen-related cell adhesion molecule (CEACAM) family. As used herein, the term "CEACAM1" refers to human CEACAM1 (UniProtKB—P13688 (CEAM1_HUMAN) which is also a member of the carcinoembryonic antigen-related cell adhesion molecule (CEACAM) family. As used herein, the term "CEACAM8" refers to human CEACAM8 (UniProtKB—P31997 (CEAM8_HUMAN) which is also a member of the carcinoembryonic antigen-related cell adhesion molecule (CEACAM) family. Further information and information on other members of the CEA family can be found under www.uniprot.org.

As used herein, the terms "specifically binding to CEA, binding to CEA, CEA binding part" refer in the context of the bispecific antibodies according to the invention to specificity for CEACAM5 on the surface of a cell. Binding to CEA on cells can be measured with gastric adenocarcinoma MKN-45 cells comprising 100.000 to 400.000 CEA copies per cell. The concentration of the antibody according to the invention is varied in an appropriate range in regard to a resulting EC50 value for binding to MKN-45 cells as defined above. The bispecific antibodies according to the invention are specifically binding to such cell membrane-bound CEACAM5.

As used herein, the term "membrane-bound human CEA" refers to human carcinoembryonic antigen (CEA) that is bound to a membrane-portion of a cell or to the surface of a cell, in particular, the surface of a tumor cell. The term "membrane-bound human CEA" may, in certain circumstances, refer to CEA which is not bound to the membrane of a cell, but which has been constructed so as to preserve the membrane bound CEA epitope to which the antibody according to the invention binds.

As used herein, the terms "no cross reactivity against CEACAM8" refer in the context of the bispecific antibodies according to the invention that the binding of the bispecific antibody according to the invention is tested on PEAK cells expressing CEACAM8 in comparison to binding to WT PEAK cells (for details see Example 1 and 5) and no crossreactivity means that the MFI measured for PEAK cells expressing CEACAM8 is no more than two times the MFI measured for WT PEAK cells. As used herein, the terms "no cross reactivity against a certain CEACAM" refer in the context of the bispecific antibodies according to the invention to said crossreactivity under the same experimental procedure and definition as described for CEACAM8.

As used herein, the term "bispecific antibody binding to human CEA and human CD3, CEA×CD3 bsAb" means a bispecific antibody binding to human CEACAM5 and CD3ε.

As used herein the term "complementarity determining region" ("CDR") describes the non-contiguous antigen combining sites (also known as antigen binding regions) found within the variable region of both heavy and light chain polypeptides. CDRs are also referred to as "hypervariable regions" and that term is used interchangeably herein with the term "CDR" in reference to the portions of the variable region that form the antigen binding regions. This particular region has been described by Kabat et al., U.S. Dept. of Health and Human Services, "Sequences of Proteins of Immunological Interest" (1983) and by Chothia et al., J. Mol. Biol. 196:901-917 (1987). Kabat et al. also defined a numbering system for variable domain sequences that is applicable to any antibody. One of ordinary skill in the art can unambiguously assign this system of "Kabat numbering" to any variable domain sequence, without reliance on any experimental data beyond the sequence itself. As used herein, "Kabat numbering" refers to the numbering system set forth by Kabat et al., U.S. Dept. of Health and Human Services, "Sequence of Proteins of Immunological Interest" (1983). Unless otherwise specified, references to the numbering of specific amino acid residue positions in bispecific antibody according to the invention (e.g. CDR sequences), are according to the Kabat numbering system.

As used herein the term "oligonucleotide-directed mutagenesis" relates to such method using degenerated oligonucleotides. For mutagenesis of each CDR a combination of various degenerated oligonucleotides is used. These comprise (but are not limited to) the degenerated codons NNS, HMT, DMT, NHT.

As used herein the term "expression vector" refers to one or more vectors which comprise the heavy and light chains of the antibody according to the invention in an appropriate manner as known from the state of the art. As used herein, the term "host cell" covers any kind of cellular system which can be engineered to generate the bispecific antibodies of the present invention. In one embodiment, the host cell is engineered to allow the production of an antigen binding molecule.

As used herein the term "substitution of amino acid" refers to a substitution of one amino acid by another amino acid out of the group of the 20 proteinogenic standard amino acids.

Therapeutic Applications and Methods of Using Anti-CEA×CD3 Antibodies According to the Invention The CEACAM×CD3 bispecific antibodies according to the invention are optimized for treatment of solid tumors, either in monotherapy or in combination therapy especially together with an anti CD47 antibody, an anti-CEA×CD47 antibody and/or PD-1 axis antagonist. The antibody according to the invention and the CD47 antibody or the CEA×CD47 antibody can be administered as described below.

In a particular embodiment, the disease resp. solid tumor is a cancer that expresses or even overexpresses CEA, including but not limited to the group of colorectal tumor, non-small cell lung tumor, gastric tumor, esophageal cancer, pancreatic tumor and breast tumor. In a particular embodiment, the tumor is a colorectal tumor. All therapeutic applications methods of use, uses, combinations, etc. described herein are especially embodiments for the treatment of these tumors/diseases.

The inventors recognize that the antibodies according to the invention show low or no ADA formation potential respectively loss of exposure due to neutralizing ADA respectively loss of efficacy.

In one embodiment, the invention provides a method of treating carcinomas (cancer, tumors, for example, human carcinomas), especially CEA expressing tumors, in vivo. This method comprises administering to a subject a pharmaceutically effective amount of a composition containing a bispecific antibody of the invention. By "subject" is meant a human subject, in one embodiment a patient suffering from cancer/tumor/carcinoma.

CEA expression in various tumor entities is generally very high, especially in colorectal carcinoma, esophageal cancer, pancreatic adenocarcinoma, gastric cancer, non-small cell lung cancer, breast cancer, head and neck carcinoma, uterine and bladder cancers among others. In healthy, normal glandular epithelia in the gastrointestinal tract, CEA is mainly expressed in a polarized pattern on the apical surface of the cells. This polarized expression pattern limits the accessibility by anti-CEA mono or bispecific antibodies which are administered systemically and therefore potential toxicity. This polarized expression pattern gets lost in the cells of gastrointestinal malignant tumors. CEA is expressed equally over the whole cell surface of the cancer cells that means cancer cells are much better accessible to an antibody of the invention than normal, healthy cells and can be selectively killed by the CEA×CD3 bispecific antibodies of the invention respectively by the combinations mentioned above.

In one embodiment the bispecific antibodies of this invention can be used in monotherapy for the treatment of advanced solid tumors, in one embodiment CEA expressing tumors. In one embodiment a bispecific antibody according to the invention is used in combination with a CEA×CD47 bsAb in simultaneous, separate, or sequential combination. In one embodiment a bispecific antibody according to the invention is used in combination with a CEA×CD47 bsAb and/or a PD-1 axis antagonist in simultaneous, separate, or sequential combination. In one embodiment a bispecific antibody according to the invention is used in combination with a PD-1 axis antagonist in simultaneous, separate, or sequential combination. Such PD-1 axis antagonists are described e.g. in WO2017118675. Such combinations attack the solid cancer by macrophages and T-cells. CD47 antibodies are e.g. described in WO2009091601, WO2009091547, WO2011143624, WO2009131453, WO2013119714, WO2015105995, WO2017181033, WO2018026600, WO2019157432, and WO2013032948 and bispecific antibody against CEA and CD47 are described in PCT/IB2019/054559 and U.S. Ser. No. 16/428, 539.

As used herein the terms "combination, simultaneous, separate, or sequential combination" of a an antibody according to the invention and a second antibody, binding to human CD47 or to human CEA and human CD47 refer to any administration of the two antibodies (or three antibodies in case of the combination of an antibody of the invention, a CD47 mAb or a CEA×CD47 bsAb and a PD-1 axis antagonist), either separately or together, where the two or three antibodies are administered as part of an appropriate dose regimen designed to obtain the benefit of the combination therapy, for example in separate, sequential, simultaneous, concurrent, chronologically staggered or alternating administration. Thus, the two or three antibodies can be administered either as part of the same pharmaceutical composition or in separate pharmaceutical compositions. The antibody according to the invention can be administered prior to, at the same time as, or subsequent to the administration of the second bispecific antibody, or in some combination thereof. Where the antibody according to the invention is administered to the patient at repeated intervals, e.g., during a standard course of treatment, the second bispecific antibody can be administered prior to, at the same time as, or subsequent to, each administration of the antibody of the invention or some combination thereof, or at different intervals in relation to the treatment with the antibody of the invention, or in a single dose prior to, at any time during, or subsequent to the course of treatment with the antibody of the invention. In one embodiment the antibody according to the invention and the second bispecific antibody are administered in alternating administration, in one embodiment in intervals of 6 to 15 days between administration of the antibody of the invention and the second antibody. In such alternating administration the first dose can be the antibody of the invention or the second antibody.

The term "PD-1 axis antagonist" refers to an anti-PD-1 antibody or an anti-PD-L1 antibody. Anti-PD-1 antibodies are e.g. pembrolizumab (Keytruda®, MK-3475), nivolumab, pidilizumab, lambrolizumab, MEDI-0680, PDR001, and REGN2810. Anti-PD-1 antibodies are described e.g. in WO200815671, WO2013173223, WO2015026634, U.S. Pat. Nos. 7,521,051, 8,008,449, 8,354,509, WO20091/14335, WO2015026634, WO2008156712, WO2015026634, WO2003099196, WO2009101611, WO2010/027423, WO2010/027827, WO2010/027828, WO2008/156712, and WO2008/156712. Anti-PD-L1 antibodies are e.g. atezolizumab, MDX-1 105, durvalumab and avelumab. Anti-PD-L1 antibodies are e.g. described in WO2015026634, WO2013/019906, WO2010077634, U.S. Pat. No. 8,383,796, WO2010077634, WO2007005874, and WO2016007235.

With regard to combined administration of the antibody according to the invention and the second bispecific antibody, both compounds may be present in one single dosage form or in separate dosage forms, for example in two different or identical dosage forms.

If the antibody of the invention and the second antibody are not competing in regard to CEACAM5, in one embodiment both antibodies are administered simultaneously. If the antibody of the invention and the second antibody are competing in regard to CEACAM5, in one embodiment the antibodies are administered in alternating administration.

The antibody of the invention will typically be administered to the patient in a dose regimen that provides for the most effective treatment of the cancer (from both efficacy and safety perspectives) for which the patient is being treated, as known in the art. Preferably tumor cells are attacked at the same time by T-cells and macrophages, to achieve full therapeutic potential of this approach, CEA× CD3 and CEA×CD47 bispecific antibodies should be non-competitive regarding binding to CEA on cell surface.

As discussed above, the amount of the antibody administered and the timing of the administration of the antibody of the invention can depend on the type (e.g. gender, age, weight) and condition of the patient being treated, the severity of the disease or condition being treated, and on the route of administration. For example, the antibody of the invention and the second antibody can be administered to a patient in doses ranging from 0.1 to 100 mg/kg of body weight per day or per week in single or divided doses, or by continuous infusion. In one embodiment each of the antibodies of the invention and the second antibody is administered to a patient in doses ranging from 1 to 20 mg/kg. In some instances, dosage levels below the lower limit of the aforesaid range may be adequate, while in other cases still larger doses may be employed without causing any harmful side effect.

As used herein, the term "half-life of the antibody" refers to the half-life of said antibody as measured in a usual pharmacokinetic assay. An antibody according to the invention and the second bispecific antibody against CEA and CD47 have elimination half-life of 3-14 days.

In another aspect, the invention is also directed to use of the bispecific antibody according to the invention in the treatment of disease, particularly cell proliferation disorders wherein CEA is expressed, particularly wherein CEA is abnormally expressed (e.g., overexpressed or expressed in a different pattern on the cell surface) compared to normal tissue of the same cell type. Such disorders include, but are not limited to colorectal cancer, NSCLC (non-small cell lung cancer), gastric cancer, esophageal cancer, pancreatic cancer and breast cancer. CEA expression levels may be determined by methods known in the art (e.g., via immunohistochemistry assay, immunofluorescence assay, immunoenzyme assay, ELISA, flow cytometry, radioimmunoassay etc.).

In one aspect, bispecific antibodies of the present invention can be used for targeting cells in vivo or in vitro that express CEA. The bispecific antibodies of the invention are particularly useful in the prevention of tumor formation, eradication of tumors and inhibition of tumor growth or metastasis via the induction of TDCC of tumor cells. The bispecific antibodies of the invention can be used to treat any tumor expressing CEA. Particular malignancies that can be treated with the bispecific antibodies of the invention include, but are not limited to, colorectal cancer, non-small cell lung cancer, gastric cancer, esophageal cancer, pancreatic cancer and breast cancer.

The bispecific antibodies of the invention are administered to a mammal, preferably a human, in a pharmaceutically acceptable dosage form such as those discussed below, including those that may be administered to a human intravenously as a bolus or by continuous infusion over a period of time, by intramuscular, intraperitoneal, intra-cerebrospinal, subcutaneous, intra-articular, intrasynovial, intrathecal, oral, topical, or inhalation routes. The bispecific antibodies of the invention also are suitably administered by intra tumoral, peritumoral, intralesional, or perilesional routes, to exert local as well as systemic therapeutic effects.

For the treatment of disease, the appropriate dosage of bispecific antibodies of the invention will depend on the type of disease to be treated, the severity and course of the disease, previous therapy, the patient's clinical history and response to the antibody, and the discretion of the attending physician. The bispecific antibody of the invention is suitably administered to the patient at one time or over a series of treatments. The present invention provides a method for selectively killing tumor cells expressing CEA.

This method comprises interaction of the bispecific antibodies of the invention with said tumor cells. These tumor cells may be from a human carcinoma including colorectal carcinoma, non-small cell lung carcinoma (NSCLC), gastric carcinoma, esophageal cancer, pancreatic carcinoma and breast carcinoma.

In another aspect, the invention is directed to a bispecific antibodies of the invention for use in the manufacture of a medicament for treating a disease related to abnormal CEA expression. In a particular embodiment, the disease is a cancer that expresses or even overexpresses CEA, including but not limited to colorectal tumor, non-small cell lung tumor, gastric tumor, esophageal cancer, pancreatic tumor and breast tumor. In a particular embodiment, the tumor is a colorectal tumor.

Compositions, Formulations, Dosages, and Routes of Administration

In one aspect, the present invention is directed to pharmaceutical compositions comprising the bispecific antibodies of the present invention and a pharmaceutically acceptable carrier. The present invention is further directed to such pharmaceutical compositions for use in the method of treatment of disease, such as cancer, or in the manufacture of a medicament for the treatment of disease, such as cancer. Specifically, the present invention is directed to a method for the treatment of disease, and more particularly, for the treatment of cancer, the method comprising administering a therapeutically effective amount of the pharmaceutical composition of the invention.

In one aspect, the present invention encompasses pharmaceutical compositions, combinations and methods for treating human carcinomas, tumors, as defined above. For example, the invention includes pharmaceutical compositions comprising a pharmaceutically effective amount of an antibody of the present invention and a pharmaceutically acceptable carrier for use in the treatment of human carcinomas.

The bispecific antibody compositions of the invention can be administered using conventional modes of administration including, but not limited to, intravenous, intraperitoneal, oral, intralymphatic or direct intratumoral administration. Intravenous administration or subcutaneous administration are preferred.

In one aspect of the invention, therapeutic formulations containing the bispecific antibodies of the invention are prepared for storage by mixing an antibody having the desired degree of purity with optional pharmaceutically acceptable carriers, excipients or stabilizers (Remington's Pharmaceutical Sciences 16th edition, Osol, A. Ed. (1980)), in the form of lyophilized formulations or liquid formulations. Acceptable carriers, excipients, or stabilizers are non-toxic to recipients at the dosages and concentrations employed. The formulations to be used for in vivo administration must be sterile. This is readily accomplished by filtration through sterile filtration membranes. The most effective mode of administration and dosage regimen for the pharmaceutical compositions of this invention depends upon the severity and course of the disease, the patient's condition and response to treatment and the judgment of the treating physician. Accordingly, the dosages of the compositions may be flat doses or may be adapted to the individual patient, e.g. the body weight. Nevertheless, an effective dose of the compositions of this invention will generally be in a range from 0.1 to 20 mg/kg.

The bispecific antibodies of this invention have a molecular weight in a magnitude of 150 kD per Mol. They carry in one embodiment a Fc part. The elimination half-life in patients is in a range of 3 to 14 days. This half-life allows for, but not limited to administration once a day, once a week, or once every two weeks.

The bispecific antibodies of the present invention and their respective compositions may be in a variety of dosage forms which include, but are not limited to, liquid solutions or suspensions, tablets, pills, powders, suppositories, polymeric microcapsules or microvesicles, liposomes, and injectable or infusible solutions. The preferred form depends upon the mode of administration and the therapeutic application.

The composition comprising a bispecific antibody of the present invention will be formulated, dosed, and administered in a fashion consistent with good medical practice. Factors for consideration in this context include the particular disease or disorder being treated, the particular mammal being treated, the clinic condition of the individual patient, the cause of the disease or disorder, the site of delivery of the agent, the method of administration, the scheduling of administration, and other factors known to medical practitioners.

Articles of Manufacture

In another aspect of the invention, an article of manufacture containing materials useful for the treatment, prevention and/or diagnosis of the disorders described above is provided. The article of manufacture comprises a container and a label or package insert on or associated with the container. Suitable containers include, for example, bottles, vials, syringes, IV solution bags, etc. The containers may be formed from a variety of materials such as glass or plastic. The container holds a composition which is by itself or combined with another composition effective for treating, preventing and/or diagnosing the condition and may have a sterile access port (for example the container may be an intravenous solution bag or a vial having a stopper pierceable by a hypodermic injection needle). One active agent in the composition is a bispecific antibody of the invention. The label or package insert indicates that the composition is used for treating the condition of choice. Moreover, the article of manufacture may comprise (a) a first container with a composition contained therein, wherein the composition comprises a bispecific antibody of the invention; and (b) a second container with a composition contained therein, wherein the composition comprises a further cytotoxic or otherwise therapeutic agent. The article of manufacture in this embodiment of the invention may further comprise a package insert indicating that the compositions can be used to treat a particular condition. Alternatively, or additionally, the article of manufacture may further comprise a second (or third) container comprising a pharmaceutically-acceptable buffer, such as bacteriostatic water for injection (BWFI), phosphate-buffered saline, Ringer's solution and dextrose solution. It may further include other materials desirable from a commercial and user standpoint, including other buffers, diluents, filters, needles, and syringes.

TABLE 1

SEQUENCE LIST

| Sequence Number | Relates to |
|---|---|
| SEQ ID NO: 1 | Common VH |
| SEQ ID NO: 2 | Common CDRH1 |
| SEQ ID NO: 3 | Common CDRH2 |
| SEQ ID NO: 4 | Common CDRH3 |
| SEQ ID NO: 5 | huCD3 VL 1B6 |
| SEQ ID NO: 6 | huCD3 1B6 CDRL1 |
| SEQ ID NO: 7 | huCD3 1B6 CDRL2 |
| SEQ ID NO: 8 | huCD3 1B6 CDRL3 |
| SEQ ID NO: 9 | huCD3 VL 1A10 |
| SEQ ID NO: 10 | huCD3 1A10 CDRL1 |
| SEQ ID NO: 11 | huCD3 1A10 CDRL2 |
| SEQ ID NO: 12 | huCD3 1A10 CDRL3 |
| SEQ ID NO: 13 | huCD3 VL 1F8 |
| SEQ ID NO: 14 | huCD3 1F8 CDRL1 |

TABLE 1-continued

SEQUENCE LIST

| Sequence Number | Relates to |
|---|---|
| SEQ ID NO: 15 | huCD3 1F8 CDRL2 |
| SEQ ID NO: 16 | huCD3 1F8 CDRL3 |
| SEQ ID NO: 17 | huCD3 VL 1A4 |
| SEQ ID NO: 18 | huCD3 1A4 CDRL1 |
| SEQ ID NO: 19 | huCD3 1A4 CDRL2 |
| SEQ ID NO: 20 | huCD3 1A4 CDRL3 |
| SEQ ID NO: 21 | huCD3 VL 1H4 |
| SEQ ID NO: 22 | huCD3 1H4 CDRL1 |
| SEQ ID NO: 23 | huCD3 1H4 CDRL2 |
| SEQ ID NO: 24 | huCD3 1H4 CDRL3 |
| SEQ ID NO: 25 | huCD3 1B6 LC |
| SEQ ID NO: 26 | huCD3 1A10 LC |
| SEQ ID NO: 27 | huCD3 1F8 LC |
| SEQ ID NO: 28 | huCD3 1A4 LC |
| SEQ ID NO: 29 | huCD3 1H4 LC |
| SEQ ID NO: 30 | Common constant heavy chain (WT IgG1) |
| SEQ ID NO: 31 | CEA VL AB1 (2F2) |
| SEQ ID NO: 32 | CEA AB1 CDRL1 |
| SEQ ID NO: 33 | CEA AB1 CDRL2 |
| SEQ ID NO: 34 | CEA AB1 CDRL3 |
| SEQ ID NO: 35 | CEA VL AB8 (2A3) |
| SEQ ID NO: 36 | CEA AB8 CDRL1 |
| SEQ ID NO: 37 | CEA AB8 CDRL2 |
| SEQ ID NO: 38 | CEA AB8 CDRL3 |
| SEQ ID NO: 39 | kappa light chain constant region (CK) |
| SEQ ID NO: 40 | CEA AB1 light chain (VKCK_2F2) |
| SEQ ID NO: 41 | lambda light chain constant region (CL) |
| SEQ ID NO: 42 | CEA AB8 light chain (VLCL_2A3) |
| SEQ ID NO: 43 | Common heavy chain (wild-type) |
| SEQ ID NO: 44 | Common heavy chain (LALA mutation) |
| SEQ ID NO: 45 | Common heavy chain (LALA + P329A mutation) |
| SEQ ID NO: 46 | VK_SM3E |
| SEQ ID NO: 47 | VH_SM3E |
| SEQ ID NO: 48 | VL_MEDI |
| SEQ ID NO: 49 | VH_MEDI |
| SEQ ID NO: 50 | VK_SAR |
| SEQ ID NO: 51 | VH_SAR |
| SEQ ID NO: 52 | VK_CH1A1A |

TABLE 1-continued

SEQUENCE LIST

| Sequence Number | Relates to |
|---|---|
| SEQ ID NO: 53 | VH_CH1A1A |
| SEQ ID NO: 54 | VK_T84.66 |
| SEQ ID NO: 55 | VH_T84.66 |
| SEQ ID NO: 56 | VK_LABETUZUMAB |
| SEQ ID NO: 57 | VH_LABETUZUMAB |
| SEQ ID NO: 58 | hybrid-kappa light chain constant region (H-CK 5) |
| SEQ ID NO: 59 | CEA VL 1B4 |
| SEQ ID NO: 60 | CEA 1B4 CDRL1 |
| SEQ ID NO: 61 | CEA 1B4 CDRL2 |
| SEQ ID NO: 62 | CEA 1B4 CDRL3 |
| SEQ ID NO: 63 | CEA VL C11 |
| SEQ ID NO: 64 | CEA C11 CDRL1 |
| SEQ ID NO: 65 | CEA C11 CDRL2 |
| SEQ ID NO: 66 | CEA C11 CDRL3 |
| SEQ ID NO: 67 | huCD3 1B6 LC-hybrid kappa |
| SEQ ID NO: 68 | huCD3 1A10 LC-hybrid kappa |
| SEQ ID NO: 69 | huCD3 1F8 LC-hybrid kappa |
| SEQ ID NO: 70 | huCD3 1A4 LC-hybrid kappa |
| SEQ ID NO: 71 | huCD3 1H4 LC-hybrid kappa |
| SEQ ID NO: 72 | CEA 2A3 LC-hybrid kappa (VLCK 2A3) |
| SEQ ID NO: 73 | CEA C11 LC (VKCK_C11) |
| SEQ ID NO: 74 | CEA 1B4 LC (VLCL_1B4) |
| SEQ ID NO: 75 | CEA 1B4 LC-hybrid kappa (VLCK_1B4) |
| SEQ ID NO: 76 | VKCK_C11 (DNA) |
| SEQ ID NO: 77 | VLCL_1B4 (DNA) |
| SEQ ID NO: 78 | VKCK_2F2 (AB1) (DNA) |
| SEQ ID NO: 79 | VLCL_2A3 (AB8) (DNA) |
| SEQ ID NO: 80 | Common heavy chain VHCH (wild-type; DNA) |
| SEQ ID NO: 81 | CEA AB13 CDRL1 |
| SEQ ID NO: 82 | CEA AB13 CDRL2 |
| SEQ ID NO: 83 | CEA AB13 CDRL3 |
| SEQ ID NO: 84 | CEA AB14 CDRL1 |
| SEQ ID NO: 85 | CEA AB14 CDRL2 |
| SEQ ID NO: 86 | CEA AB14 CDRL3 |
| SEQ ID NO: 87 | CEA AB15 CDRL1 |
| SEQ ID NO: 88 | CEA AB15 CDRL2 |
| SEQ ID NO: 89 | CEA AB15 CDRL3 |
| SEQ ID NO: 90 | CEA AB17 CDRL1 |

TABLE 1-continued

SEQUENCE LIST

| Sequence Number | Relates to |
|---|---|
| SEQ ID NO: 91 | CEA AB17 CDRL2 |
| SEQ ID NO: 92 | CEA AB17 CDRL3 |
| SEQ ID NO: 93 | CEA AB20 CDRL1 |
| SEQ ID NO: 94 | CEA AB20 CDRL2 |
| SEQ ID NO: 95 | CEA AB20 CDRL3 |
| SEQ ID NO: 96 | CEA AB54 CDRL1 |
| SEQ ID NO: 97 | CEA AB54 CDRL2 |
| SEQ ID NO: 98 | CEA AB54 CDRL3 |
| SEQ ID NO: 99 | CEA AB60 CDRL1 |
| SEQ ID NO: 100 | CEA AB60 CDRL2 |
| SEQ ID NO: 101 | CEA AB60 CDRL3 |
| SEQ ID NO: 102 | CEA AB66 CDRL1 |
| SEQ ID NO: 103 | CEA AB66 CDRL2 |
| SEQ ID NO: 104 | CEA AB66 CDRL3 |
| SEQ ID NO: 105 | CEA AB71 CDRL1 |
| SEQ ID NO: 106 | CEA AB71 CDRL2 |
| SEQ ID NO: 107 | CEA AB71 CDRL3 |
| SEQ ID NO: 108 | CEA AB72 CDRL1 |
| SEQ ID NO: 109 | CEA AB72 CDRL2 |
| SEQ ID NO: 110 | CEA AB72 CDRL3 |
| SEQ ID NO: 111 | CEA AB73 CDRL1 |
| SEQ ID NO: 112 | CEA AB73 CDRL2 |
| SEQ ID NO: 113 | CEA AB73 CDRL3 |
| SEQ ID NO: 114 | CEA AB13 VL light chain variable region |
| SEQ ID NO: 115 | CEA AB14 VL light chain variable region |
| SEQ ID NO: 116 | CEA AB15 VL light chain variable region |
| SEQ ID NO: 117 | CEA AB17 VL light chain variable region |
| SEQ ID NO: 118 | CEA AB20 VL light chain variable region |
| SEQ ID NO: 119 | CEA AB54 VL light chain variable region |
| SEQ ID NO: 120 | CEA AB60 VL light chain variable region |
| SEQ ID NO: 121 | CEA AB66 VL light chain variable region |
| SEQ ID NO: 122 | CEA AB71 VL light chain variable region |
| SEQ ID NO: 123 | CEA AB72 VL light chain variable region |
| SEQ ID NO: 124 | CEA AB73 VL light chain variable region |
| SEQ ID NO: 125 | CEA AB13 LC light chain |
| SEQ ID NO: 126 | CEA AB14 LC light chain |
| SEQ ID NO: 127 | CEA AB15 LC light chain |
| SEQ ID NO: 128 | CEA AB17 LC light chain |

TABLE 1-continued

SEQUENCE LIST

| Sequence Number | Relates to |
|---|---|
| SEQ ID NO: 129 | CEA AB20 LC light chain |
| SEQ ID NO: 130 | CEA AB54 LC light chain |
| SEQ ID NO: 131 | CEA AB60 LC light chain |
| SEQ ID NO: 132 | CEA AB66 LC light chain |
| SEQ ID NO: 133 | CEA AB71 LC light chain |
| SEQ ID NO: 134 | CEA AB72 LC light chain |
| SEQ ID NO: 135 | CEA AB73 LC light chain |
| SEQ ID NO: 136 | Consensus light chain CDR1 (XXSQXVXXNLN) |
| SEQ ID NO: 137 | Consensus light chain CDR2 (XXXNRXX) |
| SEQ ID NO: 138 | Consensus light chain CDR3 (QXFXXXXEXNT) |

EXAMPLES

Example 1 Cloning, Expression and Purification of Human CEACAM Family Members

Cloning

The sequence corresponding to the complete extracellular domain (ECD) and A3-B3 domains of CEACAM5 were synthesized and subcloned into the pEAK8 mammalian expression vector (Edge Biosystems, Gaithersburg, Md.). The vectors were modified to introduce an Avitag™ (Avidity, Denver Colo.) and either a hexa-histidine tag, a human FC region or a mouse FC region at the C-terminus. Constructs were verified by DNA sequencing. Purification of recombinant soluble protein was carried out by IMAC (Immobilized Metal Ion Affinity Chromatography), FcXL or CaptureSelect™ IgG-Fc (ms) Affinity Matrix (Thermo Fisher Scientific).

Vectors encoding for the full-length version of human CEACAM 1, 3, 4, 5, 6, 7, 8, 18, 19, 20, 21 and cynomolgus CEACAM5 and CEACAM6 were also generated for expression at the cell surface of PEAK and/or CHO cells. The soluble, full-length human CEACAM16 was also similarly cloned.

Additionally, vectors encoding the following truncated versions of human CEACAM 5 were also generated for expression at the cell surface of PEAK and/or CHO cells: A1-B1-A2-B2-A3-B3; B1-A2-B2-A3-B3; A2-B2-A3-B3; B2-A3-B3; A3-B3. The B3 subdomain is expressed as a fusion protein to the first 140 aa of the human CD86 protein.

Expression

Plasmid mentioned above are then transfected into mammalian cells using a liposome-based transfection reagent such as Lipofectamine2000 (Thermo Fisher Scientific). The transfection step requires only small quantities of DNA and cells, typically $4 \times 10^5$ cells and 2 μg of plasmid DNA per well and the transfection carried out in a 6-well plate. Although different mammalian cell lines can be used, in the examples given below, transformed human embryo kidney monolayer epithelial cells (PEAK cells) are transfected. These cells stably express the EBNA-1 gene, further supporting the episomal replication process, are semi-adherent and can be grown under standard cell culture conditions (5% $CO_2$; 37° C. in DMEM medium supplemented with 10% fetal calf serum). After 24 h, cells are placed under selective conditions by adding medium containing 0.5-2 μg/mL puromycin: cells harboring the episomal vector are resistant to this antibiotic.

Two to three weeks after transfection, amplified and selected cells were injected in disposable CELLine™ bioreactors (Sigma Aldrich) for the production step. The CELLine™ is a two-compartment bioreactor that can be used in a standard cell culture incubator. The smaller compartment (15 ml) contains the cells and is separated from a larger (one liter) medium containing compartment by a semi-permeable membrane with a cut-off size of 10 kDa (Bruce et al. 2002, McDonald et al. 2005). This system allows for the diffusion of nutrients, gazes and metabolic waste products, while retaining cells and secreted proteins in the smaller compartment.

The culture is maintained for 7-10 days before harvest of the supernatant. As the medium contains serum, the cells maintain good viability and several production runs can be generated using the same cells and containers.

Purification

After harvest, the cell culture supernatants are clarified by centrifugation. The supernatant is then supplemented with 100 mM imidazole and loaded on Ni-NTA affinity chromatography resin (Qiagen). The relatively high concentration of imidazole minimizes binding of contaminants to the resin. After washing of the column, proteins are eluted at a flow rate of 2 mL/min using a 30 mL imidazole gradient (20-400 mM imidazole) on an AKTA Prime chromatography system (Cytiva). The elution gradient further improves the purity of the recombinant protein but can be replaced by a step elution approach if a chromatography system is not available. The eluted fractions can be analyzed by SDS-PAGE or ELISA to determine their content in recombinant protein. The fractions of interest are pooled and desalted on Amicon® 10 kDa columns (Millipore) equilibrated with phosphate buffered saline or another appropriate buffer. The desalted proteins can then be quantified using various techniques and their purity analyzed by SDS-PAGE. Recombinant proteins are biotinylated in vitro using biotin ligase (Avidity, Denver Colo.) according to manufacturer's instructions. After desalting, the biotinylation level is evaluated by pull-down assays using streptavidin magnetic beads and SDS-PAGE analysis.

Example 2 Phage Display Selection of CEACAM5 Fvs Using Human scFv Libraries Containing Fixed Variable Heavy Domain General procedures for construction and handling of human scFv libraries displayed on M13 bacteriophage are described in Vaughan et al., (Nat. Biotech. 1996, 14:309-314), hereby incorporated by reference in its entirety. The libraries for selection and screening encode scFv that all share the same VH domain and are solely diversified in the VL domain. Methods for the generation of fixed VH libraries and their use for the identification and assembly of bispecific antibodies are described in US 2012/0184716 and WO 2012/023053, each of which is hereby incorporated by reference in its entirety. The procedures to identify scFv binding to human CEACAM5 are described below.
Protein Selections Aliquots of scFv phage libraries ($10^{12}$ Pfu) are blocked with PBS containing 3% (w/v) skimmed milk for one hour at room temperature on a rotary mixer. Blocked phages are deselected on streptavidin magnetic beads (Dynabeads™ M-280) for one hour at room temperature on a rotary mixer. Deselected phages are incubated with 100 nM of either biotinylated human CEACAM5 or the A3-B3 domain captured on streptavidin magnetic beads for two hours at room temperature on a rotary mixer. Beads are captured using a magnetic stand followed by five washes with PBS/0.1% Tween® 20 and two washes with PBS. Phages are eluted with 100 nM TEA for 30 minutes at room temperature on a rotary mixer. Eluted phages and beads are neutralized with Tris-HCl 1M pH 7.4 and directly added to 10 ml of exponentially growing TG1 cells (E. coli strains commonly used in phage display) and incubated for one hour at 37° C. with slow shaking (90 rpm). An aliquot of the infected TG1 is serial diluted to titer the selection output. The remaining infected TG1 are spun at 3800 rpm for 10 minutes and resuspended in 2 ml 2×TY and spread on 2×TYAG (2×TY medium containing 100 µg/ml ampicillin and 2% glucose) agar Bioassay plates. After overnight incubation at 30° C., 10 ml of 2×TY is added to the plates and the cells are scraped from the surface and transferred to a 50 ml polypropylene tube. 50% glycerol solution is added to the cell suspension to obtain a final concentration of 17% glycerol. Aliquots of the selection rounds are kept at −80° C.
Phage Rescue 50 µl of cell suspension obtained from previous selection rounds are added to 50 ml of 2×TYAG and grown at 37° C. with agitation (240 rpm) until an $OD_{600}$ of 0.3 to 0.5 is reached. The culture is then super-infected with $1.2×10^{11}$ M13K07 helper phage and incubated for one hour at 37° C. (90 rpm). The medium is changed by centrifuging the cells at 3800 rpm for 10 minutes, removing the medium and resuspending the pellet in 50 ml of 2×TYAK (2×TY medium containing 100 µg/ml ampicillin; 50 µg/ml kanamycin). The culture is then grown overnight at 30° C. (240 rpm). The next day, the phage containing supernatant is used for the next round of selection.
Cell Surface Selections Phage containing supernatants are blocked with PBS containing 3% (w/v) skimmed milk for one hour at room temperature on a rotary mixer. Blocked phages are then deselected for one hour on MKN-45 CEACAM5$^{KO}$ cells that do not express human CEACAM5. Deselected phages are incubated with $2×10^7$ MKN-45 cells expressing CEACAM5 (blocked in PBS, 3% BSA 0.1% $NaN_3$) for two hours at room temperature with gentle shaking. Cells are pelleted and washed six times with PBS. Bound phages are eluted with 76 mM citric acid and shaking for 10 minutes. After neutralization with Tris-HCl 1M pH 8 the cells are added directly to 10 ml of exponentially growing TG1 and incubated for one hour at 37° C. with slow shaking. An aliquot of the infected TG1 is serial diluted to titer the selection output. Infected TG1 are spun at 3800 rpm for 10 minutes and resuspended in 2 ml 2×TY medium and spread on a 2×TYAG agar Bioassay plate. After overnight incubation at 30° C. 10 ml of 2×TY is added to the plate and the cells are scraped from the surface and transferred to a 50 ml polypropylene tube. 50% glycerol solution is added to the cell suspension to obtain a final concentration of 17% glycerol. Aliquots of the selection rounds are kept at −80° C.

Example 3 Screening for scFv Binding/Non-Binding to Soluble CEACAM5, CEACAM6, and CEACAM1 scFv Periplasmic Preparation for Binding and Functional Tests

Individual transformed TG1 clones from selection outputs are inoculated into a deep-well microtiter plate containing 0.9 ml per well of 2×TYAG medium (2×TY medium containing 100 µg/ml ampicillin 0.1% glucose) and grown at 37° C. for 5-6 hours (240 rpm). 100 µl per well of 0.2 mM IPTG in 2×TY medium are then added to give a final concentration of 0.02 mM IPTG. The plate is incubated overnight at 30° C. with shaking at 240 rpm. The deep-well plate is centrifuged at 3200 rpm for 10 minutes at 4° C. and the supernatant carefully removed. The pellets are resuspended in 150 µl TES buffer (50 mM Tris-HCl (pH 8), 1 mM EDTA (pH 8), 20% sucrose, complemented with Complete protease inhibitor, Roche). A hypotonic shock is produced by adding 150 µl of diluted TES buffer (1:5 TES:water dilution) and incubation on ice for 30 minutes. The plate is centrifuged at 4000 rpm for 10 minutes at 4° C. to pellet cells and debris. The supernatants are carefully transferred into another microtiter plate and kept on ice for immediate testing in functional assays or binding assays.
Binding Screening of scFv for binding to CEACAM5 is tested in a homogenous assay using CellInsight™ technology. The following reagents are mixed in each well of a 384 clear bottom well plate (Corning): 30 µl of a streptavidin polystyrene bead suspension (Polysciences; 3000 beads/well) coated with either biotinylated CEACAM5, biotinylated domain A3-B3 or biotinylated NusA for a control protein; 60 µl of blocked scFv periplasmic preparation; 10 µl of detection buffer (PBS containing mouse anti-c-myc antibody at 5 µg/ml; anti-mouse Fc AlexaFluor® 647 diluted 1:200). After mixing at 600 rpm for 5 minutes, the 384-well plate is incubated at room temperature and read after 2 hours on a CellInsight™ CX5 High-Content Screening platform (ThermoFisher Scientific). Clones expressing scFv giving a specific signal for CEACAM5 and not NusA are selected for further analysis or sequencing.

Binding to CEACAM1, CEACAM6 and other CEACAMs can be measured in the same manner.
Clone Sequencing Single clones are inoculated into a 96-deep-well microtiter plate containing 1 ml LBAG medium (LB medium with 100 µg/ml ampicillin and 2% glucose) per well and grown overnight at 37° C., 300 rpm. DNA is extracted using the Zyppy-96 Plasmid Miniprep kit (Zymo Research) and sequenced.

Example 4 Fixed VII Candidates Reformatting into IgG and Transient Expression in Mammalian Cells After screening and sequencing, scFv candidates with the desired binding properties are reformatted into IgG and expressed by transient transfection into PEAK cells. The VH and VL sequences of selected scFv are amplified with specific oligonucleotides and cloned into an expression vector containing the heavy and light chain constant regions and the constructions are verified by sequencing. The expression vectors are transfected into mammalian cells using Lipofectamine 2000 (Thermo Fisher Scientific) according to manufacturer's instructions. Briefly, $4\times10^6$ PEAK cells are cultured in T75 flasks in 25 ml culture media containing fetal bovine serum. Transfected cells are cultured for 5-6 days at 37° C., IgG production is quantified using an Octet RED96 instrument. The supernatant is harvested for IgG purification on FcXL affinity resin (Thermo Fisher Scientific) according to manufacturer's instructions. Briefly, supernatants from transfected cells are incubated overnight at 4° C. with an appropriate amount of FcXL resin. After resin wash with PBS, samples are loaded on Amicon Pro column and the IgG consequently eluted in 50 mM Glycine pH3.5. The eluted IgG fraction is then dialyzed by Amicon 50 kDa against Histidine NaCl pH6.0 buffer and the IgG content is quantified by absorption at 280 nm. Purity and IgG integrity are verified by electrophoresis using an Agilent Bioanalyzer 2100 according to manufacturer instructions (Agilent Technologies, Santa Clara, Calif., USA).

Example 5 Characterization of CEACAM5 Monoclonal Antibodies a) Binding of Anti-CEACAM5 Arms to Cells Transfected with Different Members of the CEACAM Family The specificity of anti-CEACAM5 antibody arms (tested as bivalent mAbs or monovalent bsAbs is shown by flow cytometry using PEAK and/or CHO cells transfected with different members of the CEACAM family.

Vectors encoding the full-length version of human CEACAM 1, 3, 4, 5, 6, 7, 8, 18, 19, 20 and 21 and 20 are used to express these proteins at the surface of PEAK and/or CHO cells as described in Example 1. Similarly, vectors encoding the full-length version of cyno CEACAM 5 and 6 are also used to express these proteins at the surface of PEAK and/or CHO cells. Non-transfected PEAK and/or CHO cells are used as negative control. Cells are harvested, counted, checked for viability and resuspended at $3\times10^6$ cells/ml in FACS buffer (PBS 2% BSA, 0.1% $NaN_3$). 100 µl of the cell suspension are distributed in V-bottom 96-well plates ($3\times10^5$ cells/well). The supernatant is removed by centrifugation 3 minutes at 4° C., 1300 rpm and the cells incubated for 15 minutes at 4° C. with increasing concentrations of the antibody according to the invention. The antibodies carrying the anti-CEACAM5 arms to test are diluted in FACS buffer and the concentration range is 30 pM-500 nM. Cells are washed twice with cold FACS buffer and re-incubated for further 15 minutes at 4° C. with a compatible anti-human IgG secondary antibody. Cells are washed twice with cold FACS buffer and resuspended in 300 µl FACS buffer with 1:1500-diluted TOPRO-3 (Invitrogen). Fluorescence is measured using a FACSCalibur™ (BD Biosciences) or a Cytoflex Platform (Beckman Coulter). Dose-response binding curves are fitted using GraphPad Prism8 software. In the same manner, CEACAM1, CEACAM6 and other CEACAMs can be characterized.

Results obtained by using the experimental procedures described in Examples 1 and 5a are shown in table 2 and 3 (at 10 mcg/ml of the full-size antibodies tested; the BiTE MEDI-565 was tested at equimolar concentration). For the bispecific antibodies AB17L3-1/N, AB71L3-1/N, AB72L3-1/N, AB73L3-1/N the MFI measured for binding to CEACAM5 transfected cells was found between 29000 and 41000 (Table 2). In contrast MFI found by using PEAK cells transfected with CEACAM 1,3,4,6,8 were found below 1000 with the only exception of a strong signal for AB72L3-1/N on CEACAM8 transfected cells. When MFI values obtained on transfected cells expressing any given CEACAM are divided by the values obtained on WT PEAK cells, "factors to PEAK WT" can be calculated (Table 3). With the exception of AB72L3-1/N, the antibodies of the invention are all specific to CEACAM5, as the "factor to PEAK WT" values are all below 2.0. In contrast the MEDI-565 BiTE shows a "factor to PEAK WT" higher than 2 for CEACAM8, suggesting cross-reactivity for such CEACAM family member. This could cause killing of e.g. neutrophils because as mentioned already above human neutrophils express CEACAM8 on the surface.

TABLE 2

| Binding to CEACAMx transiently-expressed on PEAK cells [MFI] | | | | | | | |
|---|---|---|---|---|---|---|---|
| Binding MFI | PEAK WT | CEACAM5 | CEACAM1 | CEACAM3 | CEACAM4 | CEACAM6 | CEACAM8 |
| AB1L3-1/N | 461 | 7746 | 441 | 358 | 330 | 373 | 343 |
| AB17L3-1/N | 530 | 29209 | 652 | 633 | 431 | 541 | 411 |
| AB71L3-1/N | 440 | 35076 | 451 | 358 | 323 | 420 | 391 |
| AB72L3-1/N | 481 | 41029 | 652 | 474 | 402 | 562 | 6289 |
| AB73L3-1/N | 512 | 36240 | 542 | 465 | 352 | 490 | 401 |
| MEDI-565 BiTE | 1175 | 18414 | 1468 | 943 | 1338 | 1829 | 24002 |
| Y4L3-1/N | 253 | 396 | 283 | 298 | 283 | 275 | 249 |

TABLE 3

| Binding to CEACAMx transiently-expressed on PEAK cells [Factor to PEAK WT] | | | | | | | |
|---|---|---|---|---|---|---|---|
| Factor to PEAK WT | PEAK WT | CEACAM5 | CEACAM1 | CEACAM3 | CEACAM4 | CEACAM6 | CEACAM8 |
| AB1L3-1/N | 1.0 | 16.8 | 1.0 | 0.8 | 0.7 | 0.8 | 0.7 |
| AB17L3-1/N | 1.0 | 55.1 | 1.2 | 1.2 | 0.8 | 1.0 | 0.8 |
| AB71L3-1/N | 1.0 | 79.7 | 1.0 | 0.8 | 0.7 | 1.0 | 0.9 |
| AB72L3-1/N | 1.0 | 85.3 | 1.4 | 1.0 | 0.8 | 1.2 | 13.1 |
| AB73L3-1/N | 1.0 | 70.8 | 1.1 | 0.9 | 0.7 | 1.0 | 0.8 |
| MEDI-565 BiTE | 1.0 | 15.7 | 1.2 | 0.8 | 1.1 | 1.6 | 20.4 |
| Y4L3-1/N | 1.0 | 1.6 | 1.1 | 1.2 | 1.1 | 1.1 | 1.0 | b) Binding of CEACAM5 Monoclonal Antibodies to Recombinant Proteins in Enzyme-Linked Immunosorbent Assay (ELISA)

Biotinylated recombinant human CEACAM5 protein is captured at 0.5 μg/mL in a streptavidin coated 96-well microplate. The plate is washed and monoclonal anti-TAA bivalent antibodies of the present invention are added as a broad concentration-range (e.g. from $5 \times 10^{-4}$ to 1 μg/mL) and incubated during 1 hr. The plate is washed and bound antibodies are detected with an anti-human IgG(Fc)-HRP (Jackson ImmunoResearch). After washing, the plate is revealed with Amplex Red® reagent (Molecular Probes). The fluorescence signal is measured on a Synergy HT plate reader (Biotek).

The binding to other recombinant CEACAM family members such as CEACAM1 and CEACAM6 can be assessed similarly. Binding results are shown in FIGS. 8 and 9, for the 1B4 mAb and the C11 mAb, respectively.

c) Epitope Binning of the Antibodies of the Invention by Competition with Reference Antibodies Epitope binning is a competitive immunoassay used to, for example, characterize the binding of new monoclonal antibodies against a target protein. A competitive blocking profile of a new antibody binding to the target protein is created against antibodies also binding to this target protein and for which the binding epitope has already been established/published. Competition to one of these reference antibodies indicate that the new antibody has the same or a closely located epitope and they are "binned" together.

The ability of CEACAM5 mAbs of the present invention to compete with CEACAM5 reference antibodies is tested by ELISA on recombinant human CEACAM5 with the following reference antibodies carrying a mouse Fc region: SM3E, mAb derived from sm3E described in patent US20050147614A1; MEDI, mAb derived from MEDI-565 described in patent WO2016036678A1; SAR, mAb derived from Mab2 VLg5VHg2 described in patent EP3199552A1; CH1A1A, mAb derived from CH1A1A-2F1 described in patent US20120251529 and by Klein et al in Oncoimmunology, 2017 Jan. 11; 6(3); humanized T84.66, mAb derived from variant 1 described in patent WO2017055389; LAB, mAb derived from hMN14 described in patent US 2002/0165360 A1.

SM3E binds e.g. more to the N-terminal, cell membrane distal part of CEA, MEDI to the middle part and CH1A1 A binds close to the membrane.

Biotinylated human CEACAM5 is coated at 0.5 μg/ml in a Streptavidin-coated 96-well plate and incubated with 10 μg/ml of the reference mAbs or an irrelevant mAb carrying a mouse Fc region for 1 hour. The CEACAM5 mAbs of the present invention (that means the bivalent monoclonal anti-CEA antibodies) are added at 0.2 μg/ml for 1 hour at room temperature. The plate is washed and the bound CEACAM5 mAbs are detected with an anti-human IgG(Fc)-HRP (Jackson ImmunoResearch). After washing, the plate is revealed with Amplex® Red reagent. The fluorescence signal is measured on a Synergy HT plate reader (Biotek).

Figure 1:
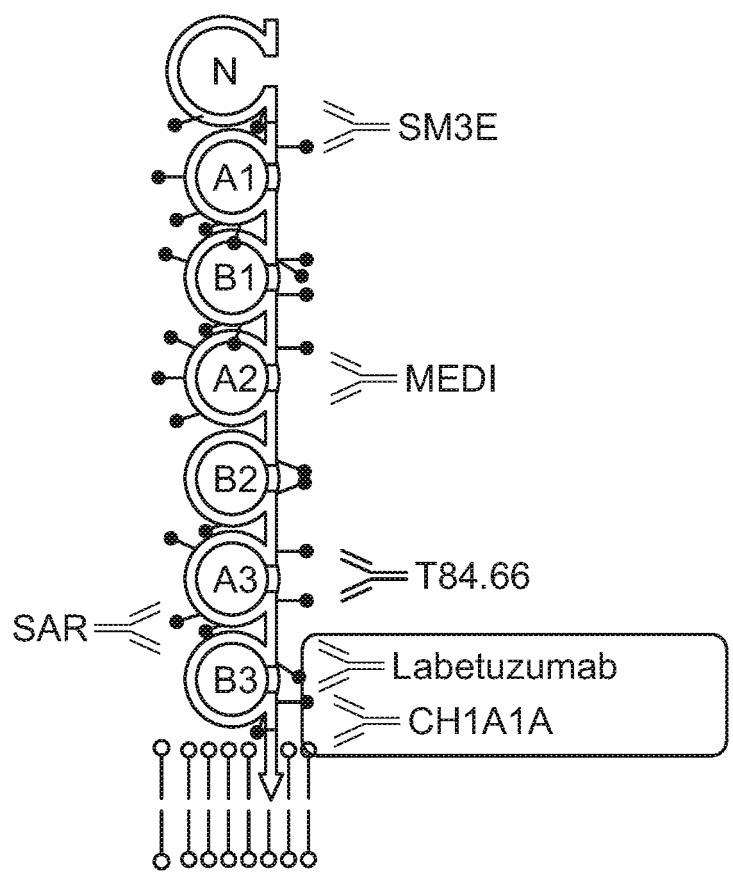
FIG. 1: Epitope Binning of the New CEA Binders Used in the Kappa/Lambda (KL) CEA×CD3 Bispecific Antibodies (Details in Example 5c)

Based on the results found with the CEACAM5 mAbs, the derived CEAxCD3 bsAbs according to the invention are considered as competitive with a reference antibody in case binding to CEACAM5 is reduced by more than 80% if the results with and w/o addition of a tool antibody are compared. A CEAxCD3 antibody is identified as non-competitive with a tool antibody in case binding to CEACAM5 is reduced by less than 20% if the results with and w/o addition of a tool antibody are compared. FIG. 1 shows in a schematic way the binding regions of reference antibodies used in Examples 5c.

d) Determination of the CEACAM5 Domain Bound by the Antibodies of the Invention Using Truncated Form of CEACAM5

Using truncated forms of CEACAM5 lacking one or more of ts extracellular subdomains, one could determine the subdomain to which the antibodies of the invention bind.

Vectors encoding the full-length version of human CEACAM5 (containing all its extracellular domains, and namely N-A1-B1-A2-B2-A3-B3) as well as vectors encoding only for a subset of the extracellular domains of CEACAM5 (A1-B1-A2-B2-A3-B3; B1-A2-B2-A3-B3; A2-B2-A3-B3; B2-A3-B3; A3-B3 and B3) are used to express these proteins at the surface of PEAK and/or CHO cells as described in Example 1. Non-transfected PEAK and/or CHO cells are used as negative control. Flow cytometry staining and acquisition is performed as described in example 5, subsection a).

An antibody according to the invention is found as binding to a given truncated CEACAM5 protein, if bound antibody is detected by the PE-conjugated anti-human IgG Fc secondary antibody.

Example 6 Expression and Purification of Bispecific Antibodies Carrying a Lambda and a Kappa Light Chain The simultaneous expression of one heavy chain and two lights chain in the same cell can lead to the assembly of three different antibodies. Simultaneous expression can be achieved in different ways such as that the transfection of multiple vectors expressing one of the chains to be co-expressed or by using vectors that drive multiple gene expression. The vector encoding the different anti-CEACAM5 antibodies are co-transfected with another vector expressing the heavy and light chain of an anti-CD3 antibody. Alternatively the two light chains are cloned into the vector pNovi κHλ that is previously generated to allow for the co-expression of one heavy chain, one Kappa light chain and one Lambda light chain as described in US 2012/0184716 and WO 2012/023053, each of which is hereby incorporated by reference in its entirety. The expression of the three genes is driven by human cytomegalovirus promoters (hCMV) and the vector also contains a glutamine synthetase gene (GS) that enables the selection and establishment of stable cell lines. The common VH and the VL genes of the anti-CEACAM5 IgG and of the anti-CD3 IgG are cloned in the vector pNovi κHλ, for transient expression in mammalian cells. Expi293 cells are cultured in suspension in an appropriate Erlenmeyer flask with suitable number of cells and culture medium volume. Plasmid DNA is finally transfected into Expi293 cells using PEI. Antibody concentration in the supernatant of transfected cells is measured during the production using an Octet RED96. According to antibody concentration, supernatants are harvested 5 to 7 days after transfection and clarified by centrifugation at 1300 g for 10 min. The purification is based on a three-step purification process. First, the CaptureSelect™ FcXL affinity matrix (Thermo Fisher Scientific) is washed with PBS and then added in the clarified supernatant. After incubation overnight at +4° C. and 20 rpm, supernatants are centrifuged at 2000 g for 10 min, flow through is stored and resin washed twice with PBS. Then, the resin is transferred on Amicon Pro columns and a solution containing 50 mM glycine at pH 3.0 is used for elution. Several elution fractions are generated, neutralized with Tris-HCl pH7.4 and pooled. The pool containing total human IgGs (the bispecific and the two monospecific antibodies) is quantified using a Nanodrop spectrophotometer (NanoDrop Technologies, Wilmington, Del.) and then incubated for 30 min at RT and 20 rpm with the appropriate volume of CaptureSelect™ KappaXL affinity matrix (Thermo Fisher Scientific). GE Healthcare). Resin recovery and wash, elution and neutralization steps are performed as described previously. The last affinity purification step is performed using the CaptureSelect™ lambda Fab affinity matrix (Thermo Fisher Scientific) applying the same process as for the kappa purification step. All elution fractions are pooled and desalted against His-NaCl pH6 formulation buffer using 50 kDa Amicon Ultra centrifugal filter units (Merck Millipore). The final product is quantified using the Nanodrop.

Purified bispecific antibodies are analyzed by electrophoresis in denaturing and reducing conditions using The Agilent 2100 Bioanalyzer with the Protein 80 kit as described by the manufacturer (Agilent Technologies, Santa Clara, Calif., USA). 4 µL of purified samples are mixed with sample buffer supplemented with dithiothreitol (DTT; Sigma Aldrich, St. Louis, Mo.). Samples are heated at 95° C. for 5 min and then loaded on the chip. All samples are tested for endotoxin contamination using the Limulus Amebocyte Lysate test (LAL; Charles River Laboratories, Wilmington, Mass.).

Example 7 In Vitro Characterization of Monovalent and Bispecific Antibodies a) Binding of Monovalent and Bispecific Antibodies to Cells Expressing CEACAM5 and Cells not Expressing CEACAM5

To demonstrate the binding of CD3×CEACAM5 κλ antibodies to target cells, a series of experiments based on flow cytometry comparing the binding of CD3×CEACAM5 κλ antibodies to their monovalent counterparts can be performed. Examples of cells that can be used include CEACAM5-positive cell lines such as the gastric adenocarcinoma cell line MKN45 (expressing 155'000 CEACAM5 molecules per cell), or the pancreatic adenocarcinoma cell line HPAF-II (expressing 108'000 CEACAM5 molecules per cell) or the colorectal adenocarcinoma cell line LS174T (expressing 26'000 CEACAM5 molecules per cell) and CEACAM5-negative cell lines, such as the lung carcinoma cell line A549 and the MKN45 CEACAM5-knock out cell line generated by CRISPR-CAS9 methodology. Cell staining and binding assessment can be performed as described above. Binding curves obtained are shown in FIGS. 4, 5, 11 and 14. EC50 values could be calculated using GraphPad Prism8 for the binding to MKN45 cells; data is shown in Table 4. Binding of the bsAb of the invention at 200 nM, 1000 nM and 5000 nM is 40% and higher compared to binding of TCB2014 (see Table 4 and also FIGS. 11 and 14).

TABLE 4

Binding EC50 to MKN-45 cells.

| | EC50 (nM) | Top MFI value |
|---|---|---|
| AB17L3-1/N | 59.2 | 862'218 |
| AB54L3-1/N | 66.4 | 759'782 |
| AB60L3-1/N | 64.1 | 989'186 |
| AB66L3-1/N | 24.3 | 759'391 |
| AB71L3-1/N | 34.1 | 833'116 |
| AB72L3-1/N | 24.5 | 962'960 |
| AB73L3-1/N | 27.8 | 920'523 |
| Y4L3-1/N | N/A | N/A |
| TCB2014 | 11.6 | 327'315 |

N/A: not applicable b) Binding of Monovalent and Bispecific Antibodies to Cells Expressing CD3 and Cells not Expressing CD3

To demonstrate the binding of CD3×CEACAM5 κλ antibodies to effector T-cells, a series of experiments based on flow cytometry comparing the binding of CD3×CEACAM5 κλ antibodies to their monovalent counterparts can be performed. Examples of cells that can be used include human primary T-cells as well as CD3-positive (Jurkat and/or HuT 78) or CD3-negative (TIB-153 and/or JKT-beta-del) cell lines. Cell staining and binding assessment can be performed as described above. Results are shown in FIGS. 3 and 10.

c) Epitope Binning of CEACAM5 Antibodies by Competition with Reference Antibodies Epitope binning is a competitive immunoassay used to characterize the binding of antibodies according to the invention or e.g. the binding of the related anti-CEA (target protein) antibodies of the first binding part. A competitive blocking profile of an antibody binding to the target protein is created against antibodies also binding to this target protein and for which the binding epitope has already been established/published. Competition with one of these reference antibodies indicate that the antibody has the same or a closely located epitope and they are "binned" together. The ability of anti CEACAM5 arms, which are part of the bispecific antibodies of the present invention to compete with anti CEACAM5 reference antibodies is tested by ELISA with recombinant human CEACAM5 and the following reference antibodies carrying a mouse Fc region: SM3E, sequences of mAb derived from SM3E described in patent US20050147614A1, mAb produced using standard methods; MEDI, mAb derived from MEDI-565 described in patent WO2016036678A1; CH1A1A, mAb derived from CH1A1A-2F1 described in patent US20120251529 and by Klein et al in Oncoimmunology, 2017 Jan. 11; 6(3). SM3E binds more to the N-terminal, cell membrane distal part of CEA, MEDI to the middle part and CH1A1A binds close to the membrane.

κλ bodies, used at 1 µg/ml, are captured by goat anti-human IgG(Fcγ) (Jackson ImmunoResearch) coated at 10 µg/ml on a 96-well black microplate and blocked with Blocking buffer (PBS 2% BSA, 0.05% Tween 20). The competitor IgG (0.03 to 20 µg/ml) are pre-incubated for 1 hour with 0.1 µg/ml Biotinylated human CEACAM5 in Blocking buffer. The κλ body plate is washed and incubated with the pre-incubated competitor IgG/CEACAM5 mixture for 1 hour. After washing the CEACAM5 is detected with Streptavidin-HRP (Jackson ImmunoResearch). The plate is revealed with Amplex™ Red reagent (Molecular Probes) and The fluorescence signal is measured on a Synergy HT plate reader (Biotek).

If the binding of CEACAM5 to the κλ bodies is reduced by the respective tool antibody by 80% or more, it can be concluded that the CEAxCD3 bispecific antibody is classified to bind competitively with the tool antibody. A CEAx CD3 antibody is therefore identified as non-competitive with a tool antibody in case binding of CEACAM5 to the respective κλ body is reduced by 20% or less if the results with and w/o addition of a tool antibody are compared.

d) Binding of Bispecific Antibodies to Primary Human Blood Cells

To demonstrate the binding of CD3xCEACAM5 κλ antibodies to primary T-cells, and the lack of binding to primary B-cells and monocytes (CEA-negative populations), a series of experiments based on flow cytometry can be performed. Cell staining and binding assessment can be performed as described in Example 7a. Data are shown in FIG. 13.

Example 8 T-Cell Dependent Cellular Cytotoxicity (TDCC) Mediated by Bispecific Antibodies a) TDCC of CEACAM5 Positive and CEACAM5 Negative Cell Lines The T-cell dependent cellular cytotoxicity (TDCC) of different CEACAM5 positive and CEACAM5 negative tumor cell lines induced by the CEAxCD3 bispecific antibodies of the present invention is assessed using either human PBMCs or purified primary T-cell as effector cells.

Target cells are detached with trypsin or cell dissociation solution after two washes with PBS. After a centrifugation step, cells are resuspended in assay media, adjusted to the needed concentration and plated in 96-well plates.

Effector cells can be either human peripheral blood mononuclear cells (PBMCs) or purified T-cells. PBMCs are isolated from buffy coats derived from healthy human donors using SepMate™ Tubes (Stemcell Technologies) with Lymphoprep™ buffer (Stemcell Technologies). If purified T-cells are used as effector cells, an extra purification step is performed, where T-cells are negatively isolated from PBMCs with the use of a T-cell immunomagnetic negative selection kit (STEMCELL Technologies).

For the TDCC assay, when PBMCs are used as effector cells, these are added to target cells at final E:T ratio of 10:1; when purified T-cells are used, a final E:T ration of 5:1 is used. The CEAxCD3 antibodies of the invention and relevant control antibodies are then added in a dose range concentration (up to 100 nM in duplicates) to the pre-plated target and effector cells. Target cell killing is assessed after either 24 h, 48 h or 72 h of incubation at 37° C., 5% $CO_2$ by quantifying the LDH released into the medium by apoptotic/necrotic cells (Cytotoxicity Detection KitPLUS (LDH), Roche). Maximal LDH release (=100% lysis) was obtained by incubating target cells with 1% Triton X-100. Spontaneous LDH release (=0% lysis) refers to target cells co-incubated with effector cells without any antibody added. TDCC curves (FIGS. 6, 7, 12 and 15) and EC50 values (Table 5) can be calculated using GraphPad Prism8 For MKN-45 and LS174T cell lines the EC50 found with the bsAb of the invention shown in Table 5 are significantly lower than the EC50 measured with TCB2014, demonstrating higher potency for in vitro tumor cell killing of these bsAb of the invention.

TABLE 5

| Killing EC50 of three CEA+ cell lines | | | |
|---|---|---|---|
| EC50 (nM) | MKN45 | HPAFII | LS174T |
| AB17L3-1/N | 0.11 | 0.16 | 0.25 |
| AB54L3-1/N | 0.11 | 0.10 | 0.13 |
| AB60L3-1/N | 0.13 | 0.28 | 0.21 |
| AB66L3-1/N | 0.05 | 0.20 | 0.22 |
| AB71L3-1/N | 0.09 | 0.16 | 0.16 |
| AB72L3-1/N | 0.02 | 0.12 | 0.11 |
| AB73L3-1/N | 0.03 | 0.13 | 0.06 |
| TCB2014 | 0.85 | 0.45 | 1.87 |
| Y4L3-1/N | N/A | N/A | N/A | b) Killing Assay by Combination of CEAxCD3 and CEAx CD47 Bispecific Antibodies

Combinations of a bispecific antibody of this invention with an anti CD47 mAb (such as described in US20140140989 and in WO2017196793) or with a CEAx CD47 bispecific antibody (described in PCT/IB2019/054559, incorporated herein by reference) can be tested in the models described above. Additional test conditions are added to the experimental design, where such CD47-targeting antibody (mono- or bispecific) is used either alone or in combination with a CEAxCD3 antibody of the present invention, at different doses.

c) Up-Regulation of T-Cell Activation Markers upon Killing of CEA-Expressing Tumor Cells Induced by CEAxCD3 bsAbs Killing of CEA-positive tumor cells induced by CEAx CD3 bsAbs requires T-cell activation, which can be quantified by flow cytometry using antibodies recognizing specific T-cell activation markers such as CD69 (early activation marker) or CD25 (late activation marker).

To assess the activation state of T-cell at the end of a killing assay (described above, example 8a), the following procedure is followed: floating cells (which include both CD4+ and CD8+ T-cells) are transferred in a new V-bottom 96-well plates. The supernatant is removed by centrifugation (3 minutes at 4° C., 1300 rpm) and cells are washed twice with cold FACS buffer (PBS 2% BSA, 0.1% NaN3) before being incubated for 15 minutes at 4° C. with Fc-block reagent (BD Biosciences). After two washing with FACS buffer, cells are incubated for 15 minutes at 4° C. with following antibodies (used according to the manufacturer's recommendations): Anti CD45 (V500-conjugated, BD Biosciences), CD69 (FITC-conjugated, Biolegend), CD8 (PerCP-Cy5.5-conjugated, Biolegend), CD25 (PE-conjugated, Biolegend), CD4 (APC-conjugated, ThermoFisher), CD3 (APC-R700-conjugated, BD Biosciences).

Cells are washed twice with cold FACS buffer and resuspended in 200 µl FACS buffer. Fluorescence is measured using a Cytoflex Platform (Beckman Coulter) and data is analyzed using FlowJo™ v10 software (BD Life Sciences). Results are shown in FIG. 17.

d) T Cell Proliferation Induced by CEA×CD3 bsAbs Molecules

CEA×CD3 bsAbs are analyzed for their capability to induce T cell proliferation upon cross-linkage in the presence of CEA positive tumor target cells. As a negative control, CEA negative malignant cells are used as well. Freshly isolated human PBMCs are adjusted to 1 million cells per mL in warm PBS and stained 0.2 µM carboxylfluorescein diacetate succinimidyl ester (CFSE, ThermoFisher Scientific) in PBS for 15 min at 37° C., washed several times with complete RPMI medium (containing 10% FCS, 2 mM L-glutamine, 1 mM sodium pyruvate, 10 mM HEPES, 50 µM 2-mercaptoethanol and 25 µg/mL gentamicin) and transferred into 96-well plates at $2 \times 10^6$ cells per mL. $0.02 \times 10^6$ target cells are plated per well of a flat-bottom 96-well plate and the different CEA×CD3 bsAbs are added at the indicated concentrations. CFSE-labeled PBMCs are added to obtain a final E:T ratio of 10:1 and the assay plates are incubated for five days in a humidified incubator at 37° C. On day five, the effector cells are harvested, washed twice with FACS buffer (PBS, 2% BSA, 0.1% NaN3), Cells are then stained with BD Horizon 620 (BD Biosciences, 564996) to exclude dead cells and with anti CD45 (V500-conjugated, BD Biosciences), anti-CD4-APC (ThermoFischer, 17-0049-41) and anti-CD8-PerCP-Cy5.5 (Biolegend, 301032). CFSE staining are analyzed on living $CD4^+$ or $CD8^+$ cells by flow cytometry using a CytoFLEX (Beckman Coulter) and results are evaluated by FlowJo software.

e) Cytokine Released in the Supernatant upon Killing of CEA-Expressing Tumor Cells Induced by CEA×CD3 bsAbs Killing of CEA-positive tumor cells induced by CEA×CD3 bsAbs requires T-cell activation. Upon activation, T-cells can release multiple cytokines which can further act as immunomodulating agents. The capacity of the bispecific antibodies of this invention to induce the release of cytokines by T-cells upon killing of CEA-expressing tumor cells was assessed by quantifying selected cytokines in the supernatant at the end of TDCC assays described in Example 8a. Following 2 days of co-culture of CEA-positive target cells and CD3-positive effector T-cells, the culture supernatants were harvested by centrifugation and stored frozen at −80° until further analysis. Cytokines/enzymes such as Granzyme B, IL2, IL6, IL10, TNFα and IFNγ were quantified using the Mesoscale Discovery Platform by using multiplex kits and results are shown in FIG. 16 f) TDCC of CEACAM5 Positive Cell in the Presence of Shed CEA

CEA positive tumors are known to shed CEA. Such shed CEA could negatively impact the anti-tumor efficacy of CEA targeting antibodies which do not preferentially bind to membrane-bound CEA. To assess whether the bispecific antibodies of this invention are impacted by shed CEA (sCEA), the T-cell dependent cellular cytotoxicity (TDCC) assay described in Example 8a is carried out in the presence of varying concentration of spiked sCEA (BioRad #PHP282). EC50 values in the presence of sCEA are then compared to the EC50 obtained in the absence of sCEA (Table 6). The EC50 calculated for a given sCEA concentration (0.2, 1 or 1 µg/mL) is then compared to that obtained in the absence of sCEA (0 µg/mL) and expressed as EC50 fold change compared to no shed CEA condition. Such values are reported in table 7.

TABLE 6

EC50 of Killing of LS174T cells in the presence of sCEA

| | sCEA µg/mL | | | |
|---|---|---|---|---|
| | 0 | 0.2 | 1 | 5 |
| AB17L3-1/N | 0.02 | 0.07 | 0.11 | 0.25 |
| AB54L3-1/N | 0.04 | 0.03 | 0.16 | 0.20 |
| AB60L3-1/N | 0.29 | 0.27 | 0.24 | 0.38 |
| AB66L3-1/N | 0.11 | 0.13 | 0.22 | 0.33 |
| AB71L3-1/N | 0.08 | 0.04 | 0.31 | 0.41 |
| AB72L3-1/N | 0.06 | 0.07 | 0.14 | 0.43 |
| AB73L3-1/N | 0.04 | 0.04 | 0.13 | 0.32 |
| Y4L3-1/N | N/A | N/A | N/A | N/A |
| TCB2014 | 0.37 | 0.12 | 3.71 | 19.83* |
| TCB2017 | 0.16 | 1.19 | 7.58 | >100* |

*no top plateau

TABLE 7

EC50 fold change compared to no shed CEA condition (0 ug/mL)

| | sCEA µg/mL | | | |
|---|---|---|---|---|
| | 0 | 0.2 | 1 | 5 |
| AB17L3-1/N | 1.0 | 3.2 | 5.0 | 11.0 |
| AB54L3-1/N | 1.0 | 0.9 | 4.6 | 5.7 |
| AB60L3-1/N | 1.0 | 0.9 | 0.8 | 1.3 |
| AB66L3-1/N | 1.0 | 1.2 | 2.1 | 3.1 |
| AB71L3-1/N | 1.0 | 0.6 | 4.2 | 5.5 |
| AB72L3-1/N | 1.0 | 1.2 | 2.4 | 7.3 |
| AB73L3-1/N | 1.0 | 0.8 | 2.9 | 7.4 |
| Y4L3-1/N | N/A | N/A | N/A | N/A |
| TCB2014 | 1.0 | 0.3 | 10.0 | 53.4* |
| TCB2017 | 1.0 | 7.7 | 48.7 | >642.7* |

*no top plateau

Significant higher shifts of EC50 for tumor cell killing were found if sCEA was added for TCB2014 and TCB2017 compared to the bispecific antibodies of the invention at 1 and 5 µg/mL sCEA. Concentrations of 1 µg/mL and above of sCEA are found in patients with CEA positive tumors. The lower shift due to sCEA of the killing curves of the bsAb of the invention suggest less inhibiting influence of high sCEA levels on the efficacy of the bsAb of the invention compared to TCB2014 and TCB2017.

g) TDCC of CEACAM5-Negative Primary Blood Cell Populations.

Given the mechanism of action of CEA×CD3 bispecific antibodies, cross-reactivity with other CEACAM could lead to depletion of important circulating healthy cell populations. E.g. cross-reactivity with CEACAM8, which is expressed by neutrophils, could lead to the depletion of such cell populations. To confirm the absence of binding, and therefore of killing of such CEA-negative circulating healthy cell populations, purified primary cells such as neutrophils are used as "target cells" instead of CEA-positive cell lines in the experimental procedure described in Example 8a.

Example 9 Evaluation of Anti-Tumor Activity of CEA×CD3 T-Cell Retargeting Molecule as Single Agent or in Combination Therapy with CD47-Targeting Antibodies, in Humanized Mouse Tumor Models a) Anti-Tumor Activity of CEA×CD3 Molecules in PBMC-Humanized Mouse Tumor Model NOG mice (NOD/Shi-scid/OL-2Rγ$^{null}$ mice, Taconic Biosciences), aged of 8-10 weeks, are implanted subcutaneously (s.c.) with 1 to 5×10$^6$ CEA-positive tumor cells (cell line-derived or patient-derived) and randomized into several treatment groups. Four to seven days later, all the mice are injected i.p. or i.v. with 10 or 20×10$^6$ of human PBMC (peripheral blood mononuclear cells) for humanization process. CD3×CEA molecules or controls are then administered i.v. starting 3-6 days after PBMC injection, once or twice a week, at different doses. Mice are monitored for tumor development 3 times a week and tumors are measured by digital caliper until the endpoint of the experiment (tumor volume=1500 mm$^3$ or onset of GvHD symptoms). Tumor volume is calculated using the formula (length×width$^2$)×0.5. Statistical analysis is performed using one-way ANOVA comparison analysis at study termination. Results from an experiment where 1 million HPAF-II cells were engrafted subcutaneously in NOG mice with subsequent injection of 10 million human PBMC are shown in FIG. 19.

b) Anti-Tumor Activity of CEA×CD3 Molecules in CD34$^+$-Humanized Mouse Tumor Model Fully humanized CD34$^+$-huNOG mice (CD34$^+$ engrafted NOD/Shi-scid/OL-2Rγ$^{null}$ mice, Taconic Biosciences), aged of 14 weeks and with human CD45$^+$ cells >25% in blood, are implanted subcutaneously (s.c.) with 1 to 5×10$^6$ CEA-positive tumor cells (cell line-derived or patient-derived) and are randomized into several treatment groups. When the mean tumor volume reaches a predefined value (ranging from 100 to 200 mm$^3$), CD3×CEA molecules or controls are administered i.v., once or twice a week, at different doses. Mice are monitored for tumor growth 3 times a week and tumors are measured by digital caliper until the endpoint of the experiment (tumor volume=1500 mm$^3$). Tumor volume is calculated using the formula (length×width$^2$)×0.5. Statistical analysis is performed using one-way ANOVA comparison analysis at study termination.

c) Anti-Tumor Activity of CEA×CD3 Molecules in Combination with CD47-Targeting Antibodies (Monospecific of Bispecific) in Humanized Mouse Tumor Model Combinations of a bispecific antibody of this invention with an anti CD47 mAb (such as described in US20140140989 and in WO2017196793) or with a CEA×CD47 bispecific antibody (described in PCT/IB2019/054559, incorporated herein by reference) can be tested in the models described above. Additional groups are added to the experimental design, including treatment groups where a CD47-targeting antibody (monospecific or bispecific) is administered i.v. either alone or in combination with a CEA×CD3 antibody of the present invention, once or twice weekly, at various doses.

d) Anti-Tumor Activity of CEA×CD3 Molecules in Combination with CD47-Targeting Antibodies (Monospecific of Bispecific) in Transgenic Mouse Tumor Models Combinations of a bispecific antibody of this invention with an anti CD47 mAb (such as described in US20140140989 and in WO2017196793) or with a CEA×CD47 bispecific antibody (described in PCT/IB2019/054559, incorporated herein by reference) can be tested in transgenic mice engineered to express human CD3, human CD47 and human SIRPα, which are implanted subcutaneously (s.c.) with 0.5 to 5×10$^6$ murine tumor cells engineered to express human CEA and human CD47. When the mean tumor volume reaches a predefined value (ranging from 100 to 200 mm$^3$), mice are randomized. Treatments are administered i.v., once or twice a week, at different doses. Mice are monitored for tumor growth 3 times a week and tumors are measured by digital caliper until the endpoint of the experiment (tumor volume=1500 mm$^3$). Tumor volume is calculated using the formula (length×width$^2$)×0.5. Statistical analysis is performed using one-way ANOVA comparison analysis at study termination.

Example 10 Cytokine Release Tested in Whole Blood and PBMCs from Healthy Human Donors Human Blood An in vitro cytokine release assay is performed using whole blood (WB CRA) with minimal dilution by the test antibodies (95% v/v blood) in aqueous presentation. This assay format is considered to mimic closely the in vivo environment, containing factors at physiological concentrations that may influence mechanisms of cytokine release. However, this format is thought to be poorly predictive of T cell-mediated cytokine release (e.g., anti-CD28).

Alternatively, the cytokine release assay can be performed using peripheral blood mononuclear cells (PBMCs) from healthy human donors and with the antibodies in aqueous presentation (Aqueous Phase, AP), to assess T cell-mediated cytokine release (PBMC AP CRA). This format limits cross-linking of mAbs to avoid high cytokine release which is observed with anti-CD3 antibodies upon cross-linking.

Negative controls (anti-EGFR mAb and PBS) as well as specific positive controls (anti-CD52 mAb, CEA×CD3 BiTE and/or anti-CD28 mAb) for each assay format are tested in parallel to the CEA×CD3 bispecific antibodies. After 24 h for WB CRA and 48 h for PBMC AP CRA, supernatants are tested for cytokines in a multiplex assay using electrochemiluminescence as readout (Mesoscale Discovery, Sector 600). IFNγ, TNFα and IL-6 are measured for WB CRA and IFNγ, IL-2, IL-10 and TNFα are measured for PBMC AP CRA. Results are plotted per cytokine with each donor displayed as a single data point.

Example 11 CEA Antibody Affinity Maturation by Oligonucleotide-Directed Mutagenesis Using Degenerated Oligonucleotides (Lead Optimization; LO)

Antibodies identified during the screening process described in the Example 3 are selected for affinity maturation in order to increase their affinity and potency. All these antibodies share the same variable heavy chain but have different variable light chains. AB1 and C11 contain a kappa light chain (IGKV3-11 and IGKV1-5, respectively, according to the IMGT nomenclature) whereas AB8 and 1B4 contain a lambda light chain (IGLV2-14 and IGLV3-21, respectively). Several phage libraries displaying scFv variants are generated by introducing diversity into the CDR1, CDR2 and CDR3 of the variable light chain region while the heavy chain variable region is kept unmodified. Different diversification strategies are used to generate libraries for each candidate, where either the CDRL1+CDRL2; or the CDRL3 only, or all three CDRLs are diversified (CDRL1+CDRL2+CDRL3) by oligonucleotide-directed mutagenesis of the parental sequence using degenerated oligonucleotides. CDRL1 is diversified in 1 to 5 amino acid positions; CDRL2 in 1 to 4 amino acid positions while CDRL3 in 1 to 5 amino acid positions. A total of up to $5\times10^9$ transformants partially covering a theoretical diversity of up to $10^{14}$ are generated for each candidate.

For candidate AB1 and 1B4, extra libraries diversified in up to 17 amino acid position across all CDRLs are generated with up to $5\times10^9$ transformants partially covering a theoretical diversity of up to $10^{21}$.

These libraries are used for phage display selections as described in Example 2 except that the selection stringency could be increased between rounds by reducing the concentration of recombinant hCEACAM5 from 100 nM gradually down to 0.01 nM between the different selection rounds or using cells expressing lower levels of hCEACAM5 like the SNUC-1 cell line. The selected variants are screened for the capacity to bind to CEACAM5 using the assay described in Example 3. Positive clones are reformatted as IgG and characterized as described in Examples 4 and 5, respectively.

The anti-CEA arm AB1 (SEQ ID NOs: 31 to 34) was optimized in two successive lead optimization waves. Wave 1 resulted in anti-CEA arms AB13, AB14, AB15, AB17 and AB20. Wave 2 resulted in anti-CEA arms AB54, AB60, AB66, AB71, AB72 and AB73.

Example 12 TDCC (T Cell-Dependent Cellular Cytotoxicity) and/or TDCC Plus ADCP of Tumor Derived Organoids Tumor cell derived organoids are an advanced translational model to test T-cell retargeting compounds and/or macrophage and NK cell retargeting compounds.

Organoids are prepared according to standard procedures (Schutte et al., Nature Communications 2017; DOI:10.1038/ncomms14262) and incubated with compounds for up to 8 days in co-culture with PBMCs and in vitro generated macrophages. Medium is changed every 4 days and replaced by fresh medium.

Organoids are collected and enzymatically dissociated into single cells at 37° C. for 5 min using Accutase. Cells are pelleted, resuspended in FACS buffer (PBS, 2% FBS, 2 mM EDTA), and filtered through a 400 µm cell strainer. Suspensions of equivalent cell numbers are incubated with antibodies against CD45, CD4, CD8, CEA, and CD14 (all from Thermo Fisher Scientific, Dreieich, Germany) for 30 min on ice. For live-cell gating, propidium iodide is used, measured and analyzed using FlowJo software (FlowJo, LLC, Ashland, Oreg., USA).

The supernatant from each well is frozen at $-80°$ C. for analysis of T-cell activity by using ELISA.

Example 13 TDCC and/or TDCC Plus ADCP of Patient Derived Tumor Tissue Slices

Patient derived fresh tumor tissue slices are another advanced translational model to test T-cell and/or Macrophage and/or NK cell retargeting compounds.

Fresh tumor tissue samples will be cut according to standard procedures as published previously (Sonnichsen et al., Clinical Colorectal Cancer, 17 (2018) e189-e199). In brief, immediately after surgical resection and first macroscopic pathologic assessment, tumor samples are cut into slices of 350 µm using a tissue chopper ((McIlwain TC752; Campden Instruments, Leicestershire, England). Tissue slice diameter is then standardized by using a 3-mm coring tool (kai Europe, Solingen, Germany). Three tissue slices are randomly pooled, placed on membrane inserts, and cultivated in 6-well plates. Slices are incubated under standardized conditions of 37° C. and 5% $CO_2$. Medium is changed 2 hours and 24 hours after preparation prior to treatment.

After 24 hours of pre-cultivation in standard cell culture medium, slice triplets can be exposed to bispecific antibodies according to the invention alone or in combination, respectively, for up to 120 hours. If necessary, incubation time is decreased to 72 hours. Medium will be changed after 72 hours.

After compound exposure, tumor slices are fixed overnight using 4% paraformaldehyde. The supernatant from each well will be frozen at $-80°$ C. for analysis of T-cell activity using ELISA.

Paraformaldehyde fixed slices are embedded in paraffin and processed to 5-µm sections. Hematoxylin and eosin (HE) staining is performed to assess histopathologic aspects and tumor cell proportion. Overall cell count, tumor cell count, and proliferation are analyzed by immunofluorescent staining. In brief, paraffin sections are deparaffinized. After antigen retrieval, sections are washed with 0.3% PBS/TritonX and blocked with 5% normal goat serum (Jackson ImmunoResearch, Suffolk, UK) for 30 minutes. Primary antibodies against cytokeratins (AE1þ3), Ki67, and cleaved-PARP, respectively, are diluted in 0.5% bovine serum albumin and incubated at 4° C. overnight. Sections are rinsed with 0.3% phosphate buffered saline/TritonX and labeled with secondary antibodies. Nuclei are stained with Hoechst 33342 (Sigma-Aldrich, St. Louis, Mo.). For further analysis, antibodies against CEA (tumor cells), CD163 (macrophages), and CD3, CD4, CD8, PD-L1 as well as FoxP3 (all T-cells) are included depending on availability of tumor slices.

Tumor cell-containing area is analyzed in HE sections using slide scans (Pannoramic SCAN and Pannoramic Viewer, 3D Histech, Budapest, Hungary) to investigate varying tumor cell fractions. Slices that contained more benign epithelial cells than neoplastic epithelial cells are excluded from analysis. Slices that did not contain tumor cells are excluded from analysis of proliferating tumor cell fraction but included in analysis of tumor cells per condition. For further analysis, 5 pictures (20×) per tissue slice are taken from fluorescent-stained sections using an Olympus BX51 fluorescent microscope (Olympus Deutschland, Hamburg, Germany). The positive pixel count is determined for Hoechst 33342, cytokeratin, Ki67, and cleaved-PARP stains with stain-specific segmentation algorithms for Image J. Proliferating/apoptotic tumor area is calculated by analyzing pixels of Ki67/cleaved PARP positive nuclei surrounded by cytokeratin-positive pixels.

For every picture, the total cell count (Hoechst-positive), tumor cell count (Hoechst- and cytokeratin-positive), and proliferating tumor cell count (Hoechst-, cytokeratin-, and Ki67-positive/cleavedPARP) is calculated. Tumor cell count is normalized to total cell count and proliferating tumor cell count is normalized to tumor cell count to consider different tumor cell fractions per picture. Mean slice values are then calculated from single image values. Mean values for conditions are calculated using mean slice values.

All publications, patents, patent applications, internet sites, and accession numbers/database sequences including both polynucleotide and polypeptide sequences cited herein are hereby incorporated by reference herein in their entirety for all purposes to the same extent as if each individual publication, patent, patent application, internet site, or accession number/database sequence were specifically and individually indicated to be so incorporated by reference.

The invention claimed is:

1. A bispecific antibody comprising a first binding part, specifically binding to human CEACAM5, and a second binding part, specifically binding to human CD3ε, wherein:
   a) the first binding part comprises a heavy chain variable region (VH), which comprises a CDRH1 of SEQ ID NO: 2, a CDRH2 of SEQ ID NO: 3 and a CDRH3 of SEQ ID NO: 4,
   b) the first binding part comprises a light chain variable region (VL) comprising a CDRL set selected from the group consisting of
      b1) a CDRL1 of SEQ ID NO: 32, CDRL2 of SEQ ID NO: 33, and CDRL3 of SEQ ID NO: 34,
      b2) a CDRL1 of SEQ ID NO: 81, CDRL2 of SEQ ID NO: 82, and CDRL3 of SEQ ID NO: 83,
      b3) a CDRL1 of SEQ ID NO: 84, CDRL2 of SEQ ID NO: 85, and CDRL3 of SEQ ID NO: 86,
      b4) a CDRL1 of SEQ ID NO: 87, CDRL2 of SEQ ID NO: 88, and CDRL3 of SEQ ID NO: 89,
      b5) a CDRL1 of SEQ ID NO: 90, CDRL2 of SEQ ID NO: 91, and CDRL3 of SEQ ID NO: 92,
      b6) a CDRL1 of SEQ ID NO: 93, CDRL2 of SEQ ID NO: 94, and CDRL3 of SEQ ID NO: 95,
      b7) a CDRL1 of SEQ ID NO: 96, CDRL2 of SEQ ID NO: 97, and CDRL3 of SEQ ID NO: 98,
      b8) a CDRL1 of SEQ ID NO: 99, CDRL2 of SEQ ID NO: 100, and CDRL3 of SEQ ID NO: 101,
      b9) a CDRL1 of SEQ ID NO: 102, CDRL2 of SEQ ID NO: 103, and CDRL3 of SEQ ID NO: 104,
      b10) a CDRL1 of SEQ ID NO: 105, CDRL2 of SEQ ID NO: 106, and CDRL3 of SEQ ID NO: 107,
      b11) a CDRL1 of SEQ ID NO: 108, CDRL2 of SEQ ID NO: 109, and CDRL3 of SEQ ID NO: 110, and
      b12) a CDRL1 of SEQ ID NO: 111, CDRL2 of SEQ ID NO: 112, and CDRL3 of SEQ ID NO: 113,
   c) the second binding part comprises a VH comprising a CDRH1 of SEQ ID NO: 2, CDRH2 of SEQ ID NO: 3 and CDRH3 of SEQ ID NO: 4, and
   d) the second binding part comprises a VL comprising a CDRL1 of SEQ ID NO: 18, CDRL2 of SEQ ID NO: 19, and CDRL3 of SEQ ID NO: 20.

2. The bispecific antibody according to claim 1, comprising
   a) in the first binding part a heavy chain variable region VH of SEQ ID NO: 1,
   b) in the first binding part a light chain variable region VL selected from the group consisting of
      b1) a light chain variable region VL of SEQ ID NO: 31,
      b2) a light chain variable region VL of SEQ ID NO: 114,
      b3) a light chain variable region VL of SEQ ID NO: 115,
      b4) a light chain variable region VL of SEQ ID NO: 116, b5) a light chain variable region VL of SEQ ID NO: 117,
b6) a light chain variable region VL of SEQ ID NO: 118,
b7) a light chain variable region VL of SEQ ID NO: 119,
b8) a light chain variable region VL of SEQ ID NO: 120,
b9) a light chain variable region VL of SEQ ID NO: 121,
b10) a light chain variable region VL of SEQ ID NO: 122,
b11) a light chain variable region VL of SEQ ID NO: 123, and
b12) a light chain variable region VL of SEQ ID NO: 124, and
c) in the second binding part a heavy chain variable region VH of SEQ ID NO: 1 and a light chain variable region VL of SEQ ID NO: 17.

3. The bispecific antibody of claim 1, comprising
a) in the first binding part a heavy chain variable region VH of SEQ ID NO: 1,
b) in the first binding part a light chain selected from the group consisting of
  b1) the light chain of SEQ ID NO: 40
  b2) the light chain of SEQ ID NO: 125,
  b3) the light chain of SEQ ID NO: 126,
  b4) the light chain of SEQ ID NO: 127,
  b5) the light chain of SEQ ID NO: 128,
  b6) the light chain of SEQ ID NO: 129,
  b7) the light chain of SEQ ID NO: 130,
  b8) the light chain of SEQ ID NO: 131
  b9) the light chain of SEQ ID NO: 132,
  b10) the light chain of SEQ ID NO: 133,
  b11) the light chain of SEQ ID NO: 134, and
  b12) the light chain of SEQ ID NO: 135, and
c) in the second binding part a heavy chain variable region VH of SEQ ID NO: 1 and a light chain of SEQ ID NO: 28.

4. The bispecific antibody according to claim 1, characterized in comprising a common heavy chain selected from the group consisting of
  a) the heavy chain of SEQ ID NO: 43,
  b) the heavy chain of SEQ ID NO: 44, and
  c) the heavy chain of SEQ ID NO: 45.

5. The bispecific antibody of claim 1, comprising a common heavy chain of SEQ ID NO: 45, and wherein the second binding part comprises a light chain of SEQ ID NO: 28 and the first binding part comprises a light chain of SEQ ID NO: 128.

6. The bispecific antibody of claim 1 comprising a common heavy chain of SEQ ID NO: 45 and wherein the second binding part comprises a light chain of SEQ ID NO: 28 and the first binding part comprises a light chain of SEQ ID NO: 133.

7. The bispecific antibody of claim 1 comprising a common heavy chain of SEQ ID NO: 45 and wherein the second binding part comprises a light chain of SEQ ID NO: 28 and the first binding part comprises a light chain of SEQ ID NO: 135.

8. A pharmaceutical composition comprising the bispecific antibody of claim 1 and a pharmaceutically acceptable carrier.

9. An isolated polynucleotide that encodes the antibody of claim 1.

10. A vector comprising the isolated polynucleotide of claim 9.

11. A cell comprising the vector of claim 10.

* * * * *

SEQUENCE LISTING

<160> NUMBER OF SEQ ID NOS: 138

<210> SEQ ID NO 1
<211> LENGTH: 125
<212> TYPE: PRT
<213> ORGANISM: Artificial Sequence
<220> FEATURE:
<223> OTHER INFORMATION: huCD3 VH

<400> SEQUENCE: 1

```
Glu Val Gln Leu Val Glu Ser Gly Gly Gly Leu Val Gln Pro Gly Gly
1               5                   10                  15

Ser Leu Lys Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Gly Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Ala Tyr Leu Gln Met Asn Ser Leu Lys Thr Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Leu Val Thr Val Ser Ser
        115                 120                 125
```

<210> SEQ ID NO 2
<211> LENGTH: 5
<212> TYPE: PRT
<213> ORGANISM: Artificial Sequence
<220> FEATURE:
<223> OTHER INFORMATION: huCD3 CDRH1

<400> SEQUENCE: 2

```
Thr Tyr Ala Met Asn
1               5
```

<210> SEQ ID NO 3
<211> LENGTH: 19
<212> TYPE: PRT
<213> ORGANISM: Artificial Sequence
<220> FEATURE:
<223> OTHER INFORMATION: huCD3 CDRH2

<400> SEQUENCE: 3

```
Arg Ile Arg Ser Lys Tyr Asn Asn Tyr Ala Thr Tyr Tyr Ala Asp Ser
1               5                   10                  15

Val Lys Asp
```

<210> SEQ ID NO 4
<211> LENGTH: 14
<212> TYPE: PRT
<213> ORGANISM: Artificial Sequence
<220> FEATURE:
<223> OTHER INFORMATION: huCD3 CDRH3

<400> SEQUENCE: 4

```
His Gly Asn Phe Gly Asn Ser Tyr Val Ser Trp Phe Ala Tyr
1               5                   10
```

<210> SEQ ID NO 5

```
<211> LENGTH: 109
<212> TYPE: PRT
<213> ORGANISM: Artificial Sequence
<220> FEATURE:
<223> OTHER INFORMATION: huCD3 VL 1B6

<400> SEQUENCE: 5

Gln Thr Val Val Thr Gln Glu Pro Ser Leu Thr Val Ser Pro Gly Gly
 1               5                  10                  15

Thr Val Thr Leu Thr Cys Arg Ser Ser Thr Gly Ala Val Thr Thr Ser
             20                  25                  30

Asn Tyr Ala Asn Trp Phe Gln Gln Lys Pro Gly Gln Ala Pro Arg Gly
         35                  40                  45

Leu Ile Gly Gly Thr Asn Lys Arg Ala Pro Gly Thr Pro Ala Arg Phe
     50                  55                  60

Ser Gly Ser Leu Leu Gly Gly Lys Ala Ala Leu Thr Leu Ser Gly Ala
 65                  70                  75                  80

Gln Pro Glu Asp Glu Ala Glu Tyr Tyr Cys Ala Leu Trp Tyr Ala Asn
                 85                  90                  95

Arg Trp Val Phe Gly Gly Gly Thr Lys Leu Thr Val Leu
            100                 105

<210> SEQ ID NO 6
<211> LENGTH: 14
<212> TYPE: PRT
<213> ORGANISM: Artificial Sequence
<220> FEATURE:
<223> OTHER INFORMATION: huCD3 1B6 CDRL1

<400> SEQUENCE: 6

Arg Ser Ser Thr Gly Ala Val Thr Thr Ser Asn Tyr Ala Asn
 1               5                  10

<210> SEQ ID NO 7
<211> LENGTH: 7
<212> TYPE: PRT
<213> ORGANISM: Artificial Sequence
<220> FEATURE:
<223> OTHER INFORMATION: huCD3 1B6 CDRL2

<400> SEQUENCE: 7

Gly Thr Asn Lys Arg Ala Pro
 1               5

<210> SEQ ID NO 8
<211> LENGTH: 9
<212> TYPE: PRT
<213> ORGANISM: Artificial Sequence
<220> FEATURE:
<223> OTHER INFORMATION: huCD3 1B6 CDRL3

<400> SEQUENCE: 8

Ala Leu Trp Tyr Ala Asn Arg Trp Val
 1               5

<210> SEQ ID NO 9
<211> LENGTH: 109
<212> TYPE: PRT
<213> ORGANISM: Artificial Sequence
<220> FEATURE:
<223> OTHER INFORMATION: huCD3 VL 1A10

<400> SEQUENCE: 9

Gln Thr Val Val Thr Gln Glu Pro Ser Leu Thr Val Ser Pro Gly Gly
 1               5                  10                  15
```

```
                1               5                   10                  15
        Thr Val Thr Leu Thr Cys Arg Ser Ser Thr Gly Ala Val Thr Thr Ser
                        20                  25                  30

Asn Tyr Ala Asn Trp Phe Gln Gln Lys Pro Gly Gln Ala Pro Arg Gly
                    35                  40                  45

Leu Ile Gly Gly Thr Asn Lys Arg Ala Pro Gly Thr Pro Ala Arg Phe
                50                  55                  60

Ser Gly Ser Leu Leu Gly Gly Lys Ala Ala Leu Thr Leu Ser Gly Ala
         65                  70                  75                  80

Gln Pro Glu Asp Glu Ala Glu Tyr Tyr Cys Ala Leu Trp Tyr Lys Gly
                        85                  90                  95

Tyr Trp Val Phe Gly Gly Gly Thr Lys Leu Thr Val Leu
                    100                 105

<210> SEQ ID NO 10
<211> LENGTH: 14
<212> TYPE: PRT
<213> ORGANISM: Artificial Sequence
<220> FEATURE:
<223> OTHER INFORMATION: huCD3 1A10 CDRL1

<400> SEQUENCE: 10

Arg Ser Ser Thr Gly Ala Val Thr Thr Ser Asn Tyr Ala Asn
 1               5                   10

<210> SEQ ID NO 11
<211> LENGTH: 7
<212> TYPE: PRT
<213> ORGANISM: Artificial Sequence
<220> FEATURE:
<223> OTHER INFORMATION: huCD3 1A10 CDRL2

<400> SEQUENCE: 11

Gly Thr Asn Lys Arg Ala Pro
 1               5

<210> SEQ ID NO 12
<211> LENGTH: 9
<212> TYPE: PRT
<213> ORGANISM: Artificial Sequence
<220> FEATURE:
<223> OTHER INFORMATION: huCD3 1A10 CDRL3

<400> SEQUENCE: 12

Ala Leu Trp Tyr Lys Gly Tyr Trp Val
 1               5

<210> SEQ ID NO 13
<211> LENGTH: 109
<212> TYPE: PRT
<213> ORGANISM: Artificial Sequence
<220> FEATURE:
<223> OTHER INFORMATION: huCD3 VL 1F8

<400> SEQUENCE: 13

Gln Thr Val Val Thr Gln Glu Pro Ser Leu Thr Val Ser Pro Gly Gly
         1               5                   10                  15

Thr Val Thr Leu Thr Cys Arg Ser Ser Thr Gly Ala Val Thr Thr Ser
                        20                  25                  30

Asn Tyr Ala Asn Trp Phe Gln Gln Lys Pro Gly Gln Ala Pro Arg Gly
                    35                  40                  45

Leu Ile Gly Gly Thr Asn Lys Arg Ala Pro Gly Thr Pro Ala Arg Phe
```

```
                50                  55                  60
Ser Gly Ser Leu Leu Gly Gly Lys Ala Ala Leu Thr Leu Ser Gly Ala
 65                  70                  75                  80

Gln Pro Glu Asp Glu Ala Glu Tyr Tyr Cys Ala Leu Trp Tyr Asp Gly
                 85                  90                  95

Lys Trp Val Phe Gly Gly Gly Thr Lys Leu Thr Val Leu
            100                 105
```

<210> SEQ ID NO 14
<211> LENGTH: 14
<212> TYPE: PRT
<213> ORGANISM: Artificial Sequence
<220> FEATURE:
<223> OTHER INFORMATION: huCD3 1F8 CDRL1

<400> SEQUENCE: 14

```
Arg Ser Ser Thr Gly Ala Val Thr Thr Ser Asn Tyr Ala Asn
 1               5                  10
```

<210> SEQ ID NO 15
<211> LENGTH: 7
<212> TYPE: PRT
<213> ORGANISM: Artificial Sequence
<220> FEATURE:
<223> OTHER INFORMATION: huCD3 1F8 CDRL2

<400> SEQUENCE: 15

```
Gly Thr Asn Lys Arg Ala Pro
 1               5
```

<210> SEQ ID NO 16
<211> LENGTH: 9
<212> TYPE: PRT
<213> ORGANISM: Artificial Sequence
<220> FEATURE:
<223> OTHER INFORMATION: huCD3 1F8 CDRL3

<400> SEQUENCE: 16

```
Ala Leu Trp Tyr Asp Gly Lys Trp Val
 1               5
```

<210> SEQ ID NO 17
<211> LENGTH: 109
<212> TYPE: PRT
<213> ORGANISM: Artificial Sequence
<220> FEATURE:
<223> OTHER INFORMATION: huCD3 VL 1A4

<400> SEQUENCE: 17

```
Gln Thr Val Val Thr Gln Glu Pro Ser Leu Thr Val Ser Pro Gly Gly
 1               5                  10                  15

Thr Val Thr Leu Thr Cys Arg Ser Ser Thr Gly Ala Val Thr Thr Ser
                20                  25                  30

Asn Tyr Ala Asn Trp Phe Gln Gln Lys Pro Gly Gln Ala Pro Arg Gly
             35                  40                  45

Leu Ile Gly Gly Thr Asn Lys Arg Ala Pro Gly Thr Pro Ala Arg Phe
     50                  55                  60

Ser Gly Ser Leu Leu Gly Gly Lys Ala Ala Leu Thr Leu Ser Gly Ala
 65                  70                  75                  80

Gln Pro Glu Asp Glu Ala Glu Tyr Tyr Cys Ala Leu Trp Tyr Lys Gln
                 85                  90                  95

Arg Trp Val Phe Gly Gly Gly Thr Lys Leu Thr Val Leu
            100                 105
```

<210> SEQ ID NO 18
<211> LENGTH: 14
<212> TYPE: PRT
<213> ORGANISM: Artificial Sequence
<220> FEATURE:
<223> OTHER INFORMATION: huCD3 1A4 CDRL1

<400> SEQUENCE: 18

Arg Ser Ser Thr Gly Ala Val Thr Thr Ser Asn Tyr Ala Asn
1               5                   10

<210> SEQ ID NO 19
<211> LENGTH: 7
<212> TYPE: PRT
<213> ORGANISM: Artificial Sequence
<220> FEATURE:
<223> OTHER INFORMATION: huCD3 1A4 CDRL2

<400> SEQUENCE: 19

Gly Thr Asn Lys Arg Ala Pro
1               5

<210> SEQ ID NO 20
<211> LENGTH: 9
<212> TYPE: PRT
<213> ORGANISM: Artificial Sequence
<220> FEATURE:
<223> OTHER INFORMATION: huCD3 1A4 CDRL3

<400> SEQUENCE: 20

Ala Leu Trp Tyr Lys Gln Arg Trp Val
1               5

<210> SEQ ID NO 21
<211> LENGTH: 109
<212> TYPE: PRT
<213> ORGANISM: Artificial Sequence
<220> FEATURE:
<223> OTHER INFORMATION: huCD3 VL 1H4

<400> SEQUENCE: 21

Gln Thr Val Val Thr Gln Glu Pro Ser Leu Thr Val Ser Pro Gly Gly
1               5                   10                  15

Thr Val Thr Leu Thr Cys Arg Ser Ser Thr Gly Ala Val Thr Thr Ser
                20                  25                  30

Asn Tyr Ala Asn Trp Phe Gln Gln Lys Pro Gly Gln Ala Pro Arg Gly
            35                  40                  45

Leu Ile Gly Gly Thr Asn Lys Arg Ala Pro Thr Pro Ala Arg Phe
        50                  55                  60

Ser Gly Ser Leu Leu Gly Gly Lys Ala Ala Leu Thr Leu Ser Gly Ala
65                  70                  75                  80

Gln Pro Glu Asp Glu Ala Glu Tyr Tyr Cys Ala Leu Trp Tyr Asn Gln
                85                  90                  95

His Trp Val Phe Gly Gly Gly Thr Lys Leu Thr Val Leu
            100                 105

<210> SEQ ID NO 22
<211> LENGTH: 14
<212> TYPE: PRT
<213> ORGANISM: Artificial Sequence
<220> FEATURE:
<223> OTHER INFORMATION: huCD3 1H4 CDRL1

<400> SEQUENCE: 22

Arg Ser Ser Thr Gly Ala Val Thr Thr Ser Asn Tyr Ala Asn
1               5                   10

<210> SEQ ID NO 23
<211> LENGTH: 7
<212> TYPE: PRT
<213> ORGANISM: Artificial Sequence
<220> FEATURE:
<223> OTHER INFORMATION: huCD3 1H4 CDRL2

<400> SEQUENCE: 23

Gly Thr Asn Lys Arg Ala Pro
1               5

<210> SEQ ID NO 24
<211> LENGTH: 9
<212> TYPE: PRT
<213> ORGANISM: Artificial Sequence
<220> FEATURE:
<223> OTHER INFORMATION: huCD3 1H4 CDRL3

<400> SEQUENCE: 24

Ala Leu Trp Tyr Asn Gln His Trp Val
1               5

<210> SEQ ID NO 25
<211> LENGTH: 215
<212> TYPE: PRT
<213> ORGANISM: Artificial Sequence
<220> FEATURE:
<223> OTHER INFORMATION: huCD3 1B6 LC

<400> SEQUENCE: 25

Gln Thr Val Val Thr Gln Glu Pro Ser Leu Thr Val Ser Pro Gly Gly
1               5                   10                  15

Thr Val Thr Leu Thr Cys Arg Ser Ser Thr Gly Ala Val Thr Thr Ser
            20                  25                  30

Asn Tyr Ala Asn Trp Phe Gln Gln Lys Pro Gly Gln Ala Pro Arg Gly
        35                  40                  45

Leu Ile Gly Gly Thr Asn Lys Arg Ala Pro Gly Thr Pro Ala Arg Phe
    50                  55                  60

Ser Gly Ser Leu Leu Gly Gly Lys Ala Ala Leu Thr Leu Ser Gly Ala
65                  70                  75                  80

Gln Pro Glu Asp Glu Ala Glu Tyr Tyr Cys Ala Leu Trp Tyr Ala Asn
                85                  90                  95

Arg Trp Val Phe Gly Gly Gly Thr Lys Leu Thr Val Leu Gly Gln Pro
            100                 105                 110

Lys Ala Ala Pro Ser Val Thr Leu Phe Pro Pro Ser Ser Glu Glu Leu
        115                 120                 125

Gln Ala Asn Lys Ala Thr Leu Val Cys Leu Ile Ser Asp Phe Tyr Pro
    130                 135                 140

Gly Ala Val Thr Val Ala Trp Lys Ala Asp Ser Ser Pro Val Lys Ala
145                 150                 155                 160

Gly Val Glu Thr Thr Thr Pro Ser Lys Gln Ser Asn Asn Lys Tyr Ala
                165                 170                 175

Ala Ser Ser Tyr Leu Ser Leu Thr Pro Glu Gln Trp Lys Ser His Arg
            180                 185                 190

Ser Tyr Ser Cys Gln Val Thr His Glu Gly Ser Thr Val Glu Lys Thr

```
                    195                 200                 205

Val Ala Pro Thr Glu Cys Ser
    210                 215

<210> SEQ ID NO 26
<211> LENGTH: 215
<212> TYPE: PRT
<213> ORGANISM: Artificial Sequence
<220> FEATURE:
<223> OTHER INFORMATION: huCD3 1A10 LC

<400> SEQUENCE: 26

Gln Thr Val Val Thr Gln Glu Pro Ser Leu Thr Val Ser Pro Gly Gly
1               5                   10                  15

Thr Val Thr Leu Thr Cys Arg Ser Ser Thr Gly Ala Val Thr Thr Ser
            20                  25                  30

Asn Tyr Ala Asn Trp Phe Gln Gln Lys Pro Gly Gln Ala Pro Arg Gly
        35                  40                  45

Leu Ile Gly Gly Thr Asn Lys Arg Ala Pro Gly Thr Pro Ala Arg Phe
    50                  55                  60

Ser Gly Ser Leu Leu Gly Gly Lys Ala Ala Leu Thr Leu Ser Gly Ala
65                  70                  75                  80

Gln Pro Glu Asp Glu Ala Glu Tyr Tyr Cys Ala Leu Trp Tyr Lys Gly
                85                  90                  95

Tyr Trp Val Phe Gly Gly Gly Thr Lys Leu Thr Val Leu Gly Gln Pro
            100                 105                 110

Lys Ala Ala Pro Ser Val Thr Leu Phe Pro Pro Ser Ser Glu Glu Leu
        115                 120                 125

Gln Ala Asn Lys Ala Thr Leu Val Cys Leu Ile Ser Asp Phe Tyr Pro
    130                 135                 140

Gly Ala Val Thr Val Ala Trp Lys Ala Asp Ser Ser Pro Val Lys Ala
145                 150                 155                 160

Gly Val Glu Thr Thr Thr Pro Ser Lys Gln Ser Asn Asn Lys Tyr Ala
                165                 170                 175

Ala Ser Ser Tyr Leu Ser Leu Thr Pro Glu Gln Trp Lys Ser His Arg
            180                 185                 190

Ser Tyr Ser Cys Gln Val Thr His Glu Gly Ser Thr Val Glu Lys Thr
        195                 200                 205

Val Ala Pro Thr Glu Cys Ser
    210                 215

<210> SEQ ID NO 27
<211> LENGTH: 215
<212> TYPE: PRT
<213> ORGANISM: Artificial Sequence
<220> FEATURE:
<223> OTHER INFORMATION: huCD3 1F8 LC

<400> SEQUENCE: 27

Gln Thr Val Val Thr Gln Glu Pro Ser Leu Thr Val Ser Pro Gly Gly
1               5                   10                  15

Thr Val Thr Leu Thr Cys Arg Ser Ser Thr Gly Ala Val Thr Thr Ser
            20                  25                  30

Asn Tyr Ala Asn Trp Phe Gln Gln Lys Pro Gly Gln Ala Pro Arg Gly
        35                  40                  45

Leu Ile Gly Gly Thr Asn Lys Arg Ala Pro Gly Thr Pro Ala Arg Phe
    50                  55                  60
```

```
Ser Gly Ser Leu Leu Gly Gly Lys Ala Ala Leu Thr Leu Ser Gly Ala
 65                  70                  75                  80

Gln Pro Glu Asp Glu Ala Glu Tyr Tyr Cys Ala Leu Trp Tyr Asp Gly
                 85                  90                  95

Lys Trp Val Phe Gly Gly Gly Thr Lys Leu Thr Val Leu Gly Gln Pro
            100                 105                 110

Lys Ala Ala Pro Ser Val Thr Leu Phe Pro Pro Ser Ser Glu Glu Leu
        115                 120                 125

Gln Ala Asn Lys Ala Thr Leu Val Cys Leu Ile Ser Asp Phe Tyr Pro
    130                 135                 140

Gly Ala Val Thr Val Ala Trp Lys Ala Asp Ser Ser Pro Val Lys Ala
145                 150                 155                 160

Gly Val Glu Thr Thr Thr Pro Ser Lys Gln Ser Asn Asn Lys Tyr Ala
                165                 170                 175

Ala Ser Ser Tyr Leu Ser Leu Thr Pro Glu Gln Trp Lys Ser His Arg
            180                 185                 190

Ser Tyr Ser Cys Gln Val Thr His Glu Gly Ser Thr Val Glu Lys Thr
        195                 200                 205

Val Ala Pro Thr Glu Cys Ser
    210                 215

<210> SEQ ID NO 28
<211> LENGTH: 215
<212> TYPE: PRT
<213> ORGANISM: Artificial Sequence
<220> FEATURE:
<223> OTHER INFORMATION: huCD3 1A4 LC

<400> SEQUENCE: 28

Gln Thr Val Val Thr Gln Glu Pro Ser Leu Thr Val Ser Pro Gly Gly
 1               5                  10                  15

Thr Val Thr Leu Thr Cys Arg Ser Ser Thr Gly Ala Val Thr Thr Ser
            20                  25                  30

Asn Tyr Ala Asn Trp Phe Gln Gln Lys Pro Gly Gln Ala Pro Arg Gly
        35                  40                  45

Leu Ile Gly Gly Thr Asn Lys Arg Ala Pro Gly Thr Pro Ala Arg Phe
 50                  55                  60

Ser Gly Ser Leu Leu Gly Gly Lys Ala Ala Leu Thr Leu Ser Gly Ala
 65                  70                  75                  80

Gln Pro Glu Asp Glu Ala Glu Tyr Tyr Cys Ala Leu Trp Tyr Lys Gln
                 85                  90                  95

Arg Trp Val Phe Gly Gly Gly Thr Lys Leu Thr Val Leu Gly Gln Pro
            100                 105                 110

Lys Ala Ala Pro Ser Val Thr Leu Phe Pro Pro Ser Ser Glu Glu Leu
        115                 120                 125

Gln Ala Asn Lys Ala Thr Leu Val Cys Leu Ile Ser Asp Phe Tyr Pro
    130                 135                 140

Gly Ala Val Thr Val Ala Trp Lys Ala Asp Ser Ser Pro Val Lys Ala
145                 150                 155                 160

Gly Val Glu Thr Thr Thr Pro Ser Lys Gln Ser Asn Asn Lys Tyr Ala
                165                 170                 175

Ala Ser Ser Tyr Leu Ser Leu Thr Pro Glu Gln Trp Lys Ser His Arg
            180                 185                 190

Ser Tyr Ser Cys Gln Val Thr His Glu Gly Ser Thr Val Glu Lys Thr
        195                 200                 205
```

Val Ala Pro Thr Glu Cys Ser
    210                 215

<210> SEQ ID NO 29
<211> LENGTH: 215
<212> TYPE: PRT
<213> ORGANISM: Artificial Sequence
<220> FEATURE:
<223> OTHER INFORMATION: huCD3 1H4 LC

<400> SEQUENCE: 29

Gln Thr Val Val Thr Gln Glu Pro Ser Leu Thr Val Ser Pro Gly Gly
1               5                   10                  15

Thr Val Thr Leu Thr Cys Arg Ser Ser Thr Gly Ala Val Thr Thr Ser
            20                  25                  30

Asn Tyr Ala Asn Trp Phe Gln Gln Lys Pro Gly Gln Ala Pro Arg Gly
        35                  40                  45

Leu Ile Gly Gly Thr Asn Lys Arg Ala Pro Gly Thr Pro Ala Arg Phe
    50                  55                  60

Ser Gly Ser Leu Leu Gly Gly Lys Ala Ala Leu Thr Leu Ser Gly Ala
65                  70                  75                  80

Gln Pro Glu Asp Glu Ala Glu Tyr Tyr Cys Ala Leu Trp Tyr Asn Gln
                85                  90                  95

His Trp Val Phe Gly Gly Gly Thr Lys Leu Thr Val Leu Gly Gln Pro
            100                 105                 110

Lys Ala Ala Pro Ser Val Thr Leu Phe Pro Pro Ser Ser Glu Glu Leu
        115                 120                 125

Gln Ala Asn Lys Ala Thr Leu Val Cys Leu Ile Ser Asp Phe Tyr Pro
    130                 135                 140

Gly Ala Val Thr Val Ala Trp Lys Ala Asp Ser Ser Pro Val Lys Ala
145                 150                 155                 160

Gly Val Glu Thr Thr Thr Pro Ser Lys Gln Ser Asn Asn Lys Tyr Ala
                165                 170                 175

Ala Ser Ser Tyr Leu Ser Leu Thr Pro Glu Gln Trp Lys Ser His Arg
            180                 185                 190

Ser Tyr Ser Cys Gln Val Thr His Glu Gly Ser Thr Val Glu Lys Thr
        195                 200                 205

Val Ala Pro Thr Glu Cys Ser
    210                 215

<210> SEQ ID NO 30
<211> LENGTH: 329
<212> TYPE: PRT
<213> ORGANISM: Artificial Sequence
<220> FEATURE:
<223> OTHER INFORMATION: Common constant heavy chain (WT IgG1)

<400> SEQUENCE: 30

Ala Ser Thr Lys Gly Pro Ser Val Phe Pro Leu Ala Pro Ser Ser Lys
1               5                   10                  15

Ser Thr Ser Gly Gly Thr Ala Ala Leu Gly Cys Leu Val Lys Asp Tyr
            20                  25                  30

Phe Pro Glu Pro Val Thr Val Ser Trp Asn Ser Gly Ala Leu Thr Ser
        35                  40                  45

Gly Val His Thr Phe Pro Ala Val Leu Gln Ser Ser Gly Leu Tyr Ser
    50                  55                  60

Leu Ser Ser Val Val Thr Val Pro Ser Ser Ser Leu Gly Thr Gln Thr
65                  70                  75                  80

```
Tyr Ile Cys Asn Val Asn His Lys Pro Ser Asn Thr Lys Val Asp Lys
                85                  90                  95

Arg Val Glu Pro Lys Ser Cys Asp Lys Thr His Thr Cys Pro Pro Cys
            100                 105                 110

Pro Ala Pro Glu Leu Leu Gly Gly Pro Ser Val Phe Leu Phe Pro Pro
        115                 120                 125

Lys Pro Lys Asp Thr Leu Met Ile Ser Arg Thr Pro Glu Val Thr Cys
    130                 135                 140

Val Val Val Asp Val Ser His Glu Asp Pro Glu Val Lys Phe Asn Trp
145                 150                 155                 160

Tyr Val Asp Gly Val Glu Val His Asn Ala Lys Thr Lys Pro Arg Glu
                165                 170                 175

Glu Gln Tyr Asn Ser Thr Tyr Arg Val Val Ser Val Leu Thr Val Leu
            180                 185                 190

His Gln Asp Trp Leu Asn Gly Lys Glu Tyr Lys Cys Lys Val Ser Asn
        195                 200                 205

Lys Ala Leu Pro Ala Pro Ile Glu Lys Thr Ile Ser Lys Ala Lys Gly
    210                 215                 220

Gln Pro Arg Glu Pro Gln Val Tyr Thr Leu Pro Pro Ser Arg Glu Glu
225                 230                 235                 240

Met Thr Lys Asn Gln Val Ser Leu Thr Cys Leu Val Lys Gly Phe Tyr
                245                 250                 255

Pro Ser Asp Ile Ala Val Glu Trp Glu Ser Asn Gly Gln Pro Glu Asn
            260                 265                 270

Asn Tyr Lys Thr Thr Pro Pro Val Leu Asp Ser Asp Gly Ser Phe Phe
        275                 280                 285

Leu Tyr Ser Lys Leu Thr Val Asp Lys Ser Arg Trp Gln Gln Gly Asn
    290                 295                 300

Val Phe Ser Cys Ser Val Met His Glu Ala Leu His Asn His Tyr Thr
305                 310                 315                 320

Gln Lys Ser Leu Ser Leu Ser Pro Gly
                325

<210> SEQ ID NO 31
<211> LENGTH: 109
<212> TYPE: PRT
<213> ORGANISM: Artificial Sequence
<220> FEATURE:
<223> OTHER INFORMATION: CEA VL AB1 (2F2)

<400> SEQUENCE: 31

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Asn Ser Asn
            20                  25                  30

Leu Asn Trp Tyr Gln Gln Lys Pro Gly Gln Ala Pro Arg Leu Leu Ile
        35                  40                  45

Tyr His Gly Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asp Leu Arg His Glu
                85                  90                  95

His Asn Thr Phe Gly Gln Gly Thr Lys Val Glu Ile Lys
            100                 105
```

<210> SEQ ID NO 32
<211> LENGTH: 11
<212> TYPE: PRT
<213> ORGANISM: Artificial Sequence
<220> FEATURE:
<223> OTHER INFORMATION: CEA AB1 CDRL1

<400> SEQUENCE: 32

Arg Ala Ser Gln Ser Val Asn Ser Asn Leu Asn
1               5                   10

<210> SEQ ID NO 33
<211> LENGTH: 7
<212> TYPE: PRT
<213> ORGANISM: Artificial Sequence
<220> FEATURE:
<223> OTHER INFORMATION: CEA AB1 CDRL2

<400> SEQUENCE: 33

His Gly Ser Asn Arg Ala Thr
1               5

<210> SEQ ID NO 34
<211> LENGTH: 11
<212> TYPE: PRT
<213> ORGANISM: Artificial Sequence
<220> FEATURE:
<223> OTHER INFORMATION: CEA AB1 CDRL3

<400> SEQUENCE: 34

Gln Gln Phe Asp Leu Arg His Glu His Asn Thr
1               5                   10

<210> SEQ ID NO 35
<211> LENGTH: 112
<212> TYPE: PRT
<213> ORGANISM: Artificial Sequence
<220> FEATURE:
<223> OTHER INFORMATION: CEA VL AB8 (2A3)

<400> SEQUENCE: 35

Gln Ser Ala Leu Thr Gln Pro Ala Ser Val Ser Gly Ser Pro Gly Gln
1               5                   10                  15

Ser Ile Thr Ile Ser Cys Thr Gly Thr Ser Ser Asp Val Ile Glu Asn
            20                  25                  30

Ala Ile Val Ser Trp Tyr Gln Gln His Pro Gly Lys Ala Pro Lys Pro
        35                  40                  45

Met Ile Tyr Thr Leu Ser Asp Arg Pro Ser Gly Val Ser Asn Arg Phe
    50                  55                  60

Ser Gly Ser Lys Ser Gly Asn Thr Ala Ser Leu Thr Ile Ser Gly Leu
65                  70                  75                  80

Gln Ala Glu Asp Glu Ala Asp Tyr Tyr Cys Ser Ser Trp Asp Thr Phe
                85                  90                  95

Ala Ile Gly Pro Ala Val Phe Gly Gly Gly Thr Lys Leu Thr Val Leu
            100                 105                 110

<210> SEQ ID NO 36
<211> LENGTH: 14
<212> TYPE: PRT
<213> ORGANISM: Artificial Sequence
<220> FEATURE:
<223> OTHER INFORMATION: CEA AB8 CDRL1

<400> SEQUENCE: 36

Thr Gly Thr Ser Ser Asp Val Ile Glu Asn Ala Ile Val Ser
1               5                   10

<210> SEQ ID NO 37
<211> LENGTH: 7
<212> TYPE: PRT
<213> ORGANISM: Artificial Sequence
<220> FEATURE:
<223> OTHER INFORMATION: CEA AB8 CDRL2

<400> SEQUENCE: 37

Thr Leu Ser Asp Arg Pro Ser
1               5

<210> SEQ ID NO 38
<211> LENGTH: 12
<212> TYPE: PRT
<213> ORGANISM: Artificial Sequence
<220> FEATURE:
<223> OTHER INFORMATION: CEA AB8 CDRL3

<400> SEQUENCE: 38

Ser Ser Trp Asp Thr Phe Ala Ile Gly Pro Ala Val
1               5                   10

<210> SEQ ID NO 39
<211> LENGTH: 117
<212> TYPE: PRT
<213> ORGANISM: Artificial Sequence
<220> FEATURE:
<223> OTHER INFORMATION: Constant kappa light chain (CK)

<400> SEQUENCE: 39

Phe Gly Gln Gly Thr Lys Val Glu Ile Lys Arg Thr Val Ala Ala Pro
1               5                   10                  15

Ser Val Phe Ile Phe Pro Pro Ser Asp Glu Gln Leu Lys Ser Gly Thr
                20                  25                  30

Ala Ser Val Val Cys Leu Leu Asn Asn Phe Tyr Pro Arg Glu Ala Lys
            35                  40                  45

Val Gln Trp Lys Val Asp Asn Ala Leu Gln Ser Gly Asn Ser Gln Glu
    50                  55                  60

Ser Val Thr Glu Gln Asp Ser Lys Asp Ser Thr Tyr Ser Leu Ser Ser
65                  70                  75                  80

Thr Leu Thr Leu Ser Lys Ala Asp Tyr Glu Lys His Lys Val Tyr Ala
                85                  90                  95

Cys Glu Val Thr His Gln Gly Leu Ser Ser Pro Val Thr Lys Ser Phe
                100                 105                 110

Asn Arg Gly Glu Cys
            115

<210> SEQ ID NO 40
<211> LENGTH: 216
<212> TYPE: PRT
<213> ORGANISM: Artificial Sequence
<220> FEATURE:
<223> OTHER INFORMATION: CEA AB1 light chain (VKCK_2F2)

<400> SEQUENCE: 40

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Asn Ser Asn

```
                    20                  25                  30

Leu Asn Trp Tyr Gln Gln Lys Pro Gly Gln Ala Pro Arg Leu Leu Ile
            35                  40                  45

Tyr His Gly Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asp Leu Arg His Glu
                85                  90                  95

His Asn Thr Phe Gly Gln Gly Thr Lys Val Glu Ile Lys Arg Thr Val
                100                 105                 110

Ala Ala Pro Ser Val Phe Ile Phe Pro Pro Ser Asp Glu Gln Leu Lys
            115                 120                 125

Ser Gly Thr Ala Ser Val Val Cys Leu Leu Asn Asn Phe Tyr Pro Arg
        130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
            180                 185                 190

Val Tyr Ala Cys Glu Val Thr His Gln Gly Leu Ser Ser Pro Val Thr
        195                 200                 205

Lys Ser Phe Asn Arg Gly Glu Cys
    210                 215

<210> SEQ ID NO 41
<211> LENGTH: 116
<212> TYPE: PRT
<213> ORGANISM: Artificial Sequence
<220> FEATURE:
<223> OTHER INFORMATION: Constant lambda light chain (CL)

<400> SEQUENCE: 41

Phe Gly Gly Gly Thr Lys Leu Thr Val Leu Gly Gln Pro Lys Ala Ala
1               5                   10                  15

Pro Ser Val Thr Leu Phe Pro Pro Ser Ser Glu Glu Leu Gln Ala Asn
            20                  25                  30

Lys Ala Thr Leu Val Cys Leu Ile Ser Asp Phe Tyr Pro Gly Ala Val
        35                  40                  45

Thr Val Ala Trp Lys Ala Asp Ser Ser Pro Val Lys Ala Gly Val Glu
    50                  55                  60

Thr Thr Thr Pro Ser Lys Gln Ser Asn Asn Lys Tyr Ala Ala Ser Ser
65                  70                  75                  80

Tyr Leu Ser Leu Thr Pro Glu Gln Trp Lys Ser His Arg Ser Tyr Ser
                85                  90                  95

Cys Gln Val Thr His Glu Gly Ser Thr Val Glu Lys Thr Val Ala Pro
                100                 105                 110

Thr Glu Cys Ser
        115

<210> SEQ ID NO 42
<211> LENGTH: 218
<212> TYPE: PRT
<213> ORGANISM: Artificial Sequence
<220> FEATURE:
<223> OTHER INFORMATION: CEA AB8 light chain (VLCL_2A3)
```

<400> SEQUENCE: 42

Gln Ser Ala Leu Thr Gln Pro Ala Ser Val Ser Gly Ser Pro Gly Gln
1               5                   10                  15

Ser Ile Thr Ile Ser Cys Thr Gly Thr Ser Ser Asp Val Ile Glu Asn
            20                  25                  30

Ala Ile Val Ser Trp Tyr Gln Gln His Pro Gly Lys Ala Pro Lys Pro
        35                  40                  45

Met Ile Tyr Thr Leu Ser Asp Arg Pro Ser Gly Val Ser Asn Arg Phe
    50                  55                  60

Ser Gly Ser Lys Ser Gly Asn Thr Ala Ser Leu Thr Ile Ser Gly Leu
65                  70                  75                  80

Gln Ala Glu Asp Glu Ala Asp Tyr Tyr Cys Ser Ser Trp Asp Thr Phe
                85                  90                  95

Ala Ile Gly Pro Ala Val Phe Gly Gly Thr Lys Leu Thr Val Leu
            100                 105                 110

Gly Gln Pro Lys Ala Ala Pro Ser Val Thr Leu Phe Pro Pro Ser Ser
        115                 120                 125

Glu Glu Leu Gln Ala Asn Lys Ala Thr Leu Val Cys Leu Ile Ser Asp
130                 135                 140

Phe Tyr Pro Gly Ala Val Thr Val Ala Trp Lys Ala Asp Ser Ser Pro
145                 150                 155                 160

Val Lys Ala Gly Val Glu Thr Thr Thr Pro Ser Lys Gln Ser Asn Asn
                165                 170                 175

Lys Tyr Ala Ala Ser Ser Tyr Leu Ser Leu Thr Pro Glu Gln Trp Lys
            180                 185                 190

Ser His Arg Ser Tyr Ser Cys Gln Val Thr His Glu Gly Ser Thr Val
        195                 200                 205

Glu Lys Thr Val Ala Pro Thr Glu Cys Ser
    210                 215

<210> SEQ ID NO 43
<211> LENGTH: 454
<212> TYPE: PRT
<213> ORGANISM: Artificial Sequence
<220> FEATURE:
<223> OTHER INFORMATION: Common heavy chain (wild-type)

<400> SEQUENCE: 43

Glu Val Gln Leu Val Glu Ser Gly Gly Gly Leu Val Gln Pro Gly Gly
1               5                   10                  15

Ser Leu Lys Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Gly Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Ala Tyr Leu Gln Met Asn Ser Leu Lys Thr Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Leu Val Thr Val Ser Ser Ala Ser Thr
        115                 120                 125

Lys Gly Pro Ser Val Phe Pro Leu Ala Pro Ser Ser Lys Ser Thr Ser
            130                 135                 140

Gly Gly Thr Ala Ala Leu Gly Cys Leu Val Lys Asp Tyr Phe Pro Glu
145                 150                 155                 160

Pro Val Thr Val Ser Trp Asn Ser Gly Ala Leu Thr Ser Gly Val His
                165                 170                 175

Thr Phe Pro Ala Val Leu Gln Ser Ser Gly Leu Tyr Ser Leu Ser Ser
            180                 185                 190

Val Val Thr Val Pro Ser Ser Leu Gly Thr Gln Thr Tyr Ile Cys
            195                 200                 205

Asn Val Asn His Lys Pro Ser Asn Thr Lys Val Asp Lys Arg Val Glu
210                 215                 220

Pro Lys Ser Cys Asp Lys Thr His Thr Cys Pro Pro Cys Pro Ala Pro
225                 230                 235                 240

Glu Leu Leu Gly Gly Pro Ser Val Phe Leu Phe Pro Pro Lys Pro Lys
                245                 250                 255

Asp Thr Leu Met Ile Ser Arg Thr Pro Glu Val Thr Cys Val Val Val
            260                 265                 270

Asp Val Ser His Glu Asp Pro Glu Val Lys Phe Asn Trp Tyr Val Asp
            275                 280                 285

Gly Val Glu Val His Asn Ala Lys Thr Lys Pro Arg Glu Glu Gln Tyr
290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Ala Leu
                325                 330                 335

Pro Ala Pro Ile Glu Lys Thr Ile Ser Lys Ala Lys Gly Gln Pro Arg
            340                 345                 350

Glu Pro Gln Val Tyr Thr Leu Pro Pro Ser Arg Glu Glu Met Thr Lys
            355                 360                 365

Asn Gln Val Ser Leu Thr Cys Leu Val Lys Gly Phe Tyr Pro Ser Asp
370                 375                 380

Ile Ala Val Glu Trp Glu Ser Asn Gly Gln Pro Glu Asn Asn Tyr Lys
385                 390                 395                 400

Thr Thr Pro Pro Val Leu Asp Ser Asp Gly Ser Phe Phe Leu Tyr Ser
                405                 410                 415

Lys Leu Thr Val Asp Lys Ser Arg Trp Gln Gln Gly Asn Val Phe Ser
            420                 425                 430

Cys Ser Val Met His Glu Ala Leu His Asn His Tyr Thr Gln Lys Ser
            435                 440                 445

Leu Ser Leu Ser Pro Gly
    450

<210> SEQ ID NO 44
<211> LENGTH: 454
<212> TYPE: PRT
<213> ORGANISM: Artificial Sequence
<220> FEATURE:
<223> OTHER INFORMATION: Common heavy chain (LALA mutation)

<400> SEQUENCE: 44

Glu Val Gln Leu Val Glu Ser Gly Gly Gly Leu Val Gln Pro Gly Gly
1               5                   10                  15

Ser Leu Lys Leu Ser Cys Ala Ala Ser Gly Phe Thr Phe Asn Thr Tyr
            20                  25                  30

```
Ala Met Asn Trp Val Arg Gln Ala Pro Gly Lys Gly Leu Glu Trp Val
         35                  40                  45
Gly Arg Ile Arg Ser Lys Tyr Asn Asn Tyr Ala Thr Tyr Tyr Ala Asp
 50                  55                  60
Ser Val Lys Asp Arg Phe Thr Ile Ser Arg Asp Asp Ser Lys Asn Thr
 65                  70                  75                  80
Ala Tyr Leu Gln Met Asn Ser Leu Lys Thr Glu Asp Thr Ala Val Tyr
             85                  90                  95
Tyr Cys Val Arg His Gly Asn Phe Gly Asn Ser Tyr Val Ser Trp Phe
            100                 105                 110
Ala Tyr Trp Gly Gln Gly Thr Leu Val Thr Val Ser Ser Ala Ser Thr
        115                 120                 125
Lys Gly Pro Ser Val Phe Pro Leu Ala Pro Ser Ser Lys Ser Thr Ser
130                 135                 140
Gly Gly Thr Ala Ala Leu Gly Cys Leu Val Lys Asp Tyr Phe Pro Glu
145                 150                 155                 160
Pro Val Thr Val Ser Trp Asn Ser Gly Ala Leu Thr Ser Gly Val His
                165                 170                 175
Thr Phe Pro Ala Val Leu Gln Ser Ser Gly Leu Tyr Ser Leu Ser Ser
            180                 185                 190
Val Val Thr Val Pro Ser Ser Ser Leu Gly Thr Gln Thr Tyr Ile Cys
        195                 200                 205
Asn Val Asn His Lys Pro Ser Asn Thr Lys Val Asp Lys Arg Val Glu
    210                 215                 220
Pro Lys Ser Cys Asp Lys Thr His Thr Cys Pro Pro Cys Pro Ala Pro
225                 230                 235                 240
Glu Ala Ala Gly Gly Pro Ser Val Phe Leu Phe Pro Pro Lys Pro Lys
                245                 250                 255
Asp Thr Leu Met Ile Ser Arg Thr Pro Glu Val Thr Cys Val Val Val
            260                 265                 270
Asp Val Ser His Glu Asp Pro Glu Val Lys Phe Asn Trp Tyr Val Asp
        275                 280                 285
Gly Val Glu Val His Asn Ala Lys Thr Lys Pro Arg Glu Glu Gln Tyr
    290                 295                 300
Asn Ser Thr Tyr Arg Val Val Ser Val Leu Thr Val Leu His Gln Asp
305                 310                 315                 320
Trp Leu Asn Gly Lys Glu Tyr Lys Cys Lys Val Ser Asn Lys Ala Leu
                325                 330                 335
Pro Ala Pro Ile Glu Lys Thr Ile Ser Lys Ala Lys Gly Gln Pro Arg
            340                 345                 350
Glu Pro Gln Val Tyr Thr Leu Pro Pro Ser Arg Glu Glu Met Thr Lys
        355                 360                 365
Asn Gln Val Ser Leu Thr Cys Leu Val Lys Gly Phe Tyr Pro Ser Asp
    370                 375                 380
Ile Ala Val Glu Trp Glu Ser Asn Gly Gln Pro Glu Asn Asn Tyr Lys
385                 390                 395                 400
Thr Thr Pro Pro Val Leu Asp Ser Asp Gly Ser Phe Phe Leu Tyr Ser
                405                 410                 415
Lys Leu Thr Val Asp Lys Ser Arg Trp Gln Gln Gly Asn Val Phe Ser
            420                 425                 430
Cys Ser Val Met His Glu Ala Leu His Asn His Tyr Thr Gln Lys Ser
        435                 440                 445
Leu Ser Leu Ser Pro Gly
```

<210> SEQ ID NO 45
<211> LENGTH: 454
<212> TYPE: PRT
<213> ORGANISM: Artificial Sequence
<220> FEATURE:
<223> OTHER INFORMATION: Common heavy chain (LALA+P329A mutation)

<400> SEQUENCE: 45

Glu Val Gln Leu Val Glu Ser Gly Gly Gly Leu Val Gln Pro Gly Gly
1               5                   10                  15

Ser Leu Lys Leu Ser Cys Ala Ala Ser Gly Phe Thr Phe Asn Thr Tyr
            20                  25                  30

Ala Met Asn Trp Val Arg Gln Ala Pro Gly Lys Gly Leu Glu Trp Val
        35                  40                  45

Gly Arg Ile Arg Ser Lys Tyr Asn Asn Tyr Ala Thr Tyr Tyr Ala Asp
    50                  55                  60

Ser Val Lys Asp Arg Phe Thr Ile Ser Arg Asp Asp Ser Lys Asn Thr
65                  70                  75                  80

Ala Tyr Leu Gln Met Asn Ser Leu Lys Thr Glu Asp Thr Ala Val Tyr
                85                  90                  95

Tyr Cys Val Arg His Gly Asn Phe Gly Asn Ser Tyr Val Ser Trp Phe
            100                 105                 110

Ala Tyr Trp Gly Gln Gly Thr Leu Val Thr Val Ser Ser Ala Ser Thr
        115                 120                 125

Lys Gly Pro Ser Val Phe Pro Leu Ala Pro Ser Ser Lys Ser Thr Ser
    130                 135                 140

Gly Gly Thr Ala Ala Leu Gly Cys Leu Val Lys Asp Tyr Phe Pro Glu
145                 150                 155                 160

Pro Val Thr Val Ser Trp Asn Ser Gly Ala Leu Thr Ser Gly Val His
                165                 170                 175

Thr Phe Pro Ala Val Leu Gln Ser Ser Gly Leu Tyr Ser Leu Ser Ser
            180                 185                 190

Val Val Thr Val Pro Ser Ser Ser Leu Gly Thr Gln Thr Tyr Ile Cys
        195                 200                 205

Asn Val Asn His Lys Pro Ser Asn Thr Lys Val Asp Lys Arg Val Glu
    210                 215                 220

Pro Lys Ser Cys Asp Lys Thr His Thr Cys Pro Pro Cys Pro Ala Pro
225                 230                 235                 240

Glu Ala Ala Gly Gly Pro Ser Val Phe Leu Phe Pro Pro Lys Pro Lys
                245                 250                 255

Asp Thr Leu Met Ile Ser Arg Thr Pro Glu Val Thr Cys Val Val Val
            260                 265                 270

Asp Val Ser His Glu Asp Pro Glu Val Lys Phe Asn Trp Tyr Val Asp
        275                 280                 285

Gly Val Glu Val His Asn Ala Lys Thr Lys Pro Arg Glu Glu Gln Tyr
    290                 295                 300

Asn Ser Thr Tyr Arg Val Val Ser Val Leu Thr Val Leu His Gln Asp
305                 310                 315                 320

Trp Leu Asn Gly Lys Glu Tyr Lys Cys Lys Val Ser Asn Lys Ala Leu
                325                 330                 335

Ala Ala Pro Ile Glu Lys Thr Ile Ser Lys Ala Lys Gly Gln Pro Arg
            340                 345                 350

Glu Pro Gln Val Tyr Thr Leu Pro Pro Ser Arg Glu Glu Met Thr Lys

```
                355                 360                 365
Asn Gln Val Ser Leu Thr Cys Leu Val Lys Gly Phe Tyr Pro Ser Asp
        370                 375                 380

Ile Ala Val Glu Trp Glu Ser Asn Gly Gln Pro Glu Asn Asn Tyr Lys
385                 390                 395                 400

Thr Thr Pro Pro Val Leu Asp Ser Asp Gly Ser Phe Phe Leu Tyr Ser
                405                 410                 415

Lys Leu Thr Val Asp Lys Ser Arg Trp Gln Gln Gly Asn Val Phe Ser
                420                 425                 430

Cys Ser Val Met His Glu Ala Leu His Asn His Tyr Thr Gln Lys Ser
                435                 440                 445

Leu Ser Leu Ser Pro Gly
                450

<210> SEQ ID NO 46
<211> LENGTH: 106
<212> TYPE: PRT
<213> ORGANISM: Artificial Sequence
<220> FEATURE:
<223> OTHER INFORMATION: VK_SM3E

<400> SEQUENCE: 46

Glu Asn Val Leu Thr Gln Ser Pro Ser Ser Met Ser Val Ser Val Gly
1               5                   10                  15

Asp Arg Val Asn Ile Ala Cys Ser Ala Ser Ser Ser Val Pro Tyr Met
                20                  25                  30

His Trp Leu Gln Gln Lys Pro Gly Lys Ser Pro Lys Leu Leu Ile Tyr
            35                  40                  45

Leu Thr Ser Asn Leu Ala Ser Gly Val Pro Ser Arg Phe Ser Gly Ser
        50                  55                  60

Gly Ser Gly Thr Asp Tyr Ser Leu Thr Ile Ser Ser Val Gln Pro Glu
65                  70                  75                  80

Asp Ala Ala Thr Tyr Tyr Cys Gln Gln Arg Ser Ser Tyr Pro Leu Thr
                85                  90                  95

Phe Gly Gly Gly Thr Lys Leu Glu Ile Lys
            100                 105

<210> SEQ ID NO 47
<211> LENGTH: 120
<212> TYPE: PRT
<213> ORGANISM: Artificial Sequence
<220> FEATURE:
<223> OTHER INFORMATION: VH_SM3E

<400> SEQUENCE: 47

Gln Val Lys Leu Glu Gln Ser Gly Ala Glu Val Val Lys Pro Gly Ala
1               5                   10                  15

Ser Val Lys Leu Ser Cys Lys Ala Ser Gly Phe Asn Ile Lys Asp Ser
                20                  25                  30

Tyr Met His Trp Leu Arg Gln Gly Pro Gly Gln Arg Leu Glu Trp Ile
            35                  40                  45

Gly Trp Ile Asp Pro Glu Asn Gly Asp Thr Glu Tyr Ala Pro Lys Phe
        50                  55                  60

Gln Gly Lys Ala Thr Phe Thr Thr Asp Thr Ser Ala Asn Thr Ala Tyr
65                  70                  75                  80

Leu Gly Leu Ser Ser Leu Arg Pro Glu Asp Thr Ala Val Tyr Tyr Cys
                85                  90                  95
```

Asn Glu Gly Thr Pro Thr Gly Pro Tyr Tyr Phe Asp Tyr Trp Gly Gln
            100                 105                 110

Gly Thr Leu Val Thr Val Ser Ser
        115                 120

<210> SEQ ID NO 48
<211> LENGTH: 116
<212> TYPE: PRT
<213> ORGANISM: Artificial Sequence
<220> FEATURE:
<223> OTHER INFORMATION: VL_MEDI

<400> SEQUENCE: 48

Gln Ala Val Leu Thr Gln Pro Ala Ser Leu Ser Ala Ser Pro Gly Ala
1               5                   10                  15

Ser Ala Ser Leu Thr Cys Thr Leu Arg Arg Gly Ile Asn Val Gly Ala
            20                  25                  30

Tyr Ser Ile Tyr Trp Tyr Gln Gln Lys Pro Gly Ser Pro Pro Gln Tyr
        35                  40                  45

Leu Leu Arg Tyr Lys Ser Asp Ser Asp Lys Gln Gln Gly Ser Gly Val
    50                  55                  60

Ser Ser Arg Phe Ser Ala Ser Lys Asp Ala Ser Ala Asn Ala Gly Ile
65                  70                  75                  80

Leu Leu Ile Ser Gly Leu Gln Ser Glu Asp Glu Ala Asp Tyr Tyr Cys
                85                  90                  95

Met Ile Trp His Ser Gly Ala Ser Ala Val Phe Gly Gly Gly Thr Lys
            100                 105                 110

Leu Thr Val Leu
        115

<210> SEQ ID NO 49
<211> LENGTH: 121
<212> TYPE: PRT
<213> ORGANISM: Artificial Sequence
<220> FEATURE:
<223> OTHER INFORMATION: VH_MEDI

<400> SEQUENCE: 49

Glu Val Gln Leu Val Glu Ser Gly Gly Gly Leu Val Gln Pro Gly Arg
1               5                   10                  15

Ser Leu Arg Leu Ser Cys Ala Ala Ser Gly Phe Thr Ser Ser Tyr
            20                  25                  30

Trp Met His Trp Val Arg Gln Ala Pro Gly Lys Gly Leu Glu Trp Val
        35                  40                  45

Gly Phe Ile Arg Asn Lys Ala Asn Gly Gly Thr Thr Glu Tyr Ala Ala
    50                  55                  60

Ser Val Lys Gly Arg Phe Thr Ile Ser Arg Asp Asp Ser Lys Asn Thr
65                  70                  75                  80

Leu Tyr Leu Gln Met Asn Ser Leu Arg Ala Glu Asp Thr Ala Val Tyr
                85                  90                  95

Tyr Cys Ala Arg Asp Arg Gly Leu Arg Phe Tyr Phe Asp Tyr Trp Gly
            100                 105                 110

Gln Gly Thr Thr Val Thr Val Ser Ser
        115                 120

<210> SEQ ID NO 50
<211> LENGTH: 107
<212> TYPE: PRT
<213> ORGANISM: Artificial Sequence

<220> FEATURE:
<223> OTHER INFORMATION: VK_SAR

<400> SEQUENCE: 50

Asp Ile Gln Met Thr Gln Ser Pro Ser Ser Leu Ser Ala Ser Val Gly
1               5                   10                  15

Asp Arg Val Thr Ile Thr Cys Arg Ala Ser Glu Asn Ile Phe Ser Tyr
            20                  25                  30

Leu Ala Trp Tyr Gln Gln Lys Pro Gly Lys Ala Pro Lys Leu Leu Ile
        35                  40                  45

Tyr Asn Thr Arg Thr Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln His Tyr Gly Thr Pro
                85                  90                  95

Thr Phe Gly Gln Gly Thr Lys Leu Glu Ile Lys
            100                 105

<210> SEQ ID NO 51
<211> LENGTH: 120
<212> TYPE: PRT
<213> ORGANISM: Artificial Sequence
<220> FEATURE:
<223> OTHER INFORMATION: VH_SAR

<400> SEQUENCE: 51

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Val Phe Ser Ser Tyr
            20                  25                  30

Asp Met Ser Trp Val Arg Gln Ala Pro Gly Lys Gly Leu Glu Trp Val
        35                  40                  45

Ser Tyr Ile Ser Ser Gly Gly Gly Ile Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Ala His Tyr Phe Gly Ser Ser Gly Pro Phe Ala Tyr Trp Gly Gln
            100                 105                 110

Gly Thr Leu Val Thr Val Ser Ser
        115                 120

<210> SEQ ID NO 52
<211> LENGTH: 108
<212> TYPE: PRT
<213> ORGANISM: Artificial Sequence
<220> FEATURE:
<223> OTHER INFORMATION: VK_CH1A1A

<400> SEQUENCE: 52

Asp Ile Gln Met Thr Gln Ser Pro Ser Ser Leu Ser Ala Ser Val Gly
1               5                   10                  15

Asp Arg Val Thr Ile Thr Cys Lys Ala Ser Ala Ala Val Gly Thr Tyr
            20                  25                  30

Val Ala Trp Tyr Gln Gln Lys Pro Gly Lys Ala Pro Lys Leu Leu Ile
        35                  40                  45

-continued

Tyr Ser Ala Ser Tyr Arg Lys Arg Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys His Gln Tyr Tyr Thr Tyr Pro Leu
                85                  90                  95

Phe Thr Phe Gly Gln Gly Thr Lys Leu Glu Ile Lys
                100                 105

<210> SEQ ID NO 53
<211> LENGTH: 121
<212> TYPE: PRT
<213> ORGANISM: Artificial Sequence
<220> FEATURE:
<223> OTHER INFORMATION: VH_ CH1A1A

<400> SEQUENCE: 53

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Glu Phe
                20                  25                  30

Gly Met Asn Trp Val Arg Gln Ala Pro Gly Gln Gly Leu Glu Trp Met
            35                  40                  45

Gly Trp Ile Asn Thr Lys Thr Gly Glu Ala Thr Tyr Val Glu Glu Phe
        50                  55                  60

Lys Gly Arg Val Thr Phe Thr Thr Asp Thr Ser Thr Ser Thr Ala Tyr
65                  70                  75                  80

Met Glu Leu Arg Ser Leu Arg Ser Asp Asp Thr Ala Val Tyr Tyr Cys
                85                  90                  95

Ala Arg Trp Asp Phe Ala Tyr Tyr Val Glu Ala Met Asp Tyr Trp Gly
                100                 105                 110

Gln Gly Thr Thr Val Thr Val Ser Ser
        115                 120

<210> SEQ ID NO 54
<211> LENGTH: 111
<212> TYPE: PRT
<213> ORGANISM: Artificial Sequence
<220> FEATURE:
<223> OTHER INFORMATION: VK_T84.66

<400> SEQUENCE: 54

Glu Ile Val Leu Thr Gln Ser Pro Ala Thr Leu Ser Leu Ser Pro Gly
1               5                   10                  15

Glu Arg Ala Thr Leu Ser Cys Arg Ala Gly Glu Ser Val Asp Ile Phe
                20                  25                  30

Gly Val Gly Phe Leu His Trp Tyr Gln Gln Lys Pro Gly Gln Ala Pro
            35                  40                  45

Arg Leu Leu Ile Tyr Arg Ala Ser Asn Arg Ala Thr Gly Ile Pro Ala
        50                  55                  60

Arg Phe Ser Gly Ser Gly Ser Gly Thr Asp Phe Thr Leu Thr Ile Ser
65                  70                  75                  80

Ser Leu Glu Pro Glu Asp Phe Ala Val Tyr Tyr Cys Gln Gln Thr Asn
                85                  90                  95

Glu Asp Pro Tyr Thr Phe Gly Gln Gly Thr Lys Leu Glu Ile Lys
                100                 105                 110

<210> SEQ ID NO 55

<211> LENGTH: 121
<212> TYPE: PRT
<213> ORGANISM: Artificial Sequence
<220> FEATURE:
<223> OTHER INFORMATION: VH_T84.66

<400> SEQUENCE: 55

Gln Val Gln Leu Val Gln Ser Gly Ala Glu Val Lys Lys Pro Gly Ser
1               5                   10                  15

Ser Val Lys Val Ser Cys Lys Ala Ser Gly Phe Asn Ile Lys Asp Thr
            20                  25                  30

Tyr Met His Trp Val Arg Gln Ala Pro Gly Gln Gly Leu Glu Trp Met
        35                  40                  45

Gly Arg Ile Asp Pro Ala Asn Gly Asn Ser Lys Tyr Val Pro Lys Phe
    50                  55                  60

Gln Gly Arg Val Thr Ile Thr Ala Asp Thr Ser Thr Ser Thr Ala Tyr
65                  70                  75                  80

Met Glu Leu Ser Ser Leu Arg Ser Glu Asp Thr Ala Val Tyr Tyr Cys
                85                  90                  95

Ala Pro Phe Gly Tyr Tyr Val Ser Asp Tyr Ala Met Ala Tyr Trp Gly
            100                 105                 110

Gln Gly Thr Leu Val Thr Val Ser Ser
        115                 120

<210> SEQ ID NO 56
<211> LENGTH: 106
<212> TYPE: PRT
<213> ORGANISM: Artificial Sequence
<220> FEATURE:
<223> OTHER INFORMATION: VK_LABETUZUMAB

<400> SEQUENCE: 56

Asp Ile Gln Leu Thr Gln Ser Pro Ser Ser Leu Ser Ala Ser Val Gly
1               5                   10                  15

Asp Arg Val Thr Ile Thr Cys Lys Ala Ser Gln Asp Val Gly Thr Ser
            20                  25                  30

Val Ala Trp Tyr Gln Gln Lys Pro Gly Lys Ala Pro Lys Leu Leu Ile
        35                  40                  45

Tyr Trp Thr Ser Thr Arg His Thr Gly Val Pro Ser Arg Phe Ser Gly
    50                  55                  60

Ser Gly Ser Gly Thr Asp Phe Thr Phe Thr Ile Ser Ser Leu Gln Pro
65                  70                  75                  80

Glu Asp Ile Ala Thr Tyr Tyr Cys Gln Gln Tyr Ser Leu Tyr Arg Ser
                85                  90                  95

Phe Gly Gln Gly Thr Lys Val Glu Ile Lys
            100                 105

<210> SEQ ID NO 57
<211> LENGTH: 119
<212> TYPE: PRT
<213> ORGANISM: Artificial Sequence
<220> FEATURE:
<223> OTHER INFORMATION: VH_LABETUZUMAB

<400> SEQUENCE: 57

Glu Val Gln Leu Val Glu Ser Gly Gly Gly Val Val Gln Pro Gly Arg
1               5                   10                  15

Ser Leu Arg Leu Ser Cys Ser Ala Ser Gly Phe Asp Phe Thr Thr Tyr
            20                  25                  30

```
Trp Met Ser Trp Val Arg Gln Ala Pro Gly Lys Gly Leu Glu Trp Ile
            35                  40                  45

Gly Glu Ile His Pro Asp Ser Ser Thr Ile Asn Tyr Ala Pro Ser Leu
    50                  55                  60

Lys Asp Arg Phe Thr Ile Ser Arg Asp Asn Ala Lys Asn Thr Leu Phe
65                  70                  75                  80

Leu Gln Met Asp Ser Leu Arg Pro Glu Asp Thr Gly Val Tyr Phe Cys
                85                  90                  95

Ala Ser Leu Tyr Phe Gly Phe Pro Trp Phe Ala Tyr Trp Gly Gln Gly
                100                 105                 110

Thr Pro Val Thr Val Ser Ser
            115

<210> SEQ ID NO 58
<211> LENGTH: 118
<212> TYPE: PRT
<213> ORGANISM: Artificial Sequence
<220> FEATURE:
<223> OTHER INFORMATION: Constant hybrid-kappa light chain (H-CK 5)

<400> SEQUENCE: 58

Phe Gly Gly Gly Thr Lys Leu Thr Val Leu Gly Arg Thr Val Ala Ala
1               5                   10                  15

Pro Ser Val Phe Ile Phe Pro Pro Ser Asp Glu Gln Leu Lys Ser Gly
            20                  25                  30

Thr Ala Ser Val Val Cys Leu Leu Asn Asn Phe Tyr Pro Arg Glu Ala
        35                  40                  45

Lys Val Gln Trp Lys Val Asp Asn Ala Leu Gln Ser Gly Asn Ser Gln
    50                  55                  60

Glu Ser Val Thr Glu Gln Asp Ser Lys Asp Ser Thr Tyr Ser Leu Ser
65                  70                  75                  80

Ser Thr Leu Thr Leu Ser Lys Ala Asp Tyr Glu Lys His Lys Val Tyr
                85                  90                  95

Ala Cys Glu Val Thr His Gln Gly Leu Ser Ser Pro Val Thr Lys Ser
                100                 105                 110

Phe Asn Arg Gly Glu Cys
            115

<210> SEQ ID NO 59
<211> LENGTH: 110
<212> TYPE: PRT
<213> ORGANISM: Artificial Sequence
<220> FEATURE:
<223> OTHER INFORMATION: CEA VL 1B4

<400> SEQUENCE: 59

Ser Tyr Val Leu Thr Gln Pro Pro Ser Val Ser Val Ala Pro Gly Lys
1               5                   10                  15

Thr Ala Arg Ile Thr Cys Gly Gly Asn Leu Ile Gly Lys Asn Ala Val
            20                  25                  30

His Trp Tyr Gln Gln Lys Pro Gly Gln Ala Pro Val Leu Val Ile Tyr
        35                  40                  45

Asn Tyr Gly Ile Arg Pro Ser Gly Ile Pro Glu Arg Phe Ser Gly Ser
    50                  55                  60

Asn Ser Gly Asn Thr Ala Thr Leu Thr Ile Ser Arg Val Glu Ala Gly
65                  70                  75                  80

Asp Glu Ala Asp Tyr Tyr Cys Gln Val Trp Asp Thr Leu Lys Leu Glu
                85                  90                  95
```

Pro Asp Ala Val Phe Gly Gly Gly Thr Lys Leu Thr Val Leu
            100                 105                 110

<210> SEQ ID NO 60
<211> LENGTH: 11
<212> TYPE: PRT
<213> ORGANISM: Artificial Sequence
<220> FEATURE:
<223> OTHER INFORMATION: CEA 1B4 CDRL1

<400> SEQUENCE: 60

Gly Gly Asn Leu Ile Gly Lys Asn Ala Val His
1               5                   10

<210> SEQ ID NO 61
<211> LENGTH: 7
<212> TYPE: PRT
<213> ORGANISM: Artificial Sequence
<220> FEATURE:
<223> OTHER INFORMATION: CEA 1B4 CDRL2

<400> SEQUENCE: 61

Asn Tyr Gly Ile Arg Pro Ser
1               5

<210> SEQ ID NO 62
<211> LENGTH: 13
<212> TYPE: PRT
<213> ORGANISM: Artificial Sequence
<220> FEATURE:
<223> OTHER INFORMATION: CEA 1B4 CDRL3

<400> SEQUENCE: 62

Gln Val Trp Asp Thr Leu Lys Leu Glu Pro Asp Ala Val
1               5                   10

<210> SEQ ID NO 63
<211> LENGTH: 107
<212> TYPE: PRT
<213> ORGANISM: Artificial Sequence
<220> FEATURE:
<223> OTHER INFORMATION: CEA VL C11

<400> SEQUENCE: 63

Asp Ile Gln Met Thr Gln Ser Pro Ser Thr Leu Ser Ala Ser Val Gly
1               5                   10                  15

Asp Arg Val Thr Ile Thr Cys Arg Ala Ser Gln Leu Ile Ser Asn Gly
            20                  25                  30

Leu Tyr Trp Tyr Gln Gln Lys Pro Gly Lys Ala Pro Lys Leu Leu Ile
        35                  40                  45

Tyr Asp Ala Ser Ile Leu Glu Ser Gly Val Pro Ser Arg Phe Ser Gly
    50                  55                  60

Ser Gly Ser Gly Thr Glu Phe Thr Leu Thr Ile Ser Ser Leu Gln Pro
65                  70                  75                  80

Asp Asp Phe Ala Thr Tyr Tyr Cys Gln Gln Arg Leu Ser Trp Pro Leu
                85                  90                  95

Thr Phe Gly Gln Gly Thr Lys Val Glu Ile Lys
            100                 105

<210> SEQ ID NO 64
<211> LENGTH: 11
<212> TYPE: PRT
<213> ORGANISM: Artificial Sequence -continued

<220> FEATURE:
<223> OTHER INFORMATION: CEA C11 CDRL1

<400> SEQUENCE: 64

Arg Ala Ser Gln Leu Ile Ser Asn Gly Leu Tyr
1               5                   10

<210> SEQ ID NO 65
<211> LENGTH: 7
<212> TYPE: PRT
<213> ORGANISM: Artificial Sequence
<220> FEATURE:
<223> OTHER INFORMATION: CEA C11 CDRL2

<400> SEQUENCE: 65

Asp Ala Ser Ile Leu Glu Ser
1               5

<210> SEQ ID NO 66
<211> LENGTH: 9
<212> TYPE: PRT
<213> ORGANISM: Artificial Sequence
<220> FEATURE:
<223> OTHER INFORMATION: CEA C11 CDRL3

<400> SEQUENCE: 66

Gln Gln Arg Leu Ser Trp Pro Leu Thr
1               5

<210> SEQ ID NO 67
<211> LENGTH: 217
<212> TYPE: PRT
<213> ORGANISM: Artificial Sequence
<220> FEATURE:
<223> OTHER INFORMATION: huCD3 1B6 LC-hybrid kappa

<400> SEQUENCE: 67

Gln Thr Val Val Thr Gln Glu Pro Ser Leu Thr Val Ser Pro Gly Gly
1               5                   10                  15

Thr Val Thr Leu Thr Cys Arg Ser Ser Thr Gly Ala Val Thr Thr Ser
            20                  25                  30

Asn Tyr Ala Asn Trp Phe Gln Gln Lys Pro Gly Gln Ala Pro Arg Gly
        35                  40                  45

Leu Ile Gly Gly Thr Asn Lys Arg Ala Pro Gly Thr Pro Ala Arg Phe
    50                  55                  60

Ser Gly Ser Leu Leu Gly Gly Lys Ala Ala Leu Thr Leu Ser Gly Ala
65                  70                  75                  80

Gln Pro Glu Asp Glu Ala Glu Tyr Tyr Cys Ala Leu Trp Tyr Ala Asn
                85                  90                  95

Arg Trp Val Phe Gly Gly Gly Thr Lys Leu Thr Val Leu Gly Arg Thr
            100                 105                 110

Val Ala Ala Pro Ser Val Phe Ile Phe Pro Pro Ser Asp Glu Gln Leu
        115                 120                 125

Lys Ser Gly Thr Ala Ser Val Val Cys Leu Leu Asn Asn Phe Tyr Pro
    130                 135                 140

Arg Glu Ala Lys Val Gln Trp Lys Val Asp Asn Ala Leu Gln Ser Gly
145                 150                 155                 160

Asn Ser Gln Glu Ser Val Thr Glu Gln Asp Ser Lys Asp Ser Thr Tyr
                165                 170                 175

Ser Leu Ser Ser Thr Leu Thr Leu Ser Lys Ala Asp Tyr Glu Lys His
            180                 185                 190

```
Lys Val Tyr Ala Cys Glu Val Thr His Gln Gly Leu Ser Ser Pro Val
        195                 200                 205

Thr Lys Ser Phe Asn Arg Gly Glu Cys
    210                 215
```

<210> SEQ ID NO 68
<211> LENGTH: 217
<212> TYPE: PRT
<213> ORGANISM: Artificial Sequence
<220> FEATURE:
<223> OTHER INFORMATION: huCD3 1A10 LC-hybrid kappa

<400> SEQUENCE: 68

```
Gln Thr Val Val Thr Gln Glu Pro Ser Leu Thr Val Ser Pro Gly Gly
1               5                   10                  15

Thr Val Thr Leu Thr Cys Arg Ser Ser Thr Gly Ala Val Thr Thr Ser
            20                  25                  30

Asn Tyr Ala Asn Trp Phe Gln Gln Lys Pro Gly Gln Ala Pro Arg Gly
        35                  40                  45

Leu Ile Gly Gly Thr Asn Lys Arg Ala Pro Gly Thr Pro Ala Arg Phe
    50                  55                  60

Ser Gly Ser Leu Leu Gly Gly Lys Ala Ala Leu Thr Leu Ser Gly Ala
65                  70                  75                  80

Gln Pro Glu Asp Glu Ala Glu Tyr Tyr Cys Ala Leu Trp Tyr Lys Gly
                85                  90                  95

Tyr Trp Val Phe Gly Gly Gly Thr Lys Leu Thr Val Leu Gly Arg Thr
            100                 105                 110

Val Ala Ala Pro Ser Val Phe Ile Phe Pro Pro Ser Asp Glu Gln Leu
        115                 120                 125

Lys Ser Gly Thr Ala Ser Val Val Cys Leu Leu Asn Asn Phe Tyr Pro
    130                 135                 140

Arg Glu Ala Lys Val Gln Trp Lys Val Asp Asn Ala Leu Gln Ser Gly
145                 150                 155                 160

Asn Ser Gln Glu Ser Val Thr Glu Gln Asp Ser Lys Asp Ser Thr Tyr
                165                 170                 175

Ser Leu Ser Ser Thr Leu Thr Leu Ser Lys Ala Asp Tyr Glu Lys His
            180                 185                 190

Lys Val Tyr Ala Cys Glu Val Thr His Gln Gly Leu Ser Ser Pro Val
        195                 200                 205

Thr Lys Ser Phe Asn Arg Gly Glu Cys
    210                 215
```

<210> SEQ ID NO 69
<211> LENGTH: 217
<212> TYPE: PRT
<213> ORGANISM: Artificial Sequence
<220> FEATURE:
<223> OTHER INFORMATION: huCD3 1F8 LC-hybrid kappa

<400> SEQUENCE: 69

```
Gln Thr Val Val Thr Gln Glu Pro Ser Leu Thr Val Ser Pro Gly Gly
1               5                   10                  15

Thr Val Thr Leu Thr Cys Arg Ser Ser Thr Gly Ala Val Thr Thr Ser
            20                  25                  30

Asn Tyr Ala Asn Trp Phe Gln Gln Lys Pro Gly Gln Ala Pro Arg Gly
        35                  40                  45

Leu Ile Gly Gly Thr Asn Lys Arg Ala Pro Gly Thr Pro Ala Arg Phe
```

```
                    50                  55                  60
Ser Gly Ser Leu Leu Gly Gly Lys Ala Ala Leu Thr Leu Ser Gly Ala
 65                  70                  75                  80

Gln Pro Glu Asp Glu Ala Glu Tyr Tyr Cys Ala Leu Trp Tyr Asp Gly
                     85                  90                  95

Lys Trp Val Phe Gly Gly Gly Thr Lys Leu Thr Val Leu Gly Arg Thr
                    100                 105                 110

Val Ala Ala Pro Ser Val Phe Ile Phe Pro Pro Ser Asp Glu Gln Leu
                115                 120                 125

Lys Ser Gly Thr Ala Ser Val Val Cys Leu Leu Asn Asn Phe Tyr Pro
            130                 135                 140

Arg Glu Ala Lys Val Gln Trp Lys Val Asp Asn Ala Leu Gln Ser Gly
145                 150                 155                 160

Asn Ser Gln Glu Ser Val Thr Glu Gln Asp Ser Lys Asp Ser Thr Tyr
                165                 170                 175

Ser Leu Ser Ser Thr Leu Thr Leu Ser Lys Ala Asp Tyr Glu Lys His
            180                 185                 190

Lys Val Tyr Ala Cys Glu Val Thr His Gln Gly Leu Ser Ser Pro Val
            195                 200                 205

Thr Lys Ser Phe Asn Arg Gly Glu Cys
            210                 215

<210> SEQ ID NO 70
<211> LENGTH: 217
<212> TYPE: PRT
<213> ORGANISM: Artificial Sequence
<220> FEATURE:
<223> OTHER INFORMATION: huCD3 1A4 LC-hybrid kappa

<400> SEQUENCE: 70

Gln Thr Val Val Thr Gln Glu Pro Ser Leu Thr Val Ser Pro Gly Gly
  1               5                  10                  15

Thr Val Thr Leu Thr Cys Arg Ser Ser Thr Gly Ala Val Thr Thr Ser
             20                  25                  30

Asn Tyr Ala Asn Trp Phe Gln Gln Lys Pro Gly Gln Ala Pro Arg Gly
             35                  40                  45

Leu Ile Gly Gly Thr Asn Lys Arg Ala Pro Gly Thr Pro Ala Arg Phe
         50                  55                  60

Ser Gly Ser Leu Leu Gly Gly Lys Ala Ala Leu Thr Leu Ser Gly Ala
 65                  70                  75                  80

Gln Pro Glu Asp Glu Ala Glu Tyr Tyr Cys Ala Leu Trp Tyr Lys Gln
                     85                  90                  95

Arg Trp Val Phe Gly Gly Gly Thr Lys Leu Thr Val Leu Gly Arg Thr
                    100                 105                 110

Val Ala Ala Pro Ser Val Phe Ile Phe Pro Pro Ser Asp Glu Gln Leu
                115                 120                 125

Lys Ser Gly Thr Ala Ser Val Val Cys Leu Leu Asn Asn Phe Tyr Pro
            130                 135                 140

Arg Glu Ala Lys Val Gln Trp Lys Val Asp Asn Ala Leu Gln Ser Gly
145                 150                 155                 160

Asn Ser Gln Glu Ser Val Thr Glu Gln Asp Ser Lys Asp Ser Thr Tyr
                165                 170                 175

Ser Leu Ser Ser Thr Leu Thr Leu Ser Lys Ala Asp Tyr Glu Lys His
            180                 185                 190

Lys Val Tyr Ala Cys Glu Val Thr His Gln Gly Leu Ser Ser Pro Val
```

Thr Lys Ser Phe Asn Arg Gly Glu Cys
    210                 215

<210> SEQ ID NO 71
<211> LENGTH: 217
<212> TYPE: PRT
<213> ORGANISM: Artificial Sequence
<220> FEATURE:
<223> OTHER INFORMATION: huCD3 1H4 LC-hybrid kappa

<400> SEQUENCE: 71

Gln Thr Val Val Thr Gln Glu Pro Ser Leu Thr Val Ser Pro Gly Gly
1               5                   10                  15

Thr Val Thr Leu Thr Cys Arg Ser Ser Thr Gly Ala Val Thr Thr Ser
            20                  25                  30

Asn Tyr Ala Asn Trp Phe Gln Gln Lys Pro Gly Gln Ala Pro Arg Gly
        35                  40                  45

Leu Ile Gly Gly Thr Asn Lys Arg Ala Pro Gly Thr Pro Ala Arg Phe
    50                  55                  60

Ser Gly Ser Leu Leu Gly Gly Lys Ala Ala Leu Thr Leu Ser Gly Ala
65                  70                  75                  80

Gln Pro Glu Asp Glu Ala Glu Tyr Tyr Cys Ala Leu Trp Tyr Asn Gln
                85                  90                  95

His Trp Val Phe Gly Gly Gly Thr Lys Leu Thr Val Leu Gly Arg Thr
            100                 105                 110

Val Ala Ala Pro Ser Val Phe Ile Phe Pro Pro Ser Asp Glu Gln Leu
        115                 120                 125

Lys Ser Gly Thr Ala Ser Val Val Cys Leu Leu Asn Asn Phe Tyr Pro
    130                 135                 140

Arg Glu Ala Lys Val Gln Trp Lys Val Asp Asn Ala Leu Gln Ser Gly
145                 150                 155                 160

Asn Ser Gln Glu Ser Val Thr Glu Gln Asp Ser Lys Asp Ser Thr Tyr
                165                 170                 175

Ser Leu Ser Ser Thr Leu Thr Leu Ser Lys Ala Asp Tyr Glu Lys His
            180                 185                 190

Lys Val Tyr Ala Cys Glu Val Thr His Gln Gly Leu Ser Ser Pro Val
        195                 200                 205

Thr Lys Ser Phe Asn Arg Gly Glu Cys
    210                 215

<210> SEQ ID NO 72
<211> LENGTH: 220
<212> TYPE: PRT
<213> ORGANISM: Artificial Sequence
<220> FEATURE:
<223> OTHER INFORMATION: CEA 2A3 LC-hybrid kappa

<400> SEQUENCE: 72

Gln Ser Ala Leu Thr Gln Pro Ala Ser Val Ser Gly Ser Pro Gly Gln
1               5                   10                  15

Ser Ile Thr Ile Ser Cys Thr Gly Thr Ser Ser Asp Val Ile Glu Asn
            20                  25                  30

Ala Ile Val Ser Trp Tyr Gln Gln His Pro Gly Lys Ala Pro Lys Pro
        35                  40                  45

Met Ile Tyr Thr Leu Ser Asp Arg Pro Ser Gly Val Ser Asn Arg Phe
    50                  55                  60

```
Ser Gly Ser Lys Ser Gly Asn Thr Ala Ser Leu Thr Ile Ser Gly Leu
 65                  70                  75                  80

Gln Ala Glu Asp Glu Ala Asp Tyr Tyr Cys Ser Ser Trp Asp Thr Phe
                 85                  90                  95

Ala Ile Gly Pro Ala Val Phe Gly Gly Gly Thr Lys Leu Thr Val Leu
            100                 105                 110

Gly Arg Thr Val Ala Ala Pro Ser Val Phe Ile Phe Pro Pro Ser Asp
        115                 120                 125

Glu Gln Leu Lys Ser Gly Thr Ala Ser Val Val Cys Leu Leu Asn Asn
130                 135                 140

Phe Tyr Pro Arg Glu Ala Lys Val Gln Trp Lys Val Asp Asn Ala Leu
145                 150                 155                 160

Gln Ser Gly Asn Ser Gln Glu Ser Val Thr Glu Gln Asp Ser Lys Asp
                165                 170                 175

Ser Thr Tyr Ser Leu Ser Ser Thr Leu Thr Leu Ser Lys Ala Asp Tyr
            180                 185                 190

Glu Lys His Lys Val Tyr Ala Cys Glu Val Thr His Gln Gly Leu Ser
        195                 200                 205

Ser Pro Val Thr Lys Ser Phe Asn Arg Gly Glu Cys
    210                 215                 220

<210> SEQ ID NO 73
<211> LENGTH: 214
<212> TYPE: PRT
<213> ORGANISM: Artificial Sequence
<220> FEATURE:
<223> OTHER INFORMATION: CEA C11 LC (VKCK_C11)

<400> SEQUENCE: 73

Asp Ile Gln Met Thr Gln Ser Pro Ser Thr Leu Ser Ala Ser Val Gly
1               5                   10                  15

Asp Arg Val Thr Ile Thr Cys Arg Ala Ser Gln Leu Ile Ser Asn Gly
            20                  25                  30

Leu Tyr Trp Tyr Gln Gln Lys Pro Gly Lys Ala Pro Lys Leu Leu Ile
        35                  40                  45

Tyr Asp Ala Ser Ile Leu Glu Ser Gly Val Pro Ser Arg Phe Ser Gly
 50                  55                  60

Ser Gly Ser Gly Thr Glu Phe Thr Leu Thr Ile Ser Ser Leu Gln Pro
 65                  70                  75                  80

Asp Asp Phe Ala Thr Tyr Tyr Cys Gln Gln Arg Leu Ser Trp Pro Leu
                 85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205
```

Phe Asn Arg Gly Glu Cys
    210

<210> SEQ ID NO 74
<211> LENGTH: 216
<212> TYPE: PRT
<213> ORGANISM: Artificial Sequence
<220> FEATURE:
<223> OTHER INFORMATION: CEA 1B4 LCEA 1B4 LC (VLCL_1B4)

<400> SEQUENCE: 74

Ser Tyr Val Leu Thr Gln Pro Pro Ser Val Ser Val Ala Pro Gly Lys
1               5                   10                  15

Thr Ala Arg Ile Thr Cys Gly Gly Asn Leu Ile Gly Lys Asn Ala Val
            20                  25                  30

His Trp Tyr Gln Gln Lys Pro Gly Gln Ala Pro Val Leu Val Ile Tyr
        35                  40                  45

Asn Tyr Gly Ile Arg Pro Ser Gly Ile Pro Glu Arg Phe Ser Gly Ser
    50                  55                  60

Asn Ser Gly Asn Thr Ala Thr Leu Thr Ile Ser Arg Val Glu Ala Gly
65                  70                  75                  80

Asp Glu Ala Asp Tyr Tyr Cys Gln Val Trp Asp Thr Leu Lys Leu Glu
                85                  90                  95

Pro Asp Ala Val Phe Gly Gly Gly Thr Lys Leu Thr Val Leu Gly Gln
            100                 105                 110

Pro Lys Ala Ala Pro Ser Val Thr Leu Phe Pro Pro Ser Ser Glu Glu
        115                 120                 125

Leu Gln Ala Asn Lys Ala Thr Leu Val Cys Leu Ile Ser Asp Phe Tyr
    130                 135                 140

Pro Gly Ala Val Thr Val Ala Trp Lys Ala Asp Ser Ser Pro Val Lys
145                 150                 155                 160

Ala Gly Val Glu Thr Thr Thr Pro Ser Lys Gln Ser Asn Asn Lys Tyr
                165                 170                 175

Ala Ala Ser Ser Tyr Leu Ser Leu Thr Pro Glu Gln Trp Lys Ser His
            180                 185                 190

Arg Ser Tyr Ser Cys Gln Val Thr His Glu Gly Ser Thr Val Glu Lys
        195                 200                 205

Thr Val Ala Pro Thr Glu Cys Ser
    210                 215

<210> SEQ ID NO 75
<211> LENGTH: 218
<212> TYPE: PRT
<213> ORGANISM: Artificial Sequence
<220> FEATURE:
<223> OTHER INFORMATION: CEA 1B4 LC-hybrid kappa (VLCK_1B4)

<400> SEQUENCE: 75

Ser Tyr Val Leu Thr Gln Pro Pro Ser Val Ser Val Ala Pro Gly Lys
1               5                   10                  15

Thr Ala Arg Ile Thr Cys Gly Gly Asn Leu Ile Gly Lys Asn Ala Val
            20                  25                  30

His Trp Tyr Gln Gln Lys Pro Gly Gln Ala Pro Val Leu Val Ile Tyr
        35                  40                  45

Asn Tyr Gly Ile Arg Pro Ser Gly Ile Pro Glu Arg Phe Ser Gly Ser
    50                  55                  60

Asn Ser Gly Asn Thr Ala Thr Leu Thr Ile Ser Arg Val Glu Ala Gly
65                  70                  75                  80

Asp Glu Ala Asp Tyr Tyr Cys Gln Val Trp Asp Thr Leu Lys Leu Glu
            85                  90                  95

Pro Asp Ala Val Phe Gly Gly Thr Lys Leu Thr Val Leu Gly Arg
            100                 105                 110

Thr Val Ala Ala Pro Ser Val Phe Ile Phe Pro Pro Ser Asp Glu Gln
        115                 120                 125

Leu Lys Ser Gly Thr Ala Ser Val Val Cys Leu Leu Asn Asn Phe Tyr
        130                 135                 140

Pro Arg Glu Ala Lys Val Gln Trp Lys Val Asp Asn Ala Leu Gln Ser
145                 150                 155                 160

Gly Asn Ser Gln Glu Ser Val Thr Glu Gln Asp Ser Lys Asp Ser Thr
                165                 170                 175

Tyr Ser Leu Ser Ser Thr Leu Thr Leu Ser Lys Ala Asp Tyr Glu Lys
            180                 185                 190

His Lys Val Tyr Ala Cys Glu Val Thr His Gln Gly Leu Ser Ser Pro
        195                 200                 205

Val Thr Lys Ser Phe Asn Arg Gly Glu Cys
        210                 215

<210> SEQ ID NO 76
<211> LENGTH: 645
<212> TYPE: DNA
<213> ORGANISM: Artificial Sequence
<220> FEATURE:
<223> OTHER INFORMATION: VKCK_C11 (DNA)

<400> SEQUENCE: 76
gacatccaga tgacccagtc tccttccacc ctgtctgcat ctgtaggaga cagagtcacc      60
atcacttgcc gggccagtca gcttattagt aatggtttgt attggtatca gcagaaacca     120
gggaaagccc ctaagctcct gatctatgat gcttccattt tggaaagtgg ggtcccatca     180
aggttcagcg gcagtggatc tgggacagag ttcactctca ccatcagcag cctgcagcct     240
gatgattttg caacttatta ctgtcagcag cgtctcagct ggcctctcac tttcggccaa     300
gggaccaagg tggaaatcaa acgtacggtg gctgcaccat ctgtcttcat cttcccgcca     360
tctgatgagc agttgaaatc tggaactgcc tctgttgtgt gcctgctgaa taacttctat     420
cccagagagg ccaaagtaca gtggaaggtg gataacgccc tccaatcggg taactcccag     480
gagagtgtca cagagcagga cagcaaggac agcacctaca gcctcagcag caccctgacg     540
ctgagcaaag cagactacga aaacacaaa gtctacgcct gcgaagtcac ccatcagggc     600
ctgagctcgc ccgtcacaaa gagcttcaac aggggagagt gttaa                     645

<210> SEQ ID NO 77
<211> LENGTH: 651
<212> TYPE: DNA
<213> ORGANISM: Artificial Sequence
<220> FEATURE:
<223> OTHER INFORMATION: VLCL_1B4 (DNA)

<400> SEQUENCE: 77
tcctatgtgc tgactcagcc accctcagtg tcagtggccc caggaaagac ggccaggatt      60
acctgtgggg gaaaccttat tggaaagaat gctgtgcact ggtaccagca gaagccaggc     120
caggcccctg tgctggtcat ctataattat ggtattcggc cctcagggat tcctgagcga     180
ttctctggct ccaactctgg gaacacggcc accctgacca tcagcagggt cgaagccggg     240
gatgaggccg actattactg tcaggtgtgg gatactctta gcttgagcc tgatgctgtg     300

```
ttcggcggag ggaccaagct gaccgtccta ggtcagccca aggctgcccc ctcggtcact      360
ctgttcccgc cctcctctga ggagcttcaa gccaacaagg ccacactggt gtgtctcata      420
agtgacttct acccgggagc cgtgacagtg gcttggaaag cagatagcag ccccgtcaag      480
gcgggagtgg agaccaccac accctccaaa caaagcaaca caagtacgc ggccagcagc       540 tatctgagcc tgacgcctga gcagtggaag tcccacagaa gctacagctg ccaggtcacg      600
catgaaggga gcaccgtgga gaagacagtg gcccctacag aatgttcata a               651
```

<210> SEQ ID NO 78
<211> LENGTH: 651
<212> TYPE: DNA
<213> ORGANISM: Artificial Sequence
<220> FEATURE:
<223> OTHER INFORMATION: VKCK_2F2 (AB1) (DNA)

<400> SEQUENCE: 78

```
gaaattgtgt tgacacagtc tccagccacc ctgtctttgt ctccagggga aagagccacc       60
ctctcctgca gggccagtca gtctgttaat tctaatttaa attggtacca acagaaacct      120
ggccaggctc ccaggctcct catctatcat gggtccaata gggccactgg catcccagcc      180
aggttcagtg gcagtgggtc tgggacagac ttcactctca ccatcagcag cctagagcct      240
gaagattttg cagtttatta ctgtcagcag tttgatctta ggcatgagca taataccttc      300
ggccaaggga ccaaggtgga aatcaaacgt acggtggctg caccatctgt cttcatcttc      360
ccgccatctg atgagcagtt gaaatctgga actgcctctg ttgtgtgcct gctgaataac      420
ttctatccca gagaggccaa agtacagtgg aaggtggata acgccctcca atcgggtaac      480
tcccaggaga gtgtcacaga gcaggacagc aaggacagca cctacagcct cagcagcacc      540
ctgacgctga gcaaagcaga ctacgagaaa cacaaagtct acgcctgcga agtcacccat      600
cagggcctga gctcgcccgt cacaaagagc ttcaacaggg gagagtgtta a               651
```

<210> SEQ ID NO 79
<211> LENGTH: 657
<212> TYPE: DNA
<213> ORGANISM: Artificial Sequence
<220> FEATURE:
<223> OTHER INFORMATION: VLCL_2A3 (AB8) (DNA)

<400> SEQUENCE: 79

```
cagtctgccc tgactcagcc tgcctccgtg tctgggtctc ctggacagtc gatcaccatc       60
tcctgcactg gaaccagcag tgacgttatt gagaatgcta ttgtctcctg gtaccaacag      120
cacccaggca agcccccaa acccatgatt tatactctta gtgatcggcc ctcaggggtt       180
tctaatcgct tctctggctc caagtctggc aacacggcct ccctgaccat ctctgggctc      240
caggctgagg acgaggctga ttattactgc agctcatggg atacttttgc gattggtcct      300
gctgtgttcg gcggagggac caagctgacc gtcctaggtc agcccaaggc tgcccctcg       360 gtcactctgt tcccgccctc tctgaggag cttcaagcca caaggccac actggtgtgt        420 ctcataagtg acttctaccc gggagccgtg acagtggctt ggaaagcaga tagcagcccc      480
gtcaaggcgg gagtggagac caccacaccc tccaaacaaa gcaacaacaa gtacgcggcc      540
agcagctatc tgagcctgac gcctgagcag tggaagtccc acagaagcta cagctgccag      600
gtcacgcatg aagggagcac cgtggagaag acagtggccc ctacagaatg ttcataa        657
```

<210> SEQ ID NO 80

<211> LENGTH: 1365
<212> TYPE: DNA
<213> ORGANISM: Artificial Sequence
<220> FEATURE:
<223> OTHER INFORMATION: Common heavy chain VHCH (wild-type; DNA)

<400> SEQUENCE: 80

| | |
|---|---:|
| gaggtgcagc tggtggagtc tgggggaggc ttggtccagc ctggggggtc cctgaaactc | 60 |
| tcctgtgcag cctctgggtt caccttcaac acctatgcta tgaactgggt ccgccaggct | 120 |
| cccgggaaag gctggagtg ggttggccgt attagaagca aatataacaa ttacgcgaca | 180 |
| tactatgctg actcggtgaa agacaggttc accatctcca gagatgattc aaagaacacg | 240 |
| gcgtatctgc aaatgaacag cctgaaaacc gaggacacgg ccgtgtatta ctgtgtgaga | 300 |
| cacgggaatt tcggcaattc ttatgtctcg tggttcgctt actggggcca agggactctg | 360 |
| gtcacagtct cgagcgcctc caccaagggc ccatcggtct tccccctggc accctcctcc | 420 |
| aagagcacct ctgggggcac agcggccctg ggctgcctgg tcaaggacta cttccccgaa | 480 |
| ccggtgacag tctcgtggaa ctcaggagcc ctgaccagcg gcgtgcacac cttcccggct | 540 |
| gtcctacagt cctcaggact ctactccctc agcagcgtgg tgactgtgcc ctccagcagc | 600 |
| ttgggcaccc agacctacat ctgcaacgtg aatcacaagc ccagcaacac caaggtggac | 660 |
| aagagagttg agcccaaatc ttgtgacaaa actcacacat gcccaccgtg cccagcacct | 720 |
| gaactcctgg ggggaccgtc agtcttcctc ttccccccaa aacccaagga caccctcatg | 780 |
| atctcccgga cccctgaggt cacatgcgtg gtggtggacg tgagccacga agaccctgag | 840 |
| gtcaagttca actggtacgt ggacggcgtg gaggtgcata atgccaagac aaagccgcgg | 900 |
| gaggagcagt acaacagcac gtaccgtgtg gtcagcgtcc tcaccgtcct gcaccaggac | 960 |
| tggctgaatg gcaaggagta caagtgcaag gtctccaaca agccctccc agcccccatc | 1020 |
| gagaaaacca tctccaaagc caaagggcag ccccgagaac cacaggtgta ccctgcccc | 1080 |
| ccatctcggg aggagatgac caagaaccag gtcagcctga cttgcctggt caaaggcttc | 1140 |
| tatcccagcg acatcgccgt ggagtgggag agcaacgggc agccggagaa caactacaag | 1200 |
| accacgcctc ccgtgctgga ctccgacggc tccttcttcc tctatagcaa gctcaccgtg | 1260 |
| gacaagtcca ggtggcagca ggggaacgtc ttctcatgct ccgtgatgca tgaggctctg | 1320 |
| cacaaccact acacgcagaa gagcctctcc ctgtctccgg gttaa | 1365 |

<210> SEQ ID NO 81
<211> LENGTH: 11
<212> TYPE: PRT
<213> ORGANISM: Artificial Sequence
<220> FEATURE:
<223> OTHER INFORMATION: CEA AB13 CDRL1

<400> SEQUENCE: 81

Arg Ala Ser Gln Ser Val Asn Ser Asn Leu Asn
1               5                   10

<210> SEQ ID NO 82
<211> LENGTH: 7
<212> TYPE: PRT
<213> ORGANISM: Artificial Sequence
<220> FEATURE:
<223> OTHER INFORMATION: CEA AB13 CDRL2

<400> SEQUENCE: 82

His Gly Ser Asn Arg Ala Thr
1               5

```
<210> SEQ ID NO 83
<211> LENGTH: 11
<212> TYPE: PRT
<213> ORGANISM: Artificial Sequence
<220> FEATURE:
<223> OTHER INFORMATION: CEA AB13 CDRL3

<400> SEQUENCE: 83

Gln Gln Phe Asp Tyr Phe Met Asn Lys Asn Thr
1               5                   10

<210> SEQ ID NO 84
<211> LENGTH: 11
<212> TYPE: PRT
<213> ORGANISM: Artificial Sequence
<220> FEATURE:
<223> OTHER INFORMATION: CEA AB14 CDRL1

<400> SEQUENCE: 84

Arg Ala Ser Gln Ser Val Asn Ser Asn Leu Asn
1               5                   10

<210> SEQ ID NO 85
<211> LENGTH: 7
<212> TYPE: PRT
<213> ORGANISM: Artificial Sequence
<220> FEATURE:
<223> OTHER INFORMATION: CEA AB14 CDRL2

<400> SEQUENCE: 85

His Gly Ser Asn Arg Ala Thr
1               5

<210> SEQ ID NO 86
<211> LENGTH: 11
<212> TYPE: PRT
<213> ORGANISM: Artificial Sequence
<220> FEATURE:
<223> OTHER INFORMATION: CEA AB14 CDRL3

<400> SEQUENCE: 86

Gln Gln Phe Asp Tyr Phe Arg Glu Ser Asn Thr
1               5                   10

<210> SEQ ID NO 87
<211> LENGTH: 11
<212> TYPE: PRT
<213> ORGANISM: Artificial Sequence
<220> FEATURE:
<223> OTHER INFORMATION: CEA AB15 CDRL1

<400> SEQUENCE: 87

Arg Ala Ser Gln Thr Val Asn Asn Asn Leu Asn
1               5                   10

<210> SEQ ID NO 88
<211> LENGTH: 7
<212> TYPE: PRT
<213> ORGANISM: Artificial Sequence
<220> FEATURE:
<223> OTHER INFORMATION: CEA AB15 CDRL2

<400> SEQUENCE: 88

Tyr Ala Ser Asn Arg Ala Thr
1               5
```

```
<210> SEQ ID NO 89
<211> LENGTH: 11
<212> TYPE: PRT
<213> ORGANISM: Artificial Sequence
<220> FEATURE:
<223> OTHER INFORMATION: CEA AB15 CDRL3

<400> SEQUENCE: 89

Gln Gln Phe Asn Tyr His His Glu His Asn Thr
1               5                   10

<210> SEQ ID NO 90
<211> LENGTH: 11
<212> TYPE: PRT
<213> ORGANISM: Artificial Sequence
<220> FEATURE:
<223> OTHER INFORMATION: CEA AB17 CDRL1

<400> SEQUENCE: 90

Arg Ala Ser Gln Ser Val Asn Ser Asn Leu Asn
1               5                   10

<210> SEQ ID NO 91
<211> LENGTH: 7
<212> TYPE: PRT
<213> ORGANISM: Artificial Sequence
<220> FEATURE:
<223> OTHER INFORMATION: CEA AB17 CDRL2

<400> SEQUENCE: 91

His Gly Ser Asn Arg Ala Thr
1               5

<210> SEQ ID NO 92
<211> LENGTH: 11
<212> TYPE: PRT
<213> ORGANISM: Artificial Sequence
<220> FEATURE:
<223> OTHER INFORMATION: CEA AB17 CDRL3

<400> SEQUENCE: 92

Gln Gln Phe Asp Tyr Phe Lys Glu His Asn Thr
1               5                   10

<210> SEQ ID NO 93
<211> LENGTH: 11
<212> TYPE: PRT
<213> ORGANISM: Artificial Sequence
<220> FEATURE:
<223> OTHER INFORMATION: CEA AB20 CDRL1

<400> SEQUENCE: 93

Arg Ala Ser Gln Ser Val Asn Ser Asn Leu Asn
1               5                   10

<210> SEQ ID NO 94
<211> LENGTH: 7
<212> TYPE: PRT
<213> ORGANISM: Artificial Sequence
<220> FEATURE:
<223> OTHER INFORMATION: CEA AB20 CDRL2

<400> SEQUENCE: 94

His Gly Ser Asn Arg Ala Thr
1               5
```

```
<210> SEQ ID NO 95
<211> LENGTH: 11
<212> TYPE: PRT
<213> ORGANISM: Artificial Sequence
<220> FEATURE:
<223> OTHER INFORMATION: CEA AB20 CDRL3

<400> SEQUENCE: 95

Gln Gln Phe Asp Tyr Phe Arg Glu Leu Asn Thr
1               5                   10

<210> SEQ ID NO 96
<211> LENGTH: 11
<212> TYPE: PRT
<213> ORGANISM: Artificial Sequence
<220> FEATURE:
<223> OTHER INFORMATION: CEA AB54 CDRL1

<400> SEQUENCE: 96

Arg Ala Ser Gln Glu Val His Lys Asn Leu Asn
1               5                   10

<210> SEQ ID NO 97
<211> LENGTH: 7
<212> TYPE: PRT
<213> ORGANISM: Artificial Sequence
<220> FEATURE:
<223> OTHER INFORMATION: CEA AB54 CDRL2

<400> SEQUENCE: 97

His Ser Ser Asn Arg Ala Thr
1               5

<210> SEQ ID NO 98
<211> LENGTH: 11
<212> TYPE: PRT
<213> ORGANISM: Artificial Sequence
<220> FEATURE:
<223> OTHER INFORMATION: CEA AB54 CDRL3

<400> SEQUENCE: 98

Gln Gln Phe Asn Tyr His His Glu His Asn Thr
1               5                   10

<210> SEQ ID NO 99
<211> LENGTH: 11
<212> TYPE: PRT
<213> ORGANISM: Artificial Sequence
<220> FEATURE:
<223> OTHER INFORMATION: CEA AB60 CDRL1

<400> SEQUENCE: 99

Arg Ala Ser Gln Thr Val Asn Ala Asn Leu Asn
1               5                   10

<210> SEQ ID NO 100
<211> LENGTH: 7
<212> TYPE: PRT
<213> ORGANISM: Artificial Sequence
<220> FEATURE:
<223> OTHER INFORMATION: CEA AB60 CDRL2

<400> SEQUENCE: 100

Tyr Ala Ser Asn Arg Ala Thr
1               5

<210> SEQ ID NO 101
```

```
<211> LENGTH: 11
<212> TYPE: PRT
<213> ORGANISM: Artificial Sequence
<220> FEATURE:
<223> OTHER INFORMATION: CEA AB60 CDRL3

<400> SEQUENCE: 101

Gln Gln Phe Asp Tyr His Asn Glu His Asn Thr
1               5                   10

<210> SEQ ID NO 102
<211> LENGTH: 11
<212> TYPE: PRT
<213> ORGANISM: Artificial Sequence
<220> FEATURE:
<223> OTHER INFORMATION: CEA AB66 CDRL1

<400> SEQUENCE: 102

His Ser Ser Gln Val Val Asn Lys Asn Leu Asn
1               5                   10

<210> SEQ ID NO 103
<211> LENGTH: 7
<212> TYPE: PRT
<213> ORGANISM: Artificial Sequence
<220> FEATURE:
<223> OTHER INFORMATION: CEA AB66 CDRL2

<400> SEQUENCE: 103

His Gly Ser Asn Arg Ala Thr
1               5

<210> SEQ ID NO 104
<211> LENGTH: 11
<212> TYPE: PRT
<213> ORGANISM: Artificial Sequence
<220> FEATURE:
<223> OTHER INFORMATION: CEA AB66 CDRL3

<400> SEQUENCE: 104

Gln Gln Phe Asp Tyr Phe Arg Glu His Asn Thr
1               5                   10

<210> SEQ ID NO 105
<211> LENGTH: 11
<212> TYPE: PRT
<213> ORGANISM: Artificial Sequence
<220> FEATURE:
<223> OTHER INFORMATION: CEA AB71 CDRL1

<400> SEQUENCE: 105

Arg Ala Ser Gln Ser Val Asn Ser Asn Leu Asn
1               5                   10

<210> SEQ ID NO 106
<211> LENGTH: 7
<212> TYPE: PRT
<213> ORGANISM: Artificial Sequence
<220> FEATURE:
<223> OTHER INFORMATION: CEA AB71 CDRL2

<400> SEQUENCE: 106

His Ser Ser Asn Arg Pro His
1               5

<210> SEQ ID NO 107
<211> LENGTH: 11
```

```
<212> TYPE: PRT
<213> ORGANISM: Artificial Sequence
<220> FEATURE:
<223> OTHER INFORMATION: CEA AB71 CDRL3

<400> SEQUENCE: 107

Gln Gln Phe Asp Tyr Phe Lys Glu His Asn Thr
1               5                   10

<210> SEQ ID NO 108
<211> LENGTH: 11
<212> TYPE: PRT
<213> ORGANISM: Artificial Sequence
<220> FEATURE:
<223> OTHER INFORMATION: CEA AB72 CDRL1

<400> SEQUENCE: 108

Arg Ala Ser Gln Ser Val Asn Ser Asn Leu Asn
1               5                   10

<210> SEQ ID NO 109
<211> LENGTH: 7
<212> TYPE: PRT
<213> ORGANISM: Artificial Sequence
<220> FEATURE:
<223> OTHER INFORMATION: CEA AB72 CDRL2

<400> SEQUENCE: 109

His Ser Thr Asn Arg Pro Arg
1               5

<210> SEQ ID NO 110
<211> LENGTH: 11
<212> TYPE: PRT
<213> ORGANISM: Artificial Sequence
<220> FEATURE:
<223> OTHER INFORMATION: CEA AB72 CDRL3

<400> SEQUENCE: 110

Gln Gln Phe Asp Tyr Phe Lys Glu Tyr Asn Thr
1               5                   10

<210> SEQ ID NO 111
<211> LENGTH: 11
<212> TYPE: PRT
<213> ORGANISM: Artificial Sequence
<220> FEATURE:
<223> OTHER INFORMATION: CEA AB73 CDRL1

<400> SEQUENCE: 111

Arg Ala Ser Gln Ser Val Asn Ser Asn Leu Asn
1               5                   10

<210> SEQ ID NO 112
<211> LENGTH: 7
<212> TYPE: PRT
<213> ORGANISM: Artificial Sequence
<220> FEATURE:
<223> OTHER INFORMATION: CEA AB73 CDRL2

<400> SEQUENCE: 112

His Ser Asn Asn Arg Pro His
1               5

<210> SEQ ID NO 113
<211> LENGTH: 11
<212> TYPE: PRT
```

<213> ORGANISM: Artificial Sequence
<220> FEATURE:
<223> OTHER INFORMATION: CEA AB73 CDRL3

<400> SEQUENCE: 113

Gln Gln Phe Asp Tyr Phe Arg Glu Tyr Asn Thr
1               5                   10

<210> SEQ ID NO 114
<211> LENGTH: 109
<212> TYPE: PRT
<213> ORGANISM: Artificial Sequence
<220> FEATURE:
<223> OTHER INFORMATION: CEA AB13 VL variable light chain region

<400> SEQUENCE: 114

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Asn Ser Asn
            20                  25                  30

Leu Asn Trp Tyr Gln Gln Lys Pro Gly Gln Ala Pro Arg Leu Leu Ile
        35                  40                  45

Tyr His Gly Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asp Tyr Phe Met Asn
                85                  90                  95

Lys Asn Thr Phe Gly Gln Gly Thr Lys Val Glu Ile Lys
            100                 105

<210> SEQ ID NO 115
<211> LENGTH: 109
<212> TYPE: PRT
<213> ORGANISM: Artificial Sequence
<220> FEATURE:
<223> OTHER INFORMATION: CEA AB14 VL variable light chain region

<400> SEQUENCE: 115

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Thr Val Asn Asn Asn
            20                  25                  30

Leu Asn Trp Tyr Gln Gln Lys Pro Gly Gln Ser Pro Arg Leu Leu Ile
        35                  40                  45

Tyr Tyr Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asn Tyr His His Glu
                85                  90                  95

His Asn Thr Phe Gly Gln Gly Thr Lys Val Glu Ile Lys
            100                 105

<210> SEQ ID NO 116
<211> LENGTH: 109
<212> TYPE: PRT
<213> ORGANISM: Artificial Sequence
<220> FEATURE:
<223> OTHER INFORMATION: CEA AB15 VL variable light chain region -continued

<400> SEQUENCE: 116

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Thr Val Asn Asn Asn
            20                  25                  30

Leu Asn Trp Tyr Gln Gln Lys Pro Gly Gln Ser Pro Arg Leu Leu Ile
        35                  40                  45

Tyr Tyr Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asn Tyr His His Glu
                85                  90                  95

His Asn Thr Phe Gly Gln Gly Thr Lys Val Glu Ile Lys
            100                 105

<210> SEQ ID NO 117
<211> LENGTH: 109
<212> TYPE: PRT
<213> ORGANISM: Artificial Sequence
<220> FEATURE:
<223> OTHER INFORMATION: CEA AB17 VL variable light chain region

<400> SEQUENCE: 117

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Asn Ser Asn
            20                  25                  30

Leu Asn Trp Tyr Gln Gln Lys Pro Gly Gln Ala Pro Arg Leu Leu Ile
        35                  40                  45

Tyr His Gly Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asp Tyr Phe Lys Glu
                85                  90                  95

His Asn Thr Phe Gly Gln Gly Thr Lys Val Glu Ile Lys
            100                 105

<210> SEQ ID NO 118
<211> LENGTH: 109
<212> TYPE: PRT
<213> ORGANISM: Artificial Sequence
<220> FEATURE:
<223> OTHER INFORMATION: CEA AB20 VL variable light chain region

<400> SEQUENCE: 118

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Asn Ser Asn
            20                  25                  30

Leu Asn Trp Tyr Gln Gln Lys Pro Gly Gln Ala Pro Arg Leu Leu Ile
        35                  40                  45

Tyr His Gly Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

```
Glu Asp Phe Ala Val Tyr Tyr Cys Gln Gln Phe Asp Tyr Phe Arg Glu
                85                  90                  95

Leu Asn Thr Phe Gly Gln Gly Thr Lys Val Glu Ile Lys
            100                 105
```

<210> SEQ ID NO 119
<211> LENGTH: 109
<212> TYPE: PRT
<213> ORGANISM: Artificial Sequence
<220> FEATURE:
<223> OTHER INFORMATION: CEA AB54 VL variable light chain region

<400> SEQUENCE: 119

```
Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Glu Val His Lys Asn
            20                  25                  30

Leu Asn Trp Tyr Gln Gln Lys Pro Gly Gln Ala Pro Arg Leu Leu Ile
        35                  40                  45

Tyr His Ser Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asn Tyr His His Glu
                85                  90                  95

His Asn Thr Phe Gly Gln Gly Thr Lys Val Glu Ile Lys
            100                 105
```

<210> SEQ ID NO 120
<211> LENGTH: 109
<212> TYPE: PRT
<213> ORGANISM: Artificial Sequence
<220> FEATURE:
<223> OTHER INFORMATION: CEA AB60 VL variable light chain region

<400> SEQUENCE: 120

```
Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Thr Val Asn Ala Asn
            20                  25                  30

Leu Asn Trp Tyr Gln Gln Lys Pro Gly Gln Ala Pro Arg Leu Leu Ile
        35                  40                  45

Tyr Tyr Ala Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asp Tyr His Asn Glu
                85                  90                  95

His Asn Thr Phe Gly Gln Gly Thr Lys Val Glu Ile Lys
            100                 105
```

<210> SEQ ID NO 121
<211> LENGTH: 109
<212> TYPE: PRT
<213> ORGANISM: Artificial Sequence
<220> FEATURE:
<223> OTHER INFORMATION: CEA AB66 VL variable light chain region

<400> SEQUENCE: 121

```
Glu Ile Val Leu Thr Gln Ser Pro Ala Thr Leu Ser Leu Ser Pro Gly
```

```
                1               5                  10                 15
Glu Arg Ala Thr Leu Ser Cys His Ser Ser Gln Val Val Asn Lys Asn
            20                  25                 30

Leu Asn Trp Tyr Gln Gln Lys Pro Gly Gln Ala Pro Arg Leu Leu Ile
        35                  40                  45

Tyr His Gly Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asp Tyr Phe Arg Glu
                85                  90                  95

His Asn Thr Phe Gly Gln Gly Thr Lys Val Glu Ile Lys
            100                 105

<210> SEQ ID NO 122
<211> LENGTH: 109
<212> TYPE: PRT
<213> ORGANISM: Artificial Sequence
<220> FEATURE:
<223> OTHER INFORMATION: CEA AB71 VL variable light chain region

<400> SEQUENCE: 122

Glu Ile Val Leu Thr Gln Ser Pro Ala Thr Leu Ser Leu Ser Pro Gly
1               5                  10                 15

Glu Arg Ala Thr Leu Ser Cys Arg Ala Ser Gln Ser Val Asn Ser Asn
            20                  25                  30

Leu Asn Trp Tyr Gln Gln Lys Pro Gly Gln Ala Pro Arg Leu Leu Ile
        35                  40                  45

Tyr His Ser Ser Asn Arg Pro His Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asp Tyr Phe Lys Glu
                85                  90                  95

His Asn Thr Phe Gly Gln Gly Thr Lys Val Glu Ile Lys
            100                 105

<210> SEQ ID NO 123
<211> LENGTH: 109
<212> TYPE: PRT
<213> ORGANISM: Artificial Sequence
<220> FEATURE:
<223> OTHER INFORMATION: CEA AB72 VL variable light chain region

<400> SEQUENCE: 123

Glu Ile Val Leu Thr Gln Ser Pro Ala Thr Leu Ser Leu Ser Pro Gly
1               5                  10                 15

Glu Arg Ala Thr Leu Ser Cys Arg Ala Ser Gln Ser Val Asn Ser Asn
            20                  25                  30

Leu Asn Trp Tyr Gln Gln Lys Pro Gly Gln Ala Pro Arg Leu Leu Ile
        35                  40                  45

Tyr His Ser Thr Asn Arg Pro Arg Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asp Tyr Phe Lys Glu
                85                  90                  95
```

Tyr Asn Thr Phe Gly Gln Gly Thr Lys Val Glu Ile Lys
            100                 105

<210> SEQ ID NO 124
<211> LENGTH: 109
<212> TYPE: PRT
<213> ORGANISM: Artificial Sequence
<220> FEATURE:
<223> OTHER INFORMATION: CEA AB73 VL variable light chain region

<400> SEQUENCE: 124

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Asn Ser Asn
            20                  25                  30

Leu Asn Trp Tyr Gln Gln Lys Pro Gly Gln Ala Pro Arg Leu Leu Ile
        35                  40                  45

Tyr His Ser Asn Asn Arg Pro His Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asp Tyr Phe Arg Glu
                85                  90                  95

Tyr Asn Thr Phe Gly Gln Gly Thr Lys Val Glu Ile Lys
            100                 105

<210> SEQ ID NO 125
<211> LENGTH: 216
<212> TYPE: PRT
<213> ORGANISM: Artificial Sequence
<220> FEATURE:
<223> OTHER INFORMATION: CEA AB13 LC light chain

<400> SEQUENCE: 125

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Asn Ser Asn
            20                  25                  30

Leu Asn Trp Tyr Gln Gln Lys Pro Gly Gln Ala Pro Arg Leu Leu Ile
        35                  40                  45

Tyr His Gly Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asp Tyr Phe Met Asn
                85                  90                  95

Lys Asn Thr Phe Gly Gln Gly Thr Lys Val Glu Ile Lys Arg Thr Val
            100                 105                 110

Ala Ala Pro Ser Val Phe Ile Phe Pro Pro Ser Asp Glu Gln Leu Lys
        115                 120                 125

Ser Gly Thr Ala Ser Val Val Cys Leu Leu Asn Asn Phe Tyr Pro Arg
    130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
            180                 185                 190

Val Tyr Ala Cys Glu Val Thr His Gln Gly Leu Ser Ser Pro Val Thr
        195                 200                 205

Lys Ser Phe Asn Arg Gly Glu Cys
    210                 215

<210> SEQ ID NO 126
<211> LENGTH: 216
<212> TYPE: PRT
<213> ORGANISM: Artificial Sequence
<220> FEATURE:
<223> OTHER INFORMATION: CEA AB14 LC light chain

<400> SEQUENCE: 126

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Asn Ser Asn
            20                  25                  30

Leu Asn Trp Tyr Gln Gln Lys Pro Gly Gln Ala Pro Arg Leu Leu Ile
        35                  40                  45

Tyr His Gly Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asp Tyr Phe Arg Glu
                85                  90                  95

Ser Asn Thr Phe Gly Gln Gly Thr Lys Val Glu Ile Lys Arg Thr Val
            100                 105                 110

Ala Ala Pro Ser Val Phe Ile Phe Pro Pro Ser Asp Glu Gln Leu Lys
        115                 120                 125

Ser Gly Thr Ala Ser Val Val Cys Leu Leu Asn Asn Phe Tyr Pro Arg
    130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
            180                 185                 190

Val Tyr Ala Cys Glu Val Thr His Gln Gly Leu Ser Ser Pro Val Thr
        195                 200                 205

Lys Ser Phe Asn Arg Gly Glu Cys
    210                 215

<210> SEQ ID NO 127
<211> LENGTH: 216
<212> TYPE: PRT
<213> ORGANISM: Artificial Sequence
<220> FEATURE:
<223> OTHER INFORMATION: CEA AB15 LC light chain

<400> SEQUENCE: 127

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Thr Val Asn Asn Asn
            20                  25                  30

Leu Asn Trp Tyr Gln Gln Lys Pro Gly Gln Ser Pro Arg Leu Leu Ile
        35                  40                  45

Tyr Tyr Ala Ser Asn Arg Ala Thr Gly Ile Pro Ala Arg Phe Ser Gly

```
            50                  55                  60
Ser Gly Ser Gly Thr Asp Phe Thr Leu Thr Ile Ser Ser Leu Glu Pro
 65                  70                  75                  80

Glu Asp Phe Ala Val Tyr Tyr Cys Gln Gln Phe Asn Tyr His His Glu
                 85                  90                  95

His Asn Thr Phe Gly Gln Gly Thr Lys Val Glu Ile Lys Arg Thr Val
                100                 105                 110

Ala Ala Pro Ser Val Phe Ile Phe Pro Pro Ser Asp Glu Gln Leu Lys
                115                 120                 125

Ser Gly Thr Ala Ser Val Val Cys Leu Leu Asn Asn Phe Tyr Pro Arg
        130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
                180                 185                 190

Val Tyr Ala Cys Glu Val Thr His Gln Gly Leu Ser Ser Pro Val Thr
                195                 200                 205

Lys Ser Phe Asn Arg Gly Glu Cys
        210                 215

<210> SEQ ID NO 128
<211> LENGTH: 216
<212> TYPE: PRT
<213> ORGANISM: Artificial Sequence
<220> FEATURE:
<223> OTHER INFORMATION: CEA AB17 LC light chain

<400> SEQUENCE: 128

Glu Ile Val Leu Thr Gln Ser Pro Ala Thr Leu Ser Leu Ser Pro Gly
 1               5                  10                  15

Glu Arg Ala Thr Leu Ser Cys Arg Ala Ser Gln Ser Val Asn Ser Asn
                 20                  25                  30

Leu Asn Trp Tyr Gln Gln Lys Pro Gly Gln Ala Pro Arg Leu Leu Ile
             35                  40                  45

Tyr His Gly Ser Asn Arg Ala Thr Gly Ile Pro Ala Arg Phe Ser Gly
     50                  55                  60

Ser Gly Ser Gly Thr Asp Phe Thr Leu Thr Ile Ser Ser Leu Glu Pro
 65                  70                  75                  80

Glu Asp Phe Ala Val Tyr Tyr Cys Gln Gln Phe Asp Tyr Phe Lys Glu
                 85                  90                  95

His Asn Thr Phe Gly Gln Gly Thr Lys Val Glu Ile Lys Arg Thr Val
                100                 105                 110

Ala Ala Pro Ser Val Phe Ile Phe Pro Pro Ser Asp Glu Gln Leu Lys
                115                 120                 125

Ser Gly Thr Ala Ser Val Val Cys Leu Leu Asn Asn Phe Tyr Pro Arg
        130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
                180                 185                 190

Val Tyr Ala Cys Glu Val Thr His Gln Gly Leu Ser Ser Pro Val Thr
```

-continued

```
                    195                 200                 205

Lys Ser Phe Asn Arg Gly Glu Cys
    210                 215

<210> SEQ ID NO 129
<211> LENGTH: 216
<212> TYPE: PRT
<213> ORGANISM: Artificial Sequence
<220> FEATURE:
<223> OTHER INFORMATION: CEA AB20 LC light chain

<400> SEQUENCE: 129

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Asn Ser Asn
            20                  25                  30

Leu Asn Trp Tyr Gln Gln Lys Pro Gly Gln Ala Pro Arg Leu Leu Ile
        35                  40                  45

Tyr His Gly Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asp Tyr Phe Arg Glu
                85                  90                  95

Leu Asn Thr Phe Gly Gln Gly Thr Lys Val Glu Ile Lys Arg Thr Val
            100                 105                 110

Ala Ala Pro Ser Val Phe Ile Phe Pro Pro Ser Asp Glu Gln Leu Lys
        115                 120                 125

Ser Gly Thr Ala Ser Val Val Cys Leu Leu Asn Asn Phe Tyr Pro Arg
    130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
            180                 185                 190

Val Tyr Ala Cys Glu Val Thr His Gln Gly Leu Ser Ser Pro Val Thr
        195                 200                 205

Lys Ser Phe Asn Arg Gly Glu Cys
    210                 215

<210> SEQ ID NO 130
<211> LENGTH: 216
<212> TYPE: PRT
<213> ORGANISM: Artificial Sequence
<220> FEATURE:
<223> OTHER INFORMATION: CEA AB54 LC light chain

<400> SEQUENCE: 130

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Glu Val His Lys Asn
            20                  25                  30

Leu Asn Trp Tyr Gln Gln Lys Pro Gly Gln Ala Pro Arg Leu Leu Ile
        35                  40                  45

Tyr His Ser Ser Asn Arg Ala Thr Gly Ile Pro Ala Arg Phe Ser Gly
    50                  55                  60
```

```
Ser Gly Ser Gly Thr Asp Phe Thr Leu Thr Ile Ser Ser Leu Glu Pro
 65                  70                  75                  80

Glu Asp Phe Ala Val Tyr Tyr Cys Gln Gln Phe Asn Tyr His His Glu
                 85                  90                  95

His Asn Thr Phe Gly Gln Gly Thr Lys Val Glu Ile Lys Arg Thr Val
            100                 105                 110

Ala Ala Pro Ser Val Phe Ile Phe Pro Pro Ser Asp Glu Gln Leu Lys
        115                 120                 125

Ser Gly Thr Ala Ser Val Val Cys Leu Leu Asn Asn Phe Tyr Pro Arg
    130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
            180                 185                 190

Val Tyr Ala Cys Glu Val Thr His Gln Gly Leu Ser Ser Pro Val Thr
        195                 200                 205

Lys Ser Phe Asn Arg Gly Glu Cys
    210                 215

<210> SEQ ID NO 131
<211> LENGTH: 216
<212> TYPE: PRT
<213> ORGANISM: Artificial Sequence
<220> FEATURE:
<223> OTHER INFORMATION: CEA AB60 LC light chain

<400> SEQUENCE: 131

Glu Ile Val Leu Thr Gln Ser Pro Ala Thr Leu Ser Leu Ser Pro Gly
 1               5                  10                  15

Glu Arg Ala Thr Leu Ser Cys Arg Ala Ser Gln Thr Val Asn Ala Asn
             20                  25                  30

Leu Asn Trp Tyr Gln Gln Lys Pro Gly Gln Ala Pro Arg Leu Leu Ile
         35                  40                  45

Tyr Tyr Ala Ser Asn Arg Ala Thr Gly Ile Pro Ala Arg Phe Ser Gly
 50                  55                  60

Ser Gly Ser Gly Thr Asp Phe Thr Leu Thr Ile Ser Ser Leu Glu Pro
 65                  70                  75                  80

Glu Asp Phe Ala Val Tyr Tyr Cys Gln Gln Phe Asp Tyr His Asn Glu
                 85                  90                  95

His Asn Thr Phe Gly Gln Gly Thr Lys Val Glu Ile Lys Arg Thr Val
            100                 105                 110

Ala Ala Pro Ser Val Phe Ile Phe Pro Pro Ser Asp Glu Gln Leu Lys
        115                 120                 125

Ser Gly Thr Ala Ser Val Val Cys Leu Leu Asn Asn Phe Tyr Pro Arg
    130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
            180                 185                 190

Val Tyr Ala Cys Glu Val Thr His Gln Gly Leu Ser Ser Pro Val Thr
        195                 200                 205
```

Lys Ser Phe Asn Arg Gly Glu Cys
    210                 215

<210> SEQ ID NO 132
<211> LENGTH: 216
<212> TYPE: PRT
<213> ORGANISM: Artificial Sequence
<220> FEATURE:
<223> OTHER INFORMATION: CEA AB66 LC light chain

<400> SEQUENCE: 132

Glu Ile Val Leu Thr Gln Ser Pro Ala Thr Leu Ser Leu Ser Pro Gly
1               5                   10                  15

Glu Arg Ala Thr Leu Ser Cys His Ser Ser Gln Val Val Asn Lys Asn
            20                  25                  30

Leu Asn Trp Tyr Gln Gln Lys Pro Gly Gln Ala Pro Arg Leu Leu Ile
        35                  40                  45

Tyr His Gly Ser Asn Arg Ala Thr Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asp Tyr Phe Arg Glu
                85                  90                  95

His Asn Thr Phe Gly Gln Gly Thr Lys Val Glu Ile Lys Arg Thr Val
            100                 105                 110

Ala Ala Pro Ser Val Phe Ile Phe Pro Pro Ser Asp Glu Gln Leu Lys
        115                 120                 125

Ser Gly Thr Ala Ser Val Val Cys Leu Leu Asn Asn Phe Tyr Pro Arg
    130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
            180                 185                 190

Val Tyr Ala Cys Glu Val Thr His Gln Gly Leu Ser Ser Pro Val Thr
        195                 200                 205

Lys Ser Phe Asn Arg Gly Glu Cys
    210                 215

<210> SEQ ID NO 133
<211> LENGTH: 216
<212> TYPE: PRT
<213> ORGANISM: Artificial Sequence
<220> FEATURE:
<223> OTHER INFORMATION: CEA AB71 LC light chain

<400> SEQUENCE: 133

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Asn Ser Asn
            20                  25                  30

Leu Asn Trp Tyr Gln Gln Lys Pro Gly Gln Ala Pro Arg Leu Leu Ile
        35                  40                  45

Tyr His Ser Ser Asn Arg Pro His Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asp Tyr Phe Lys Glu
                85                  90                  95

His Asn Thr Phe Gly Gln Gly Thr Lys Val Glu Ile Lys Arg Thr Val
            100                 105                 110

Ala Ala Pro Ser Val Phe Ile Phe Pro Pro Ser Asp Glu Gln Leu Lys
            115                 120                 125

Ser Gly Thr Ala Ser Val Val Cys Leu Leu Asn Asn Phe Tyr Pro Arg
        130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
            180                 185                 190

Val Tyr Ala Cys Glu Val Thr His Gln Gly Leu Ser Ser Pro Val Thr
        195                 200                 205

Lys Ser Phe Asn Arg Gly Glu Cys
        210                 215

<210> SEQ ID NO 134
<211> LENGTH: 216
<212> TYPE: PRT
<213> ORGANISM: Artificial Sequence
<220> FEATURE:
<223> OTHER INFORMATION: CEA AB72 LC light chain

<400> SEQUENCE: 134

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Asn Ser Asn
            20                  25                  30

Leu Asn Trp Tyr Gln Gln Lys Pro Gly Gln Ala Pro Arg Leu Leu Ile
        35                  40                  45

Tyr His Ser Thr Asn Arg Pro Arg Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asp Tyr Phe Lys Glu
                85                  90                  95

Tyr Asn Thr Phe Gly Gln Gly Thr Lys Val Glu Ile Lys Arg Thr Val
            100                 105                 110

Ala Ala Pro Ser Val Phe Ile Phe Pro Pro Ser Asp Glu Gln Leu Lys
            115                 120                 125

Ser Gly Thr Ala Ser Val Val Cys Leu Leu Asn Asn Phe Tyr Pro Arg
        130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
            180                 185                 190

Val Tyr Ala Cys Glu Val Thr His Gln Gly Leu Ser Ser Pro Val Thr
        195                 200                 205

Lys Ser Phe Asn Arg Gly Glu Cys
        210                 215

<210> SEQ ID NO 135
<211> LENGTH: 216
<212> TYPE: PRT
<213> ORGANISM: Artificial Sequence
<220> FEATURE:
<223> OTHER INFORMATION: CEA AB73 LC light chain

<400> SEQUENCE: 135

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Asn Ser Asn
            20                  25                  30

Leu Asn Trp Tyr Gln Gln Lys Pro Gly Gln Ala Pro Arg Leu Leu Ile
        35                  40                  45

Tyr His Ser Asn Asn Arg Pro His Gly Ile Pro Ala Arg Phe Ser Gly
    50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Phe Asp Tyr Phe Arg Glu
                85                  90                  95

Tyr Asn Thr Phe Gly Gln Gly Thr Lys Val Glu Ile Lys Arg Thr Val
            100                 105                 110

Ala Ala Pro Ser Val Phe Ile Phe Pro Pro Ser Asp Glu Gln Leu Lys
        115                 120                 125

Ser Gly Thr Ala Ser Val Val Cys Leu Leu Asn Asn Phe Tyr Pro Arg
    130                 135                 140

Glu Ala Lys Val Gln Trp Lys Val Asp Asn Ala Leu Gln Ser Gly Asn
145                 150                 155                 160

Ser Gln Glu Ser Val Thr Glu Gln Asp Ser Lys Asp Ser Thr Tyr Ser
                165                 170                 175

Leu Ser Ser Thr Leu Thr Leu Ser Lys Ala Asp Tyr Glu Lys His Lys
            180                 185                 190

Val Tyr Ala Cys Glu Val Thr His Gln Gly Leu Ser Ser Pro Val Thr
        195                 200                 205

Lys Ser Phe Asn Arg Gly Glu Cys
    210                 215

<210> SEQ ID NO 136
<211> LENGTH: 11
<212> TYPE: PRT
<213> ORGANISM: Artificial Sequence
<220> FEATURE:
<223> OTHER INFORMATION: CEA AB1 CDRL1 mutation
<220> FEATURE:
<221> NAME/KEY: misc_feature
<222> LOCATION: (1)..(2)
<223> OTHER INFORMATION: Xaa can be any naturally occurring amino acid
<220> FEATURE:
<221> NAME/KEY: misc_feature
<222> LOCATION: (5)..(5)
<223> OTHER INFORMATION: Xaa can be any naturally occurring amino acid
<220> FEATURE:
<221> NAME/KEY: misc_feature
<222> LOCATION: (7)..(8)
<223> OTHER INFORMATION: Xaa can be any naturally occurring amino acid

<400> SEQUENCE: 136

Xaa Xaa Ser Gln Xaa Val Xaa Xaa Asn Leu Asn
1               5                   10

```
<210> SEQ ID NO 137
<211> LENGTH: 7
<212> TYPE: PRT
<213> ORGANISM: Artificial Sequence
<220> FEATURE:
<223> OTHER INFORMATION: CEA AB1 CDRL2 mutation
<220> FEATURE:
<221> NAME/KEY: misc_feature
<222> LOCATION: (1)..(3)
<223> OTHER INFORMATION: Xaa can be any naturally occurring amino acid
<220> FEATURE:
<221> NAME/KEY: misc_feature
<222> LOCATION: (6)..(7)
<223> OTHER INFORMATION: Xaa can be any naturally occurring amino acid

<400> SEQUENCE: 137

Xaa Xaa Xaa Asn Arg Xaa Xaa
1               5

<210> SEQ ID NO 138
<211> LENGTH: 11
<212> TYPE: PRT
<213> ORGANISM: Artificial Sequence
<220> FEATURE:
<223> OTHER INFORMATION: CEA AB1 CDRL3 mutation
<220> FEATURE:
<221> NAME/KEY: misc_feature
<222> LOCATION: (2)..(2)
<223> OTHER INFORMATION: Xaa can be any naturally occurring amino acid
<220> FEATURE:
<221> NAME/KEY: misc_feature
<222> LOCATION: (4)..(7)
<223> OTHER INFORMATION: Xaa can be any naturally occurring amino acid
<220> FEATURE:
<221> NAME/KEY: misc_feature
<222> LOCATION: (9)..(9)
<223> OTHER INFORMATION: Xaa can be any naturally occurring amino acid

<400> SEQUENCE: 138

Gln Xaa Phe Xaa Xaa Xaa Xaa Glu Xaa Asn Thr
1               5                   10
```